United States Patent
Sanford

(10) Patent No.: US 12,308,504 B2
(45) Date of Patent: May 20, 2025

(54) COAXIAL RF DUAL-POLARIZED WAVEGUIDE FILTER AND METHOD

(71) Applicant: Ubiquiti Inc., New York, NY (US)

(72) Inventor: John R. Sanford, Escondido, CA (US)

(73) Assignee: Ubiquiti Inc., New York, NY (US)

( * ) Notice: Subject to any disclaimer, the term of this patent is extended or adjusted under 35 U.S.C. 154(b) by 0 days.

(21) Appl. No.: 18/408,541

(22) Filed: Jan. 9, 2024

(65) Prior Publication Data

US 2024/0145894 A1 May 2, 2024

Related U.S. Application Data

(63) Continuation of application No. 16/854,858, filed on Apr. 21, 2020, now Pat. No. 11,909,087, which is a
(Continued)

(51) Int. Cl.
*H01P 1/20* (2006.01)
*H01P 1/208* (2006.01)
(Continued)

(52) U.S. Cl.
CPC ............ *H01P 1/208* (2013.01); *H01P 3/127* (2013.01); *H01P 7/06* (2013.01); *H01Q 1/42* (2013.01);
(Continued)

(58) Field of Classification Search
CPC . H01P 1/208; H01P 3/127; H01P 7/06; H01Q 1/42; H01Q 1/1228; H01Q 15/16;
(Continued)

(56) References Cited

U.S. PATENT DOCUMENTS 2,455,888 A 12/1948 Brown
2,460,869 A 2/1949 Braden
(Continued)

FOREIGN PATENT DOCUMENTS

CN 202042599 U 11/2011
EP 2416449 A1 2/2012
(Continued)

OTHER PUBLICATIONS

Le-Ngoc et al.; Design aspects and performance evaluation of ATCS mobile data link; IEEE 39th; InVehicular Technology Conference; pp. 860-867; May 1, 1989.
(Continued)

*Primary Examiner* — Junpeng Chen
(74) *Attorney, Agent, or Firm* — Shay Glenn LLP

(57) ABSTRACT

A device for transmission of wireless signals that switches between duplexing schemes may include radio circuitry configured to utilize a plurality of duplexing schemes to transmit a radio-frequency signal in a frequency channel from a transmitting reflector and to receive a radio-frequency signal from a receiving reflector, wherein the radio circuitry comprises a transmitter and a receiver, further wherein the transmitter is coupled to the transmitting reflector and the receiver is coupled to the receiving reflector and a detector coupled to either the transmitting reflector or the receiving reflector, wherein the detector is configured to monitor the same frequency channel as the radio-frequency signal transmitted by the radio circuitry to detect a reflection of the transmitted radio-frequency signal.

20 Claims, 74 Drawing Sheets

Related U.S. Application Data continuation of application No. 15/992,163, filed on May 29, 2018, now abandoned, which is a continuation of application No. 14/170,507, filed on Jan. 31, 2014, now abandoned, which is a continuation-in-part of application No. 13/843,205, filed on Mar. 15, 2013, now Pat. No. 9,496,620.

(60) Provisional application No. 61/922,741, filed on Dec. 31, 2013, provisional application No. 61/891,877, filed on Oct. 16, 2013, provisional application No. 61/762,814, filed on Feb. 8, 2013, provisional application No. 61/760,387, filed on Feb. 4, 2013, provisional application No. 61/760,381, filed on Feb. 4, 2013.

(51) Int. Cl.
| | | |
|---|---|---|
| *H01P 3/127* | (2006.01) | |
| *H01P 7/06* | (2006.01) | |
| *H01Q 1/42* | (2006.01) | |
| *H01Q 15/16* | (2006.01) | |
| *H01Q 19/13* | (2006.01) | |
| *H01Q 1/12* | (2006.01) | |
| *H01Q 3/26* | (2006.01) | |
| *H04B 1/38* | (2015.01) | |

(52) U.S. Cl.
CPC ........... *H01Q 15/16* (2013.01); *H01Q 19/134* (2013.01); *H01Q 1/1228* (2013.01); *H01Q 3/26* (2013.01); *H01Q 3/267* (2013.01); *H04B 1/38* (2013.01)

(58) Field of Classification Search
CPC ........ H01Q 19/134; H01Q 3/26; H01Q 3/267; H04B 1/38
See application file for complete search history.

(56) References Cited

U.S. PATENT DOCUMENTS

| | | | |
|---|---|---|---|
| 3,140,491 A | 7/1964 | Ashbaugh et al. | |
| 3,599,219 A | 8/1971 | Holtum et al. | |
| 3,739,392 A | 6/1973 | Ross et al. | |
| 4,578,638 A | 3/1986 | Takano et al. | |
| 4,598,178 A | 7/1986 | Rollins | |
| 4,626,863 A | 12/1986 | Knop et al. | |
| 4,788,554 A | 11/1988 | Smith | |
| 4,918,459 A | 4/1990 | De Teso | |
| 5,010,348 A | 4/1991 | Rene et al. | |
| 5,131,006 A | 7/1992 | Kamerman et al. | |
| 5,151,920 A | 9/1992 | Haagh et al. | |
| 5,295,154 A | 3/1994 | Meier et al. | |
| 5,374,911 A | 12/1994 | Kich et al. | |
| 5,402,136 A | 3/1995 | Goto et al. | |
| 5,406,260 A | 4/1995 | Cummings et al. | |
| 5,422,887 A | 6/1995 | Diepstraten et al. | |
| 5,428,636 A | 6/1995 | Meier | |
| 5,446,792 A | 8/1995 | Sango | |
| 5,504,746 A | 4/1996 | Meier | |
| 5,521,983 A | 5/1996 | Thompson, III et al. | |
| 5,546,397 A | 8/1996 | Mahany | |
| 5,625,365 A | 4/1997 | Tom et al. | |
| 5,706,428 A | 1/1998 | Boer et al. | |
| 5,740,366 A | 4/1998 | Mahany et al. | |
| 5,760,739 A | 6/1998 | Pauli | |
| 5,760,749 A | 6/1998 | Minowa et al. | |
| 5,844,893 A | 12/1998 | Gollnick et al. | |
| 5,907,310 A | 5/1999 | Seewig et al. | |
| 5,936,542 A | 8/1999 | Kleinrock et al. | |
| 5,940,771 A | 8/1999 | Gollnick et al. | |
| 5,943,430 A | 8/1999 | Saitoh | |
| 6,130,892 A | 10/2000 | Short et al. | |
| 6,137,449 A | 10/2000 | Kildal | |
| 6,140,978 A * | 10/2000 | Patenaude | H01Q 5/30 |
| | | | 343/756 |
| 6,169,522 B1 | 1/2001 | Ma et al. | |
| 6,184,840 B1 | 2/2001 | Loug et al. | |
| 6,194,992 B1 | 2/2001 | Short et al. | |
| 6,269,086 B1 * | 7/2001 | Magana | H04W 52/0225 |
| | | | 370/280 |
| 6,337,990 B1 | 1/2002 | Koshino | |
| 6,374,311 B1 | 4/2002 | Mahany et al. | |
| 6,437,757 B1 | 8/2002 | Butler | |
| 6,483,814 B1 * | 11/2002 | Hsu | H04L 1/0003 |
| | | | 455/557 |
| 6,522,305 B2 | 2/2003 | Sharman | |
| 6,563,786 B1 | 5/2003 | Nee | |
| 6,636,894 B1 | 10/2003 | Short et al. | |
| 6,665,536 B1 | 12/2003 | Mahany | |
| 6,697,415 B1 | 2/2004 | Mahany | |
| 6,714,559 B1 | 3/2004 | Meier | |
| 6,788,253 B1 * | 9/2004 | Calin | H04L 5/1484 |
| | | | 342/464 |
| 6,789,110 B1 | 9/2004 | Short et al. | |
| 6,795,035 B2 | 9/2004 | Jocher | |
| 6,795,852 B1 | 9/2004 | Kleinrock et al. | |
| 6,810,426 B2 | 10/2004 | Mysore et al. | |
| 6,857,009 B1 | 2/2005 | Ferreria et al. | |
| 6,868,399 B1 | 3/2005 | Short et al. | |
| 6,970,680 B1 | 11/2005 | Tomoe | |
| 7,020,082 B2 | 3/2006 | Bhagavath et al. | |
| 7,088,727 B1 | 8/2006 | Short et al. | |
| 7,117,526 B1 | 10/2006 | Short | |
| 7,155,196 B1 | 12/2006 | Beard | |
| 7,194,554 B1 | 3/2007 | Short et al. | |
| 7,197,556 B1 | 3/2007 | Short et al. | |
| 7,254,191 B2 | 8/2007 | Sugar et al. | |
| 7,295,165 B2 | 11/2007 | Ferguson et al. | |
| 7,295,812 B2 | 11/2007 | Haapoja et al. | |
| 7,386,002 B2 | 6/2008 | Meier | |
| 7,411,931 B2 * | 8/2008 | Holma | H04W 36/0094 |
| | | | 455/24 |
| 7,457,646 B2 | 11/2008 | Mahany et al. | |
| 7,577,398 B2 | 8/2009 | Judd et al. | |
| 7,656,363 B2 | 2/2010 | Devicque et al. | |
| 7,715,800 B2 | 5/2010 | Sinha | |
| 7,739,383 B1 | 6/2010 | Short et al. | |
| 7,752,334 B2 | 7/2010 | Paunikar et al. | |
| 7,800,551 B2 | 9/2010 | McCown | |
| 7,826,426 B1 | 11/2010 | Bharghavan et al. | |
| 8,077,113 B2 | 12/2011 | Syed et al. | |
| 8,190,708 B1 | 5/2012 | Short et al. | |
| 8,335,272 B2 | 12/2012 | Roberts | |
| 8,385,869 B2 | 2/2013 | Feenaghty et al. | |
| 8,400,937 B2 | 3/2013 | Huang et al. | |
| 8,466,847 B2 | 6/2013 | Pera et al. | |
| 8,483,188 B2 | 7/2013 | Walton et al. | |
| 8,493,279 B2 | 7/2013 | Pera et al. | |
| 8,581,795 B2 | 11/2013 | Simms et al. | |
| 8,751,613 B1 | 6/2014 | Medved et al. | |
| 8,804,622 B1 | 8/2014 | Thal et al. | |
| 8,836,601 B2 | 9/2014 | Sanford et al. | |
| 8,982,901 B2 | 3/2015 | Uppunda et al. | |
| 9,151,572 B1 | 10/2015 | Sieracki | |
| 9,191,037 B2 | 11/2015 | Lascari et al. | |
| 9,368,870 B2 | 6/2016 | Dayanandan et al. | |
| 9,397,820 B2 | 7/2016 | Schulz et al. | |
| 9,490,533 B2 | 11/2016 | Sanford et al. | |
| 9,496,620 B2 | 11/2016 | Schulz et al. | |
| 9,543,635 B2 | 1/2017 | Schulz et al. | |
| 9,634,373 B2 | 4/2017 | Lee et al. | |
| 9,912,034 B2 | 3/2018 | Sanford et al. | |
| 9,941,570 B2 | 4/2018 | Sanford et al. | |
| 9,972,912 B2 | 5/2018 | Schulz et al. | |
| 10,069,580 B2 | 9/2018 | Hardy et al. | |
| 10,136,233 B2 | 11/2018 | Lee et al. | |
| 10,205,471 B2 | 2/2019 | Lascari et al. | |
| 10,312,598 B2 | 6/2019 | Schulz et al. | |
| 10,367,592 B2 | 7/2019 | Hardy et al. | |
| 10,566,676 B2 | 2/2020 | Sanford et al. | |
| 10,623,030 B2 | 4/2020 | Lascari et al. | |

(56) References Cited

U.S. PATENT DOCUMENTS

| | | | |
|---|---|---|---|
| 10,756,422 B2 | 8/2020 | Lee et al. |
| 10,757,518 B2 | 8/2020 | Lee et al. |
| 10,812,204 B2 | 10/2020 | Hardy et al. |
| 10,819,307 B2 | 10/2020 | Sato et al. |
| 11,057,061 B2 | 7/2021 | Lascari et al. |
| 11,196,141 B2 | 12/2021 | Sanford et al. |
| 11,296,805 B2 | 4/2022 | Hardy et al. |
| 11,736,211 B2 | 8/2023 | Hardy et al. |
| 11,804,864 B2 | 10/2023 | Lascari et al. |
| 11,909,087 B2 | 2/2024 | Sanford |
| 2002/0044032 A1 | 4/2002 | Guguen et al. |
| 2002/0098805 A1 | 7/2002 | King |
| 2002/0105913 A1* | 8/2002 | Miya | H04W 36/304 370/254 |
| 2002/0177425 A1 | 11/2002 | Li |
| 2003/0032398 A1 | 2/2003 | Harris |
| 2003/0038753 A1 | 2/2003 | Mahon |
| 2003/0203743 A1 | 10/2003 | Sugar et al. |
| 2003/0207669 A1 | 11/2003 | Kroeger |
| 2003/0221304 A1 | 12/2003 | Janssen et al. |
| 2003/0224801 A1 | 12/2003 | Lovberg et al. |
| 2004/0071298 A1 | 4/2004 | Geeng |
| 2004/0083385 A1 | 4/2004 | Ahmed et al. |
| 2004/0104822 A1 | 6/2004 | Pieralli |
| 2004/0108966 A1 | 6/2004 | McKivergan et al. |
| 2004/0132424 A1 | 7/2004 | Aytur et al. |
| 2004/0161062 A1 | 8/2004 | Richey et al. |
| 2004/0176050 A1 | 9/2004 | Steer et al. |
| 2005/0069056 A1 | 3/2005 | Willingham |
| 2005/0089052 A1 | 4/2005 | Chen et al. |
| 2005/0113035 A1 | 5/2005 | Kyongyop O |
| 2005/0226201 A1 | 10/2005 | McMillin |
| 2005/0245254 A1 | 11/2005 | Hall |
| 2005/0286547 A1* | 12/2005 | Baum | H04B 1/707 370/437 |
| 2006/0001589 A1 | 1/2006 | Nicolae |
| 2006/0007044 A1 | 1/2006 | Crouch et al. |
| 2006/0009177 A1 | 1/2006 | Persico et al. |
| 2006/0068708 A1 | 3/2006 | Dessert et al. |
| 2006/0109931 A1* | 5/2006 | Asai | H04L 27/0012 375/299 |
| 2007/0057860 A1 | 3/2007 | Jaffer et al. |
| 2007/0132651 A1 | 6/2007 | Nilsson |
| 2007/0157482 A1 | 7/2007 | Wallace |
| 2008/0100530 A1 | 5/2008 | Manholm et al. |
| 2008/0123520 A1 | 5/2008 | Ji et al. |
| 2008/0191955 A1 | 8/2008 | Manholm et al. |
| 2008/0199037 A1 | 8/2008 | Xu et al. |
| 2008/0222691 A1 | 9/2008 | Dessert et al. |
| 2008/0224938 A1 | 9/2008 | Udagawa et al. |
| 2008/0240313 A1 | 10/2008 | Deisher et al. |
| 2008/0261548 A1 | 10/2008 | Krone |
| 2008/0297425 A1 | 12/2008 | Axton et al. |
| 2009/0174622 A1 | 7/2009 | Kanou |
| 2009/0253385 A1* | 10/2009 | Dent | H04B 1/0458 455/73 |
| 2009/0267701 A1 | 10/2009 | Parsa et al. |
| 2009/0295677 A1 | 12/2009 | Gratton et al. |
| 2009/0310721 A1 | 12/2009 | Redfern et al. |
| 2009/0322648 A1 | 12/2009 | Bishop et al. |
| 2010/0013729 A1 | 1/2010 | Harel et al. |
| 2010/0053022 A1 | 3/2010 | Mak et al. |
| 2010/0152600 A1 | 6/2010 | Droitcour et al. |
| 2010/0245187 A1 | 9/2010 | Omuro et al. |
| 2010/0285769 A1 | 11/2010 | Conroy et al. |
| 2010/0289705 A1 | 11/2010 | Shtrom et al. |
| 2011/0012801 A1 | 1/2011 | Monte et al. |
| 2011/0013581 A1* | 1/2011 | Lee, II | H04W 72/0453 370/329 |
| 2011/0068988 A1 | 3/2011 | Monte |
| 2011/0081880 A1 | 4/2011 | Ahn et al. |
| 2011/0121734 A1 | 5/2011 | Pape |
| 2011/0168480 A1 | 7/2011 | Sterling et al. |
| 2011/0181479 A1 | 7/2011 | Martin et al. |
| 2011/0210849 A1 | 9/2011 | Howard et al. |
| 2011/0258678 A1 | 10/2011 | Cowling et al. |
| 2012/0013516 A1 | 1/2012 | Ahn et al. |
| 2012/0176608 A1 | 7/2012 | McCown |
| 2012/0196547 A1 | 8/2012 | Rofougaran |
| 2012/0213086 A1 | 8/2012 | Matsuura |
| 2012/0250793 A1 | 10/2012 | Khatana et al. |
| 2012/0274208 A1 | 11/2012 | Chen et al. |
| 2012/0328055 A1 | 12/2012 | Yokote |
| 2013/0002515 A1 | 1/2013 | Hills et al. |
| 2013/0012134 A1 | 1/2013 | Jin et al. |
| 2013/0017794 A1 | 1/2013 | Kloper et al. |
| 2013/0028150 A1 | 1/2013 | Ma et al. |
| 2013/0113993 A1 | 5/2013 | Dagit, III |
| 2013/0135146 A1 | 5/2013 | Ransom et al. |
| 2013/0154894 A1 | 6/2013 | Caimi et al. |
| 2013/0163770 A1 | 6/2013 | Takemura |
| 2013/0249754 A1 | 9/2013 | Rice |
| 2013/0271337 A1 | 10/2013 | Lee et al. |
| 2014/0022131 A1 | 1/2014 | Azulay et al. |
| 2014/0118220 A1 | 5/2014 | Ley |
| 2014/0146924 A1 | 5/2014 | Shattil |
| 2014/0169194 A1 | 6/2014 | Banerjee et al. |
| 2014/0178076 A1 | 6/2014 | Fang et al. |
| 2014/0274177 A1 | 9/2014 | Carbajal |
| 2014/0315599 A1 | 10/2014 | Teichmann et al. |
| 2015/0079945 A1 | 3/2015 | Rubin et al. |
| 2015/0133060 A1 | 5/2015 | Duan |
| 2015/0256275 A1 | 9/2015 | Hinman et al. |
| 2015/0292948 A1 | 10/2015 | Goldring et al. |
| 2016/0183353 A1 | 6/2016 | Louh et al. |
| 2016/0218406 A1 | 7/2016 | Sanford |
| 2018/0269554 A1 | 9/2018 | Sanford |
| 2022/0059922 A1 | 2/2022 | Sanford et al. |
| 2024/0266709 A1 | 8/2024 | Sanford et al. |

FOREIGN PATENT DOCUMENTS

| | | |
|---|---|---|
| JP | S54-95157 U | 7/1979 |
| JP | 2002299940 A | 10/2002 |
| JP | 2007259001 A | 10/2007 |
| JP | 2010192992 A | 9/2010 |
| JP | 2012227863 A | 11/2012 |
| KR | 10-20080079357 A | 9/2008 |
| KR | 20090039578 A | 4/2009 |
| KR | 200450128 Y1 | 8/2010 |
| KR | 101023789 B1 | 3/2011 |
| KR | 101068766 B1 | 9/2011 |
| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2008/042804 A2 | 4/2008 |
| WO | WO2008/154514 A2 | 12/2008 |
| WO | WO2009/131219 A1 | 10/2009 |
| WO | WO2011/005710 A2 | 1/2011 |
| WO | WO2013/071810 A1 | 5/2013 |
| WO | WO2014/017325 A1 | 1/2014 |
| WO | WO2015/054567 A1 | 4/2015 |

OTHER PUBLICATIONS

Lascari et al.; U.S. Appl. No. 18/475,177 entitled "Wireless radio system optimization by persistent spectrum analysis." filed Sep. 26, 2023.

Toseef; LTE Optimization and Resource Management in Wireless Heterogeneous Networks; Universität Bremen; Doctoral dissertation; Feb. 5, 2013; 298 pages; retrieved from the internet (http://nbn-resolving.de/urn:nbn:de:gbv:46-00103197-19) on Jun. 19, 2019.

* cited by examiner

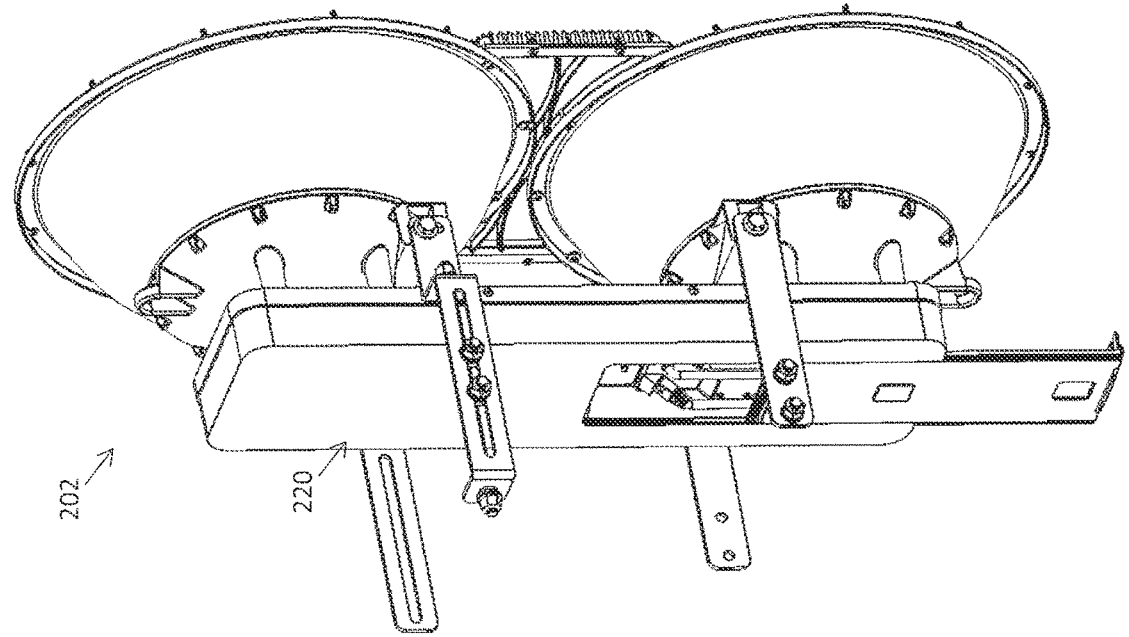
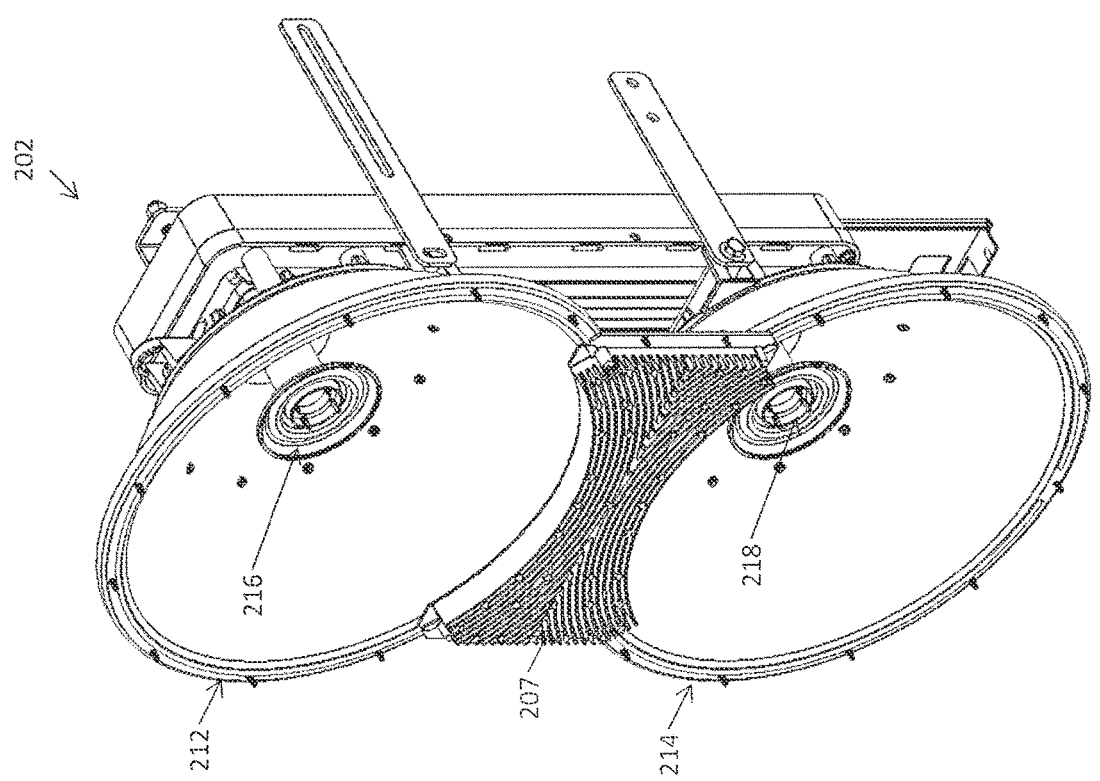

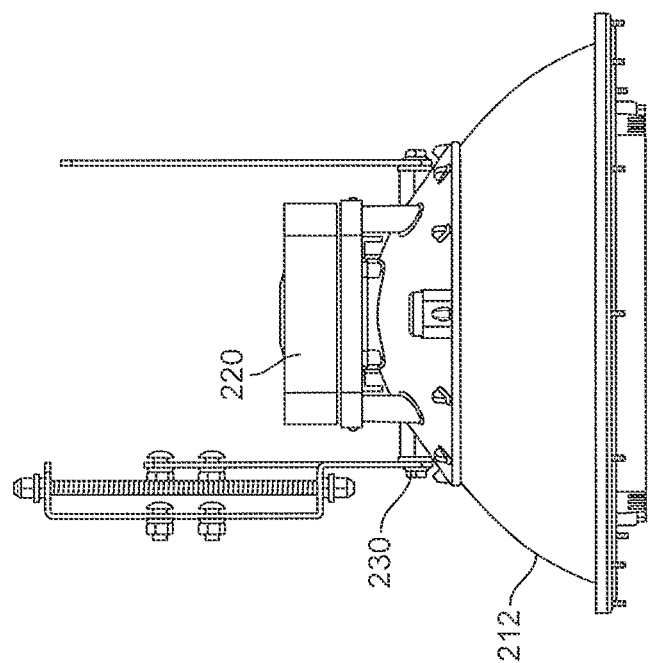
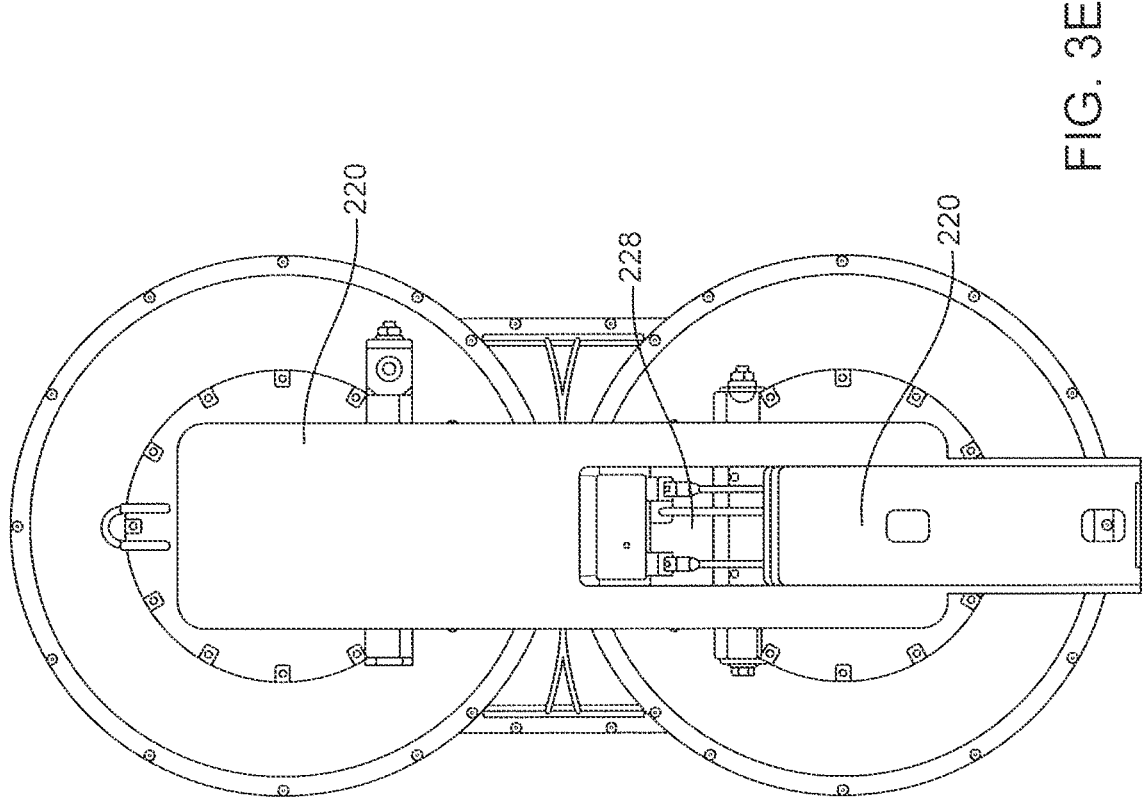
FIG. 3F
FIG. 3E

615 →

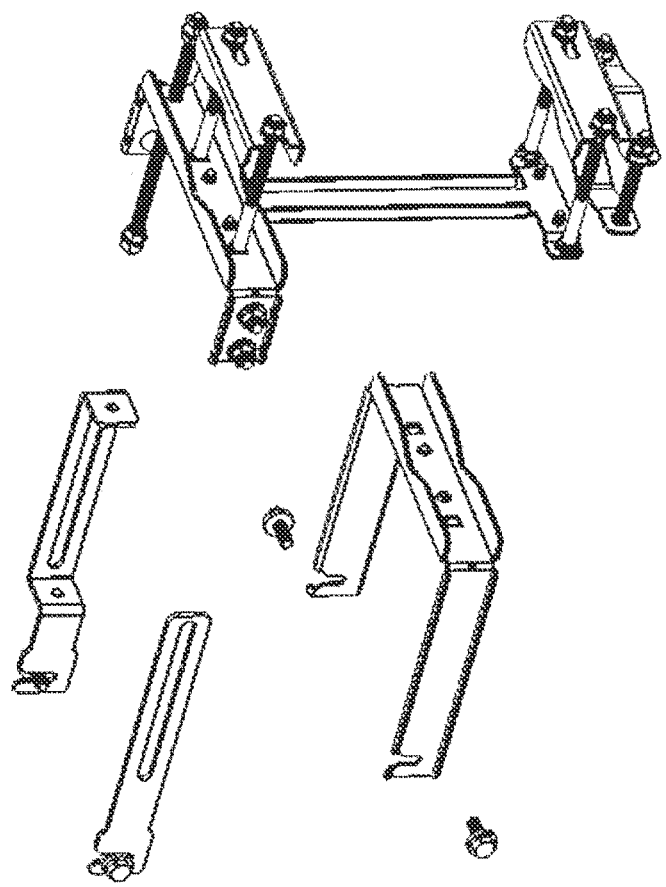
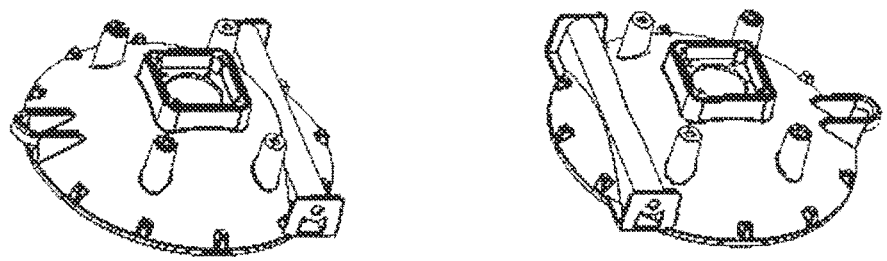
FIG. 8B

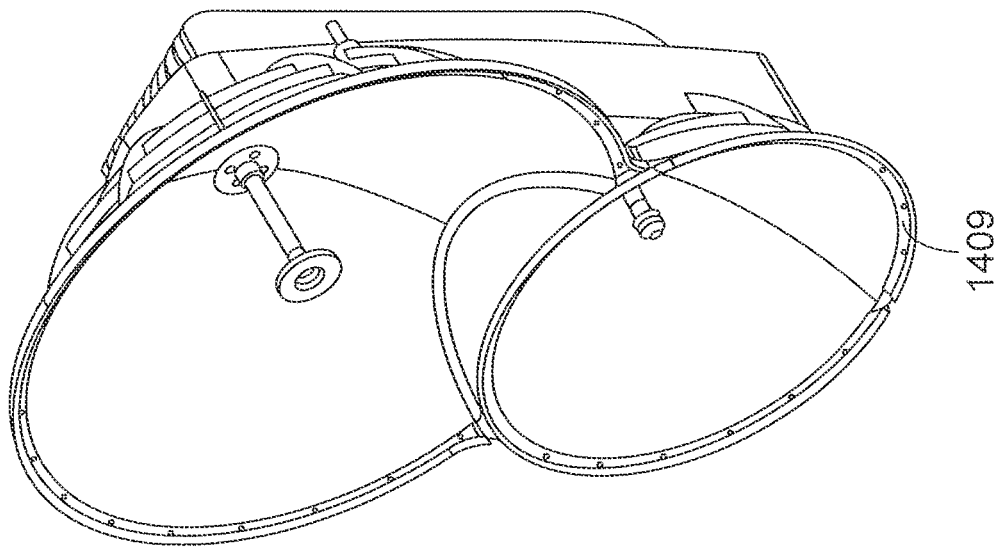
FIG. 14C
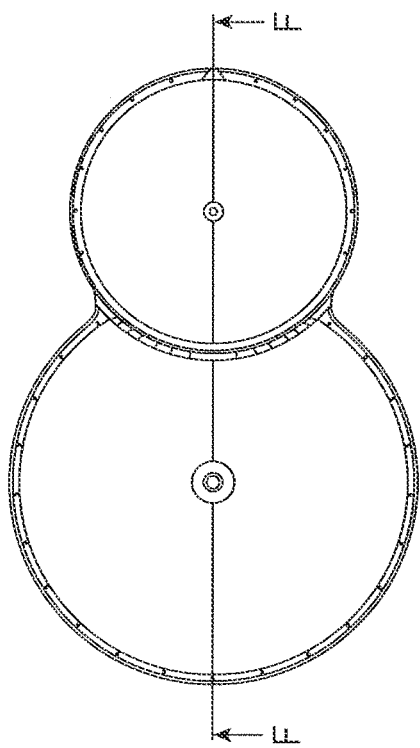
FIG. 14B1
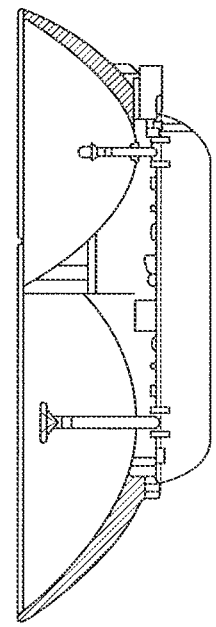
SECTION F-F
FIG. 14B2

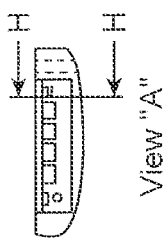
FIG. 15D
FIG. 15E
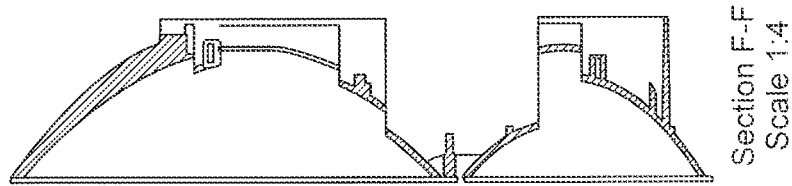
FIG. 15C
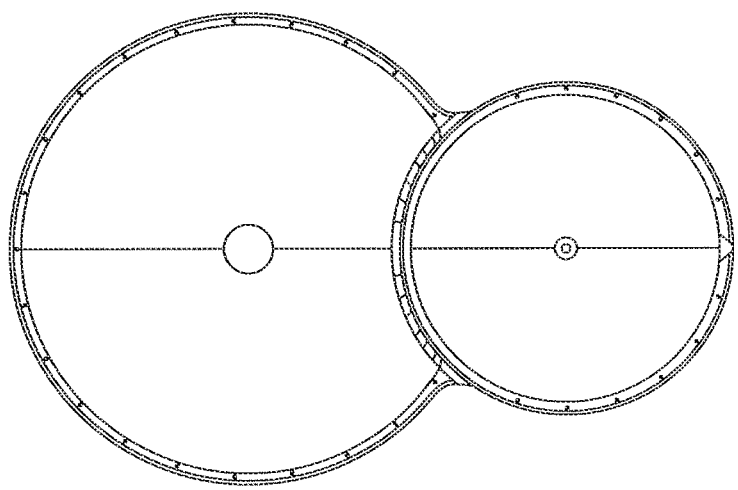
FIG. 15B
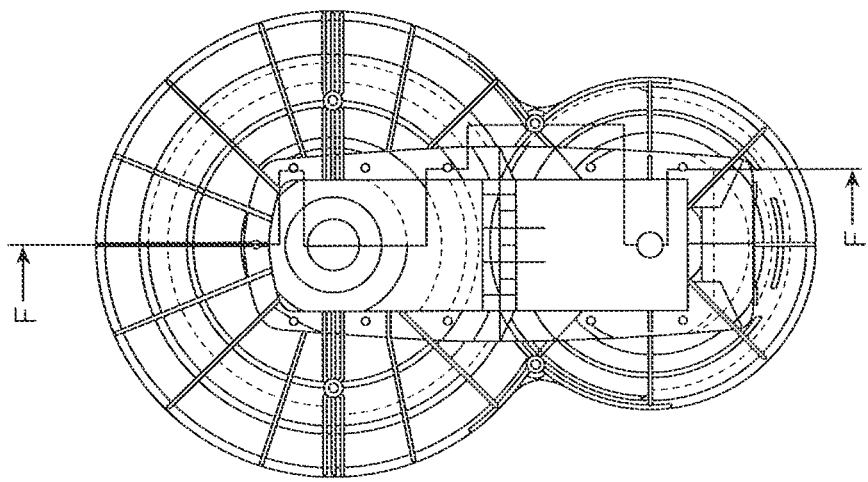
FIG. 15A

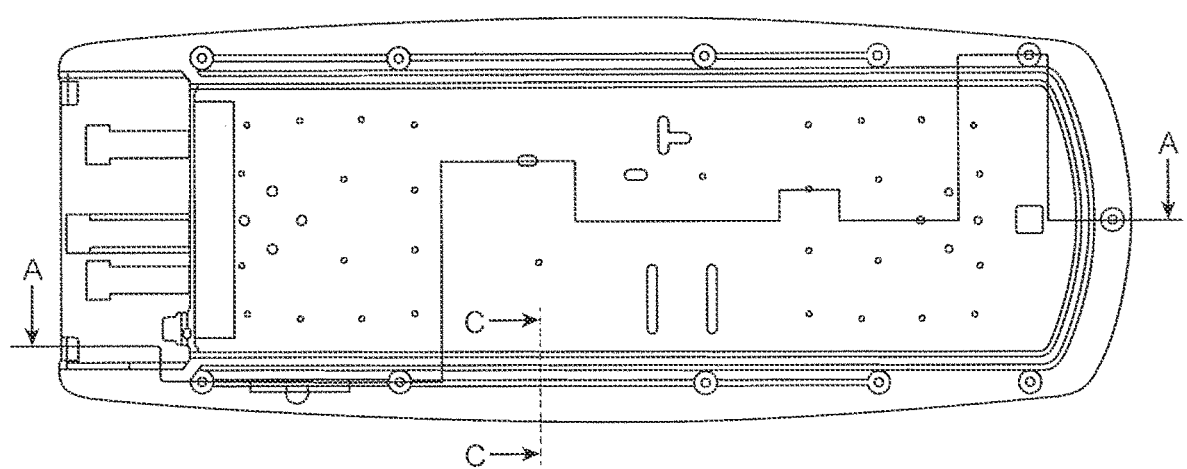
FIG. 16C1
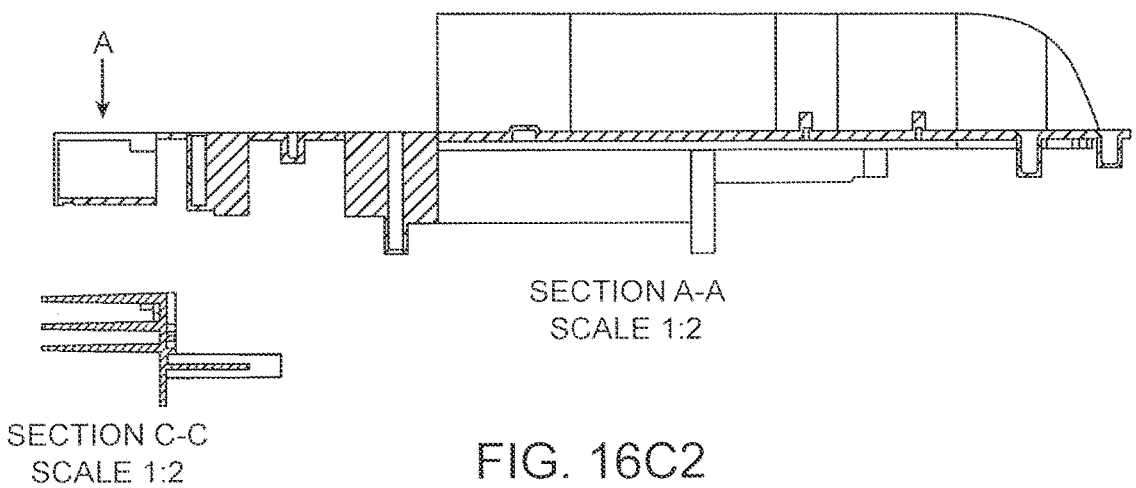
SECTION A-A
SCALE 1:2
SECTION C-C
SCALE 1:2
FIG. 16C2

FIG. 16D1
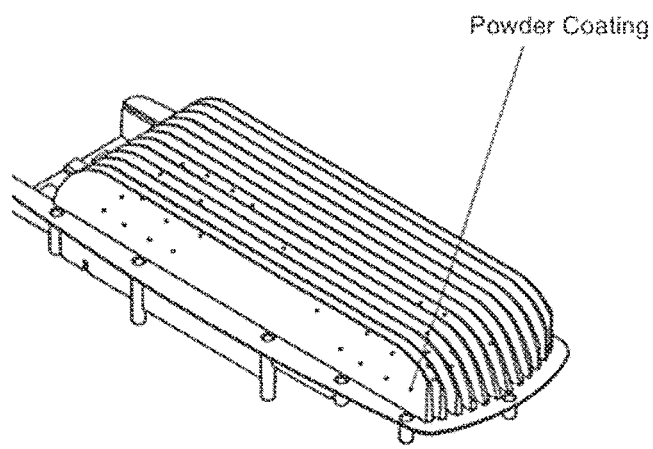
FIG. 16D2
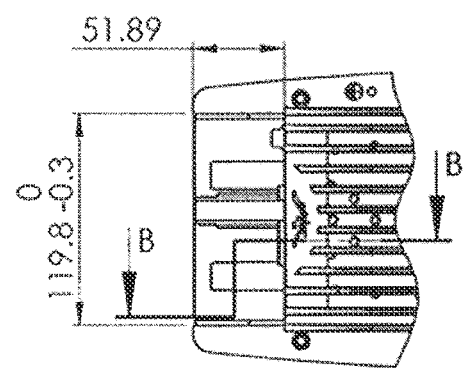
View A (Scale 1:4)
FIG. 16D3
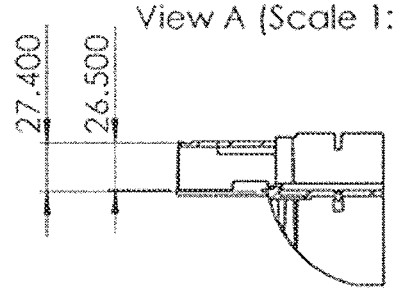
Section B-B
Scale 1 : 4

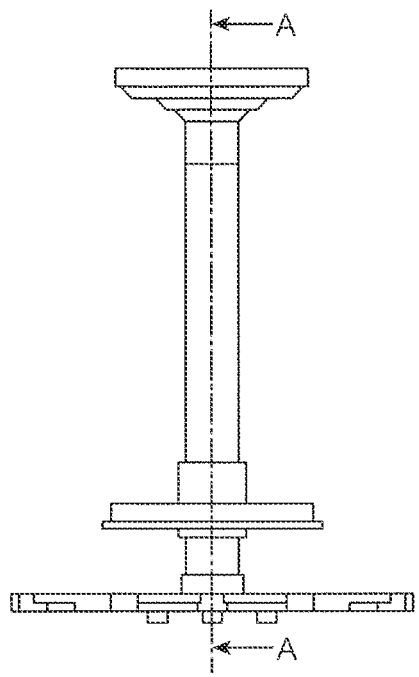
FIG. 17B1
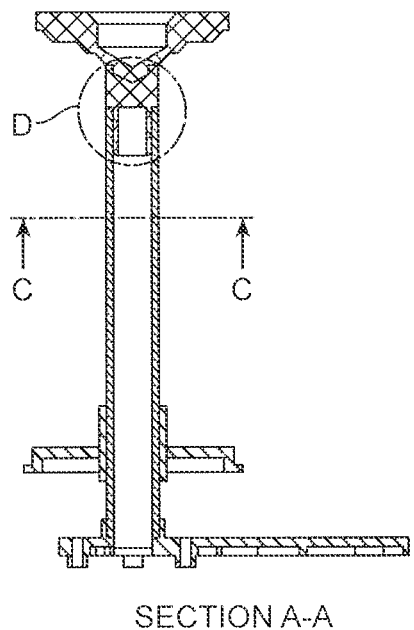
SECTION A-A
FIG. 17B2
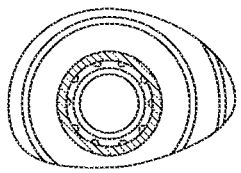
SECTION C-C
FIG. 17B3
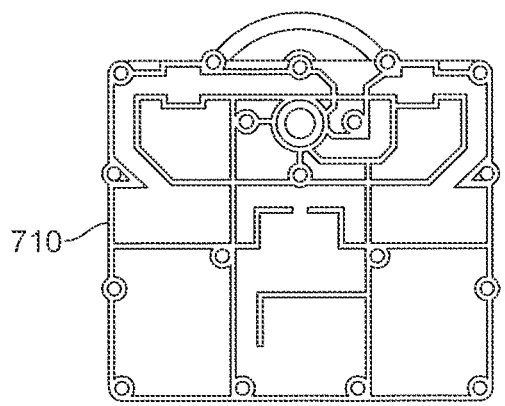
FIG. 17B4
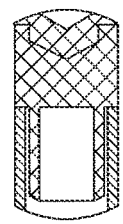
DETAIL D
FIG. 17B5

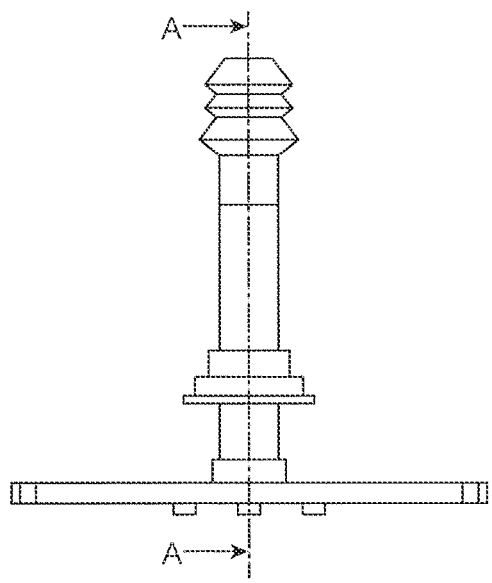
FIG. 18B1
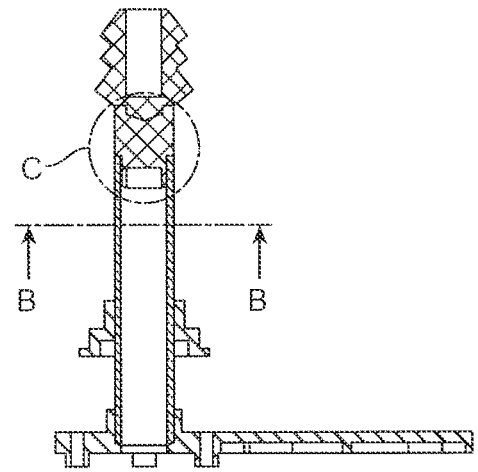
SECTION A-A
FIG. 18B2
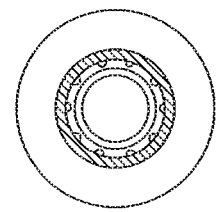
SECTION B-B
SCALE 2:1
FIG. 18B3
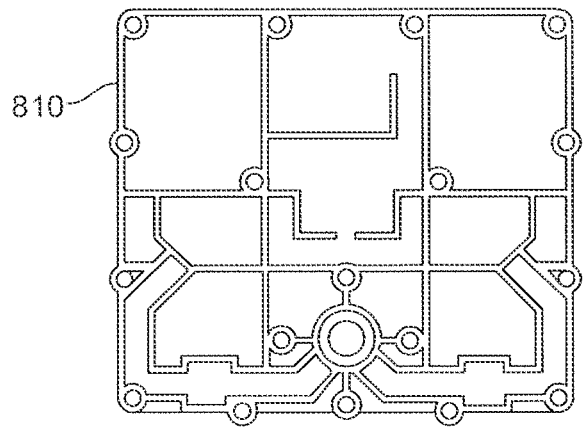
FIG. 18B4
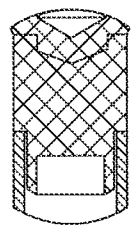
DETAIL C
SCALE 2:1
FIG. 18B5

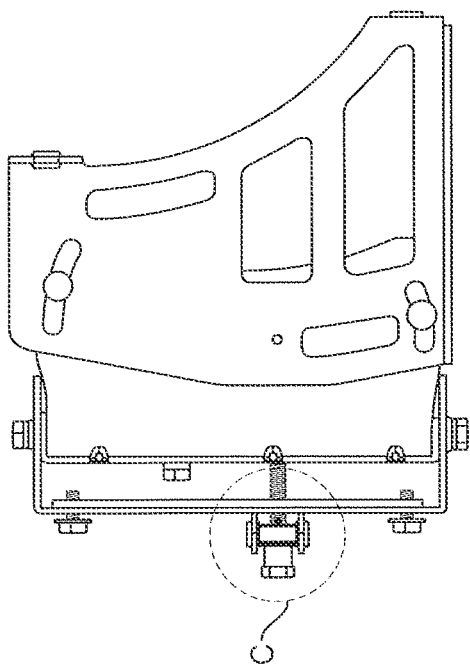
FIG. 19C2
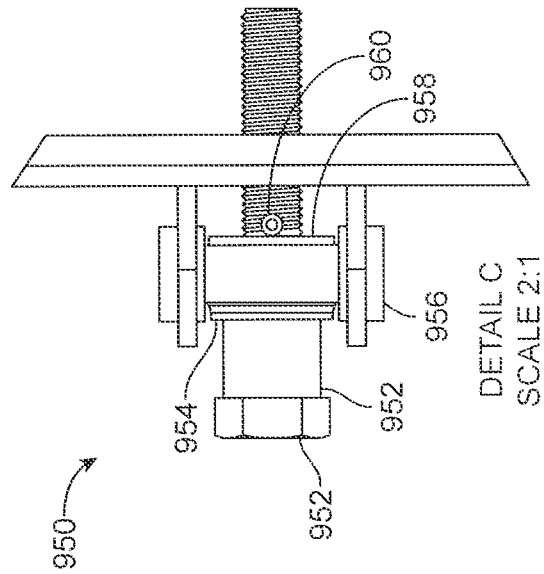
FIG. 19C4
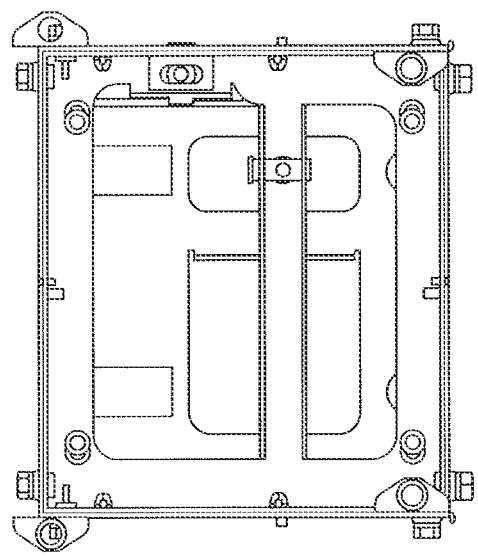
FIG. 19C1
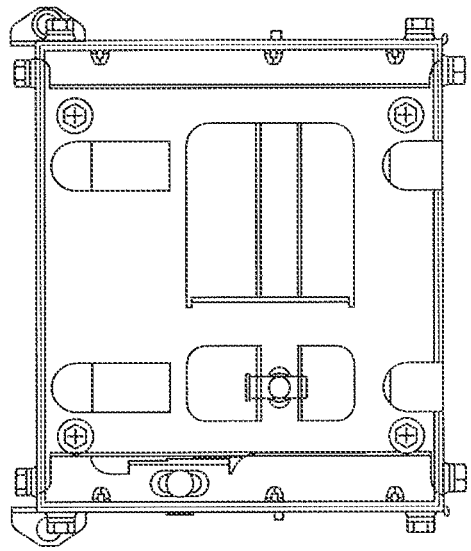
FIG. 19C3

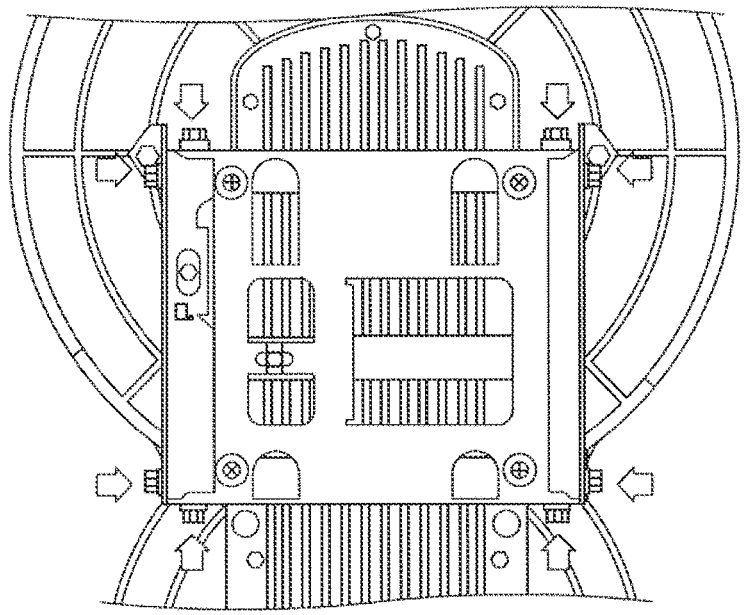
FIG. 19D1
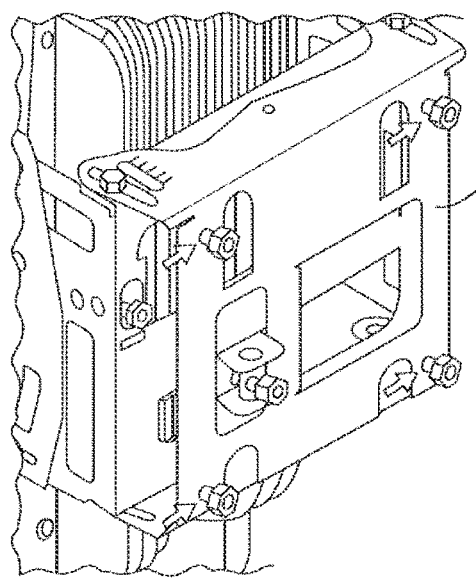
FIG. 19D2
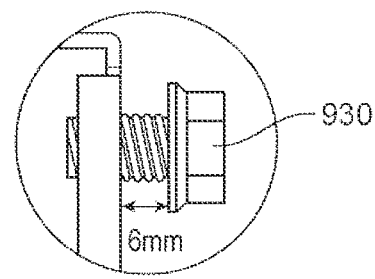
FIG. 19D3

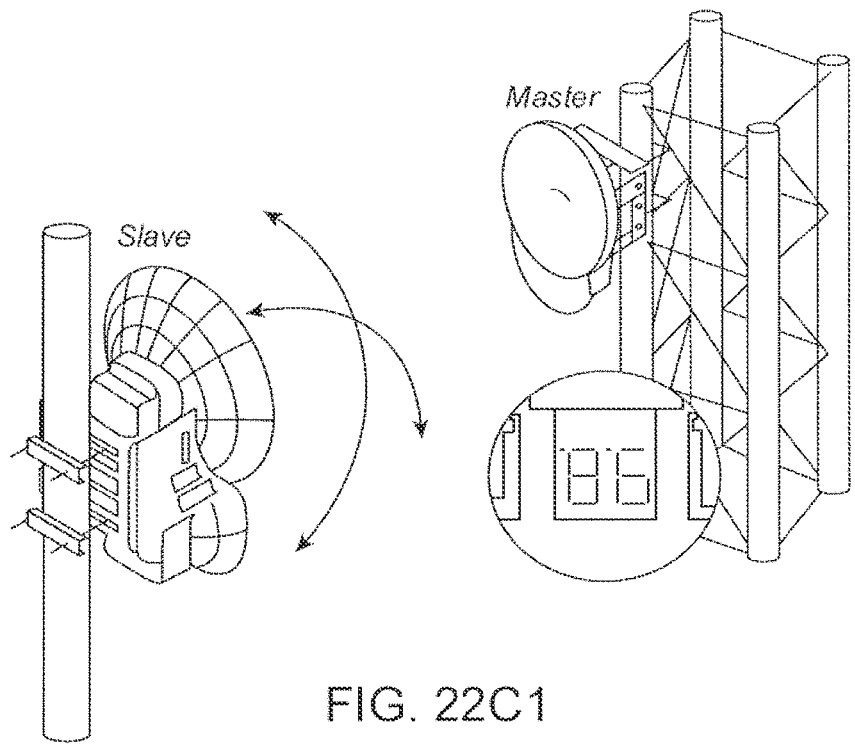
FIG. 22C1
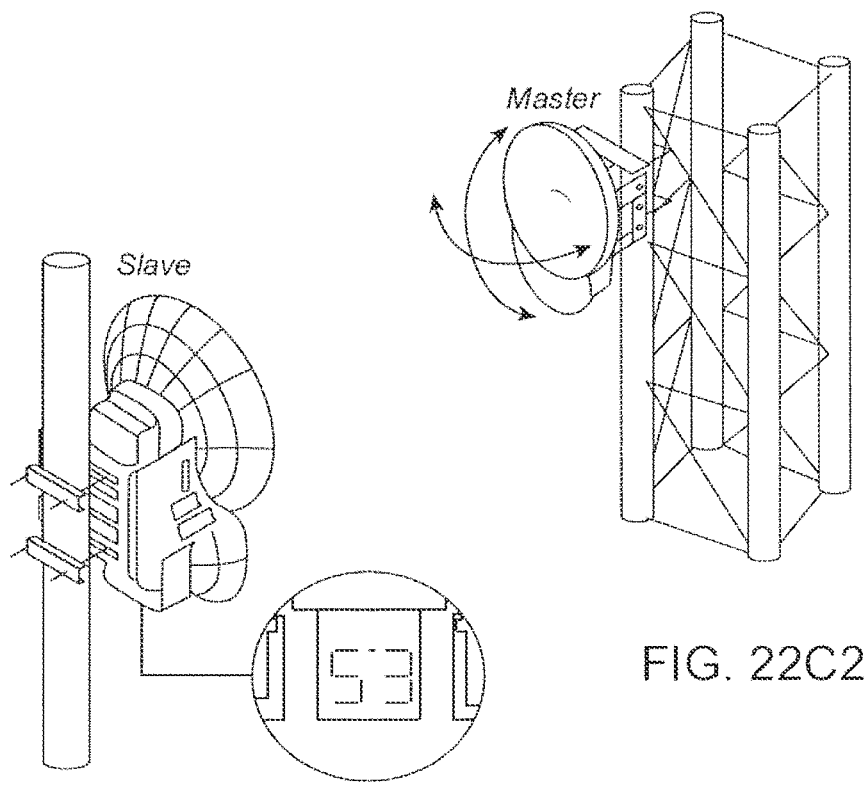
FIG. 22C2

| Receive Sensitivity Specs | | | |
|---|---|---|---|
| Modulation | Sensitivity | FDD Capacity* | TDD Capacity* |
| 64QAM | -66 dBm | 1500 Mbps | 760 Mbps |
| 16QAM | -72 dBm | 1000 Mbps | 507 Mbps |
| QPSK MIMO | -78 dBm | 500 Mbps | 253 Mbps |
| QPSK SISO | -80 dBm | 250 Mbps | 127 Mbps |
| ¼x QPSK SISO | -87 dBm | 62.5 Mbps | 31.7 Mbps |

*FDD = (2) 100 MHz channels and TDD = (1) 100 MHz channel

FIG. 30

| airFiber AF5 | |
|---|---|
| Operating Frequency | 24.05-24.25 GHz |
| Dimensions | 649 x 426 x 303 mm |
| Weight | 10.5 kg (Mount Included) |
| Max. Power Consumption | < 50W |
| Power Supply | 50V, 1.2A PoE GigE Adapter (Included) |
| Power Method | Passive Power over Ethernet (42-58VDC) |
| Certifications | CE, FCC, IC |
| Mounting | Pole Mount Kit (Included) |
| Operating Temperature | -40 to 55°C (-40 to 131°F) |
| LEDs | (8) Status LEDs: Data Port Speed<br>Data Port Link/Activity<br>Configuration Port Speed<br>Configuration Port Link/Activity<br>GPS Synchronization<br>Modulation Mode<br>Master/Slave<br>RF Status<br>(1) Two-Digit LED Display Calibrated in dBm |
| Interface | |
| Data Port | (1) 10/100/1000 Ethernet Port |
| Configuration Port | (1) 10/100 Ethernet Port |
| Auxiliary Port | (1) RJ-12, Alignment Tone Port |
| System | |
| Maximum Throughput | 1.4+ Gbps |
| Maximum Range | 13+ km |
| Packets per Second | > 1 Million |
| Encryption | 128-Bit AES |
| Forward Error Correction | 164/205 |
| Cyclic Prefix | 1/16 Fixed |
| Uplink/Downlink Ratio | 50% Fixed |

FIG. 31

| Radio Frequency | |
|---|---|
| GPS | GPS Clock Synchronization |
| Transceiver | |
| EIRP | ~33 dBm (FCC/IC), ~20 dBm (CE) |
| Frequency Accuracy | ±2.5 ppm without GPS Synchronization<br>± 0.2 ppm with GPS Synchronization |
| Channel Bandwidth | 100 MHz |
| Operating Channels | 24.1 GHz, 24.2 GHz |
| Modulation | 64QAM MIMO<br>16QAM MIMO<br>QPSK MIMO<br>QPSK SISO<br>¼x QPSK SISO |
| Integrated Split Antenna | |
| TX Gain | 33 dBi |
| RX Gain | 38 dBi |
| Beamwidth | < 3.5° |
| Front-to-Back Ratio | 70 dB |
| Polarity | Dual-Slant Polarization |
| Cross-Polarity Isolation | > 28 dB |

FIG. 31 (Cont.)

COAXIAL RF DUAL-POLARIZED WAVEGUIDE FILTER AND METHOD

CROSS REFERENCE TO RELATED APPLICATIONS

This patent application claims priority as a continuation of U.S. patent application Ser. No. 16/854,858, filed Apr. 21, 2020, titled "COAXIAL RF DUAL-POLARIZED WAVEGUIDE FILTER AND METHOD," now U.S. Patent Application Publication No. 2020/0295424, which is a continuation of U.S. patent application Ser. No. 15/992,163, filed May 29, 2018, titled "COAXIAL RF DUAL-POLARIZED WAVEGUIDE FILTER AND METHOD," now U.S. Patent Application Publication No. 2018/0269554, which is a continuation of U.S. patent application Ser. No. 14/170,507, filed Jan. 31, 2014, titled "COAXIAL RF DUAL-POLARIZED WAVEGUIDE FILTER AND METHOD," now U.S. Patent Application Publication No. 2016-0218406, which is a continuation-in-part of U.S. patent application Ser. No. 13/843,205, titled "RADIO SYSTEM FOR LONG-RANGE HIGH-SPEED WIRELESS COMMUNICATION," filed on Mar. 15, 2013, now U.S. Pat. No. 9,496,620. The entire contents of these applications are herein incorporated by reference in their entirety.

U.S. patent application Ser. No. 14/170,507 also claims priority to U.S. Provisional Patent Application No. 61/760,387, titled "DUAL POLARIZED WAVEGUIDE FILTER," and filed on Feb. 4, 2013; U.S. Provisional Patent Application No. 61/760,381, titled "FULL DUPLEX ANTENNA," and filed on Feb. 4, 2013; U.S. Provisional Patent Application No. 61/762,814, titled "RADIO SYSTEM FOR LONG-RANGE HIGH-SPEED WIRELESS COMMUNICATION," and filed on Feb. 8, 2013; U.S. Provisional Patent Application No. 61/891,877, titled "RADIO SYSTEM FOR LONG-RANGE HIGH-SPEED WIRELESS COMMUNICATION," and filed on Oct. 16, 2013; and U.S. Provisional Patent Application No. 61/922,741, titled "RADIO SYSTEM FOR LONG-RANGE HIGH-SPEED WIRELESS COMMUNICATION," and filed on Dec. 31, 2013. The entire contents of each of these applications are herein incorporated by reference in their entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure is generally related to wireless communication systems. More specifically, this disclosure is related to radio systems for high-speed, long-range wireless communication, and particularly radio devices for point-to-point transmission of high bandwidth signals.

BACKGROUND

The rapid development of optical fibers, which permit transmission over longer distances and at higher bandwidths, has revolutionized the telecommunications industry and has played a major role in the advent of the information age. However, there are limitations to the application of optical fibers. Because laying optical fibers in the field can require a large initial investment, it is not cost effective to extend the reach of optical fibers to sparsely populated areas, such as rural regions or other remote, hard-to-reach areas. Moreover, in many scenarios where a business may want to establish point-to-point links among multiple locations, it may not be economically feasible to lay new fibers.

On the other hand, wireless radio communication devices and systems provide high-speed data transmission over an air interface, making it an attractive technology for providing network connections to areas that are not yet reached by fibers or cables. However, currently available wireless technologies for long-range, point-to-point connections encounter many problems, such as limited range and poor signal quality.

Radio frequency (RF) and microwave antennas represent a class of electronic antennas designed to operate on signals in the megahertz to gigahertz frequency ranges. Conventionally these frequency ranges are used by most broadcast radio, television, and wireless communication (cell phones, Wi-Fi, etc.) systems with higher frequencies often employing parabolic antennas.

A parabolic antenna is an antenna that uses a parabolic reflector, a curved surface with the cross-sectional shape of a parabola, to direct the radio waves. Conventionally, a parabolic antenna is includes a portion shaped like a dish and is often referred to as a "dish." Parabolic antennas provide for high directivity of the radio signal because they have very high gain in a single direction. To achieve narrow beam-widths, the parabolic reflector must typically be much larger than the wavelength of the radio waves used, so parabolic antennas are typically used in the high frequency part of the radio spectrum, at UHF and microwave (SHF) frequencies, where the wavelengths are small enough to allow for manageable antenna sizes. Parabolic antennas may be used in point-to-point communications, such as microwave relay links, WAN/LAN links and spacecraft communication antennas.

The operating principle of a parabolic antenna is that a point source of radio waves at the focal point in front of a parabolic reflector of conductive material will be reflected into a collimated plane wave beam along the axis of the reflector. Conversely, an incoming plane wave parallel to the axis will be focused to a point at the focal point.

Conventional radio devices, including radio devices having parabolic reflectors, suffer from a variety of problems, including difficultly in aligning with an appropriate receiver, monitoring and switching between transmitting and receiving functions, avoiding interference (including reflections and spillover from adjacent radios/antennas), and complying with regulatory requirements without negatively impacting function.

Described herein are devices, methods and systems that may address many of the issues identified above.

Also described herein are systems, devices and methods for RF signal filtration, and more particularly to a polarization-preserving RF filter for microwave applications. Radio frequency (RF) and microwave filters represent a class of electronic filters designed to operate on signals in the megahertz to gigahertz frequency ranges. Conventionally these frequency ranges are used by most broadcast radio, television, and wireless communication (cell phones, Wi-Fi, etc.) systems. Accordingly most RF and microwave devices will include some kind of filtering on the signals transmitted or received. Such filters may be used as building blocks for duplexers and diplexers to combine or separate multiple frequency bands.

Conventional RF and microwave filters are often made up of one or more coupled resonators. The unloaded quality ("Q") factor of the resonators being used will generally set the selectivity of the filter. In the microwave range (1 GHz and higher), cavity filters become more practical in terms of size and increased Q factor than lumped element resonators and filters, although power handling capability may decrease. However, well-constructed cavity filters are capable of high selectivity even under high power loads. The resonators on conventional filters are limited because a higher Q factor and increased performance stability may only be achieved by increasing the internal volume of the filter cavities.

Increasingly microwave RF filters are required to have wide bandwidth and preserve all polarizations. While generating attenuation poles at specific frequencies in the filter response is well known in standard multi-pole filters, the polarization-preserving characteristic is not always fully realized.

SUMMARY OF THE DISCLOSURE

In general, described herein are devices and systems, and methods of using them, for point-to-point transmission/communication of high bandwidth signals. For example, described herein are radio devices and systems including dual high-gain reflector antennas. A typical radio device may include a pair of reflectors (e.g., parabolic reflectors) that are adjacent to each other and configured so that one of the reflectors is dedicated for sending/transmitting information, and the adjacent reflector is dedicated for receiving information. Both reflectors may be in a fixed configuration relative to each other so that they are aligned to send/receive in parallel. In many variations the two reflectors are formed of a single housing, so that the parallel alignment is fixed, and reflectors cannot lose alignment. The housing forming or holding the antenna is this fixed parallel alignment may be adapted to prevent disruption of the alignment, for example, by increasing the rigidity of the overall device/system.

In general, the radio systems and devices described herein may be configured for point-to-point operation, and/or for point-to-multipoint operation. These apparatuses may be configured to operate at licensed or unlicensed frequencies, including the unlicensed 24 GHz frequency band. Thus the devices, systems and methods may be configured for operation at this frequency band. In some variations, the apparatus (e.g., devices and/or systems) are configured to transmit and receive between about 4 GHz and about 8 GHz (e.g., around 5 GHz, centered on 5.2 GHz, between about 5470-5950 MHz, between about 5725-6200 MHz, etc.), and/or in the 11 GHz range or 13 GHz range.

The apparatuses described herein may be referred to as dual receiver/transmitter radio devices including an attenuating boundary (e.g., choke) between them ("dual receiver/transmitter radio devices with a choke"). These wireless radio apparatuses may be used for point-to-point or point-to-multipoint transmission/communication of high bandwidth signals. The apparatuses may include a dedicated transmitter, including a dedicated transmitting reflector, and a dedicated receiver, including a dedicated receiving reflector, that are adjacently positioned. In general, the radio devices and systems may include a pair of reflectors separated by an isolation choke boundary. The apparatuses may be configured to operate in any appropriate band (e.g., a 5 GHz band, a 24 GHz band, etc.) and may simultaneously transmit and receive with minimal crosstalk. As described in greater detail below, an isolation choke boundary may have ridges that extend between the first and second reflectors to a height that may attenuate signals in the transmitting/receiving band. For example, an isolation choke boundary may provide greater than 10 dB isolation between the transmitting and receiving reflectors. The reflectors may be in a fixed configuration relative to each other so that they are aligned to send/receive in parallel. The two reflectors may be formed of a single housing, with fixed parallel alignment.

The devices and systems described herein may also be adapted to prevent loss of signal strength for both sending and receiving, including preventing cross-talk or interference between the separate transmission and receiving reflectors. For example, the reflectors may be sized, shaped, and/or positioned to prevent interference, as will be described in greater detail below. The devices and systems may be configured to prevent loss at the radio by shielding (separately or jointly) the transmission and/or receiving components of the radio, e.g., on the circuitry. The device may be configured so that the transmitting and receiving components of the system are located on a single circuit board (e.g., PCB) so that the number of connectors between different components is minimized. Although such configurations may potentially introduce cross-talk/interference between the sending and receiving channels, various design aspects, illustrated and discussed herein, may be included to prevent or reduce such interference.

For example, described herein are radio devices for point-to-point transmission of high bandwidth signals. Such devices may include 1 MHz center channel resolution allows operators to choose the part of the band with the least interference, and/or for the device to automatically choose and/or switch to a band with less interference.

Any or all of the variations of apparatuses (encompassing systems and devices) described herein may include any of the features described for any of the other variations, unless otherwise indicated. For example, any of the variations described herein may include a Radio Alignment Display (RAD) that allows for easier aiming. In general, the RAD includes a dual (e.g., LED) displaying configured to simultaneously show received signal strength on both the local and remote radios. This status monitor may display modulation rates, GPS synchronization status, Ethernet and RF link status, etc. In some variations, the apparatuses described herein may be configured to include a drop-in cradle mount design that allows an installer to fully pre-assemble mounting hardware prior to installation.

As mentioned, some variations of the apparatuses described herein are configured to cover the 5470-5875 MHz bands (which require no licenses in many parts of the world); other variations covers the 5725-6200 MHz bands, and may have robust filtering enabling interference-free coexistence with devices operating in the lower 5 GHz bands. Some variations providing optional use of the less congested 5.9 and 6 GHz bands.

Any of the apparatuses described herein include a parabolic antenna configured for transmission adjacent to a parabolic antenna configured for receiving (both transmitting and receiving broadband radio-frequency signals, e.g., between about 4 and about 8 GHz), where the openings of the two parabolic antennas are separated by an isolation choke boundary reduces or eliminates interference between transmission and receiving. In general, an isolation choke boundary includes a plurality (e.g., >3, more than 5, more than 6, more than 7, more than 7, more than 8, more than 9, more than 10, more than 11, more than 12, more than 13, more than 14, more than 15, more than 16, more than 20, more than 25, etc.) of ridges that extend in height perpendicular to the plane of the opening(s) of the parabolic antenna(s). The ridges may extend at least partially around the perimeter of one or both of the parabolic antenna opening(s). For example, isolation choke boundary may extend just in the region between the openings of the parabolic reflectors. Although any of the apparatuses described herein may include parabolic reflectors, non-parabolic reflectors may also be used.

For example, any of the radio devices for transmission of wireless signals described herein may include: a first reflector; a second reflector; radio circuitry configured for transmission of radio-frequency signals from the first reflector and configured for reception of radio-frequency signals from the second reflector; and an isolation choke boundary coupled between the first reflector and the second reflector.

Any of the radio devices for transmission of broadband wireless signals described herein may include: a first parabolic reflector; a second parabolic reflector; radio circuitry configured for transmission of broadband radio-frequency signals between about 4 and about 8 GHz from the first parabolic reflector and configured for reception of broadband radio-frequency signals between about 4 and about 8 GHz from the second parabolic reflector; and an isolation choke boundary coupled between the first parabolic reflector and the second parabolic reflector, the isolation choke boundary comprising a plurality of ridges extending between the first and second parabolic reflectors. The isolation choke boundary may be configured to provide greater than 10 dB isolation between the first and the second parabolic reflectors.

In general an isolation choke boundary as described herein may be configured to improve the overall isolation between the two parabolic antennas. For example, the overall isolation of radio frequency signals between the first and second parabolic reflectors including the isolation provided by the isolation choke boundary may be greater than about 60 dB (e.g., greater than about 65 dB, greater than about 70 dB, greater than about 75 dB, greater than about 80 dB, etc.). For example, the overall isolation of radio frequency signals between the first and second parabolic reflectors including the isolation provided by the isolation choke boundary may be greater than about 70 dB.

The plurality of ridges of the isolation choke boundary may extend past an outer edge of the first parabolic reflector and an outer edge of the second parabolic reflector. As mentioned, the choke boundary ("choke") may include any appropriate number of ridges. For example, a choke may include at least 10 ridges.

The isolation choke boundary may be mounted to an outer edge of the first parabolic reflector and an outer edge of the second parabolic reflector. In general, the choke boundary may be positioned directly between the two openings (mouths) of the parabolic antenna. The choke boundary may extend completely around the mouths of one (or both) of the parabolic reflectors. As mentioned, the isolation choke boundary may extend only partially around the opening of the parabolic reflector(s). For example, the isolation choke boundary may be positioned between the two reflectors (which may be side-to-side, or separated by some distance) and may extend partially around one (or both) of the opening(s) of the reflector(s). In some variation the isolation choke boundary is bow-tie shaped, with two outer edges that follow the curvature of the reflector mouths. The isolation choke boundary may extend along the edge(s) of the reflector mouth between about 30 and about 180 degrees around the mouth opening (e.g., at least about 40 degrees, at least about 50 degrees, at least about 51 degrees, at least about 52 degrees, at least about 53 degrees, at least about 54 degrees, at least about 55 degrees, etc.). In any of these variations, the isolation choke boundary may overhang an outer edge of the parabolic reflectors. For example, the choke boundary may overhand both the outer edges of the two parabolic reflectors.

As mentioned, the isolation choke boundary may include ridges. The ridges run along the length of the isolation choke boundary (e.g., in the direction of the outer rim of the reflector(s)). In some variations, a first subset of the ridges of the isolation choke boundary follow a curvature (in the major plane of the isolation choke boundary) of the outer edge of the first parabolic reflector and a second subset of the ridges of the isolation choke boundary follow a curvature of the outer edge of the second parabolic reflector. The ridges may be the same heights or different heights. In some variations, the ridges alternate in height. For example, in the isolation choke boundary adjacent ridges in the isolation choke boundary may be separated by a channel; in some variations the depth of each channel may be greater than the width (the distance) between adjacent ridges. The depth between channels may be uniform, or it may be different; in some variations the depth within a channel may vary.

For example, an isolation choke boundary may be configured to extend along the curved boundaries of two adjacent parabolic reflectors and may include a plurality or ridges running adjacent to each other; the ridges may be arranged so that they follow the perimeter of both openings of the parabolic reflectors. The choke boundary may be configured so that the plurality of ridges are arranged along a sinusoidal curve, e.g., so that either the tops or bottoms of adjacent ridges form a sinusoidal curve across a diameter of the isolation choke boundary. Thus, in some variations, the ridges of the isolation choke boundary are arranged along a sinusoidal curve.

Any of the isolation choke boundaries described may have a variable cross-sectional profile in a transverse section through the choke, but may generally be symmetric about the long axis plane (e.g., between the reflectors). Alternatively, in some variations the choke has a non-symmetric rib height profile, and thus symmetry is not a requirement.

Thus, as mentioned, at least some of the ridges of the isolation choke boundary may comprise different heights; adjacent ridges of the isolation choke boundary may comprise different heights and may be separated by channels having different depths. The channels between adjacent ridges of the isolation choke boundary may be separated from each other by some fraction of the wavelengths. The channels between adjacent ridges of the isolation choke boundary may have a depth that is about ¼ of the center frequency used by the apparatus. For example, for an apparatus adapted to transmit between about 5.4 and about 6.2 GHz, the depth(s) of the channels in the isolation choke boundary may be between about 13.89 mm and about 12.1 mm; for apparatuses adapted to operate at between about 4 GHz and about 8 GHz, the depth(s) of the channels in the isolation choke boundary may be between about 18.8 mm and 9.4 mm deep.

In some variations the radio circuitry of the apparatus is configured for transmission of broadband radio-frequency signals between about 5 and about 7 GHz from the first parabolic reflector and for reception of broadband radio-frequency signals between about 5 and about 7 GHz from the second parabolic reflector. The radio circuitry may be configured as a MIMO radio. In some variations the radio circuitry includes two or more receivers that are connected to the receiving parabolic antenna reflector (dish), and/or two or more transmitters that are connected to the transmitting parabolic antenna reflector (dish). In some variations the radio circuitry is configured so that there are at least two receiving chains connected to the receiving parabolic antenna reflector (dish), and/or two or more transmitter chains that are connected to the transmitting parabolic antenna reflector (dish).

Any of the radio devices (apparatuses) for transmission of broadband wireless signals described herein may include: a parabolic transmitting reflector; a parabolic receiving reflector; radio circuitry configured to transmit broadband radio-frequency signals between about 4 and about 8 GHz from the parabolic transmitting reflector and to receive broadband radio-frequency signals between about 4 and about 8 GHz from the parabolic receiving reflector; and an isolation choke boundary between the parabolic transmitting reflector and the parabolic receiving reflector, wherein the isolation choke boundary comprises at least 10 ridges extending between the parabolic transmitting reflector and the parabolic receiving reflector and in the direction of either an outer edge of the transmitting reflector or an outer edge of the receiving reflector.

For example, any of the radio device for transmission of broadband wireless signals described herein may include: a parabolic transmitting reflector; a parabolic receiving reflector; radio circuitry configured to transmit broadband radio-frequency signals between about 5 and about 7 GHz from the parabolic transmitting reflector and to receive broadband radio-frequency signals between about 5 and about 7 GHz from the parabolic receiving reflector; and an isolation choke boundary between the parabolic transmitting reflector and the parabolic receiving reflector, wherein the isolation choke boundary comprises at least 10 ridges extending between the parabolic transmitting reflector and the parabolic receiving reflector and in the direction of either an outer edge of the transmitting reflector or an outer edge of the receiving reflector, wherein the isolation choke boundary provides greater than 10 dB isolation between the parabolic transmission reflector and the parabolic receiving reflector. The overall isolation of radio frequency signals between the parabolic transmitting reflector and the parabolic receiving reflector including the isolation provided by the isolation choke boundary may be greater than about 60 dB.

Any of the radio device for transmission of broadband wireless signals described herein may include: a parabolic transmitting reflector; a parabolic receiving reflector; a radio circuitry configured to transmit radio-frequency signals between about 5 and about 7 GHz from the parabolic transmitting reflector and to receive radio-frequency signals between about 5 and about 7 GHz from the parabolic receiving reflector; and an isolation choke boundary between the parabolic transmitting reflector and the parabolic receiving reflector, wherein the isolation choke boundary comprises a plurality of ridges extending between the parabolic transmitting reflector and the parabolic receiving reflector and in the direction of either an outer edge of the transmitting reflector or an outer edge of the receiving reflector, wherein adjacent ridges of the isolation choke boundary are arranged along a sinusoidal curve.

Also described herein are radio devices for broadband wireless signals (e.g., between about 4 GHz and about 8 GHz) that include a transmitting parabolic reflector and a receiving parabolic reflector that are both mounted to a frame. The radio devices also typically include a pole mount configured to be pre-loaded for mounting to a pole and also include a quick-connect coupling to couple the pole mount with the frame. The pole mount may be connected or connectable to the frame, and the quick connect coupling may be used to "drop" the frame connecting the reflectors and radio circuitry to the pole mount after it has been attached to a pole, stand or some other mount. In some variations the pole mount may be pre-loaded so that it can be quickly and easily mounted to a pole with just pre-attached parts. Thus, mounting may not require separate parts (screws, clasps, etc.) that could be dropped or otherwise separated from the pole mount while connecting to the pole.

For example, any of the apparatuses for transmission of broadband wireless signals described herein may include: a first parabolic reflector; a second parabolic reflector; radio circuitry configured for transmission of broadband radio-frequency signals between about 4 and about 8 GHz from the first parabolic reflector and configured for reception of broadband radio-frequency signals between about 4 and about 8 GHz from the second parabolic reflector; a frame connecting the first parabolic reflector, second parabolic reflector, and housing holding the radio circuitry; and a pole mount configured to be pre-loaded for mounting to a pole, the pole mount further comprising a quick connect coupling to couple the pole mount with the frame.

As discussed above, any of these variations may also include an isolation choke boundary layer between the first and second parabolic reflectors.

In general, the radio circuitry may comprises a printed circuit board (PCB) having a pair of transmitters and a pair of receivers (and/or a pair of transmission pathways or chains and/or a pair of receiving pathways or chains), wherein the transmitters are coupled to the first parabolic reflector and the receivers are coupled to the second parabolic reflector.

In some variations the radio circuitry comprises an elongate PCB, a first feed extending from the PCB to the first parabolic reflector, and a second feed extending from the PCB to the second parabolic reflector. The first feed and the second feed may be configured so that they can work with different-sized parabolic reflectors; this may allow a modular system in which the same radio circuitry (including feeds) may be used with different parabolic reflectors or different "sets" of parabolic reflectors. For example, a first set of parabolic reflectors (e.g., optimized for mid-band, between about 5470-5950 MHz bands or a subset of these) consisting of a transmission parabolic reflector and a receiving parabolic reflector that are each the same general size and shape may be attached to the housing and circuitry; this first set of parabolic reflectors may be switched out with a second set of parabolic reflectors (e.g., optimized for hi-band, between about 5725-6200 MHz bands or a subset of these) that are also the same height, but may be attached to the same circuitry. In some variations the same frame may also be used, and may include a housing for the circuitry; thus only the reflectors and in some variations the isolation choke boundary between the reflectors needs to be swapped. This modular swapping may be performed at the factory (e.g., prior to consumer operation), and allows more flexibility in manufacturing, storing and shipping the devices.

As mentioned, in general the radio circuitry may be configured for transmission of broadband radio-frequency signals between about 5 and 7 GHz from the first parabolic reflector and configured for reception of broadband radio-frequency signals between about 5 and about 7 GHz from the second parabolic reflector.

The quick connect coupling is generally adapted so that the frame can connect into the pole mount easily, regardless of (and accommodating) the weight and size of the antenna. For example, the quick connect coupling may include vertical slots on the pole mount into which the frame may be dropped. Thus, the vertical slots may be oriented so that they engage members on the frame oriented downward (relative to the antenna).

The device (e.g., the frame) may also include one or more elevation adjust (e.g., screw, lever, or any other adjustment mechanism) for adjusting the position of the device. The elevation adjust may be part of the frame and may adjust the position of the entire device (including both antenna reflectors) in one or more of azimuth, altitude, tilt, or the like.

For example, any of the radio devices for transmission of broadband wireless signals described herein may include: a parabolic transmitting reflector; a parabolic receiving reflector; radio circuitry configured to transmit broadband radio-frequency signals between about 4 and about 8 GHz from the parabolic transmitting reflector and to receive broadband radio-frequency signals between about 4 and about 8 GHz from the parabolic receiving reflector, further wherein the radio circuitry comprises a pair of transmitters and a pair of receivers, wherein the transmitters are coupled to the parabolic transmitting reflector and the receivers are coupled to the parabolic receiving reflector; a frame connecting the parabolic transmitting reflector, parabolic receiving reflector, and housing holding the radio circuitry; and a pole mount configured to be pre-loaded for mounting to a pole, the pole mount further comprising a quick connect coupling to couple the pole mount with the frame. The device may also include an isolation choke boundary layer between the parabolic transmitting reflector and the parabolic receiving reflector.

Any of the radio devices for transmission of broadband wireless signals may include: a parabolic transmitting reflector; a parabolic receiving reflector; radio circuitry configured to transmit broadband radio-frequency signals between about 5 and about 7 GHz from the parabolic transmitting reflector and to receive broadband radio-frequency signals between about 5 and about 7 GHz from the parabolic receiving reflector, further wherein the radio circuitry comprises a pair of transmitters and a pair of receivers, wherein the transmitters are coupled to the parabolic transmitting reflector and the receivers are coupled to the parabolic receiving reflector; wherein the radio circuitry comprises an elongate PCB, a transmission feed extending from the PCB to the parabolic transmission reflector, and a receiving feed extending from the PCB to the parabolic receiving reflector; a frame connecting the parabolic transmitting reflector, parabolic receiving reflector, and housing holding the radio circuitry; a pole mount configured to be pre-loaded for mounting to a pole, the pole mount further comprising a quick connect coupling to couple the pole mount with the frame; and a pole mount configured to be pre-loaded for mounting to a pole, the pole mount further comprising a quick connect coupling to couple the pole mount with the frame.

As mentioned above, any of the radio devices described herein may include a radio alignment display (RAD) that improves and enhances the aiming/aligning of the device. For example, operation of the device in a point-to-point, or point-to-multipoint configuration may benefit by aligning each of the radio devices (each "point") to be aligned and oriented so that the transmission between the different radio devices is optimal, enhancing signal strength and reliability. A RAD may be used to display properties relevant to the receiving/transmission of signals by a first radio device (e.g., a local device, which is being adjusted by the operator or technician), as well as displaying properties relevant to the receiving/transmission of signals by a second radio device (e.g., a remote device). Even with poor alignment, the two radio devices (local and remote) may transmit this relevant signal strength/alignment information in control band that is robust, so that even with poor or sub-optimal alignment the RAD may display relevant connection information. For example, a robust control band may be configured to transfer information with redundancy and checking/correction, even at the sacrifice of speed.

For example, any of the devices described herein may be configured as radio devices for the exchange of broadband wireless signals with a second radio device including: a first parabolic reflector; a second parabolic reflector; radio circuitry configured for transmission of broadband radio-frequency signals from the first parabolic reflector and configured for reception of broadband radio-frequency signals from the second parabolic reflector; a first status indicator visible on the outside of the radio device that is configured to indicate the signal strength of wireless signals received by the radio device from the second radio device; and a second status indicator visible on the outside of the radio device that is configured to indicate the signal strength of wireless signals from the radio device that are received by the second radio device.

The first status indicator may be any appropriate display or output. For example, the first status indicator may be one or more LEDs indicating the signal strength in dBm. The status indicator(s) may generally be visible on the device. For example, the status indicators may be visible from an outer surface of the device (e.g., the frame, housing, or the like). For example, the first status indicator and the second status indicator are visible on or through a housing at least partially enclosing the radio circuitry.

The second status indicator may also or alternatively comprises one or more LEDs indicating the signal strength in dBm. The first and second status indicators may be arranged next to each other (e.g., immediately adjacent) so that they can be simultaneously visualized). In some variations the first status indicator is immediately above or below the second status indicator.

Any appropriate status indicator, and particularly those relevant to the transmission/reception between at both the local radio device and the remote radio device, may be used. For example, the status indicators visible on the outside of the radio device may be configured to indicate one or more of: modulation mode, GPS synchronization status, data port speed, data port link/activity, management port speed, management port link/activity, link (RF) status.

Any of the radio devices for the exchange of broadband wireless signals described herein may include: a first parabolic reflector; a second parabolic reflector; radio circuitry configured for transmission of broadband radio-frequency signals from the first parabolic reflector and configured for reception of broadband radio-frequency signals from the second parabolic reflector; a housing enclosing the radio circuitry; a first LED status indicator visible on or through the outside of the housing that is configured to indicate the signal strength of wireless signals received by the radio device from the second radio device; and a second LED status indicator visible on or through the outside of the housing that is configured to indicate the signal strength of wireless signals from the radio device that are received by the second radio device.

The first status indicator may be an LEDs indicating the signal strength in dBm. The LED may be an alphanumeric display (e.g. showing numbers/letters, both), or it may be simply indicator lights (e.g., reflecting by a number of lights illuminated), or the like. Similarly, the second status indicator may comprise one or more LEDs indicating the signal strength in dBm. The device may include a label or symbol (e.g., text) near the status indicators to specify what the status indicator describes.

Methods of setting up (including methods of aligning) the radio devices described herein are also included. These methods may include methods of aligning a first (e.g., local) radio device relative to a second (remote) radio device (or multiple radio devices). The methods may include using the RAD discussed above, or the information provided by the RAD. For example, any of the methods of setting up and/or aligning a first radio device and a second radio device for transmission of broadband wireless signals therebetween may include: aiming the first radio device at the second radio device; displaying, on the first radio device, a first status indicator indicating the signal strength of wireless signals received by the first radio device from the second radio device; and displaying on the first radio device, a second status indicator indicating the signal strength of wireless signals received by the second radio device from the first radio device.

An of these methods of aligning a first and second radio device may also include aligning the first radio device based on the displayed first and second status indicators (e.g., the RAD). The method may also include displaying on the second radio device, the first status indicator indicating the signal strength of wireless signals received by the first radio device from the second radio device.

Any of these methods may also include displaying on the second radio device, the second status indicator indicating the signal strength of wireless signals received by the second radio device from the first radio device.

Displaying the first status indicator comprises illuminating one or more LEDs indicating the signal strength in dBm. Similarly, displaying the second status indicator comprises illuminating one or more LEDs indicating the signal strength in dBm.

In any of the method described herein, the method may also include transmitting, from the first radio device in a control channel between the first radio device and the second radio device, a measure of signal strength of signals received by the first radio device; and transmitting from the second radio device in the control channel, a measure of signal strength of signals received by the second radio device. As discussed above, this transmission may be performed over a robust channel of communication between the first and second radio. Thus, any of the methods described herein may also include transmitting from the first radio device, in a control channel between the first radio device and the second radio device, a measure of signal strength of signals received by the first radio device; and transmitting from the second radio device, in the control channel, a measure of signal strength of signals received by the second radio device.

Displaying the first status indicator and displaying the second status indicator may comprise displaying the first and second status indicators on or through a housing of the first radio device. Any appropriate status indicator may be displayed, particularly those related to the quality of the alignment, and/or the quality of the communication between the two devices. For example, displaying may include displaying on the first radio device an indicator of one or more of: modulation mode, GPS synchronization status, data port speed, data port link/activity, management port speed, management port link/activity, link (RF) status.

Any of the methods described herein may include methods of aligning a first radio device and a second radio device for transmission of broadband wireless signals therebetween, the method comprising aiming the first radio device at the second radio device; illuminating in LEDs on the first radio device an indicator of the signal strength of wireless signals received by the first radio device from the second radio device; illuminating in LEDs on the first radio device an indicator of the signal strength of wireless signals received by the second radio device from the first radio device; and aligning the first radio device based on the displayed first and second status indicators.

The methods described herein may also include illuminating in LEDs on the second radio device, the indicator of the signal strength of wireless signals received by the first radio device from the second radio device. For example a method of aligning a first and second radio device may include illuminating in LEDs on the second radio device, the indicator of the signal strength of wireless signals received by the second radio device from the first radio device.

Illuminating an indicator of the signal strength of the wireless signals received by the first radio device from the second radio device may comprise illuminating an indicator of signal strength in dBm. Similarly, illuminating an indicator of the signal strength of the wireless signals received by the second radio device from the second radio device may include illuminating an indicator of signal strength in dBm.

Displaying (e.g., illuminating) status indicators, such as by illuminating in LEDs on the first radio device the indicator of the signal strength of the wireless signals received by the first radio device from the second radio device and the indicator of the signal strength of wireless signals received by the second radio device from the first radio device may include illuminating LEDs so that they are visible on or through a housing of the first radio device. In general, any method of displaying status indicators (for both the local and the remote radio devices) on the local (and/or remote) device may be used.

The status indicator displayed may be, for example, displayed on the first radio device and may be an indicator of one or more of: modulation mode, GPS synchronization status, data port speed, data port link/activity, management port speed, management port link/activity, link (RF) status.

Any of the wireless radio apparatuses described herein may be configured as agile duplexing wireless radio devices. For example, described herein are radio devices having separate transmission and reception reflectors for transmitting and receiving wireless signals that detect interference in a transmission channel and may be automatically or manually switch duplexing schemes when signal reflections, radar, or other interference is detected. As mentioned above, these devices typically include both a transmission antenna reflector and a receiving transmitter reflector, which may be connected or formed of a single housing, that are operatively coupled to radio circuitry for transmission and reception of wireless signals. Interference, and particularly reflected signals between the transmitter and receiver, are avoided by including a detector coupled to either (or both) reflectors that monitors the transmitting frequency channel; reflections and/or radar signals may be detected and may trigger switching (manual or automatic switching) to a different duplexing modes such as frequency-division duplexing (FDD), time-division duplexing (TDD), etc.

In general, these apparatuses are consider agile (or agile mode) apparatuses because they may detect and respond to interference (e.g., reflections, radar, etc.) in the transmission frequency channel (within the band of operation) by switching to a different duplexing mode. Thus, a radio device for transmission of broadband wireless signals may continuously monitor a transmitted frequency channel to avoid interference. Such devices may also or alternatively be configured to automatically adjust radio parameters, e.g., the duplexing scheme of the radio and/or the transmission channel of the radio, based on detected interference. In general, any of these devices may include a monitor (e.g., a monitoring receiver) for monitoring the transmission channel for interference, and (based on any detected interference), adjust radio parameters to avoid interference. The monitoring may be performed continuously (e.g., during transmission of signals). Since these systems generally include both a transmitter and a receiver (with one or more transmission and/or receiving chains) that may be operated simultaneously, the monitor may operate continuously during both transmission and reception to avoid interference, including reflection. In some variations the apparatus may be configured for continuous dynamic frequency selection (DFS). Although the variations described herein use a detector (e.g., monitoring receiver independent of the primary receiver) with a device/system having a pair of parabolic reflectors, a radio device for transmission of broadband wireless signals that continuously monitors a transmitted frequency channel to avoid interference that uses such a detector may be part of any appropriate radio device, and is not limited to those having a pair of parabolic antennas. For example, any radio device having a separate and independent transmitter and receiver that can operate simultaneously, or that have a detector that can concurrently monitor received signals in the same band as the transmitter may be configured as described.

Although the apparatuses described herein may switch modes in response to detection of reflections and/or radar signal interferers, in any of these variations the apparatus may also or alternatively switch frequency channels in response to detected interferers.

For example, described herein are radio devices for transmission of broadband wireless signals that automatically switches between duplexing schemes, the device comprising: a parabolic transmitting reflector; a parabolic receiving reflector; radio circuitry configured to utilize a plurality of duplexing schemes to transmit a radio-frequency signal in a frequency channel between about 5 and about 7 GHz from the parabolic transmitting reflector and to receive a radio-frequency signal between about 5 and about 7 GHz from the parabolic receiving reflector, further wherein the radio circuitry comprises a transmitter and a receiver, wherein the transmitter is coupled to the parabolic transmitting reflector and the receiver is coupled to the parabolic receiving reflector; and a detector coupled to either the parabolic transmitting reflector or the parabolic receiving reflector, wherein the detector is configured to monitor the same frequency channel as the radio-frequency signal transmitted by the radio circuitry to detect a reflection of the transmitted radio-frequency signal, wherein the device is configured to switch duplexing schemes for the device when the reflection is detected.

The radio device may be configured to switch between any appropriate duplexing scheme, or into/out of duplexing. For example, the radio device may be configured to automatically switch from frequency-division duplexing (FDD) to time-division duplexing (TDD) when the reflection is detected. The apparatuses may also be configured to transmit the switch to an operator (e.g., by indicating a status), and may communicate with one or more paired partners (stations) to indicate the duplexing scheme/status (or non-duplexing status). Communication between stations may be done over a robust command channel.

For example, a device may be configured to automatically switch from frequency-division duplexing (FDD) to time-division duplexing (TDD) when the power of a detected reflection is greater than a threshold power level.

In general, a detector may be configured to receive (radio-frequency) signals in the same channel (e.g., frequency channel) that the apparatus is transmitting in, concurrent with transmission. The detector may analyze the signal strength (e.g., power), and/or the signal itself. For example a detector may determine if a monitored (detected) signal in the same band as the transmitted band corresponds to the transmitted signal. Thus, a detector may include a correlator for cross-correlating the transmitted signal(s) with the signal(s) received by the detector. The more correlated the two signals, the more likely that the detected signal is a reflection. The detector may also include logic (hardware, software, firmware, etc.) for comparing the strength of the detected signal (e.g., the power of the signal) to one or more thresholds. For example, if a detected signal in the monitored channel (e.g., the transmitting channel) is above a threshold, the apparatus may switch the transmission channel; if the signal received by the detector is a reflection of the transmitted signal, and if the power is above a threshold, the detector may cause the radio circuitry to change the duplexing mode (e.g., between FDD and TDD, etc.). For example, a device may be configured to automatically switch from frequency-division duplexing (FDD) to time-division duplexing (TDD) when the power of the detected reflection is greater than a threshold power level and return to FDD if the power of the reflected signal is below the threshold power level or if the detector does not detect a reflected signal.

As mentioned, a detector may include a correlator (cross-correlator) configured to correlate a signal received by the detector with the radio-frequency signal transmitted by the radio circuitry to detect the reflection of the transmitted radio-frequency signal.

Any of these devices having a detector as described herein may also be configured to determine if the detector senses a radar signal and automatically avoid the channel on which the signal is detected.

In general, the detector monitors at least the same band as the transmitter. The detector may therefore receive information about the operation of the transmitter (e.g., band), transmitted signals or characteristics of the transmitted signals that the detector can compare against detected signals to determine reflection. The detector may be coupled to the parabolic receiving reflector.

The detector may be a separate receiver from the receiver(s) of the radio circuitry, though it may be connected to them. In some variations the detector includes a radio receiver on the radio circuitry. For example, the radio circuitry may include a pair of transmitters and a pair of receivers, wherein the transmitters are coupled to the parabolic transmitting reflector and the receivers are coupled to the parabolic receiving reflector; the detector may comprises a detector receiver coupled to the parabolic receiving reflector.

In some variations, the detector is configured as a spectrum analyzer. For example, the detector may analyze the spectrum (bandwidth) of the radio for interference, paying particular attention to the band being used by the transmitter. Additional information about the spectrum may be used to control the shift in the band. In some variations the detector is not configured as a spectrum analyzer.

Any of the apparatuses described herein may be configured as radio devices for transmission of broadband wireless signals that automatically switch between duplexing schemes. For example, a device may include a parabolic transmitting reflector; a parabolic receiving reflector; radio circuitry configured to utilize a plurality of duplexing schemes to transmit a radio-frequency signal in a frequency channel between about 5 and about 7 GHz from the parabolic transmitting reflector and to receive a radio-frequency signal between about 5 and about 7 GHz from the parabolic receiving reflector, further wherein the radio circuitry comprises a pair of transmitters and a pair of receivers, wherein the transmitters are coupled to the parabolic transmitting reflector and the receivers are coupled to the parabolic receiving reflector; and a detector coupled to either the parabolic transmitting reflector or the parabolic receiving reflector, wherein the detector is configured to monitor the same frequency channel as the radio-frequency signal transmitted by the radio circuitry to detect a reflection of the transmitted radio-frequency signal, wherein the device is configured to switch duplexing schemes when the reflection is detected.

Any of the apparatuses described herein may be configured as a radio device for transmission of broadband wireless signals that performs continuous dynamic frequency selection (DFS), the device comprising: a parabolic transmitting reflector; a parabolic receiving reflector; radio circuitry configured to transmit radio-frequency signals in a frequency channel between about 5 and about 7 GHz from the parabolic transmitting reflector and to receive radio-frequency signals between about 5 and about 7 GHz from the parabolic receiving reflector, further wherein the radio circuitry comprises a pair of transmitters and a pair of receivers, wherein the transmitters are coupled to the parabolic transmitting reflector and the receivers are coupled to the parabolic receiving reflector; and a detector configured to operate concurrently with transmission by the radio circuitry, the detector coupled to either the parabolic transmitting reflector or the parabolic receiving reflector, wherein the detector is configured to continuously monitor the same frequency channel as transmitted signals to detect radar signals, wherein the device is configured to switch the frequency channel that the radio circuitry transmits on when a radar signal is detected.

When the detector is configured to detect a radar signal (e.g., to allow the apparatus to avoid, by DFS, any channel including radar signals), the apparatus may monitor for radar signals by determining if signal(s) received by the detector (even during transmission) are characteristic of radar signals. In some variations, the detector includes a correlator configured to correlate a signal received by the detector with a predetermined radar signal; the detector may also look at power (e.g., power within a specific frequency range) and/or spectral information that is characteristic of radar. Thus, in general, any of the detectors described herein may comprises a correlator configured to correlate a signal received by the detector with the radio-frequency signal transmitted by the radio circuitry to detect a reflection of the transmitted radio-frequency signal and/or other predetermined signals (e.g., radar signals) to determine possible interference.

Any of the apparatuses (devices and/or systems) described herein may be configured as radio device for transmission of broadband wireless signals that continuously monitors a transmitted frequency channel to avoid interference, the device comprising: a parabolic transmitting reflector; a parabolic receiving reflector; radio circuitry configured to transmit a radio-frequency signal in a frequency channel between about 5 and about 7 GHz from the parabolic transmitting reflector and to receive a radio-frequency signal between about 5 and about 7 GHz from the parabolic receiving reflector, further wherein the radio circuitry comprises a transmitter and a receiver, wherein the transmitter is coupled to the parabolic transmitting reflector and the receiver is coupled to the parabolic receiving reflector; and a detector configured to operate concurrently with transmission by the radio circuitry, the detector coupled to either the parabolic transmitting reflector or the parabolic receiving reflector, wherein the detector is configured to continuously monitor the same frequency channel as the radio-frequency signal transmitted by the radio circuitry to detect interference including a reflection of the transmitted radio-frequency signal and a radar signal, wherein the device is configured to switch duplexing schemes for the device when the reflection is detected and to switch the frequency channel that the radio circuitry transmits on when a radar signal is detected. The device may be configured to switch from frequency-division duplexing (FDD) to time-division duplexing (TDD) when the reflection is detected. For example, the device may be configured to automatically switch from frequency-division duplexing (FDD) to time-division duplexing (TDD) when the power of the detected reflection is greater than a threshold power level. The device may be configured to automatically switch from frequency-division duplexing (FDD) to time-division duplexing (TDD) when the power of the detected reflection is greater than a threshold power level and return to FDD if the power of the reflected signal is below the threshold power level or if the detector does not detect a reflected signal.

For example, the detector may comprise a correlator configured to correlate a signal received by the detector with the radio-frequency signal transmitted by the radio circuitry to detect the reflection of the transmitted radio-frequency signal.

Although the devices described herein are primarily radio device for transmission of broadband wireless signals including a first and second parabolic reflector and radio circuitry configured for transmission of broadband radio-frequency signals between about 4 and about 8 GHz from the first parabolic reflector and configured for reception of broadband radio-frequency signals between about 4 and about 8 GHz from the second parabolic reflector, many of the features and method of operation described herein may be used as part of other radio devices, and may therefore improve such devices, including radio devices that are configured to operate over different radio-frequency ranges. Although there may be advantages to applying the features and improvements described herein in this ("5 GHz") range, other ranges may be used. For example, features and improvements as described herein may be used in radio antennas having non-parabolic antenna dishes, or having fewer or more than the number of antennas described. Any of the features, elements and methods described herein, including (but not limited to) the isolation choke boundary, RAD, and mounting system (e.g., quick release pole mount, etc.), may be used as part of any other antenna system. For example, U.S. patent application Ser. No. 13/843,205, previously incorporated by reference in its entirety, describes other variations of radio systems that may incorporate some or all of the these features, further features described in any of the radio apparatuses in U.S. patent application Ser. No. 13/843,205 may be incorporated in any of the apparatuses described herein.

For example, described herein are radio devices for point-to-point transmission of high bandwidth signals. Such devices may include: a housing comprising a first parabolic reflector and a second parabolic reflector wherein the first and second reflectors are aimed directionally parallel with each other; a transmitter feed coupled to the first parabolic reflector; a receiver feed coupled to the second parabolic reflector; and a printed circuit board (PCB) comprising both a first transmitter connected to the transmitter feed and a first receiver connected to the receiver feed.

In any of the variations described herein, more than two reflectors (e.g., parabolic reflectors) may be used, e.g., 3, 4, 5, 6, or more. For example, two transmitter reflectors and one receiver; two transmitter reflectors and two receivers, etc. Such reflectors are all typically rigidly arranged as described, and may be aligned so that all of them are configured to be aimed directionally parallel. Any of the variations describe herein may be configured as multiple-input multiple-output (MIMO) antennas, so that multiple (e.g., 2) transmitters feed into one or more reflector/antenna feed for the transmitter and/or multiple receivers feed into one or more reflector/antenna feed for the receiver.

For example, in some variations, the PCB comprises a second transmitter connected to the transmitter feed and a second receiver connected to the receiver feed.

In some variations of the apparatuses (e.g., systems and devices) described herein, the housing may be rigid or stiff, which may keep the send and receive antenna (reflector) aimed directionally parallel. It may be particularly beneficial to have such rigidly arranged parabolic antennas when operating about 15 GHz, where alignment may be particularly sensitive, however such rigid configurations may be used for devices operating at lower (e.g., around 5 GHz, 11 GHz, 13 GHz, etc.) as well. For example, the housing may comprise a rigid housing. The housing may be adapted for rigidity, for example by forming the antenna and/or circuitry housing from a single piece. The radio devices/systems described herein may also include supports, struts, beams, etc. ("ribs") to provide/enhance the rigidity, which may also be formed as a single piece with the housing. The device may also include a cover (e.g., radome cover) over all or a portion of the device (e.g., the reflectors) which may enhance stiffness. In general, the se device may be adapted for exterior use, and may withstand temperature, moisture, wind and/or other environmental forces without altering the alignment of the reflectors.

As mentioned, the systems/devices may be configured to prevent interference between the transmitter and receiver of the radio. For example, the first parabolic reflector and the second parabolic reflector may be separated by an isolation choke boundary layer. In some variations, the choke boundary layer may be configured to include corrugations or ridges between the reflectors, which may be considered as part of the isolation boundary between the reflectors. In some variations the reflectors are configured so that there is low mutual coupling between the two antennas. For example, the ratio of focal length to diameter ($f_r/d$) may be less than approximately 0.25 for the reflectors (e.g., the transmission reflector or both the transmission and receiving reflectors).

In some variations the outer diameter of the first parabolic reflector cuts into the outer diameter of the second parabolic reflector. This configuration may allow better coupling between the radio circuitry components and may be balanced to prevent interference between the transmitter and receiver. Thus, the distance between the dedicated transmitter feed and the dedicated receiver feed may be less than the sum of the diameters of the two reflectors (transmitter reflector and receiver reflector). In some variations the transmitter reflector cuts into the transmitter receiver.

The relative sizes of the transmitter reflector and the receiver reflector may be different. For example, the first parabolic reflector (e.g., transmitter) may be smaller than the second parabolic reflector (e.g., receiver).

As mentioned, the housing comprises ribs configured to stiffen the housing and keep the first and second reflectors directionally parallel. These ribs may be located anywhere on the housing, including behind the reflectors, between the reflectors, etc.

In general, the reflectors may be configured to reflect the frequencies being transmitted/received (which may be the same frequencies for both transmission/receiving). For example, the reflectors may include reflective coating on the first and second reflectors. The reflective coating may be a metal (e.g., silver, aluminum, alloys, etc.) and may be applied by any appropriate method, including deposition (e.g., sputtering, etc.), plating, etc.

As mentioned, in some variations, the first parabolic reflector is a dedicated transmitting antenna configured to transmit but not to receive; further wherein the second parabolic reflector is a dedicated receiving antenna configured to receive but not to transmit.

For example, described herein are radio devices for point-to-point transmission of high bandwidth signals that include: a housing forming a pair of reflectors including a first reflector and a second reflector, wherein the pair of reflectors are situated on a front side of the antenna housing unit; and a printed circuit board (PCB) comprising at least a transmitter and a receiver, wherein the transmitter couples with the first reflector to form a dedicated transmitting antenna configured to transmit but not to received and the receiver couples with the second reflector to form a dedicated receiving antenna configured to receive but not to transmit.

As mentioned, the transmitter may be isolated from the receiver on the PCB to prevent RF interference between the two.

In any of the examples described herein, the transmitter and the receiver can be operated either a full-duplex mode or a half-duplex mode. As described in more detail below, the devices and systems may be configured so that a full duplex mode (e.g., FDD, etc.) or a half-duplex mode (e.g., TDD) or a variation thereof (e.g., HDD) may be selected automatically and/or manually. In some variations, the system or device is configured to switch between two or more of these modes dynamically, based on performance and/or environmental parameters.

As mentioned above, the reflectors may be formed using a single mold. For example, the housing may be injection molded so that the reflectors are formed a single piece. In general, such reflectors may include a parabolic reflecting surface. The reflectors may have different shapes and sizes. For example, the parabolic shaped reflecting surfaces may have different diameters, e.g., a reflector with a larger diameter is coupled to the receiver, or in some variations to the transmitter. In some variations the parabolic profiles of the first and second reflectors overlap.

As mentioned above, in general the transmitters are isolated from the receiver, so that a first reflector (antenna) is dedicated as a transmitter and a second reflector (antenna) is dedicated as a receiver. For example, a transmitter feed may be coupled to the first reflector and the transmitter; and a receiver feed coupled to a second reflector and the transmitter.

Any of the radio devices described herein may include a mounting unit for mounting the radio device (e.g., onto a pole). In some variations the mounting unit is coupled to the backside of the housing. The mounting unit may be configured to rigidly secure the device to a stand, pole, wall, or the like; the mounting unit may include adjustable elements to allow the direction that the combined transmitter reflector and parallel-arranged receiver face. In some variations a mounting unit includes: an azimuth-adjustment mechanism for adjusting the reflectors' azimuth; and an elevation-adjustment mechanism for adjusting the reflectors' elevation.

In general, the devices described herein include radio circuitry controlling the transmission and reception of high-bandwidth signals. For example, the radio devices/systems typically include a printed circuit board (PCB) holding the circuitry and connecting/coupled to the antenna feeds for transmission and reception. In some variations only a single PCB is used, so that connections are minimal, reducing the losses due to connections.

The devices may be dynamically programmable. For example, the radio circuitry may include a field-programmable gate array (FPGA) chip coupled to the transmitter and the receiver on the PCB. The devices/systems may include a central processing unit (CPU) coupled to the FPGA chip, on the PCB. In some variations the devices/systems includes an Ethernet transceiver, e.g., coupled to the FPGA chip.

Any of the devices described herein may include a global positioning satellite (GPS). The device of claim 11, wherein the PCB further comprises a GPS receiver. The GPS receiver may provide timing and/or location device that may be used for scheduling communication (e.g., transmission between units). For example, the GPS signal received by the antenna may be used to provide a timing that is synchronized with other radio devices (e.g., a paired radio system). The GPS signal may also be used to provide distance information on the separation between radio systems, which may also be used, for example, for adaptive synchronous protocols for minimizing latency in TDD (or hybrid TDD) systems. See, e.g., U.S. application Ser. No. 13/217,428 (titled "Adaptive Synchronous Protocol for Minimizing Latency in TDD systems").

Any of the systems and devices described herein may be configured as wide bandwidth zero intermediate frequency radios. For example, the transmitter may comprise a quadrature modulator for modulating transmitted signals. In particular, the transmitter further may include an in-phase/quadrature (IQ) alignment module for automatic alignment of in-phase and quadrature components of transmitted signals, as will be described in greater detail below.

In general any of the devices described herein may be paired with another similar (or different embodiment) to form a system for point-to-point transmission of high bandwidth data. A system may include two or more radio devices having a dedicated transmitter aligned in parallel with a dedicated receiver. For example a wireless communication system may include: a pair of radio devices that are in communication with each other; wherein each radio device comprises an antenna housing forming a pair of reflectors including a first reflector and a second reflector wherein the first and second reflectors are aimed directionally parallel with each other; and wherein the radio devices are configured so that the reflectors of a first radio device face reflectors of a second radio device.

As mentioned, any of the radio devices described herein may be used. For example, the pair of reflectors may include a top parabolic reflector situated adjacent (e.g., above) a bottom parabolic reflector. The transmitter reflector may be smaller than the receiver reflector, and the transmitter reflector may cut into the transmitter reflector. Any of these radio devices may be configured to operate in either full-duplex mode or half-duplex mode.

Also described herein are methods for establishing a wireless communication link. These methods may use any of the radio devices/systems described herein. A method of establishing a link (e.g. point-to-point high bandwidth connection) may include: placing a pair of radio devices that are in communication with each other at each end of the wireless communication link; wherein each radio device comprises an antenna housing forming a first reflector and a second reflector that are aimed directionally parallel with each other; and wherein placing the radio devices involves configuring reflectors of a first radio device to face reflectors of a second radio device. The radio device(s) may be configured to operate in either a full-duplex mode or a half-duplex mode, or to switch between the two (manually and/or dynamically).

Another example of a method of establishing a point-to-point wireless communication link may include: positioning a first radio device at one end of the link, wherein the first radio device comprises a housing forming a dedicated transmitting antenna configured to transmit but not to receive and a dedicated receiving antenna configured to receive but not to transmit; and positioning a second radio device at one end of the link, wherein the second radio device comprises a housing forming a dedicated transmitting antenna configured to transmit but not to receive and a dedicated receiving antenna configured to receive but not to transmit; wherein the first radio device faces the second radio device so that transmitted signals from the transmitting antenna of the first radio device are received by the receiving antenna of the second radio device. As mentioned, the transmitting antenna may comprise a first reflector and the receiving antenna comprises a second reflector, wherein the first and second reflectors are formed by the housing of the first radio device so that the first reflector and the second reflector are aimed directionally parallel with each other. The method transmitting antenna may comprise a first parabolic reflector and the receiving antenna comprises a second parabolic reflector, further wherein the first parabolic reflector cuts into the second parabolic reflector. As mentioned, the radio device may be configured to operate in either full-duplex mode or half-duplex mode, or to manually and/or dynamically switch between the two.

In general, any of the radio devices and systems described herein may be configured to allow switching between full-duplex and half-duplex (e.g., emulated full duplex) modes. For example, a radio device for point-to-point transmission of high-bandwidth signals may be configured for switching between frequency division duplexing (FDD) and time division duplexing (TDD) when received signal integrity transitions across a threshold level. For example, a radio device for switching between frequency division duplexing (FDD) and time division duplexing (TDD) when received signal integrity transitions across a threshold level may include: a pair of antenna comprising a dedicated transmitting antenna and a dedicated receiving antenna; a transmitter coupled to the dedicated transmitting antenna; a receiver coupled to the dedicated receiving antenna; wherein the transmitter and receiver are configured to switch from frequency division duplexing (FDD) to time division duplexing (TDD) when integrity of the received signal falls below a threshold level.

Full duplex (double-duplex) systems typically allow communication in both directions simultaneously. Frequency division duplexing (FDD) may be one example of full duplex systems. As used herein, half duplex modulation may include emulated full duplex communication over a half-duplex communication link (e.g., TDD or HDD). In general, the systems and devices described herein may be configured to switch (manually and/or automatically) between different modes of operation such as FDD, TDD, HDD and other variations. This may be possible, in part, because the transmitter is isolated from, but directed in parallel with, the receiver, as described herein. Thus, the radio devices used may comprise a rigid housing forming both a first reflector of the dedicated transmitting antenna and a second reflector of the dedicated receiving antenna. For example, including a first parabolic reflector of the dedicated transmitting antenna and a second parabolic reflector of the dedicated receiving antenna, wherein the first and second parabolic reflectors are aimed directionally parallel with each other; the dedicated transmitting antenna may be configured to transmit but not to receive, and the dedicated receiving antenna may be configured to receive but not to transmit.

In some variations the transmitter and receiver are configured to be manually switchable between modes, (e.g., FDD and TDD; FDD and HDD; TDD and HDD; FDD, TDD and HDD, etc.).

In general, switching between modes may occur based on performance parameters and/or environmental parameters. For example, the threshold level may comprise a threshold error rate of received signals. The threshold error rate may correspond to a packet error rate.

As mentioned above, in some variations multiple transmitters and/or multiple receivers may be used. For example, the transmitter may comprise a pair of transmitters and the receiver may comprise a pair of receivers. The pair of transmitters may be configured to concurrently transmit at orthogonal polarization with respect to each other. In general, the transmitter and receiver may be configured to transmit and receive at the same frequency channel.

Thus, switching between modes may be dynamic. In some variations of radio devices for point-to-point transmission of high bandwidth signals, the device comprises: a housing comprising a first reflector configured as a transmitting antenna and a second reflector configured as a receiving antenna wherein the first and second reflectors are in a fixed relationship relative to each other; and a transmitter coupled to the first reflector; a receiver coupled to the second reflector; wherein the transmitter and receiver are configured to switch between frequency division duplexing (FDD) and time division duplexing (TDD).

In some variations, the radio device for point-to-point transmission of high bandwidth signals includes: a housing comprising a first reflector configured as a dedicated transmitting antenna and a second reflector configured as a dedicated receiving antenna wherein the first and second reflectors are aimed directionally parallel with each other; and a transmitter coupled to the first reflector; a receiver coupled to the second reflector; wherein the transmitter and receiver are configured to dynamically switch between frequency division duplexing (FDD) and time division duplexing (TDD) when received signal integrity transitions across a threshold level. As mentioned, the threshold level may comprise a threshold error rate of received signals (e.g., a packet error rate, etc.).

Any of the devices and systems described herein may be configured as wide-bandwidth zero intermediate frequency radio devices. These devices may include: a controller configured to emit transmission signals into a transmission path, the controller further configured to emit calibration tones; the first transmission path connected to the controller and including an in-phase/quadrature (IQ) modulator comprising an IQ filter and an IQ up-converter; and an IQ alignment module, wherein the IQ alignment module is connected to the first transmission path and comprises a band-limited measuring receiver having a measuring frequency $f_m$ wherein the measuring receiver determines a carrier leakage signal based on the level of a calibration tone at fm, further wherein the measuring receiver determines a sideband rejection signal based on the level of the calibration tone at $\pm\frac{1}{2}$ ($f_m$); wherein the IQ alignment module provides the carrier leakage signal and the sideband rejection signal to the controller. Radio devices including an IQ alignment module may be referred to as self-correcting, because they correct the transmission path.

In any of these variations, the measuring receiver may comprise a pair of detectors. For example, an IQ alignment module may comprise a pair of detectors each configured to receive orthogonal frequency division multiplexed (OFDM) transmission signals or single carrier signals generated by IQ sources. The IQ alignment module may comprise a filter, amplifier and analog to digital converter (ADC).

A band-limited measuring receiver may comprise a filter that sets the measuring frequency, $f_m$. For example, the measuring frequency may be 10.7 MHz.

In some variations, the controller is configured to emit orthogonal frequency division multiplexed calibration tones during an unused portion of a broadband communication signal frame. The controller may be configured to emit orthogonal frequency division multiplexed (OFDM) transmission signals. Generally, the controller may be configured to adjust device based on the sideband rejection signal and the carrier leakage signal.

For example, also described herein are methods of automatically correcting a wide-bandwidth zero intermediate frequency radio device, the method comprising: emitting calibration tones from a controller configured to emit broadband communication signals to first transmission path including an in-phase/quadrature (IQ) modulator; determining a carrier leakage signal based on a level of a calibration tone at a measuring frequency, $f_m$ using an IQ alignment module having a band-limited measuring receiver with the measuring frequency; determining a sideband rejection signal based on the level of a calibration tone at $\pm\frac{1}{2}$ ($f_m$); and providing the carrier leakage signal and sideband rejection signal to the controller.

The determining steps may comprise determining during an unused portion of a broadband communication signal frame. Analysis/transmission of the tone may occur during an unused portion of the frame.

The step of emitting may comprise emitting calibration tones that are orthogonal frequency division multiplexed (OFDM).

Providing the carrier leakage signal and the sideband rejection signal may comprise converting the carrier leakage signal to a digital signal and converting the sideband rejection signal to a digital signal. As mentioned above, the measuring frequency is 10.7 MHz.

In any of the methods of automatically correcting a wide-bandwidth zero intermediate frequency radio devices described herein, the method may include adjusting the wide-bandwidth zero intermediate frequency radio device based on the sideband rejection signal and the carrier leakage signal.

Methods of forming, assembling and/or making the radio devices and systems describe herein are also included. For example, a method of making a radio may include: forming a first reflector and a second reflector in a front side of an antenna housing unit; placing a printed circuit board (PCB) comprising a transmitter feed coupled to at least one transmitter and a receiver feed coupled to at least one receiver within a cavity at a backside of the antenna housing unit; and placing a backside cover over the cavity, thereby enclosing the PCB within the antenna housing unit. The method may further include coupling the transmitter feed to the first reflector; and coupling the receiver feed to the second reflector; wherein the transmitter and the receiver are isolated from each other with respect to the transmission of RF energy. In some variation, the method may include configuring the transmitter and the receiver to operate in one of: a full-duplex mode (e.g., FDD); and a half-duplex mode (e.g., TDD).

The first and second reflectors may be formed using a single mold. The first and second reflectors may include a pair of parabolic shaped reflecting surfaces. For example, the first reflector may comprise a first parabolic surface and the second reflector may comprise a second parabolic surface, and wherein the first parabolic surface cuts into the profile of the second parabolic surface. In some variations, the first reflector comprises a first parabolic surface and the second reflector comprises a second parabolic surface, further wherein the diameter of the first parabolic surface is larger than the diameter of the second parabolic surface.

The transmitter may comprise a quadrature modulator for modulating transmitted signals. For example, the transmitter may further comprise an IQ alignment module, as discussed above, for automatic alignment of in-phase and quadrature components of transmitted signals.

User interfaces for controlling the operation of any of the radio devices and system are also described herein. For example, a user interface for configuring a radio device for point-to-point transmission of high bandwidth signals may include: a display configured to show information about the radio; and a number of selectable tabs presented on the display, wherein a selection of a respective tab results in a number of user-editable fields being displayed, thereby facilitating a user in configuring and monitoring operations of the radio.

The selectable tabs may include a main tab, which displays current values of a plurality of configuration settings of the radio and traffic status for a link associated with the radio. The selectable tabs may include a wireless tab, which enables the user to set a plurality of parameters for a wireless link associated with the radio. In some variations, the plurality of parameters include at least one of: a wireless mode of the radio; a duplex mode for the wireless link; a transmitting frequency; a receiving frequency; a transmitting output power; a current modulation rate; and a gain setting for a receiving antenna.

The selectable tabs may include a network tab, which enables the user to configure settings for a management network associated with the radio. The selectable tabs may include a services tab, which enables the user to configure management services associated with the radio. The management services include at least one of: a ping service; a Simple Network Monitor Protocol (SNMP) agent; a web server; a Secure Shell (SSH) server; a Telnet server; a Network Time Protocol (NTP) client service; a dynamic Domain Name System (DNS); a system log service; and a device discovery service.

The selectable tabs may include a system tab, which enables the user to perform at least one of the following operations: reboot the radio; update firmware; manage a user account; and save or upload a configuration file.

Also described herein are polarization-preserving microwave RF filters. In particular, described herein are polarization-preserving microwave RF filters having multiple resonators that are each operable for different Q factors for setting overall bandwidth. These filters may be referred to as coaxial radio frequency (RF) dual-polarized waveguide filters. Such filters may be used with any of the radio apparatuses described herein, or any other RF apparatus in which it is desired or appropriate to provide dual-polarized waveguide filters. For example, these filters may be incorporated into radio devices for point-to-point transmission of high bandwidth signals.

For example, a coaxial dual-polarized waveguide filter may include a cable having a hollow circular body with ends formed by copper plates that each includes at least one iris. The irises may control the energy transfer into and out of the cavity and therefore set the Q factor for the body. The shape of the internal diameter of the body and the irises may provide for reception and propagation of differently polarized signals. Multiple segments may be cascaded in series to effect higher order filtering. Also described are methods of transmitting signals using these filters.

In general these RF filters may include multiple segments, each segment operable for a different Q factor for setting overall bandwidth. Some embodiments of the polarization-preserving microwave RF filters comprise a hollow circular body with ends formed by copper plates. Each of the plates has at least one iris. The irises operate to control the energy transfer into and out of the cavity, and accordingly, set the Q factor for the body. The shape of the internal diameter of the body and irises provide for reception and propagation of different polarized signals. Multiple segments may be cascaded in series to effect higher order filtering.

In some embodiments the filter portions may be formed by selecting a radio frequency and forming a cylinder with a length approximately one-half the wavelength of the operating radio frequency band and a diameter approximately 65% of the wavelength of the operating radio frequency band. The cylinders are formed into resonators by forming an iris on each end of the cylinders Polarization may be preserved by using circular irises.

Multi-pole filters may be effectuated by cascading resonators together and each resonator may be set to a different Q factor by varying the size of the irises. In operation, a method for effecting a radio frequency (RF) filter may include the steps of: coupling an RF signal into a cylindrical body of a filter having a circular internal cavity operable as an RF waveguide, said cylindrical body a length substantially one-half a wavelength of a first radio frequency and a diameter substantially 65 percent of the wavelength of the radio frequency; transmitting at least a portion of the RF signal through a first iris on a first end of said cylindrical body and into the cylindrical body, and transmitting at least a portion of the RF signal through a second iris on a second end of said cylindrical body and out of the cylindrical body. The first iris and the second iris may be substantially circular. The method may also include adjusting a Q factor of the filter by altering the diameter of the first iris and the diameter of the second iris.

Any of these methods may also include the step of coupling the filter to a second, similarly formed filter, for example, wherein the Q factor of the filter is substantially different from the Q factor of the second filter.

For example, a method for effecting a radio frequency (RF) filter may include: coupling a radio frequency signal to a first iris on a first end of a cylindrical body of an RF filter; passing at least a portion of the RF signal through the first iris and into the cylindrical body of the RF filter, wherein the cylindrical body has a length substantially one-half a wavelength of a first radio frequency and a diameter substantially 65 percent of the wavelength of said radio frequency; and passing at least a portion of the RF signal through a second iris on a second end of the cylindrical body of the RF filter.

BRIEF DESCRIPTION OF THE DRAWINGS

FIG. 3A is an exemplary view of a front side of one variation of a radio device.

FIG. 3B is a back perspective view of the radio device of FIG. 3A.

FIGS. 3C, 3D and 3E are front, side and back views (respectively) of the radio device shown in FIG. 3A.

FIGS. 3F and 3G are top and bottom views, respectively, of the radio device of FIG. 3A.

In FIG. 7B, the pole has been removed.

FIG. 8B is an exploded view of another variation of a frame and pole mount, similar to the apparatus shown in FIG. 3H.

FIGS. 13G and 13H show front view and back views, respectively, of a radio with the radome cover on.

FIG. 14B1 is a diagram a front view of the assembled radio of FIG. 14A. FIG. 14B2 shows a section through the device.

FIG. 14C is a diagram illustrating where to apply the sealant for the radome of FIG. 14A.

FIGS. 15A-15E illustrates detailed mechanical drawing views of the reflecting housing of a device such as that shown in FIG. 13A. FIGS. 15A and 15B show back and front views, respectively, FIG. 15C shows a section through the midline along a long axis, and FIGS. 15D and 15E show partial views, respectively or regions and sections indicated.

FIGS. 16C1 and 16C2 illustrate a front view and cross-sectional views, respectively of a rear lid.

FIGS. 16D1-16D3 illustrates perspective views and partial detail views of the backside of the rear lid of FIGS. 13A-13B in detail.

FIGS. 17B1-17B5 show detailed mechanical drawing views for the upper feed-shield subassembly. FIG. 17B1 is a side view, 17B2 is a sectional view through the side, and FIGS. 17B3-17B5 show enlarged regional views of portions of the feed and shield assembly as indicated.

FIGS. 18B1-18B5 show detailed mechanical drawing views for the lower feed-shield subassembly. FIG. 18B1 is a side view, 18B2 is a sectional view through the side, and FIGS. 18B3-18B5 show enlarged regional views of portions of the feed and shield assembly as indicated.

FIGS. 19C1-19C4 shows more detailed mechanical drawing views s of a radio-mounting bracket. FIG. 19C1 is a back view, FIG. 19C2 is a side view, and FIG. 19C3 is a front views. FIG. 19C4 shows an enlarged view of the fastener.

FIGS. 19D1-19D3 show diagrams illustrating different views of the radio-mounting bracket mounted to a radio from the back, back perspective, and detail of fastener, respectively.

FIGS. 22C1 and 22C2 illustrate the fine-tuning of the wireless link.

FIG. 24 presents a diagram illustrating an exemplary view of a configuration interface.

FIG. 27 presents a diagram illustrating an exemplary view of a configuration interface.

FIG. 28 presents a diagram illustrating an exemplary view of a configuration interface.

FIG. 30 presents a diagram illustrating one variation of the receive sensitivity specifications of the radio for various modulation schemes.

FIG. 31 presents a diagram illustrating one variation of the general specifications of the radio.

In the figures, like reference numerals refer to the same figure elements. Unless the context indicates otherwise, dimensions marked in the figures are in millimeters.

DETAILED DESCRIPTION

Figure 1A:
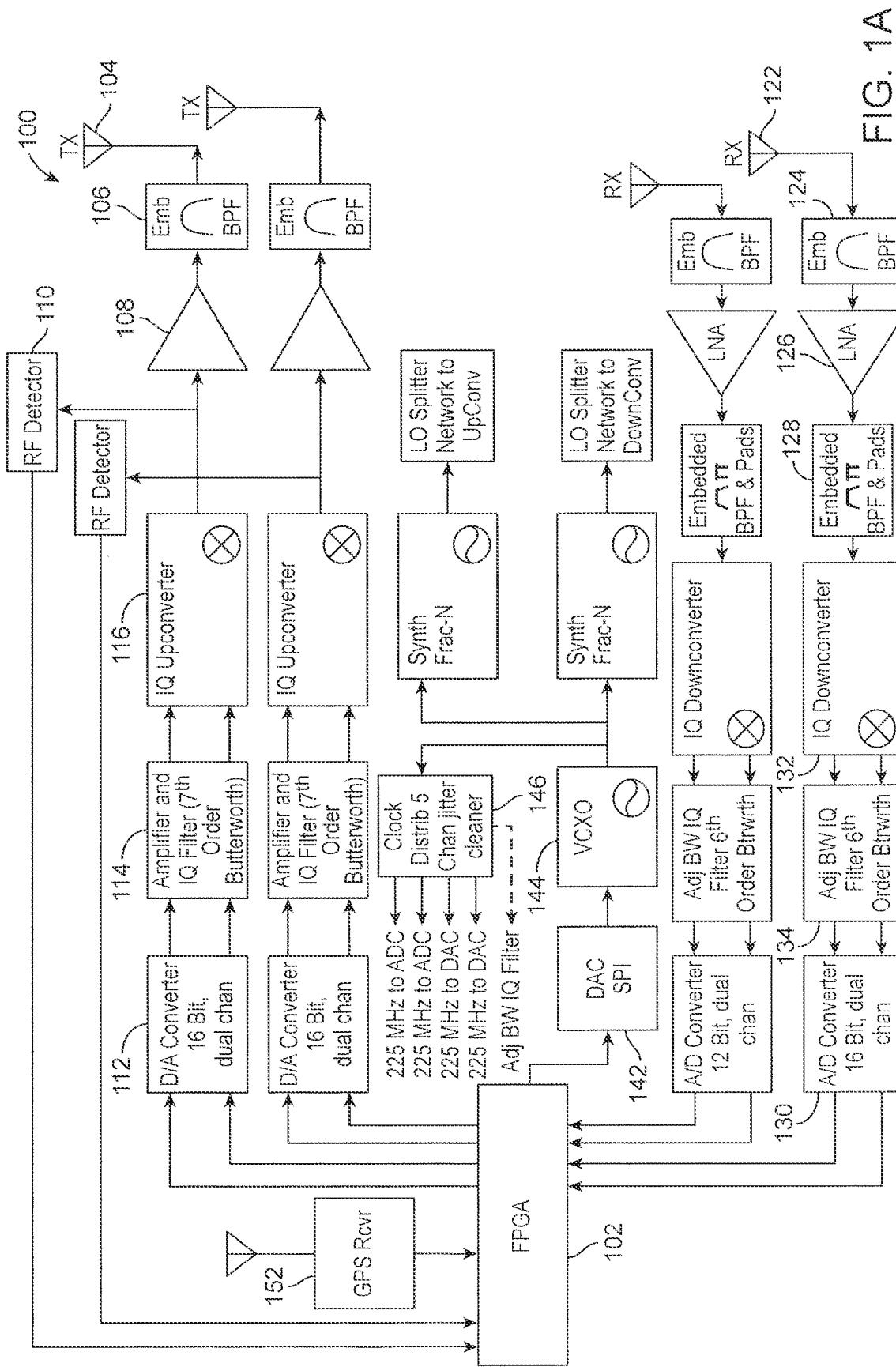
FIG. 1A presents a block diagram illustrating one exemplary architecture of an RF frontend of a radio device for transmission of broadband wireless signals.

Described herein are radio devices for point-to-point and/or point-to-multipoint transmission of high bandwidth radio signals. These devices may include radio apparatuses (devices/systems) used for high-speed, long-range wireless communication.

In general, these radios may include a dedicated transmit reflector (connected to one or more transmitters), and a dedicated receiver reflector (connected to one or more receivers). The dedicated transmit and receive reflectors may be held in a fixed relationship with each other. In some variations the devices and systems may also be configured so that the circuitry for the radio is held on a single board, which connects to both the transmitter antenna feed, connected to the transmitter reflector, and the receiver antenna feed, connected to the receiver reflector. The two reflectors may be adapted for use in any appropriate frequency range, including, e.g., the 5 GH frequency range, the 11 GHz frequency range, the 13 GHz frequency range, the 24 GHz frequency range, etc. The transmit and receiving reflectors may be configured so that they are approximately the same size, or they may be different sizes. In some variations the receiver reflector is larger than the transmitter reflector. The receiver and transmitter reflectors may be formed as part of a unitary housing or frame, or they may be attached but formed separately; in some variations the frame also includes a separate housing for the radio circuitry. Having separate transmission (Tx) and receiving (Rx) antennas (and/or antenna reflectors) may extend link budgets by eliminating the extra RF losses caused by the switches or duplexers required in systems with common antennas Tx/Rx.

Any of the devices described herein may allow selectable in-band or out-of-band network management, providing operators with a choice between the greater security of out-of-band management and the convenience of in-band management.

As described in more detail below, any of these devices and systems may be configured to permit changing of the duplexing scheme of the device/system. For example, the radio device may be configured to manually and/or automatically switch between different types of duplexing (e.g., Frequency Division Duplexing (FDD), Time Division Duplexing (TDD), Hybrid Division Duplexing (HDD), etc.). In some variations the systems/devices are configured to switch between duplexing schemes based on performance parameters from the systems. For example, if the transmission degrades during operation of one duplexing scheme (e.g., FDD), the system may switch to a different duplexing scheme (e.g., TDD) for more reliable, though possibly slower, communication; if performance increases again, or if environmental parameters indicate, the system may again switch to a different duplexing scheme (e.g., FDD).

In some variations, split-frequency TDD mode operates with zero TX/RX turn-around time, increasing throughput and allowing more options for network channel planning and interference avoidance. FDD mode may allow for use on either end of the link for any frequency, reducing the number of modular parts (unique SKUs) require for spares for the apparatuses described herein.

In some variations, the systems and devices described herein may be configured as a wide bandwidth zero intermediate frequency radio. Such radios typically allow generation and decoding at the baseband before up/down converting to the frequency band used (e.g., 5 GHz). Although such systems have historically been difficult to implement without the use of costly and complex circuitry to avoid imbalance of the in-phase and quadrature components (e.g., resulting from a DC offset), described herein are systems including IQ alignment modules that allow the device/systems to correct for either or both carrier leakage and sideband rejection.

In one variation, the radio system includes a pair of dual-independent 2×2 multiple-input multiple-output (MIMO) high-gain reflector antennas, a pair of transceivers capable of transmitting and receiving high-speed data at the 5 GHz band (the 11 GHz band, the 13 Ghz band, the 24 GHz band, etc.), and a user-interface that provides plug-and-play capability. In one configuration, the transceivers are capable of operating in both FDD (Frequency Division Duplex) and HDD (Hybrid Division Duplex) modes. The unique design of the antenna provides long-range reachability. The radio system may operate at other unlicensed or licensed frequency bands. For example, the radio system may operate at the 5 GHz frequency band. Moreover, the radio system may be configured to operate in various transmission modes. For example, in addition to a MIMO system, it is also possible for the radio system to be configured as a single-input single-output (SISO), SIMO, or MISO system. Similarly, in addition to the FDD mode, the radio system may operation in time-division duplex (TDD) mode or a hybrid of TDD and FDD.

FIG. 1A presents a block diagram illustrating one exemplary architecture of an RF frontend of a radio. In FIG. 1A, the RF frontend 100 includes two identical transmission paths and two identical receiving paths in order to enable 2×2 MIMO.

Each transmission path includes a transmitting antenna, such as antenna 104; a band-pass filter (BPF), such as BPF 106; a power amplifier (PA), such as PA 108; an RF detector, such as RF detector 110; a modulator; and a digital-to-analog converter (DAC), such as DAC 112. In one embodiment, the system uses a quadrature modulation scheme (also known as IQ modulation), and the modulator is an IQ modulator, which includes an IQ filter (such as IQ filter 114, which also works as a pre-amplifier) and an IQ up-converter (such as IQ up-converter 116). In one embodiment, the radio system operates at the 5 GHz frequency band, and the IQ up-converters and the PAs are configured to operate at the 5 GHz RF band. Each receiving path includes a receiving antenna, such as antenna 122; a band-pass filter (BPF), such as BPF 124; a low-noise amplifier (LNA), such as LNA 126; a second BPF, such as BPF 128; a demodulator; and an analog-to-digital converter (ADC), such as ADC 130. In one embodiment, the system uses a quadrature modulation scheme (also known as IQ modulation), and the demodulator is an IQ demodulator, which includes an IQ down-converter (such as IQ down-converter 132) and an IQ filter (such as IQ filter 134 with adjustable bandwidth).

In FIG. 1A, a field-programmable gate array (FPGA) chip 102 provides signal processing capability as well as clock signals to both the transmission and receiving paths. More particularly, FPGA 102 includes a baseband digital signal processor (DSP), which is not shown in the figure. In addition, FPGA 102 provides an input to a DAC 142, which in turn drives a voltage-controlled crystal oscillator (VCXO) 144 to generate a clock signal. For example, VCXO 144 may generate a 50 MHz clock signal. This low-frequency clock signal can be frequency-multiplied by fraction-N synthesizers to higher frequency sinusoidal waves, thus providing sinusoidal signals to the up- and down-converters. In addition, the output of VCXO 144 is sent to a clock distributor 146, which provides clock signals to the DACs, the ADCs, and the IQ filters with adjustable bandwidth.

Also included in FIG. 1A is a GPS (Global-Positioning System) receiver 152 for receiving GPS signals. In some variations the clock signal is derived (or synchronized/initiated with) the GPS signal from a GPS receiver 152.

Figure 1B:
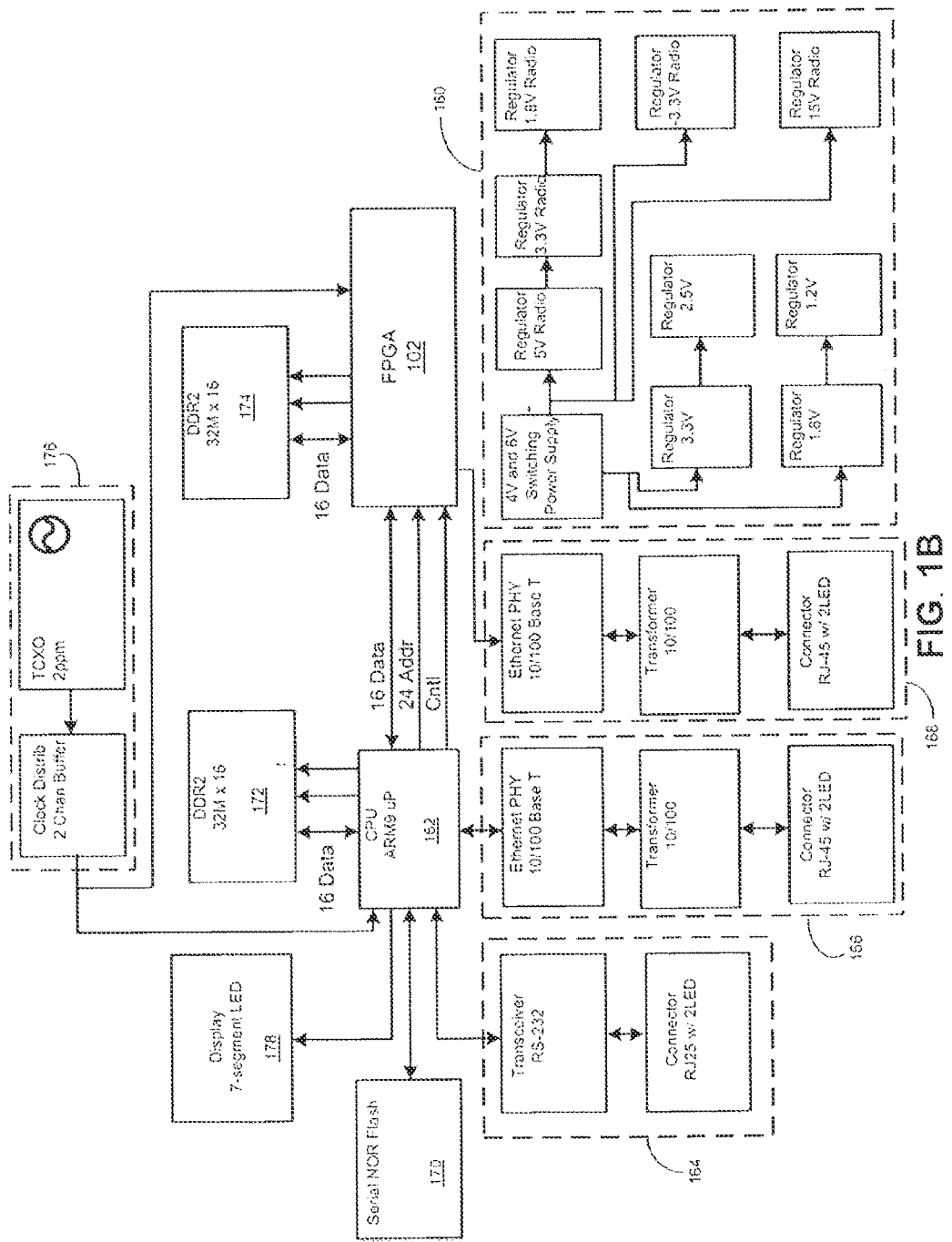
FIG. 1B presents a block diagram illustrating one exemplary architecture of power and control modules of a radio device for transmission of broadband wireless signals.

FIG. 1B presents a block diagram illustrating an exemplary architecture of power and control modules of one example of a radio device/system. FIG. 1B includes a power module 160 for providing power to the entire radio system, a CPU 162 for providing control to the radio system, and a number of control and data interfaces.

More specifically, power module 160 includes a power supply and a number of voltage regulators for providing power to the different components in the radio system. CPU 162 may control the operation of the radio system, such as the configurations or operating modes of the systems, by interfacing with FPGA chip 102. For example, the system may operate as a full-duplex system where the transmitter and receiver are running concurrently in time, or a half-duplex system (or may switch between the two or more duplex regimes, as described above). To configure the radio system, a user can access CPU 162 via a serial interface (such as an RS-232 interface 164) or an Ethernet control interface 166. In other words, a user is able to interact with the radio system via the serial interface or the Ethernet control interface. In one embodiment, the serial port is designated for alignments of the antennas. Ethernet data interface 168 is the data port for uploading and downloading data over the point-to-point link Data to be transmitted over the point-to-point link may be uploaded to FPGA chip 102, which includes the baseband DSP, via Ethernet data interface 168; and data received from the point-to-point link can be downloaded from FPGA 102 via Ethernet data interface 168. Each Ethernet interface includes an Ethernet PHY transceiver, a transformer, and an RJ-45 connector. In one embodiment, the Ethernet PHY transceiver is capable of operating at 10 Mbps and 100 Mbps. Note that each of the interfaces (or ports) may also include status LEDs for indicating the status of each port.

Other components in the radio system may also include a flash memory 170 coupled to CPU 162, a random-access memory (RAM) 172 (such as a DDR2 memory) coupled to CPU 162, a RAM 174 coupled to FPGA 102, a clock source 176 providing clock signals to CPU 162 and FPGA 102, and an LED display 178 with two digits displaying the received signal strength in dBm.

Note that the various components (with the exception of the antennas) for the radio system shown in FIGS. 1A and 1B can be integrated onto a single printed circuit board (PCB). FIGS. 1A and 1B illustrate the architecture of a single radio. To establish a point-to-point link, a pair of radios may be used, one for each node of the link.

In the example shown in FIG. 1A, the modulation scheme used is quadrature modulation, which relies on orthogonally defined in-phase and quadrature signals (or I- and Q-signals). To ensure orthogonality between the I- and Q-signals, the amplitude of the I- and Q-signals should remain equal. However, in practice, a number of factors can affect the amplitude and phase of the I- and Q-signals, thus resulting in a misalignment between these signals. A misalignment in the I- and Q-signals may result in the increased bit error rate of the demodulated signal due to carrier leakage and imperfect sideband cancellation. Therefore, it is desirable to align the I- and Q-signals. Such alignment can result in cancellation of the carrier as well as the sideband signals. In one embodiment of the present invention, the systems/device includes an IQ alignment module that may provide feedback to correct imbalances in phase and quadrature. In some variations, including the system illustrated in FIGS. 1A and 1B, the FPGA 102 generates calibration tones that can be used for IQ alignment purpose.

Figure 1C:
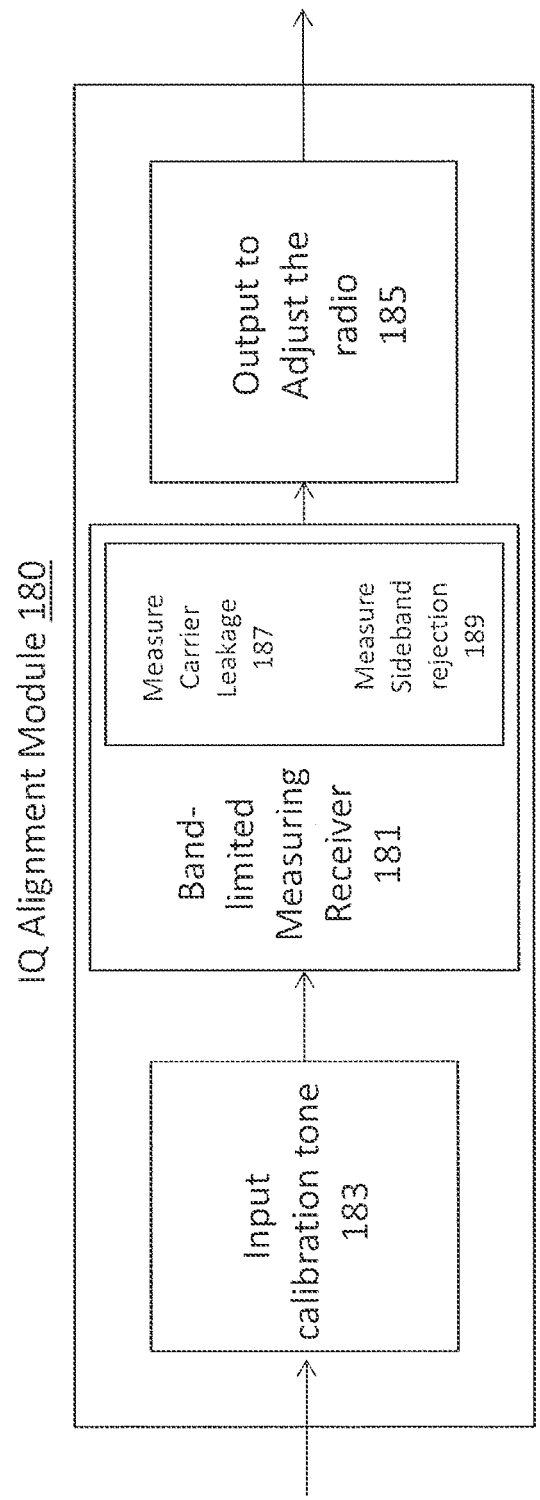
FIG. 1C is a schematic (block) diagram of one variation of an IQ alignment module.

FIG. 1C presents a block diagram illustrating, at a high level, the operation of an IQ alignment module that provides feedback to correct imbalances (alignment) in the in-phase and quadrature signals. In this example, a test tone ("calibration" tone) is entered into the IQ alignment module 183. The IQ alignment module 180 is typically positioned in the radio, e.g., on the transmitter side, after up-converting the signal, e.g., between the up-converter 116 and the power amplified 108. In. FIG. 1A, the RF detector 110 includes the IQ alignment module. An alignment module such as described above is described in greater detail in U.S. patent application Ser. No. 13/843,205, previously incorporated by reference. Such a module may, but is not necessary, including in the devices described herein.

Returning to FIG. 1C, the IQ alignment module receives the calibration tone 183 at the input. In some variations, the same IQ alignment module receives inputs from multiple sources (e.g., transmitters, for transmitter-side alignment). The input may therefore include one or more switches to switch between these inputs. The input tone is passed to a band-limited measuring receiver that filters and amplifies the signal. The measuring receiver 181 may (depending on the calibration tone) determine either carrier leakage or sideband rejection. The IQ alignment module may include logic (e.g., separate from or part of the FPGA) to know when the signal (alignment tone) is appropriate for carrier leakage 187 or for sideband rejection 189. For example, the measuring receiver examines a calibration tone for carrier leakage emitted by the FPGA onto a first transmitter. Next, the measuring receiver examines a calibration tone for sideband rejection from the first transmitter. Next the measuring receiver examines a calibration tone for carrier leakage from the second transmitter. Then the measuring receiver examines a calibration tone for sideband rejection on the second transmitter, and the cycle may repeat. The IQ alignment module may monitor continuously or periodically.

Output from the measuring receiver may then be used as feedback to adjust the radio to correct the alignment of the in-phase and quadrature for the device component being monitored (e.g., each transmitter of the radio). In FIG. 1C, the output is used to adjust, for example, the carrier leakage of a transmitter by applying a DC offset proportional to the input from measuring receiver to the input ports of the IQ modulator for that transmitter; if the adjustment results in increasing the carrier leakage, then during the next cycle the offset may be adjusted in the opposite direction, providing feedback to the baseband inputs to minimize the carrier leakage. Similarly, output from the measuring receiver may be used to provide feedback that the FPGA (or other control circuitry) may use to generate a signal to adjust the phase imbalance on the baseband inputs to minimize sideband rejection.

In some variations the IQ alignment module operates during periods during transmission where signals are not being sent (e.g., transmission of time). In some variations the IQ alignment module operates when transmission is active, or when the system is both active and inactive. The system may generate an OFDM spectrum signal for the calibration tone that is distributed amongst the carriers. To make the radio transmit all these carriers so that any distortion pattern is produced at $f_m$ (e.g., 10.7 MHz). The IQ alignment module then detects the 10.7 MHz signal and looks at the distortion component to generate a digital word for the distortion (either for carrier leakage or for sideband rejection) that goes into the FPGA and can provide a closed-loop feedback to minimize the distortion in the IQ modulator.

Figure 1D:
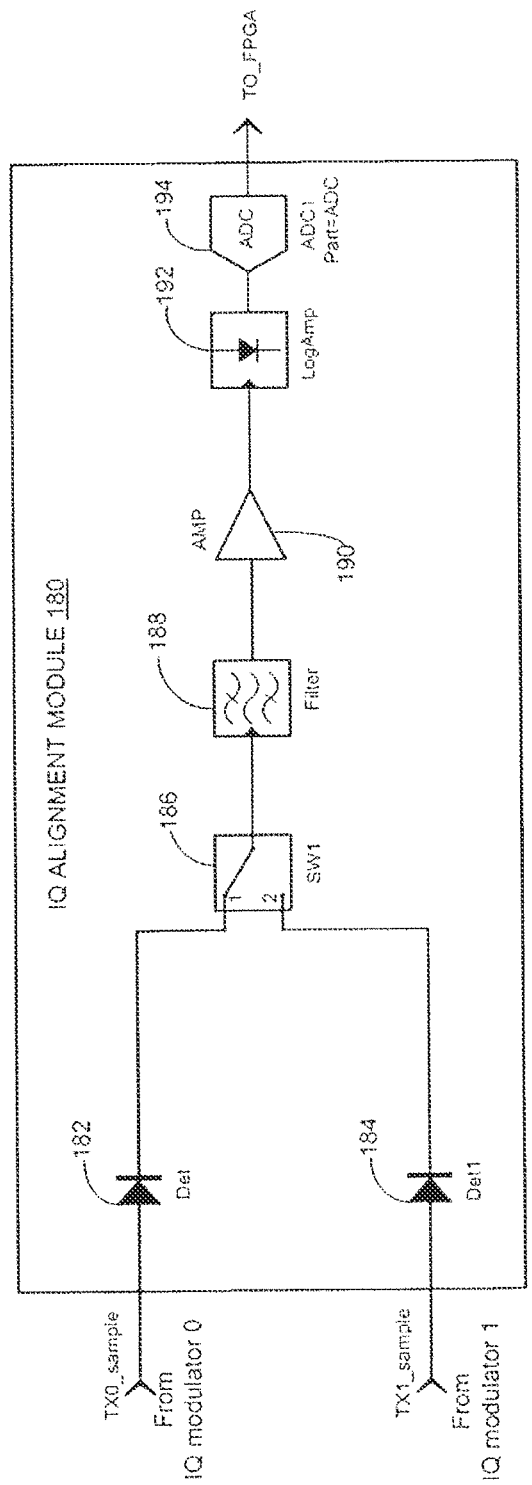
FIG. 1D presents a block diagram illustrating an exemplary architecture of an IQ alignment module, in accordance with an embodiment of the present invention.

FIG. 1D shows an example of an architecture of an IQ alignment module, in accordance with an embodiment of the present invention. IQ alignment module 180 includes two detectors 182 and 184, a switch 186, a filter 188, an amplifier 190, a log amplifier 192, and an ADC 194.

As mentioned, the input to the IQ alignment module 180, such as low-level detectors (detectors 182 and 184), may be placed after the IQ modulators, or the image-reject converters. During operation, the outputs of detectors 182 and 184 are alternately fed (via switch 186) to a band-limited measuring receiver, which includes filter 188, amplifier 190, log amplifier 192, and ADC 194. The selection of the calibration tone frequency determines which transmitter parameter is measured. The combinations of tones sent basically allow detectors 182 and 184 to operate as mixers with one strong tone acting as a local oscillator to convert other tones down to a low frequency that is easy to measure with low cost hardware.

Assuming that filter 188 sets its center frequency, and thus the center frequency of the measuring receiver, to $f_m$ for selecting one tone near $f_m$ only, then one can measure the carrier leakage by measuring the baseband signal. More specifically, in this situation, a baseband tone of $\pm f_m$ ($=f_{RF}\pm f_m$ at the output of the modulator) would produce a tune at $f_m$ in the measuring receiver at a level that is proportional to the amount of carrier leakage. This is because the tone at $f_{RF}\pm f_m$ acts as the local oscillator to mix down the residual carrier that is at the frequency $f_{RF}$. The tone level is measured by ADC 194 and read by an FPGA, such as FPGA 102, for processing. Consequently, self-calibration or adjustment can be made to eliminate the carrier leakage.

In addition to measuring carrier leakage, IQ alignment module 180 can also be configured to measure the rejection to the sideband. To do so, in one variation, a transmitter tone is set at either $+\frac{1}{2}f_m$ or $-\frac{1}{2}f_m$, which can produce a measurable result proportional to the level of undesired sideband. Because the transmitter outputs include signals at $f_{RF}\pm\frac{1}{2}f_m$ (the strong "local oscillator" signal for the detectors) and opposite sideband signal, the power level seen by the measuring receiver at $f_m$ is proportional to the amount of undesired sideband signal present ($f_m$ away from the strong tone centered at $f_{RF}\pm\frac{1}{2}f_m$). Similar to the process of carrier leakage elimination, the sideband rejection measurement can be used for self-calibration or cancellation of the undesired sideband.

In some variations, the specific tones used by the transmitters are the nearest frequency bins already available in the IFFT function of the transmitters. For example, filter 188 sets its center frequency $f_m$ at around 10.7 MHz due to the availability of low-cost filters. This frequency selection also makes implementations of the rest of the receiver straightforward. The calibration tones may be chosen based on this known modulation frequency, $f_m$.

Implementing IQ alignment module 180 to augment the transmitters of the radio system may provide continuous self-correction (or self-calibration) functionality to the transmitters. Unlike other conventional integrated transceivers that perform some sort of corrections when "offline", embodiments of the present invention never go offline when operating in full duplex mode, where transmitters and receivers operate at different frequencies. As a result, this allows for the use of IQ image reject mixers with limited sideband rejection to be applied as quadrature modulators and demodulators. The IQ modulation may therefore effectively use Zero intermediate frequency (ZIF). Note that in addition to allowing parts with modest performance to be used in areas where IQ amplitude and phase balance is critical, this automatic IQ alignment scheme also assures that the radio maintains sufficiently high levels of performance across a wide range of temperatures and signal levels.

Figure 2A:
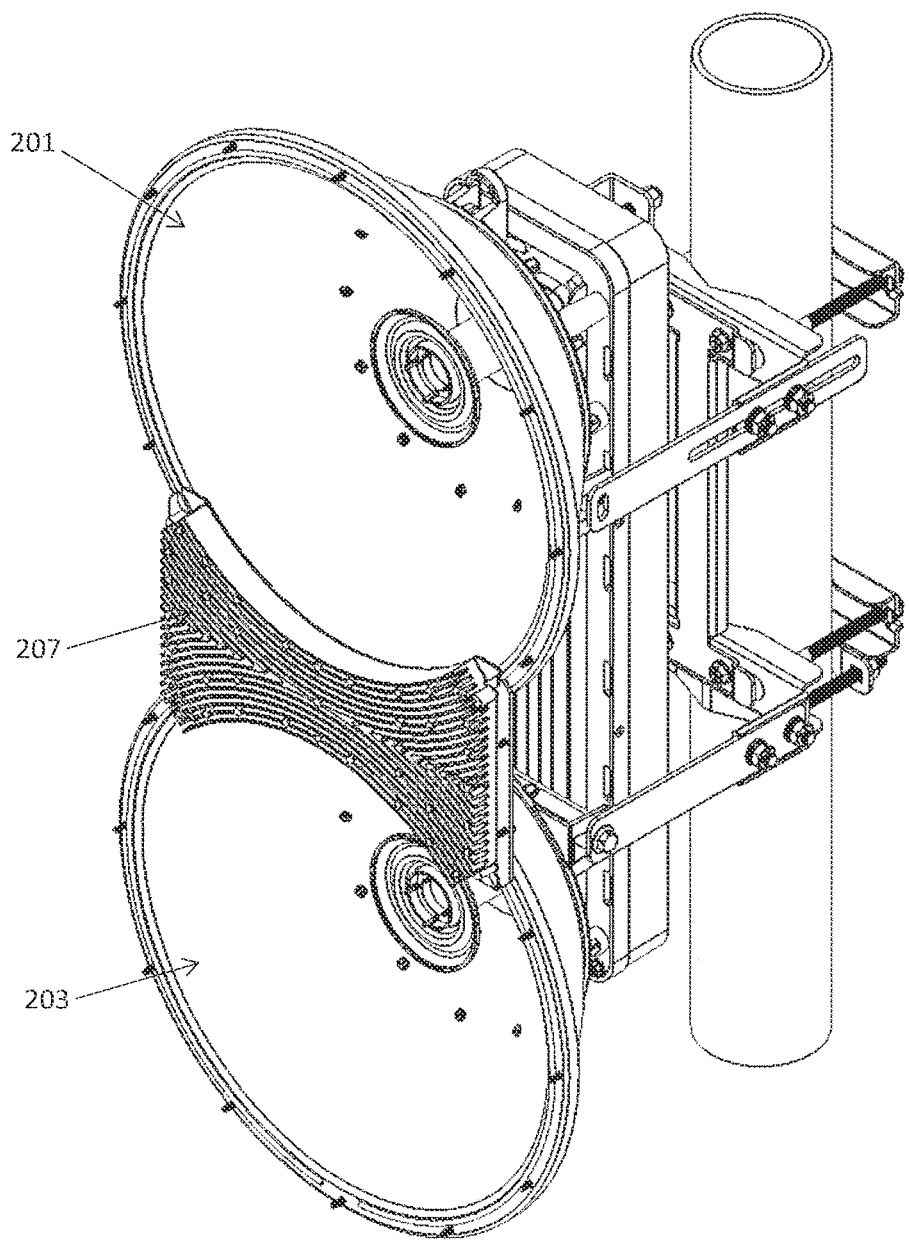
FIG. 2A presents a diagram illustrating an exemplary view of a radio device for transmission of broadband wireless signals mounted on a pole.
Figure 2B:
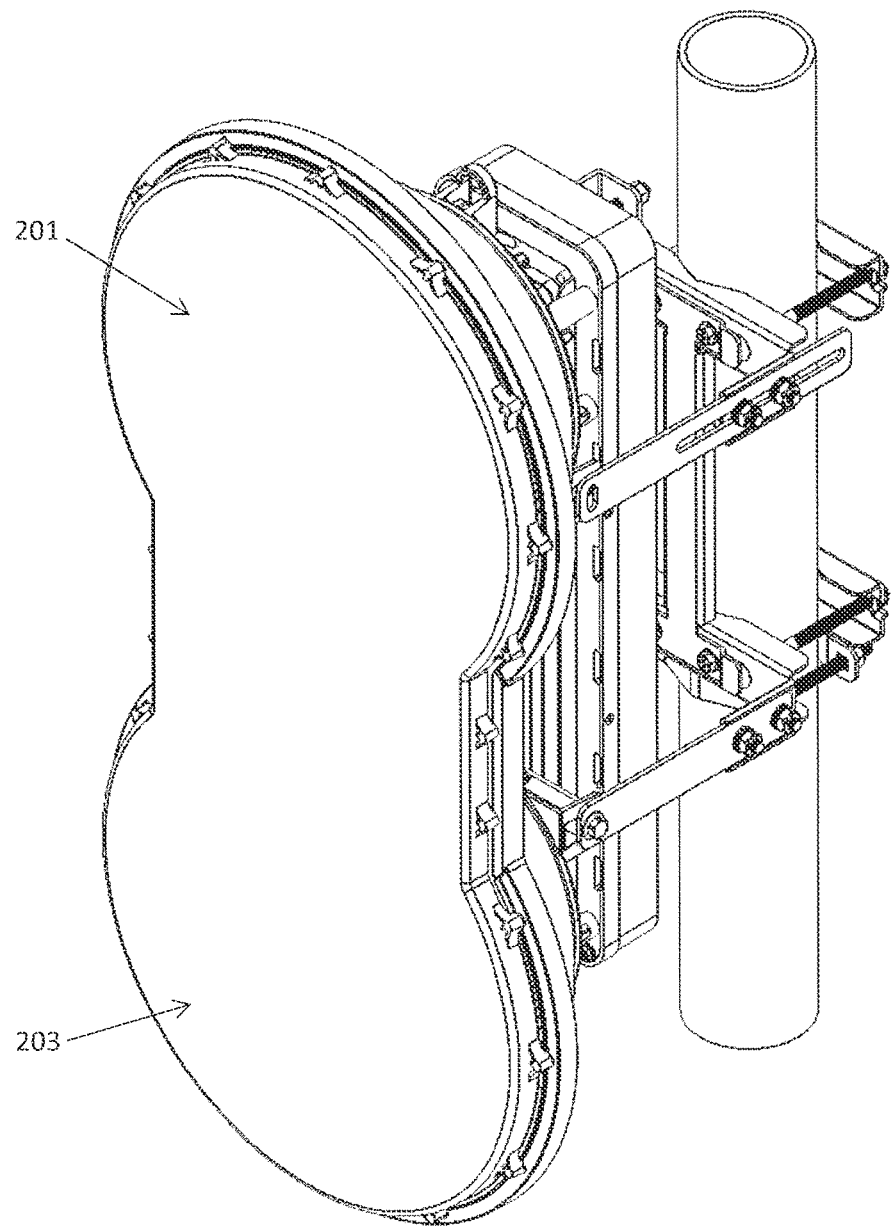
FIG. 2B presents a diagram illustrating an exemplary view of the radio device of FIG. 2A, including the cover (radome).

FIGS. 2A and 2B show an exemplary view of one variation of a point-to-point/point-to-multipoint radio apparatus as described herein, shown mounted on a pole. In FIG. 2A, a radio 202 is mounted to pole 204 via a mounting unit 206. FIG. 2B shows the apparatus of FIG. 2A, with a cover (radome) over the parabolic dishes (reflectors) and isolation choke boundary 207. In contrast with other conventional radios where antennas are built as separate units from other radio components, such as tuners and transceivers, various embodiments of the present invention provide an integrated solution where other radio components are housed together with the antenna. From FIG. 2A, one can see that the tuning components, as well as other radio components, are housed together with the antennas 201, 203. A radome may be used to cover the antenna surface, thus protecting the antenna from hazardous weather.

Figure 2C:
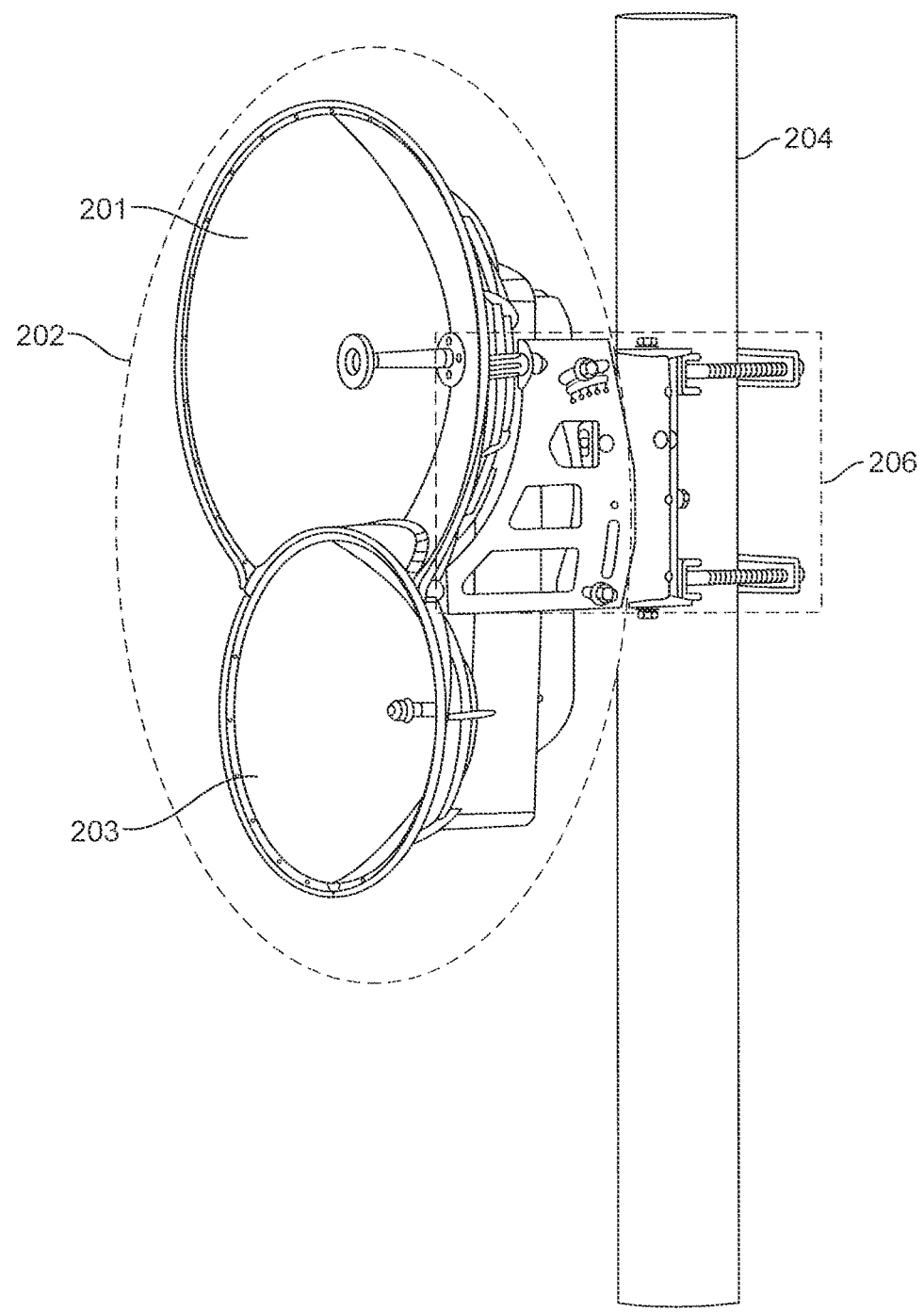
FIG. 2C presents a diagram illustrating an exemplary view of a radio mounted on a pole, in accordance with an embodiment of the present invention.
Figure 2D:
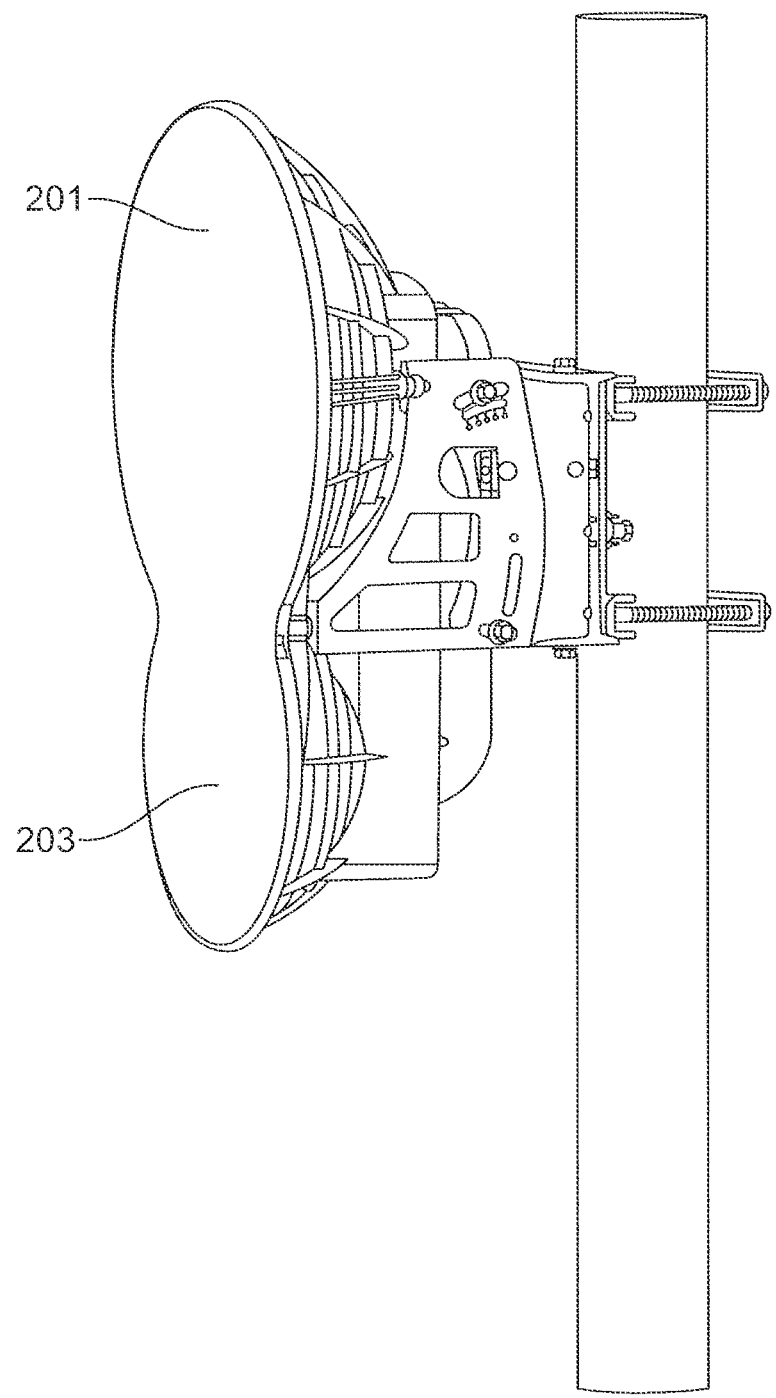
FIG. 2D presents a diagram illustrating an exemplary view of a radio mounted on a pole, in accordance with an embodiment of the present invention.

FIGS. 2C and 2D show an exemplary view of another variation of a point-to-point/point-to-multipoint radio apparatus, also shown mounted to a pole. FIG. 2C shows an exemplary view of one variation of a point-to-point radio that may be configured to operate at 24 GHz. In FIG. 2C, a radio 202 is mounted to pole 204 via a mounting unit 206. In contrast with other conventional radios where antennas are built as separate units from other radio components, such as tuners and transceivers, various embodiments of the present invention provide an integrated solution where other radio components are housed together with the antenna. From FIG. 2C, one can see that the tuning components, as well as other radio components, are housed together with the antennas 201, 203. In some variations, compact, highly efficient form factor of the radio system and the utilization of the worldwide license-free 24 GHz band may provide cost-effective and instant deployment of the radio system anywhere in the world. FIG. 2D shows an illustration of an exemplary view of a radio mounted on a pole. In FIG. 2D, a radome is used to cover the antenna surface, thus protecting the antenna from hazardous weather.

FIG. 3A presents an exemplary view of a radio showing the front side of the radio, in accordance with an embodiment of the present invention. From FIG. 3A, one can see that the front side of radio 202 includes two parabolic reflectors, an upper reflector 212 and a lower reflector 214; and two feed antennas, an upper feed antenna 216 and a lower feed antenna 218. In one embodiment, upper feed antenna 216 is coupled to the receiver of the radio, whereas lower feed antenna 218 is coupled to the transmitter of the radio. The reflecting surfaces of the reflectors are carefully designed to ensure long-range reachability. In one embodiment, reflectors 212 and 214 are parabolic reflectors.

FIG. 3B presents an exemplary view of a radio showing the backside of the radio, in accordance with an embodiment of the present invention. From FIG. 3B, the backside of radio 202 includes a substantially rectangular enclosure 220 or housing, which houses the radio circuitry (control circuitry), which may be a PCB. This rectangular enclosure may be part of a frame to which other components, including the reflectors 212, 214 are coupled. Note that the rest of the radio components, including the CPU, the FPGA, the transmitters, the receivers, etc., can all be mounted to the single PCB.

FIG. 3A also illustrates the isolation choke boundary 207. This element is described in greater detail below, but is generally mounted to the apparatus between the first and second antenna reflectors. As mentioned above, a radome may be used to cover the mouths of the antenna and the isolation choke boundary, as shown in FIG. 2B.

Figure 3D:
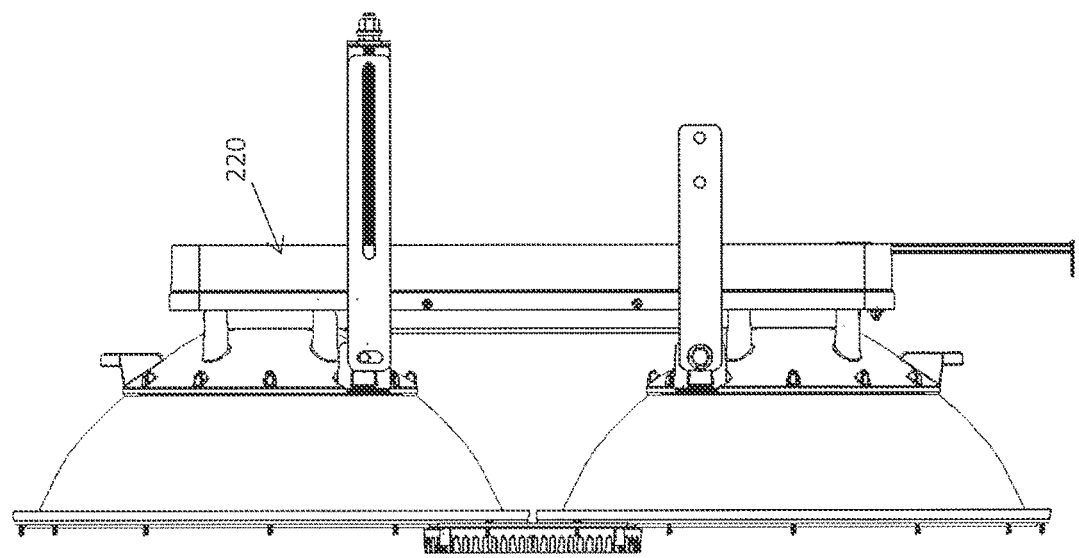
Figure 3C:
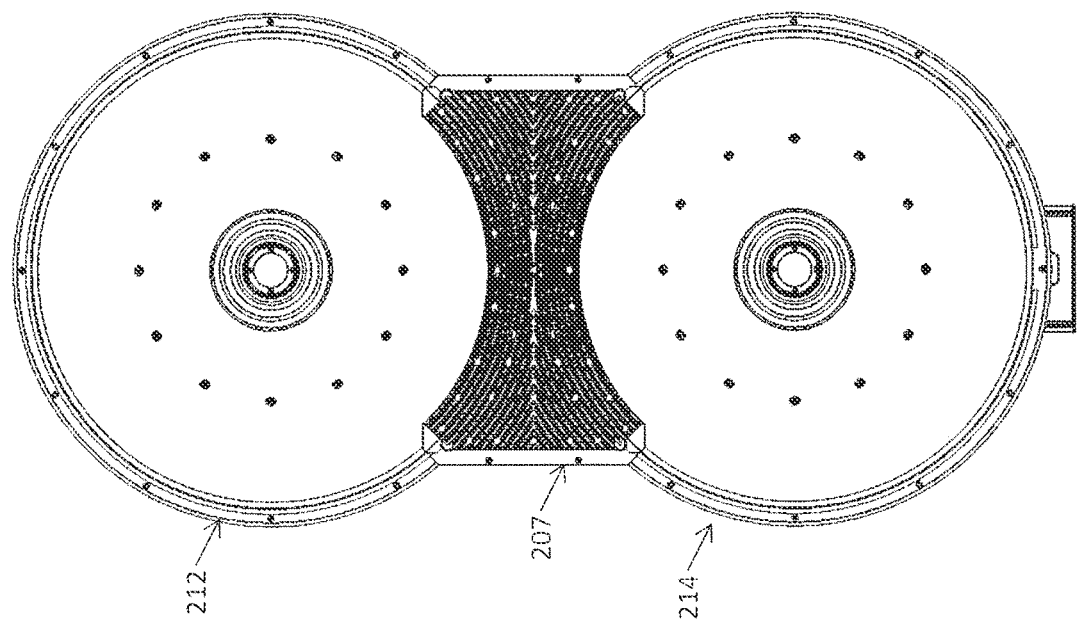
Figure 3H:
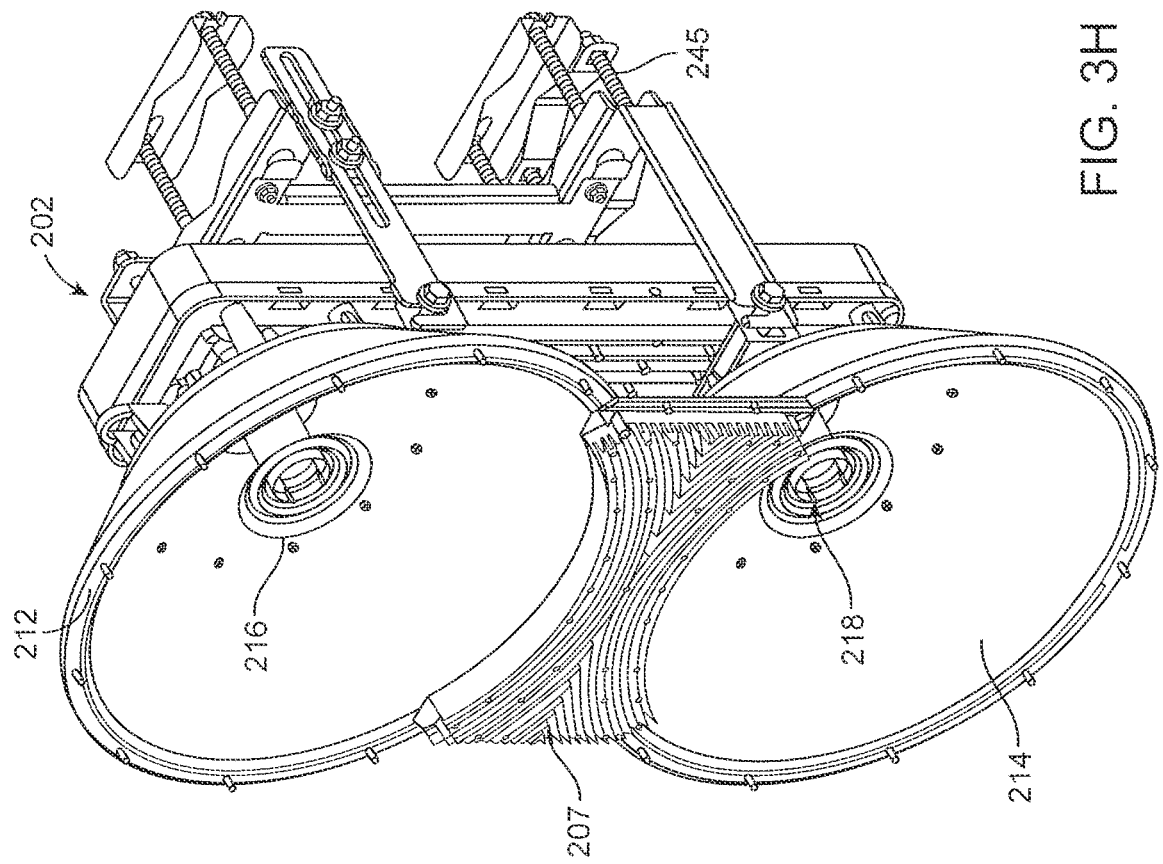
FIG. 3H is another variation of a radio device including a pole mount and frame, having a quick connect.

FIG. 3C is a front view of the radio device of FIGS. 3A and 3B. In FIG. 3C the two reflectors are in front of the rectangular housing, mas shown by the side view of FIG. 3D. The upper 212 and lower 214 reflectors are separate, and the isolation choke boundary 207 is positioned between the two. Note that the proximity of the reflectors to the radio circuitry housed in enclosure 220 not only ensures a compact radio system, but also eliminates the need for an external cable to connect the reflector to other radio components, thus obviating the need for tuning the transmitter antennas.

FIG. 3E shows a back view of the radio device of FIG. 3A. In this view, the back of the housing 220 is visible. A door 226 or opening in the back of the housing is shown open, showing connections to cables (input ports) that may be included. Thus, the housing may include an atrial area that can be closed off by the door 226, but which is separated from the inner housing region holding the circuitry. This atrial region 228 may be used to enclose the connectors for one or more cables, e.g., Ethernet connector cables, including power over Ethernet (POE) cables. The door 226 is show slid open, but it may be connected otherwise to the housing or frame 230. In any of the variations described herein, the housing 220 may be directly or indirectly connected to the frame 230. For example, as shown in FIG. 3F, the housing is connected to the antenna reflectors 212, and the reflectors are connected to the frame 230.

Figure 3G:
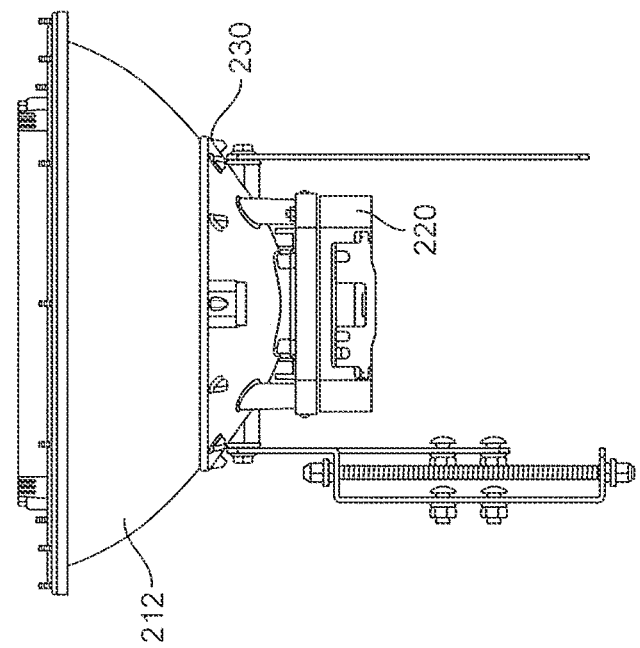

FIG. 3F shows a top view of the radio device of FIG. 3A. In this variation, the frame 230 also includes attachment sites for coupling the antenna to a pole mount (not show in FIGS. 3A-3F). FIG. 3G shows a bottom view of the radio device of FIG. 3A.

Figure 4A:
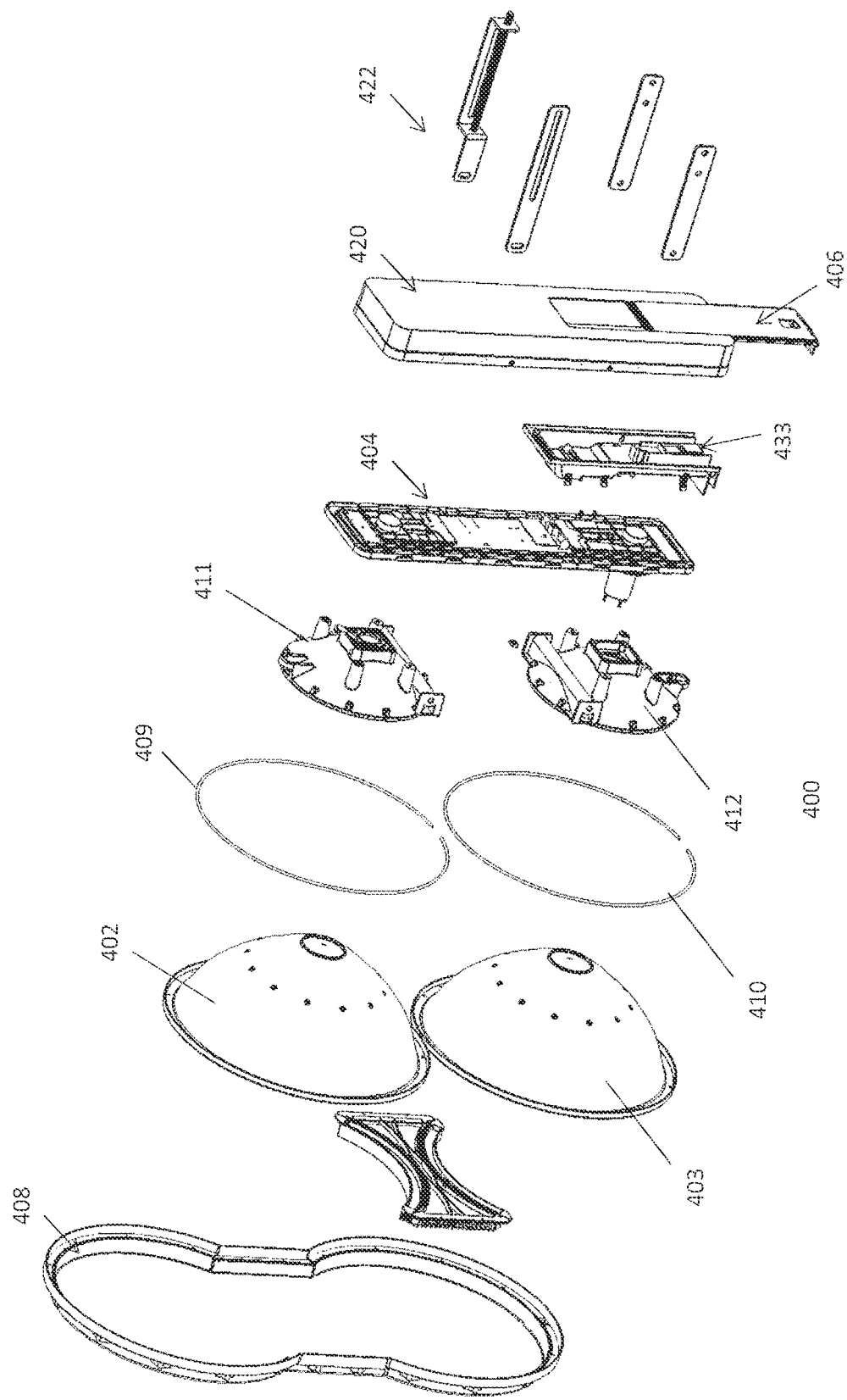
FIG. 4A is an exploded view of the radio assembly of FIG. 3A.

FIG. is a diagram illustrating an exemplary exploded view of one variation of a radio apparatus. In FIG. 4A, a radio device 400 includes a number of major components as well as a number of auxiliary or connecting components. More specifically, the major components include a first and second parabolic reflector 402, 403, radio (receive/transmit) circuitry 404, and a housing 420. A frame configured to support the reflectors, and housing may include a back support 411, 412 that supports the reflectors for the antenna the housing may enclose the circuitry 404 and may also be mounted to the frame formed by the back supports and the brackets 422. The circuitry 404 may include most radio components, such as the CPU, the FPGA, the transmitter, and the receiver. Backside cover 406 covers the backside of the housing, enclosing the atrial area formed in the housing cover by inner region 433. More specifically, backside of the housing forms a hollowed space that snugly fits PCB 404. The isolation choke boundary 407 attached to the front of the device, between the reflectors.

Additional components may include a radome cover 408 for protecting the antenna from weather damage, and gaskets 409, 410 for securing the radome; additional element may include an upper feed-shield subassembly for shielding a feed antenna to the upper reflector; a lower feed-shield subassembly for shielding a feed antenna to the lower reflector; heat sinks for dissipating heat from components on PCB; thermal pads; microwave absorbers; screws for coupling together the various components, washers and screw covers.

Figure 4B:
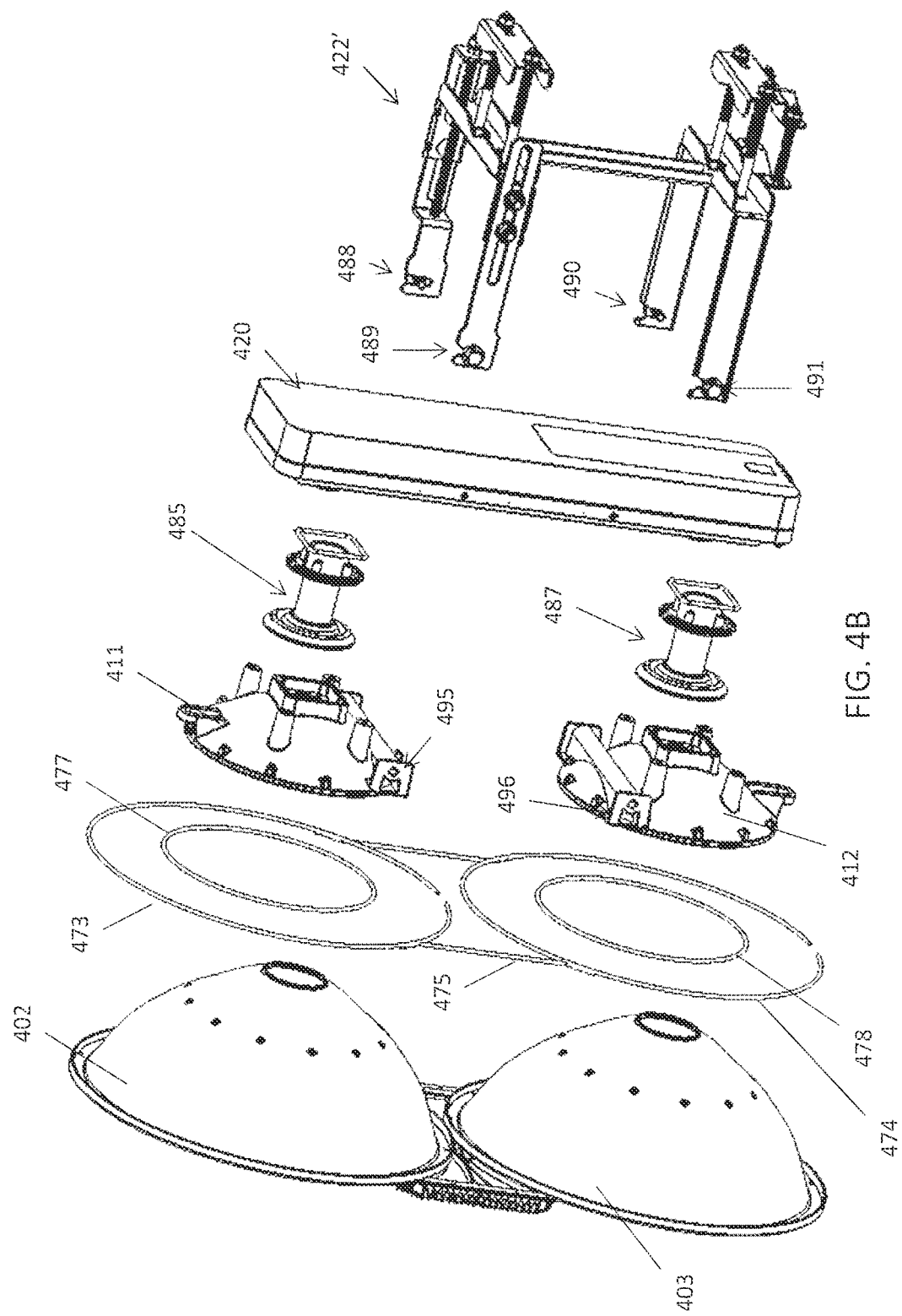
FIG. 4B is an exploded view of another variation of a radio device.
Figure 9G:
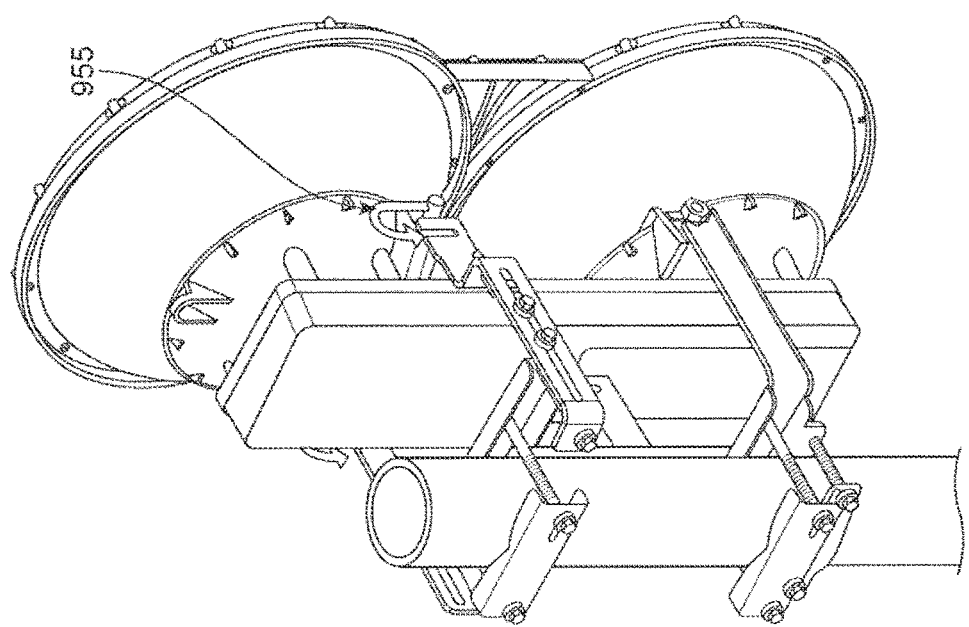
FIG. 9G illustrates one method of quick-connect coupling of a frame holding a pair of reflectors into a mount (e.g., pole mount).

FIG. 4B shows another variation of a radio apparatus having a pair of parabolic antenna reflectors 402, 403, radio circuitry for the receiver and transmitter(s) (not visible in FIG. 4B) held within a housing 420. Transmitter and receiver feeds connect to the radio circuitry and extend into the antenna reflectors. A frame, composed at least in part of a pair of reflector supports 411, 412, may interact with a pole mount region 422' including side beams and cross beams ("brackets") also include quick connects (slots 488) that may hold projections (e.g., bolts 495, 496, etc.) extending from the frame. FIG. 9G illustrates operation of a pair of quick connects used to connect a frame of a device holding a pair of reflectors into a pole mount, shown by arrow 955.

The housing also includes a door enclosing an atrial sub-housing within the housing for holding the connectors and the ends of one or more cables that can extend from the apparatus.

A radome (not pictured) similar to the one shown in FIG. 4A may also be included as a cover over the openings of the antenna reflectors and isolation choke boundary. In FIG. 4B, a pair of O-rings 473, 474 may be used to secure the radome to the back of a lip of both the reflectors and extension of these O-rings 475 may seal the radome to the back of the isolation choke. A separate pair of O-rings 477, 478 may be used between the support 411, 412 and the reflector 402, 403.

As used herein, an isolation choke boundary may refer to any structure that reduces the spillover between the transmission antenna and the receiving antenna, thereby enhancing the isolation between of the antennas from each other. An isolation choke boundary may be referred to as an isolation barrier, isolation boundary, choke, choke boundary, choke barrier, etc. A choke (e.g., isolation choke boundary) may provide a structure (including a corrugated structure) having multiple barriers, such as ridges, that reduce the cross-talk between the transmission and receiving parabolic antenna dishes. The height/depth and spacing of the ridges may be adapted so that they isolate the particular frequency range (e.g., bands) used by the device. For example, the barrier structures forming the isolation choke boundary may have a depth or range of depths centered on the ¼ wavelength of the bands being used, as describe in greater detail herein. Functionally, an isolation choke boundary may be configured to provide greater than a minimum level of isolation (e.g., 10 dB isolation) when positioned between adjacent parabolic transmitter and receiver dishes, as described.

FIGS. 5A-5I illustrate one variation of an isolation choke boundary (which may also be referred to as a choke or isolation choke). In general, a choke acts as a barrier or damper between the transmitting antenna and the receiving antenna at the mouths of the transmitting antenna reflector and the transmitting antenna reflector. In the examples provided herein, the devices include a dedicated transmit antenna reflector and a dedicated receiver antenna reflector, and the choke may be positioned between the two, and/or around the outer edges of both. In variations of the radio devices described herein that are configured to operate around the 5 GHz band, the choke may include a plurality (e.g., more than 3, more than 4, more than 5, more than 6, etc.) ridges that are spaced apart running parallel to the outer rim of one or both parabolic reflectors. The ridges may extend at least partially around the rim(s) of the antenna reflector(s) so that the ridges are directed perpendicular to the plane of the antenna reflector mouth. The height, spacing between adjacent ridges, number of ridges, shape of ridges, and length of the ridges may be optimized based on the particular radio bands used. For example, the choke shown in FIGS. 5A-5I is optimized for operation around the 5 GHz band, so that the device has greater than about 70 dB isolation between the transmit and receive antennas. The choke component shown may add about 10 dB isolation (e.g., about 12 dB isolation, etc.).

For example, the depth between the ridges may be approximately ¼ wavelength of the wavelengths used by the apparatus. In variations in which the apparatus is configured to transmit and receive between 4 GHz and 8 GHz, the depths between adjacent ridges may be between about 18.8 mm and 9.4 mm (e.g., centered around 13 mm); in variations in which the apparatus is configured to transmit/receive in the 5.4 GHz to 6.2 GHz range, the depth may be between about 13.9 and 12.1 mm. The ridges may be arranged to minimize edge diffraction and reduce the energy communicated between the adjacent transmission and receiving antenna dishes. As described in more detail below, an isolation choke boundary may be configured so that the range of frequencies isolated is adjustable. For example, an isolation choke boundary may be adjustable to adjust the height(s) of the ridges.

Figure 5A:
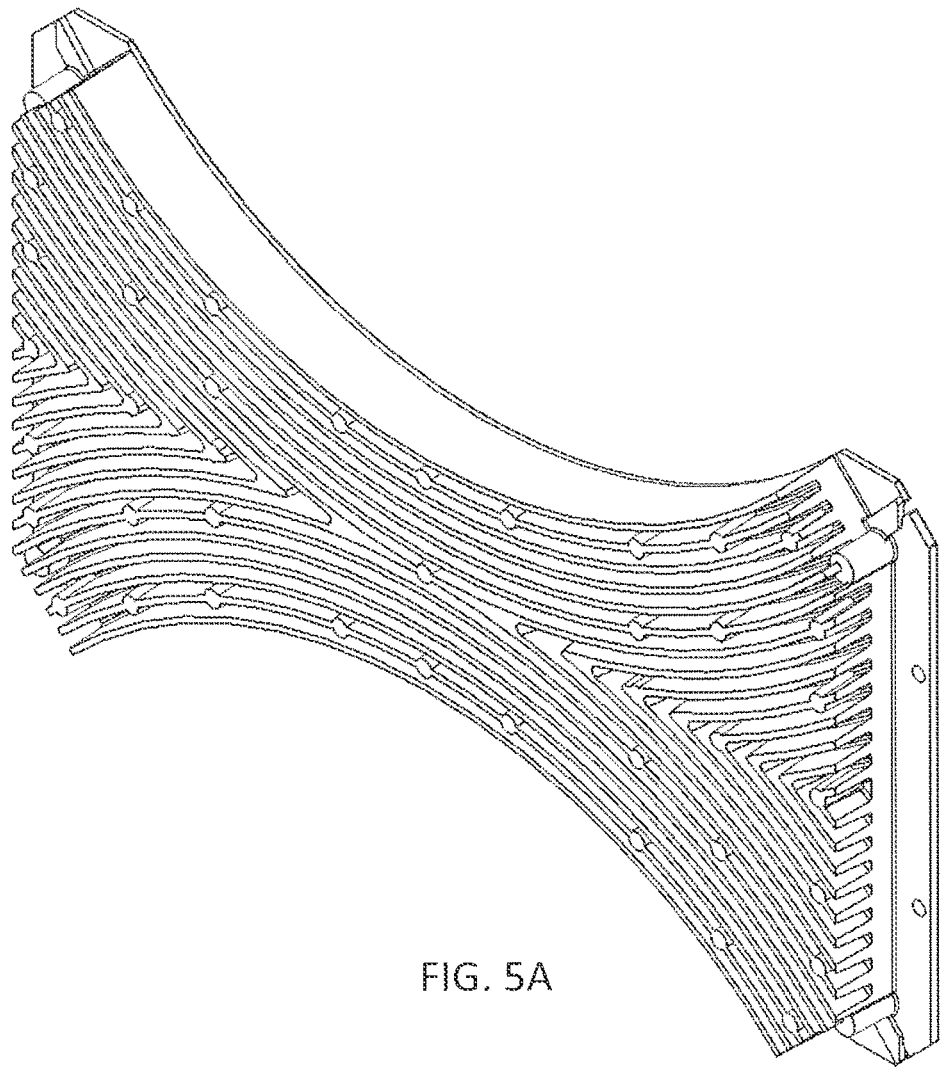
FIG. 5A is a front perspective view of one variation of an isolation choke as described herein.

FIG. 5A shows a side perspective view of the choke. In this example, the choke is mounted to (or at least partially over) the outer edges of the reflectors; in this variation the choke may overhand into the antenna reflector(s). The choke of FIG. 5A has greater than 12 ridges (e.g., two sets of 6). The ridges 505 have a pitch that is less than about 0.35 inches. Two sets of ridges are shown, each set following the curvature of the mouth of a reflector. The ridges are separated by channels. The separation of the ridges (e.g., the width and/or depth of the channels) may be constant or varied. In some variations the height of the ridges may be varied. For example, adjacent ridges may have different heights (going from higher to lower, or alternating high/low, etc.) extending "up", out from of the plane of the mouth of the reflector.

Figure 5B:
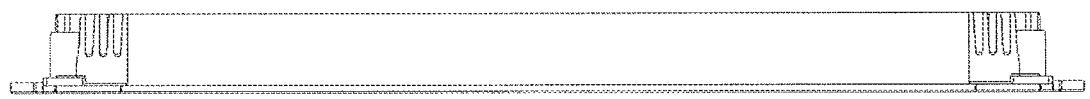
FIGS. 5B and 5C show top and side views, respectively of the isolation choke shown in FIG. 5A.
Figure 5C:
Figure 5D:
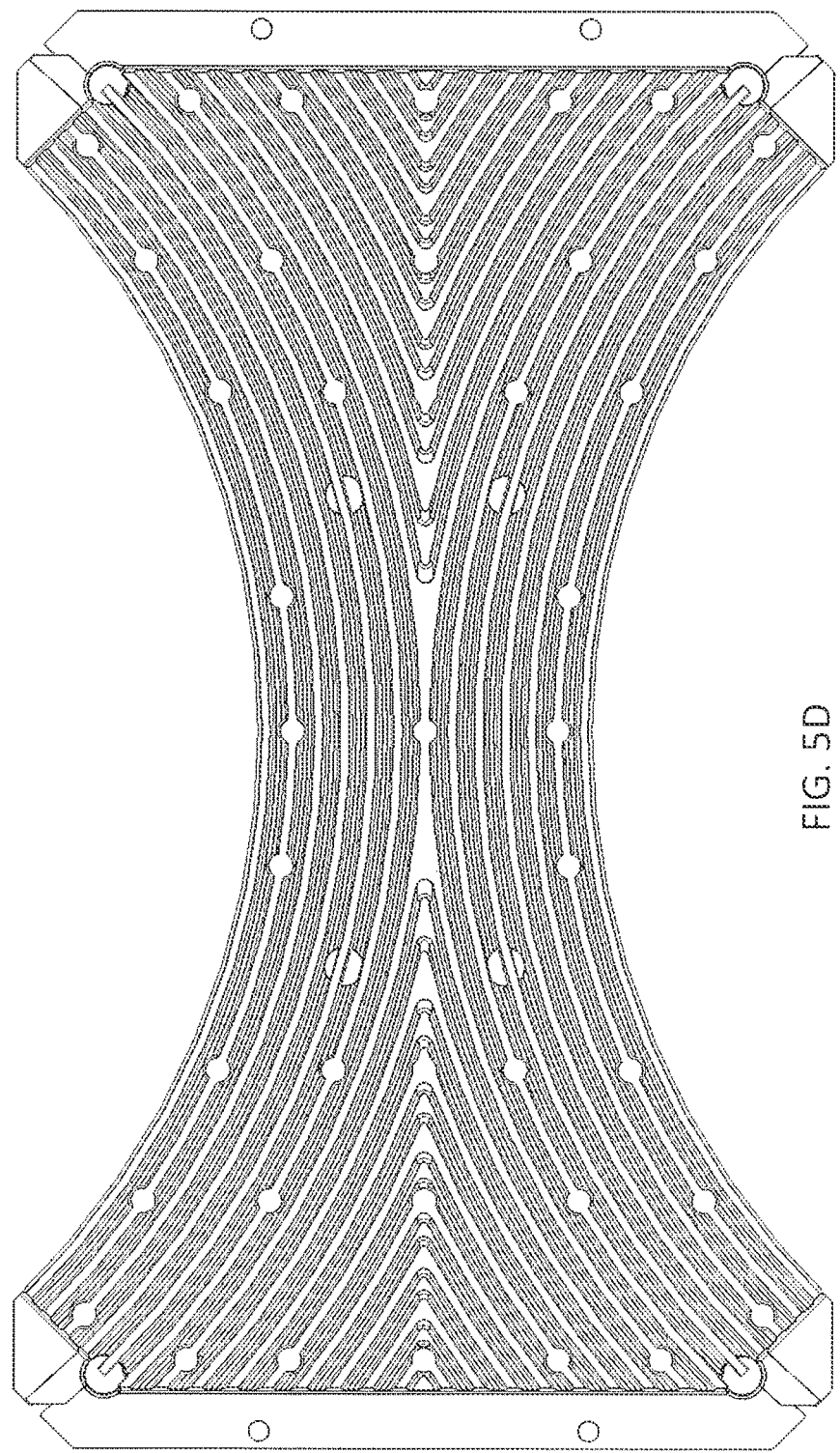
FIGS. 5D and 5E are front and back views, respectively, of the isolation choke of FIG. 5A.
Figure 5E:
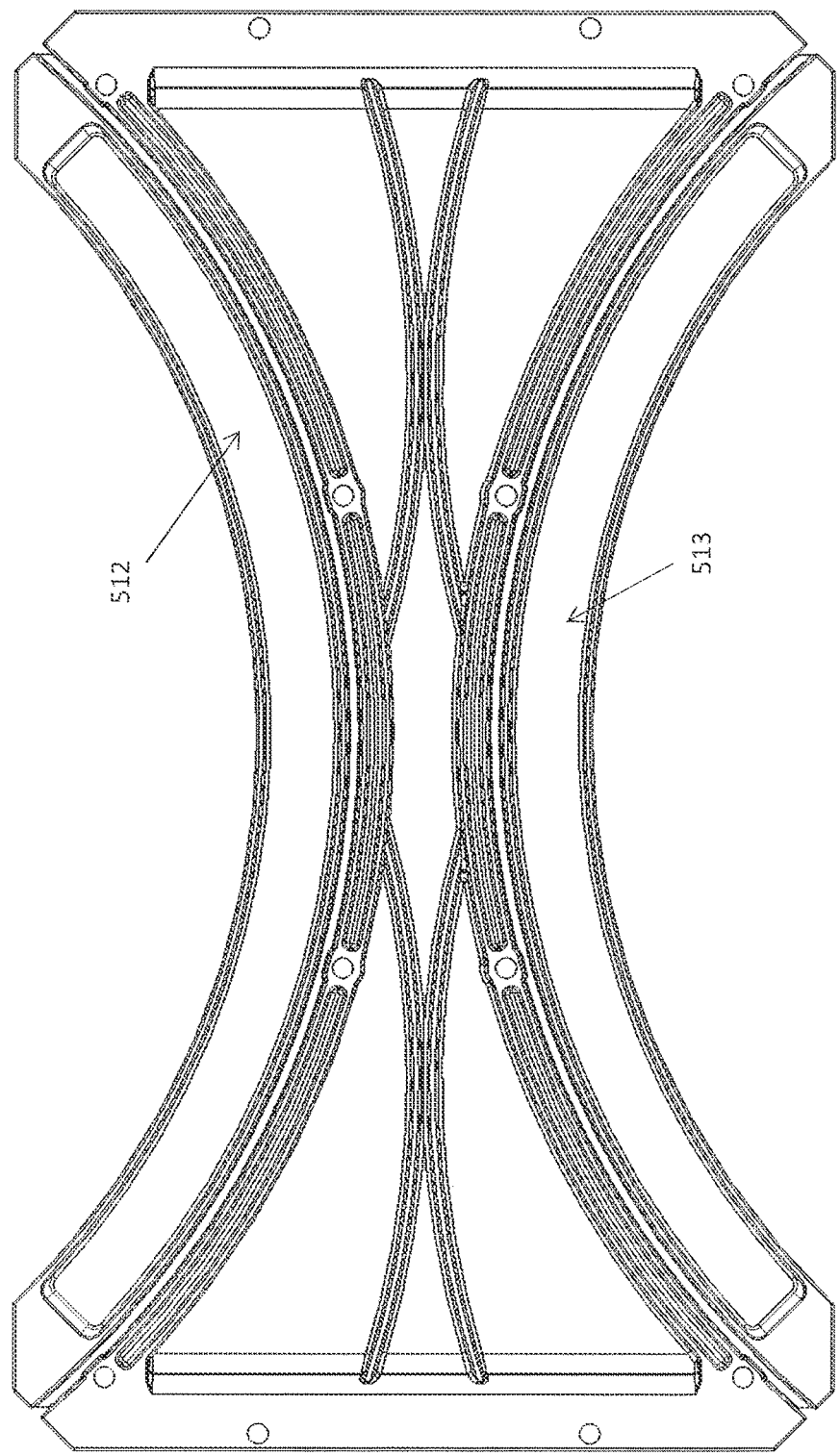

FIG. 5B shows a side view of the choke; FIG. 5C is an end view. The arrangement of the ridges and channels may also be seen in the front view of FIG. 5D. FIG. 5E shows a back view of the choke, showing a lip region 512, 513 on either side that may overhang over the antenna reflector opening(s).

Figure 5F:
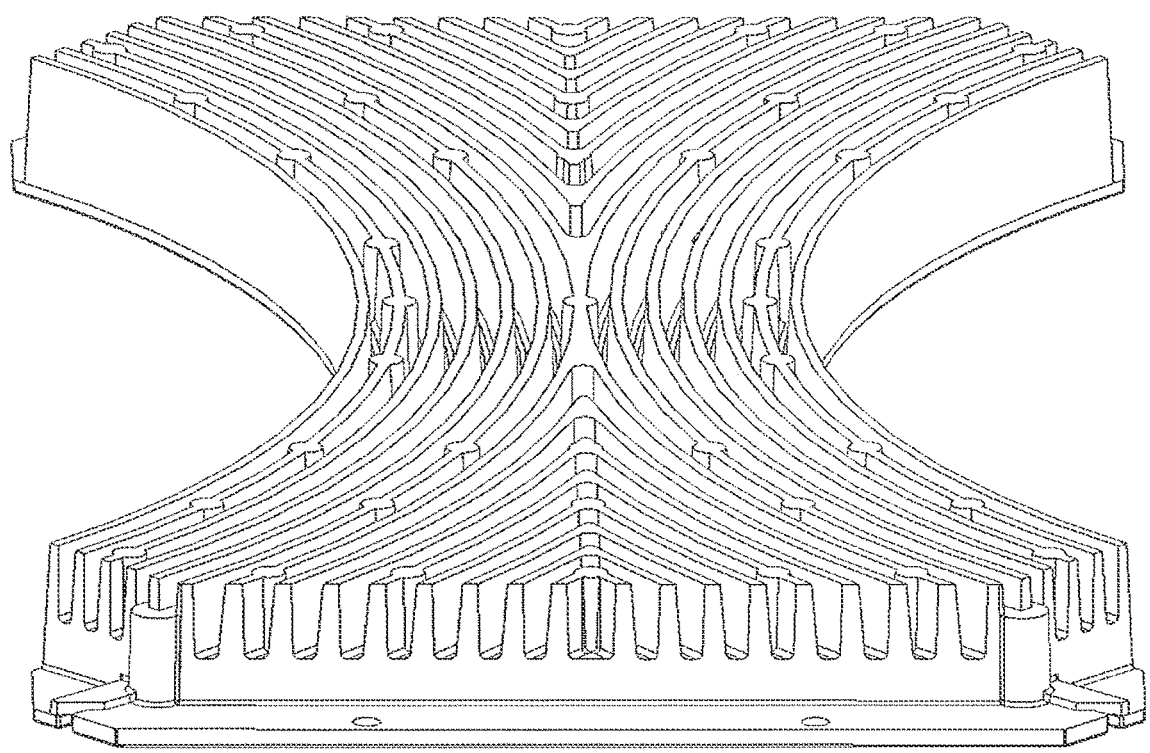
FIG. 5F shows a side perspective view of the isolation choke of FIG. 5A.
Figure 5G:
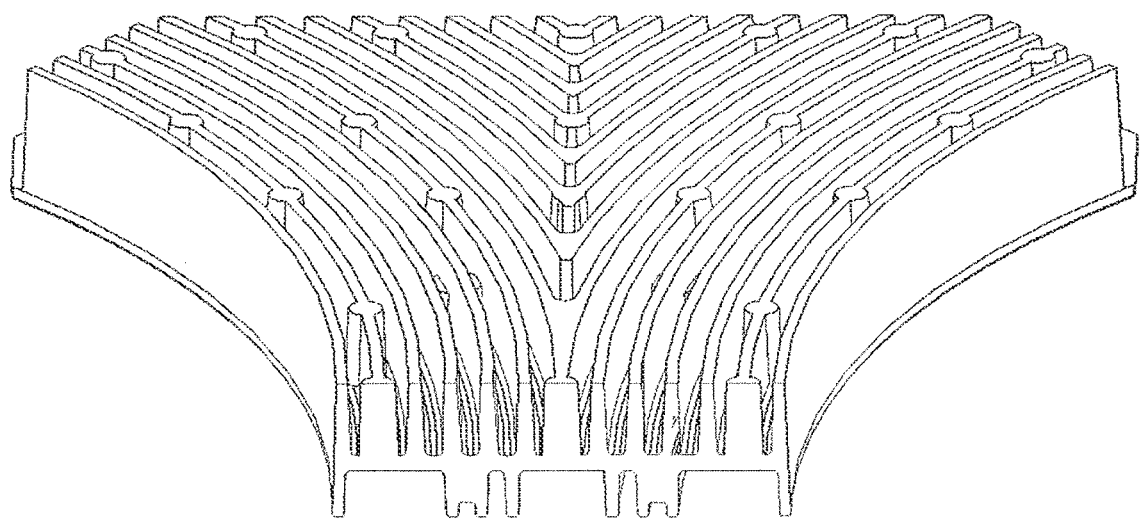
FIG. 5G shows a section through the isolation choke shown in FIG. 5F.
Figure 5H:
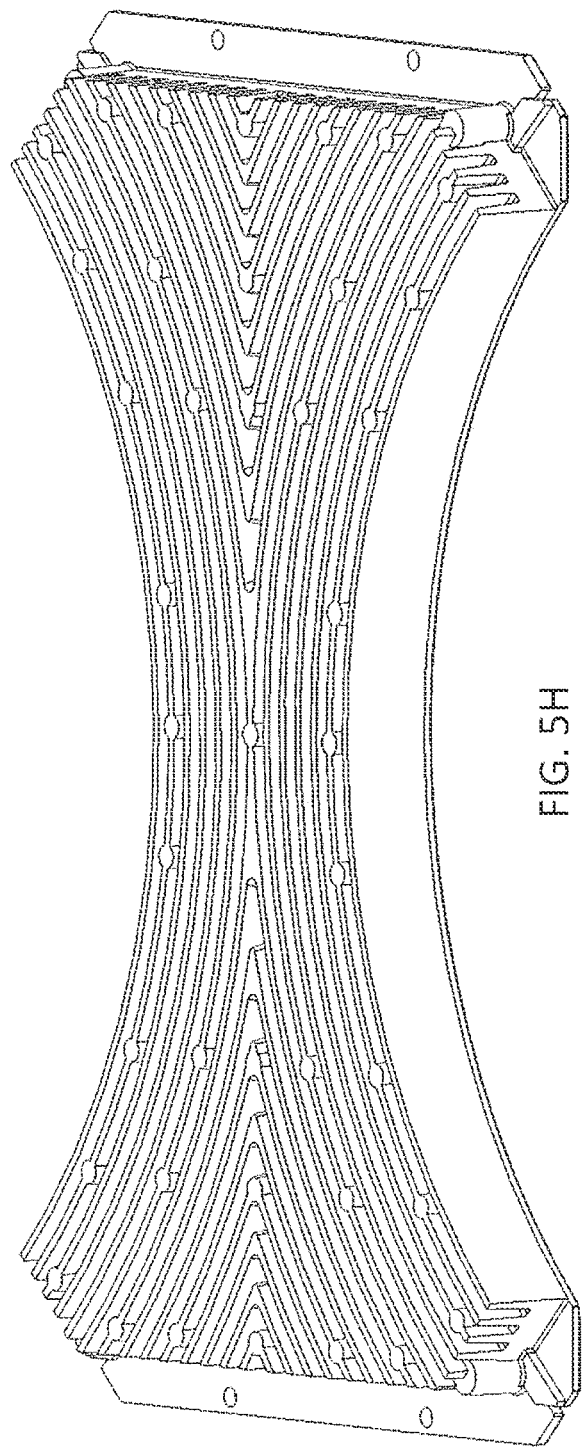
FIG. 5H shows a front perspective view of the isolation choke of FIG. 5A.
Figure 5I:
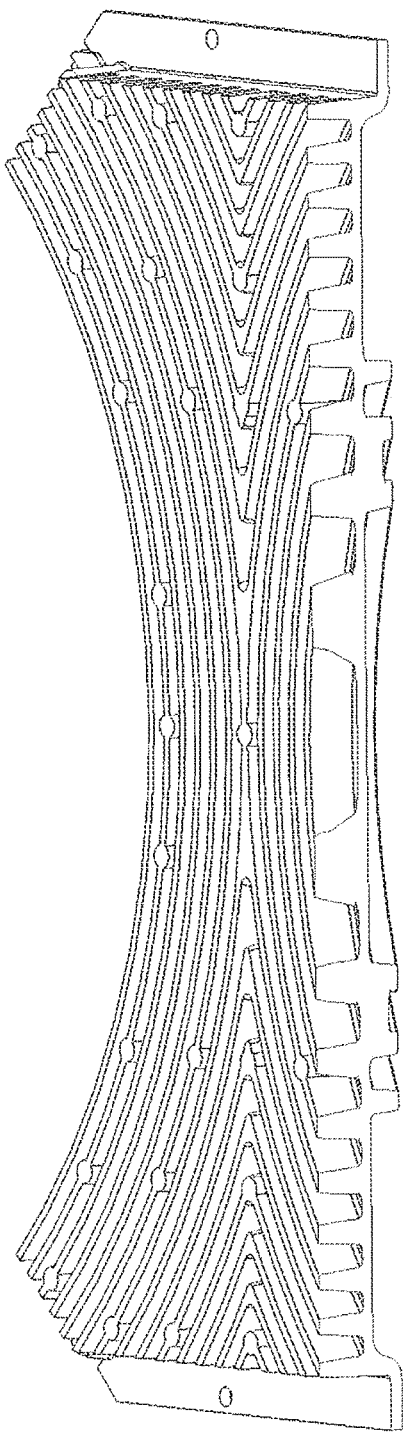
FIG. 5I shows a section through the isolation choke of FIG. 5H.

FIG. 5G shows a transverse section though the midline of the choke shown in FIG. 5F. In section, the channels and ridges are clear. Similarly, FIG. 5I shows a transverse section through the choke of FIG. 5H. In general, a choke may be configured as a low Q structure and may integrate as many ridges as possible without substantially compromising the power of the transmit and receive antennas.

Figure 6A:
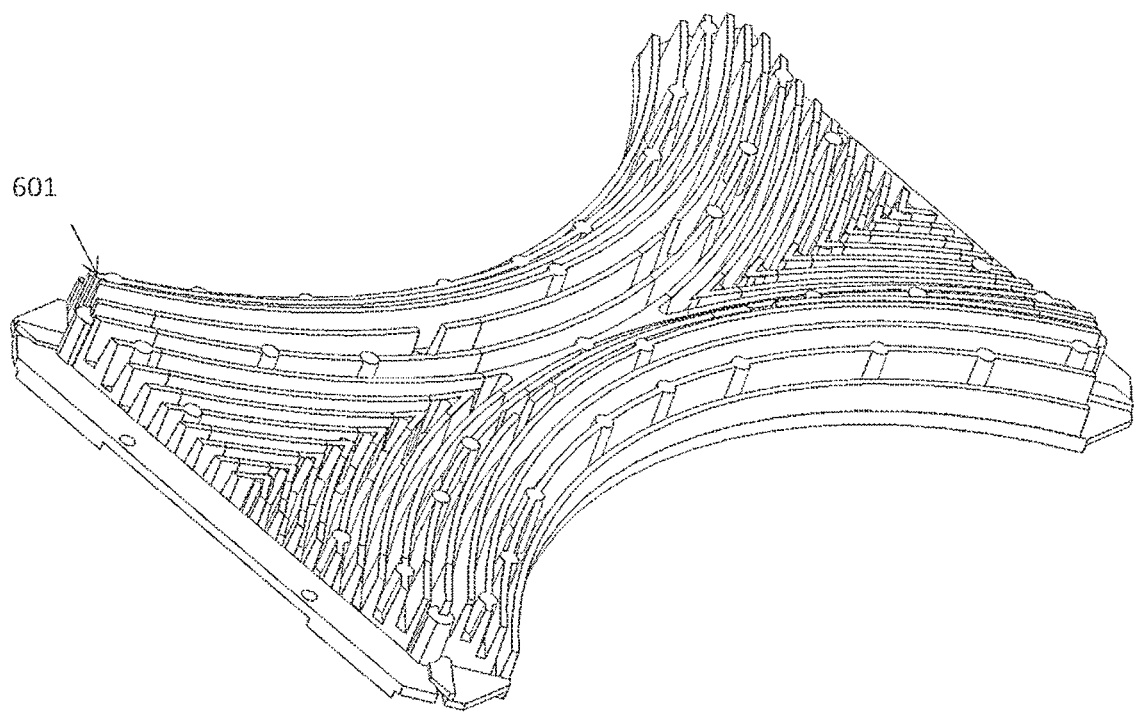
FIG. 6A is a front perspective view of another variation of an isolation choke.
Figure 6B:
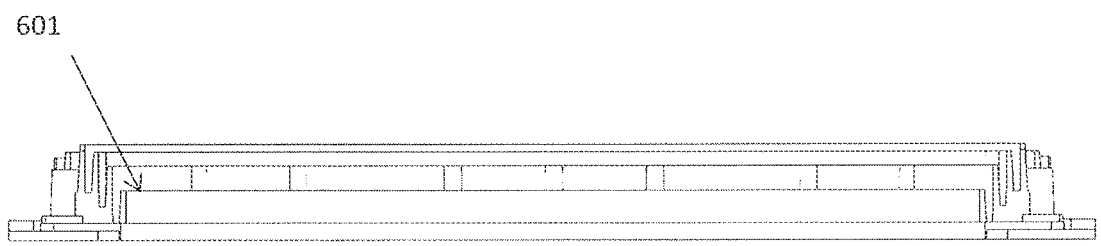
FIGS. 6B and 6C show top and side views, respectively of the isolation choke shown in FIG. 6A.
Figure 6C:
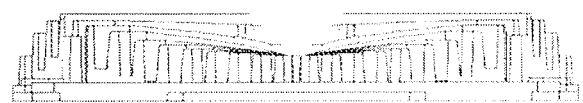
Figure 6D:
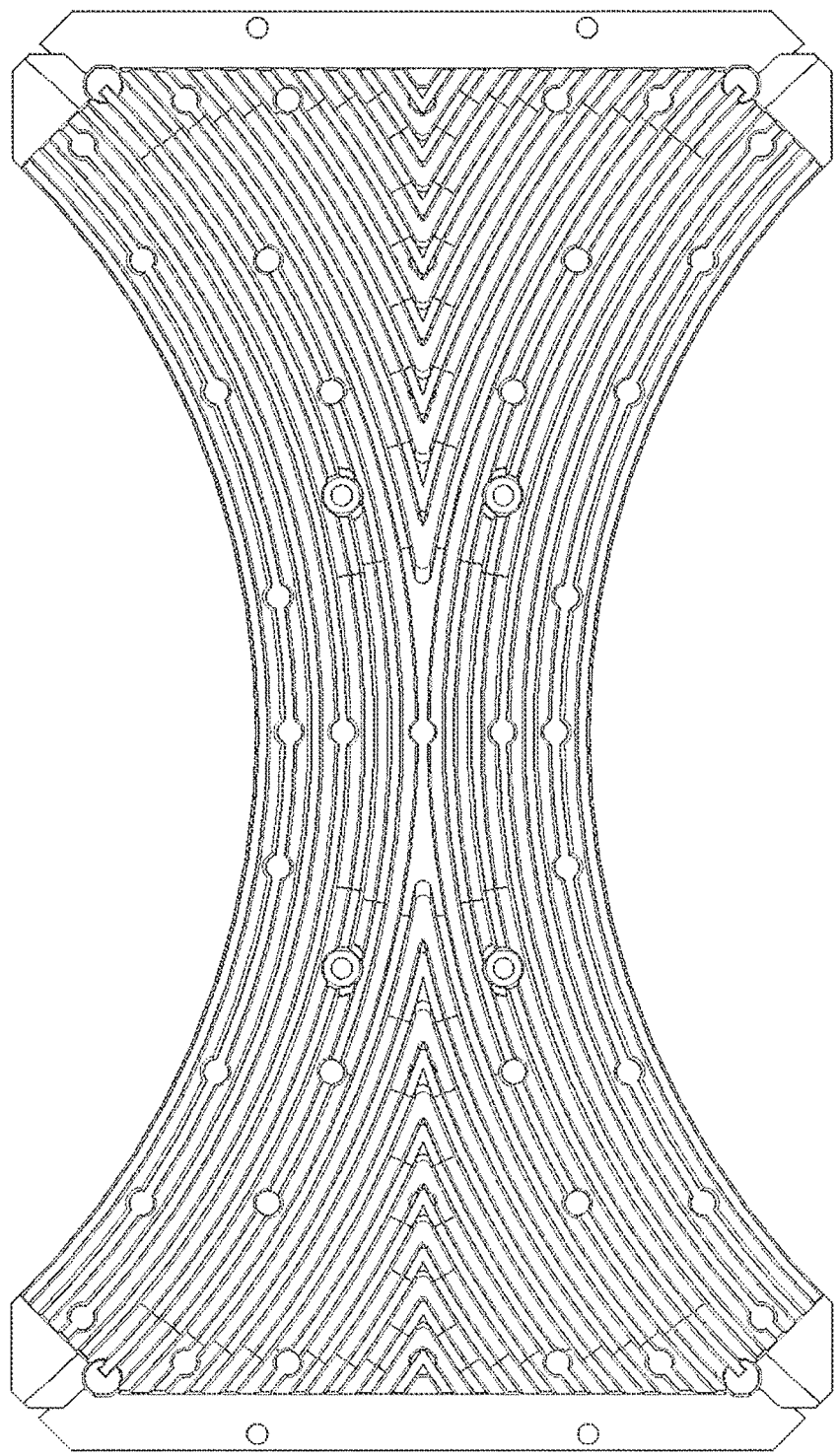
FIGS. 6D and 6E are front and back views, respectively, of the isolation choke of FIG. 6A.
Figure 6E:
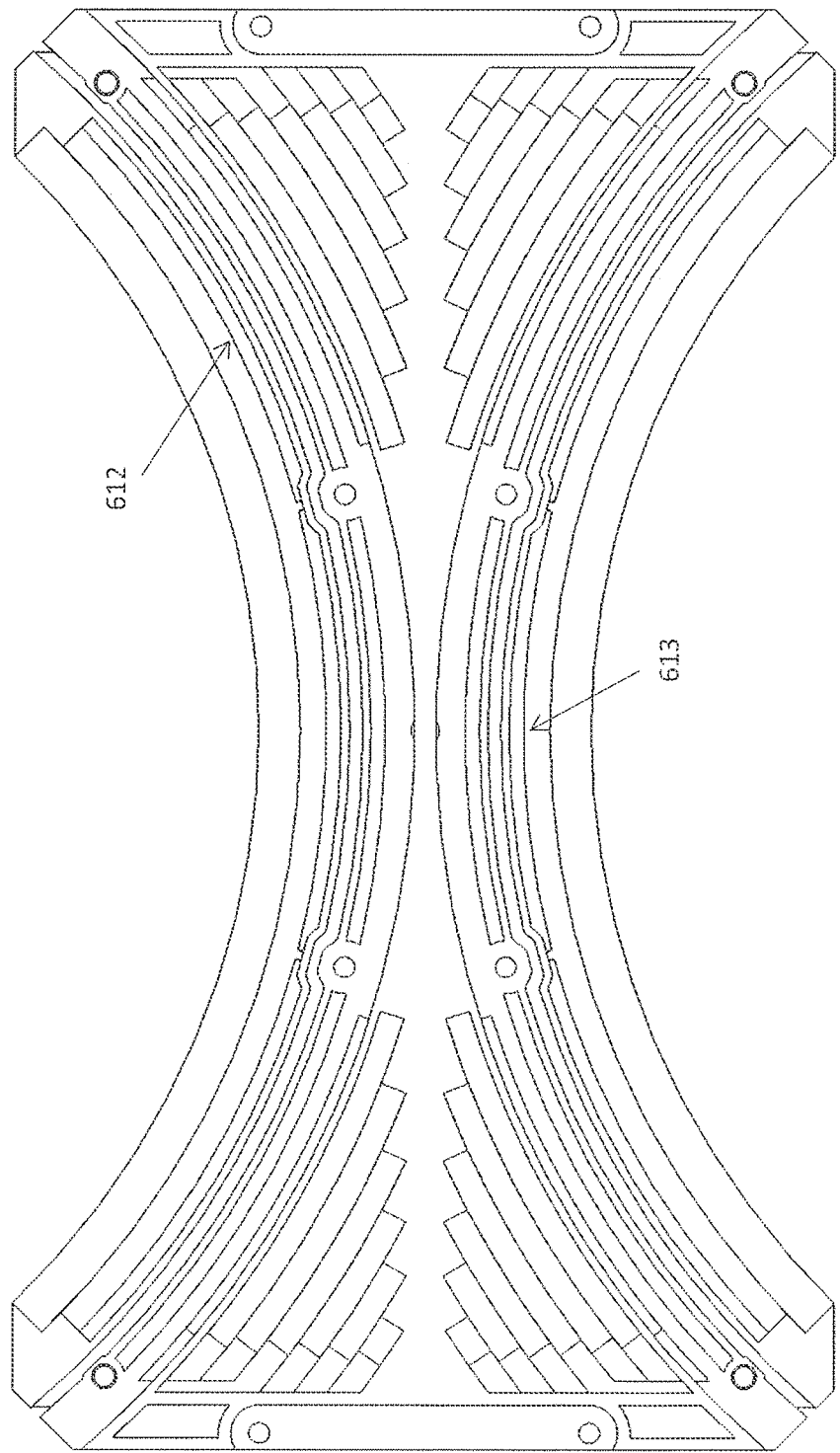

FIGS. 6A-6J illustrate another variation of a choke boundary. In this variation the ridges are arranged so that the ridges 601 are not in a single plane, but adjacent ridges are instead arranged in a sinusoidal pattern. For example, in the perspective view of FIG. 6A, the upper surface of the choke, formed by the ridges extending laterally along the surface, is uneven. The apparent heights of adjacent ridges are uneven, as some extend further above the major plane of the choke boundary (the "top" of the choke boundary) than others. This is even more apparent in the side views shown in FIGS. 6B and 6C. FIG. 6C shows an end view of the isolation choke boundary of FIG. 6A. FIG. 6D shows a top view, looking down onto the choke boundary, of the choke boundary of FIG. 6A, while FIG. 6E shows a bottom view of the choke boundary; the bottom may be attached to the outer edges between the parabolic reflectors of the transmitting and receiving reflectors Similar to the example shown in FIG. 5A-5I, the bottom of the choke may include a lip region 612, 613 on either side that may overhang over the antenna reflector opening(s).

Figure 6F:
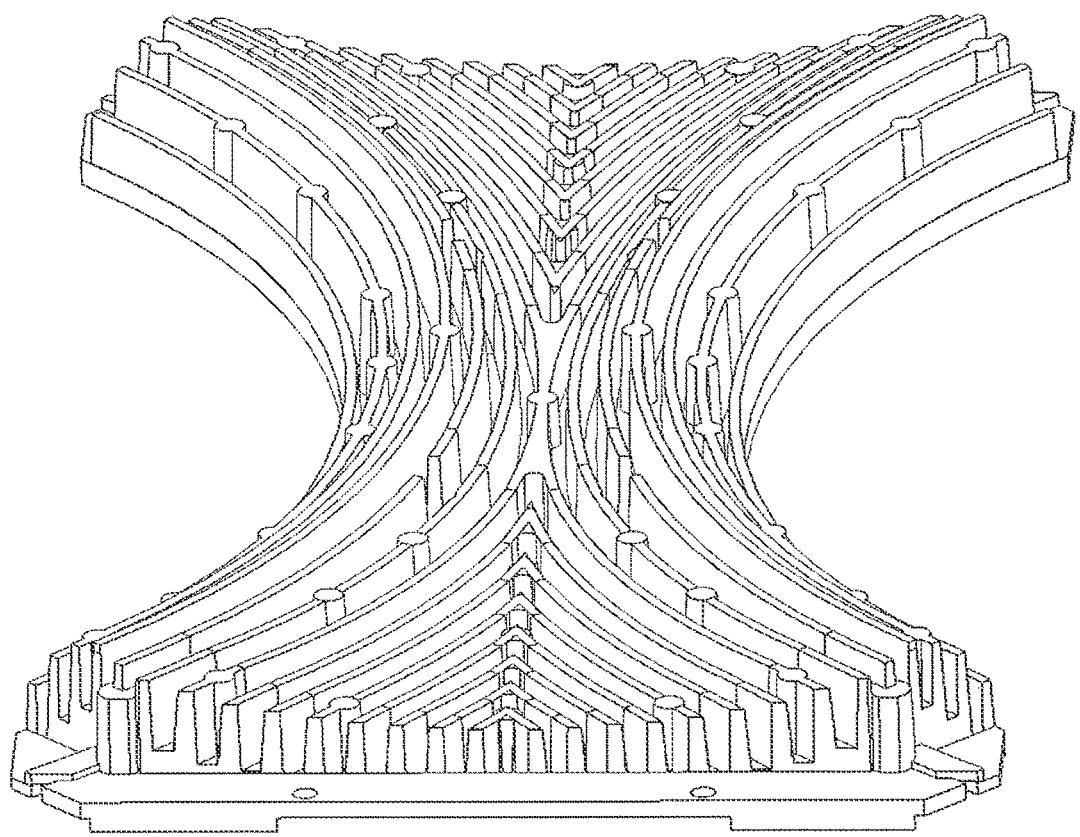
FIG. 6F shows a side perspective view of the isolation choke of FIG. 6A.
Figure 6G:
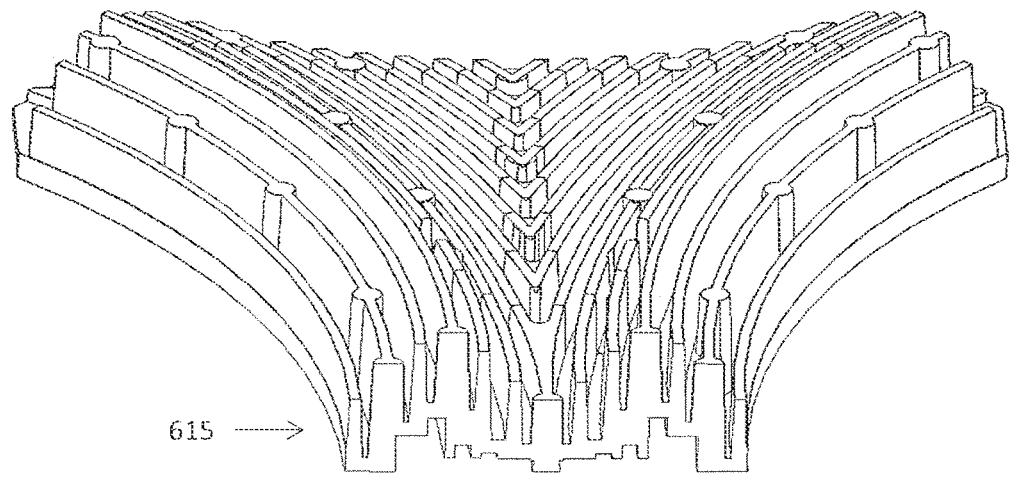
FIG. 6G shows a section through the isolation choke shown in FIG. 6F.
Figure 6H:
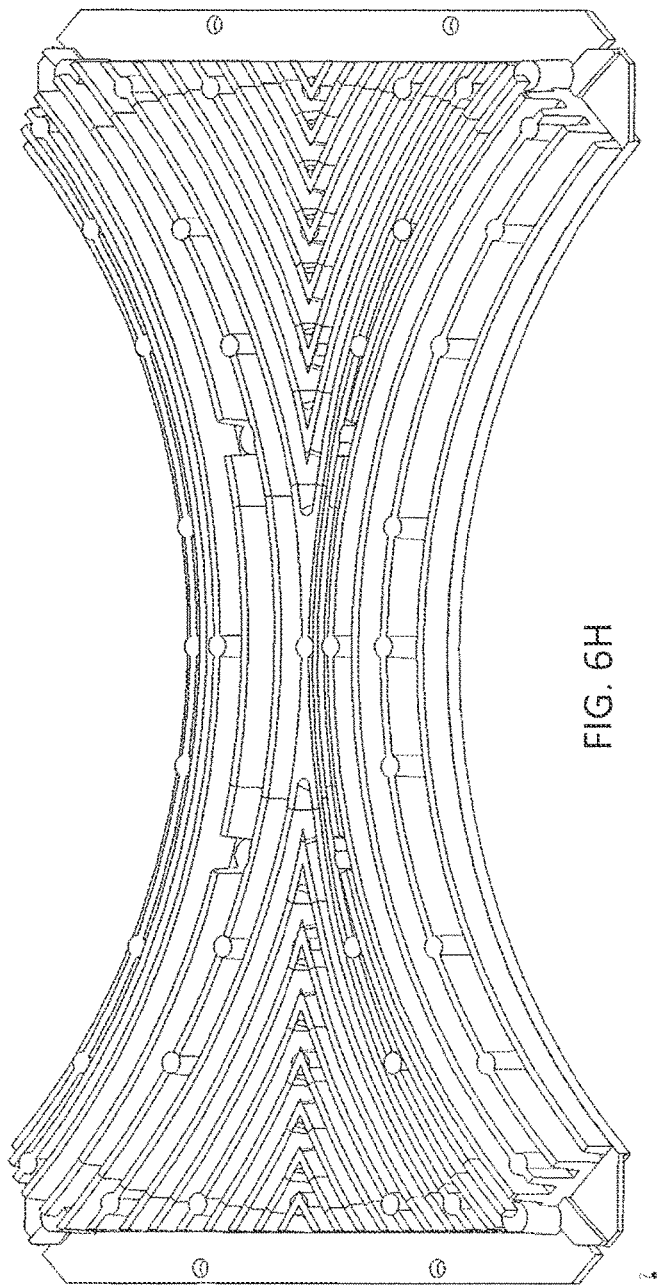
FIG. 6H shows a front perspective view of the isolation choke of FIG. 6A.
Figure 6I:
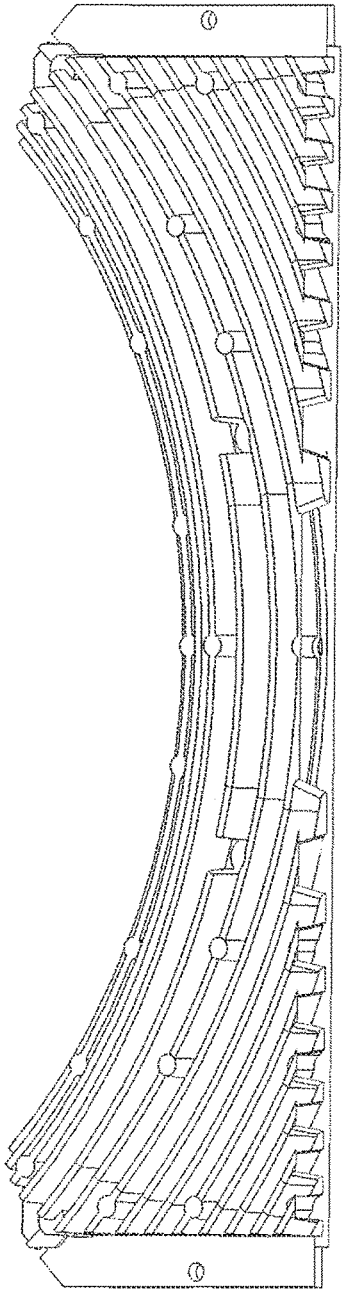
FIG. 6I shows a section through the isolation choke of FIG. 6H.

FIGS. 6F and 6G show a perspective end view of the isolation choke boundary ("choke" or "choke boundary") of FIG. 6A. In FIG. 6G a section though the middle of the choke is shown 615, illustrating the arrangement of the ridges in a curved (e.g., sinusoidal) pattern. The apparent heights of adjacent ridges are different. In some variations the spacing between the ridges may also be different, and/or the depths (e.g., between about 9 mm and 19 mm) Similarly, FIG. 6I shows a transverse section through the choke of FIG. 6A; FIG. 6H shows the same perspective view, of FIG. 6I, without the section through the choke.

Figure 6J:
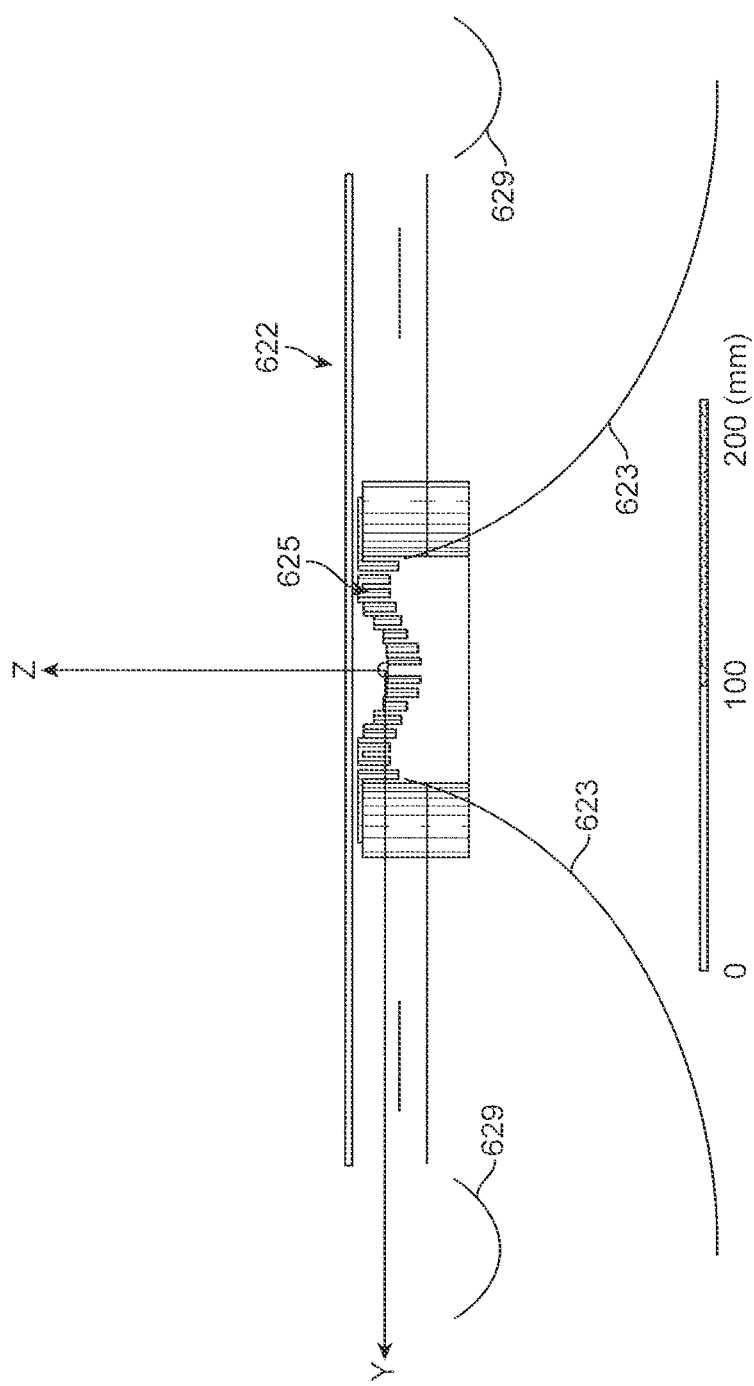
FIG. 6J schematically illustrates the operation of an isolation choke such as the one shown in FIG. 6A within a radio device having a transmission antenna and a receiving antenna.

FIG. 6J schematically illustrates a choke boundary between two parabolic reflectors of a radio device. In this example, the surfaces of the choke 625 and reflectors 623 may be covered by a radome 622. The choke is positioned over the lip of the reflectors 623 and in front of (extending further than) the subreflectors 629 of each reflector. A scale bar is shown on the bottom for reference, although the scale is not intended to be exact. In this example, the choke has a low-frequency wave profile on top of the high-frequency notch (ridged) profile. As described, this may provide an increase in the isolation between the two reflectors (antennas).

In some variations, the isolation choke boundary may include an absorber (e.g., a microwave absorber) material as part of the structure. The material may act to absorb energy including energy within a frequency range relevant to the operation of the apparatus. For example, a strip or region of absorber such as microwave absorber may extend between the two antenna dishes when the choke is positioned between the two dishes. An example of a microwave material includes a polymeric material filled with magnetic particles; the particles may have both a high permeability (magnetic loss properties) and a high permittivity (dielectric loss properties). The absorber may be a solid (e.g. magnetic) absorber and/or a foam absorber. For example, a foam absorber may be an open celled form that is impregnated with a material that is lossy at the appropriate frequencies (e.g., a carbon coating). An absorber may be held on the choke (e.g., extending along a long axis of the choke that would be positioned between the two reflector dishes). The absorber may be any appropriate thickness, width and length, such as between about 0.5 mm and about 5 cm thick and/or wide, etc. The absorber may be shaped (e.g., may include projections, ridges, etc.) and/or may form one or more of the ridges of the choke boundary.

Also described herein are isolation boundaries (isolation choke boundaries) that are automatically or manually adjustable to adjust the isolation frequency. For example, and isolation choke boundary may be adjustable by adjusting the height(s) of the ridges extending between the reflectors. The ridge heights may be adjusted from a particular height or range/distribution of heights based on the desired transmitting/receiving frequency band. In general, the height of the ridges may be a fraction (e.g., ¼) of the wavelength based on the band, and may be set to or centered to the center frequency of the band. For example, an operating frequency bandwidth of 5470-5950 MHz, having a center frequency of 5710 may have a height of the ridges of the choke of (or centered around) 13.25 mm. Similarly, an operating frequency bandwidth of 5725-6200 MHz, having a center frequency of 5962.5 MHz, may have a ridge height for the choke of (or centered around) 12.6 mm. However, if an adjustable choke is used, the heights of the ridges may be adjusted from about 13.25 to about 12.6 if the desired band of operation is changed.

The heights of the ridges may be adjustable by mechanically adjusting the ridges so that they extend from or retract into the base of the choke. In some variations the ridges extend into and out of the base and are mechanically (and/or electrically) adjustable to various heights. The heights may be manually adjusted, e.g., using a knob or other control, including controls having pre-set heights which may correspond to desired operating bands. Any of these devices may also be automatically adjustable, e.g., so that the circuitry controlling the radio may also control and/or adjust the height of the isolation barrier ridges; if the device switches operation from one band (e.g., 5470-5950 MHz) to another (e.g., 5725-6200 MHz), then it may automatically tune, or adjust, the height of the ridges of the choke. For example, the heights of the ridges may be adjusted between about 4 mm and about 20 mm (e.g., 8 mm to 20 mm, 10 mm to 18 mm, etc.). In some variations the spacing between ridges may also be adjustable.

Also described herein are kits and/or systems having more than one isolation choke boundary. In addition to, or instead of, adjustable chokes, in some variations the choke portion of the apparatus may be swapped for a choke having different characteristics. Thus, a system may include a radio apparatus including a pair of reflectors (e.g., parabolic reflectors) including a transmitting reflector and a receiving reflector, each connected to a radio circuitry controlling transmission and receiving of signals; the radio apparatus may also include a plurality of different isolation choke boundaries that can be swapped out between the reflectors, e.g., to provide isolation over different frequency bands. For example, a radio apparatus may include a first isolation choke boundary having ridges that are configured to optimally attenuate between the receiver and transmitter when operating at a center frequency of about 5.71 GHz and a second isolation choke boundary having ridges that are configured to optimally attenuate between the receiver and the transmitter when operating at a center frequency of about 5.96 GHz.

Figure 7B:
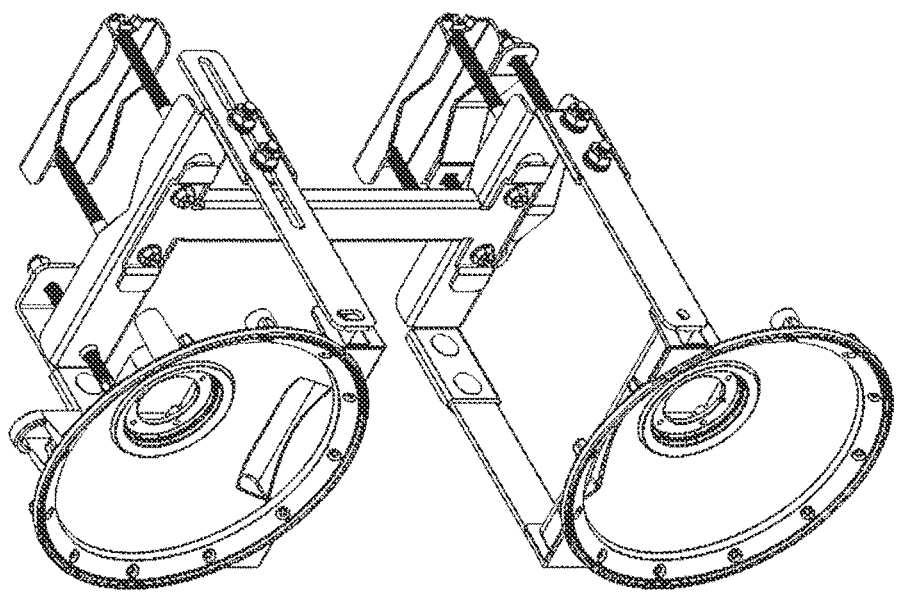
FIGS. 7A and 7B show a first variation of a frame and pole mount of a radio apparatus (the other features of the radio have been removed to illustrate the attachment of the frame to a pole).
Figure 7A:
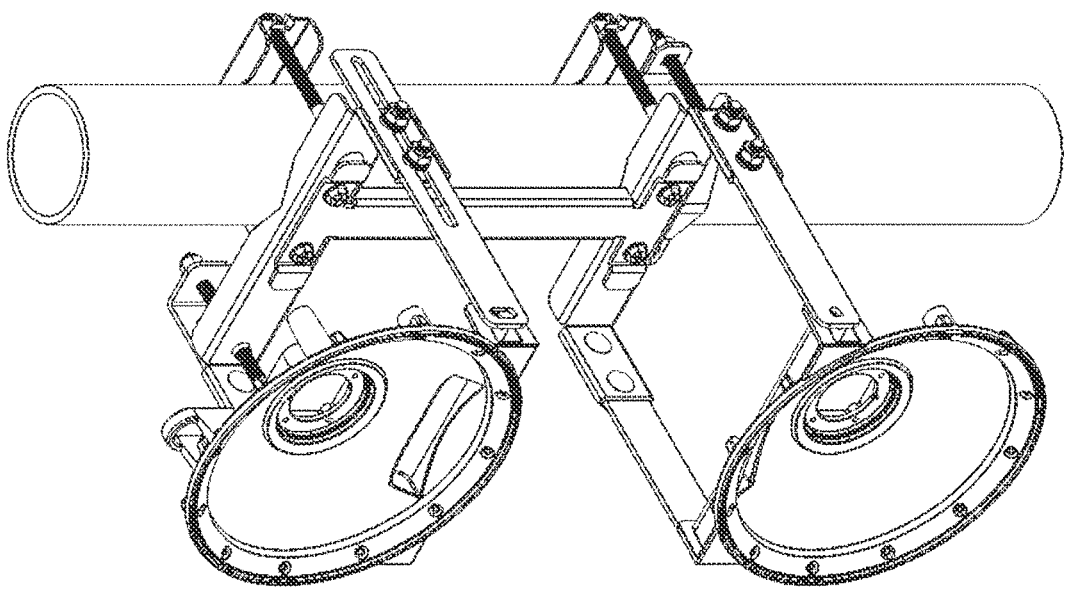
Figure 7E:
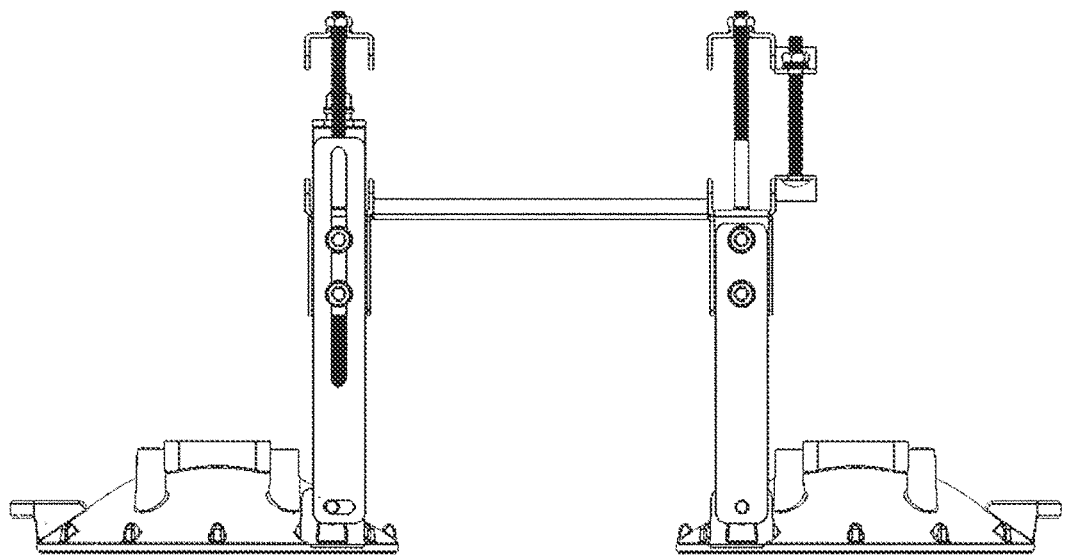
FIGS. 7C, 7D, and 7E illustrate front, back and side views, respectively, of the frame and pole mount of FIG. 7A.
Figure 7D:
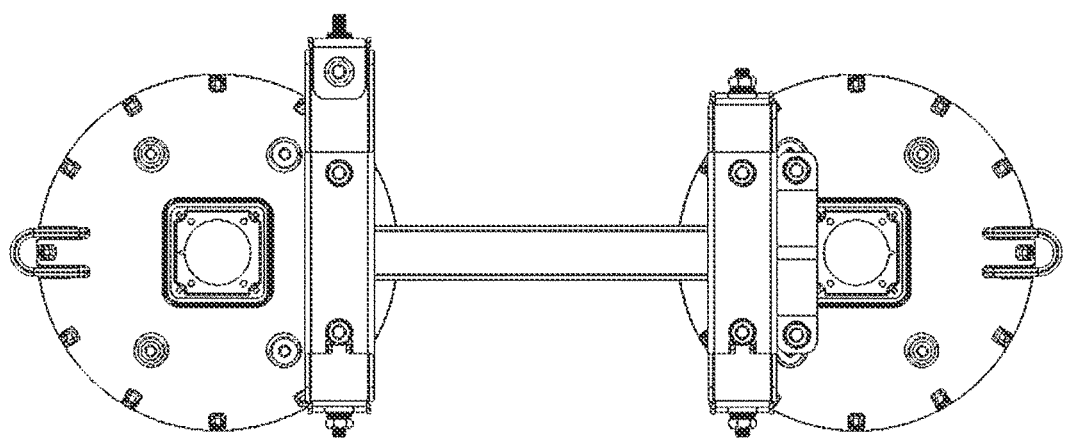
Figure 7C:
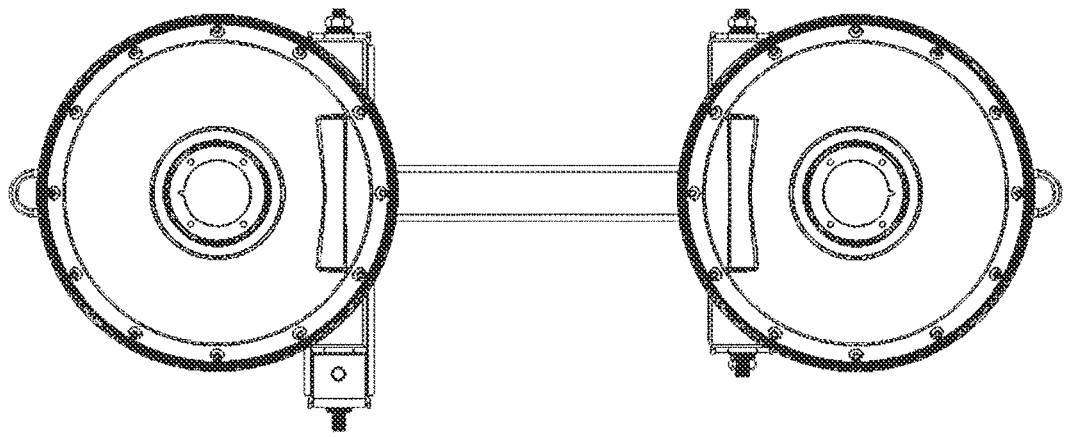
Figure 7F:
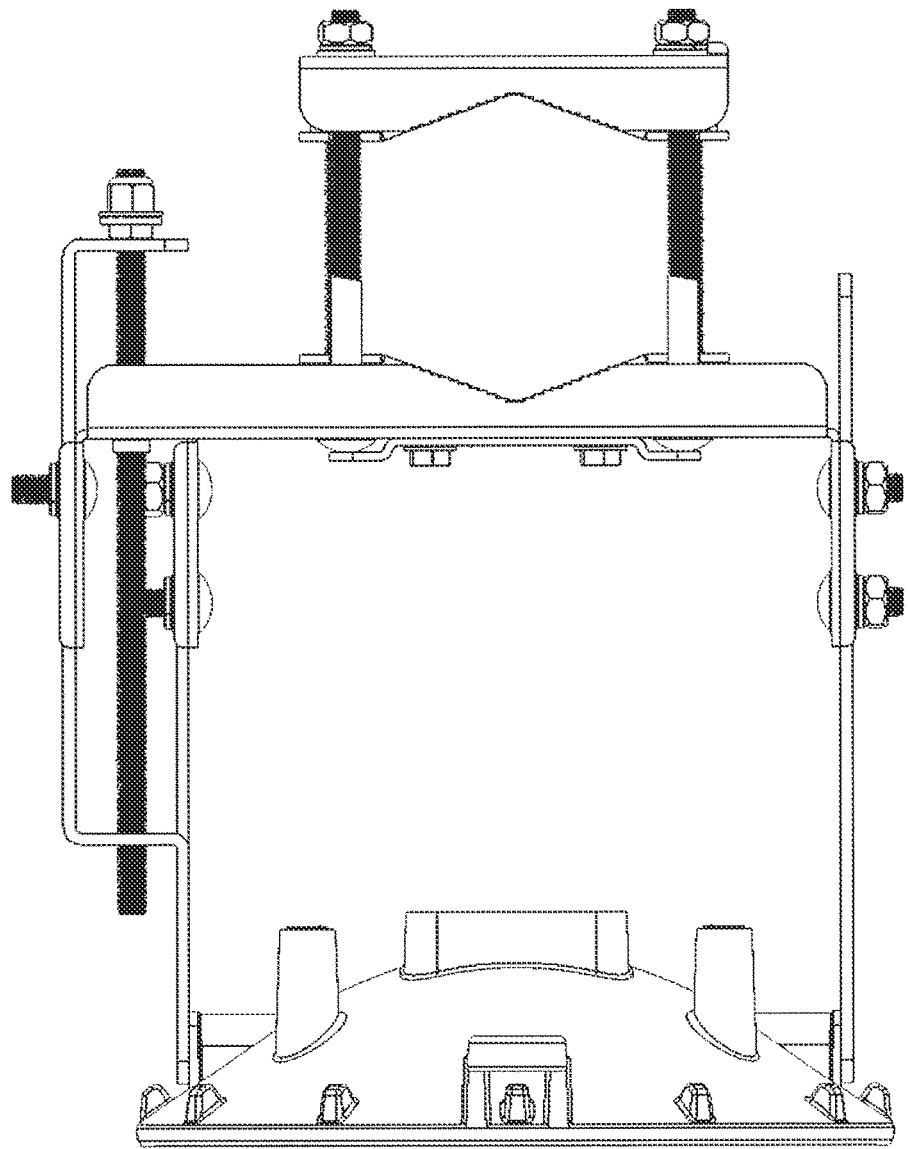
FIG. 7F shows a top view of the frame and pole mount of FIG. 7A.

FIGS. 7A to 7F illustrate one variation of a pole mount and bracket that may be included as part of the devices and apparatuses described herein. In this variation, the bracket (e.g., frame) includes the pair of supports to support the antenna reflectors. Extendable and adjustable arms may attach (e.g., via a drop-in mount) to the frame, and may be adjusted to adjust the angle/orientation of the radio antennas (jointly) either before, during or after coupling the antenna to a pole or mount. In FIG. 7A, the pole mount is coupled to a pole. In operation, the pole mount is configured to be pre-loaded with the screws; the back bracket may be placed over the back of the pole to surround it, and tightened down, as shown. In some variation, a support or clamp may be placed on the pole first, providing the pole mount something to rest against during mounting and providing additional support. FIG. 7C shows a front view of the pole mount and frame, FIG. 7D shows a back view (with the pole removed, as in FIG. 7B), and FIG. 7E shows a side view. FIG. 7F shows a top view.

Figure 8A:
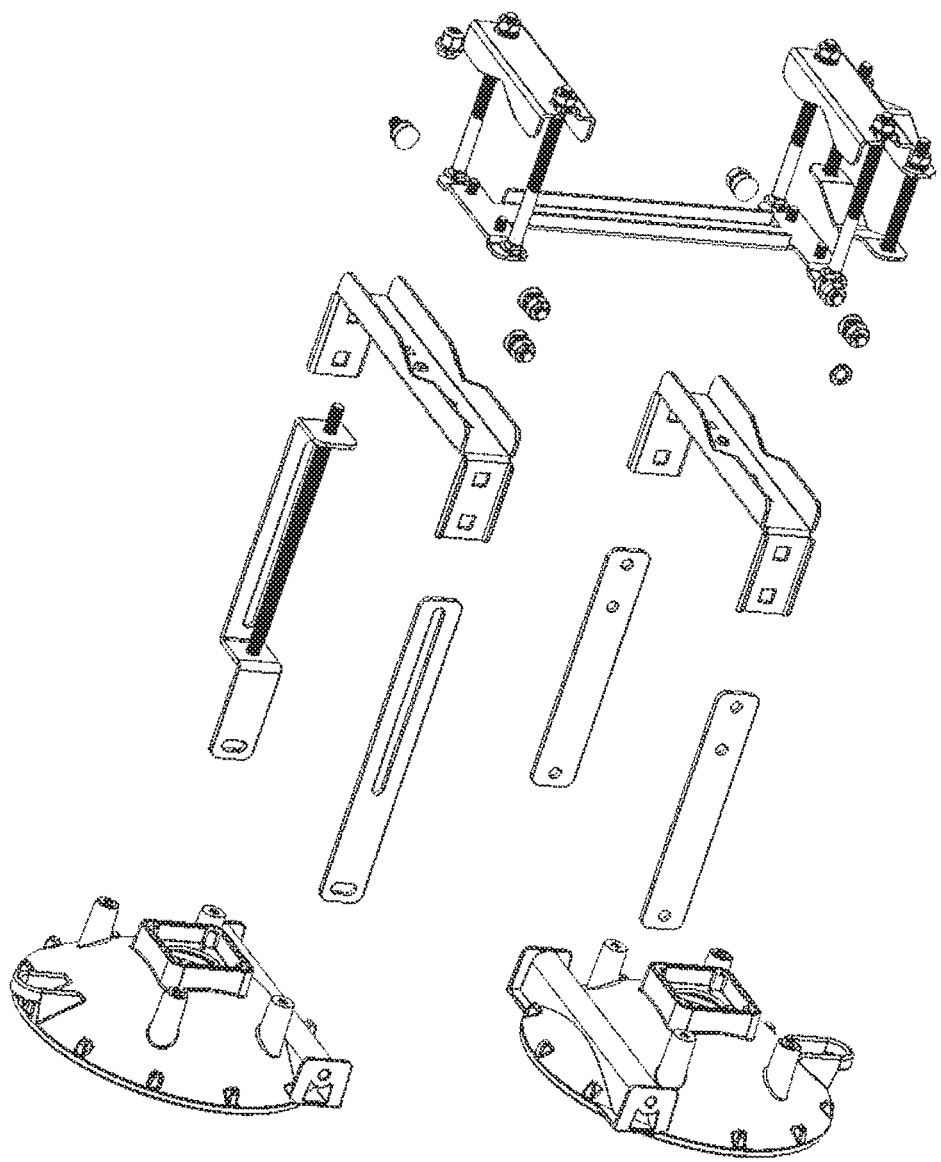
FIG. 8A is an exploded view of the frame and pole mount of FIG. 7A, illustrating the connection between the elements.
Figure 9B:
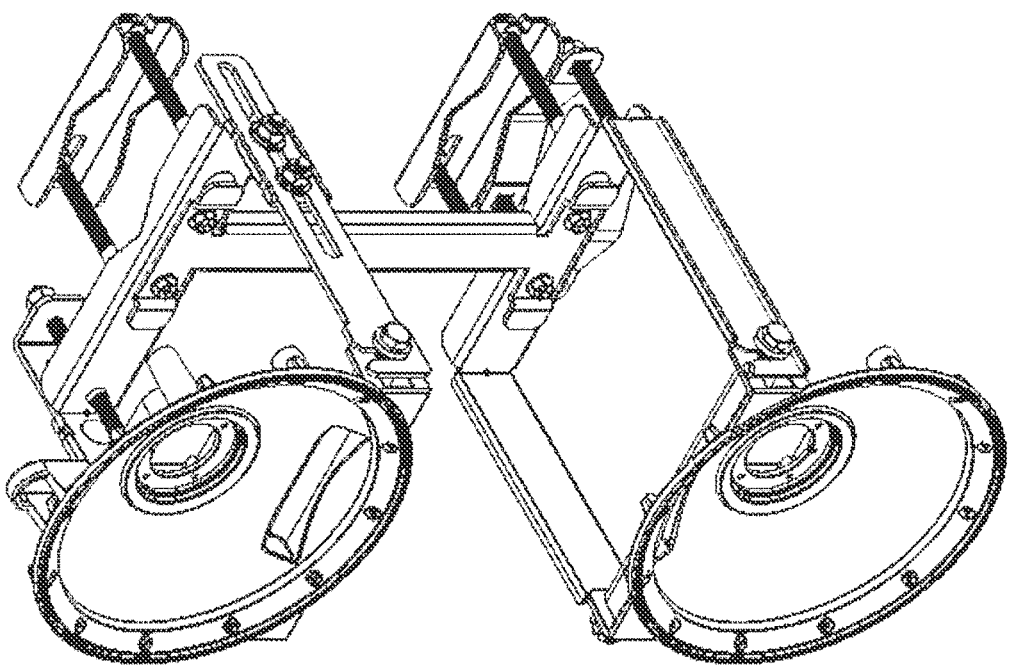
FIG. 9B is a perspective view similar to that shown in FIG. 9A, but with the post removed.
Figure 9A:
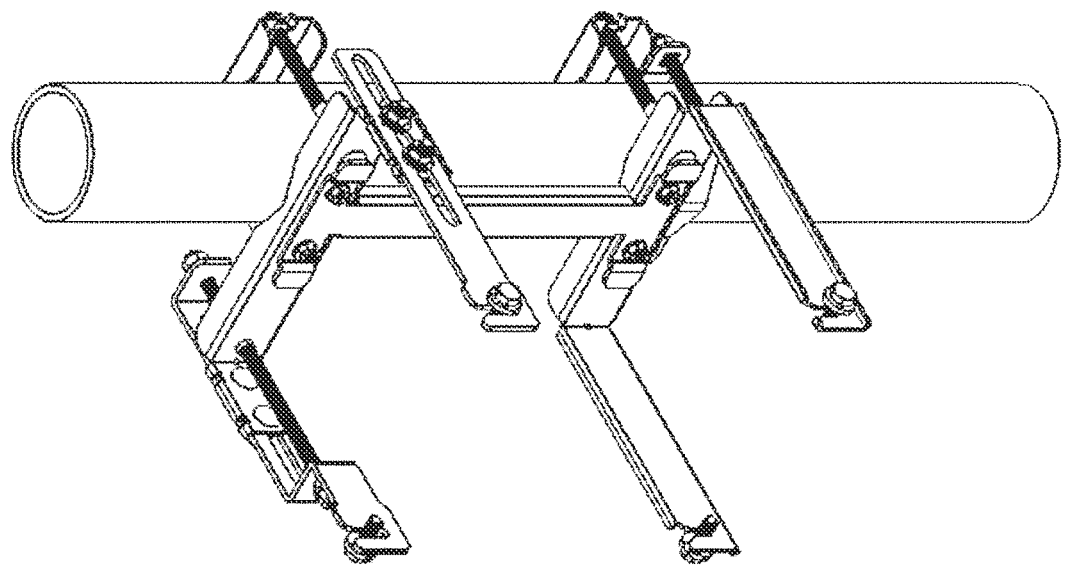
FIG. 9A is a perspective view of another variation of the frame and pole mount portion of a radio apparatus; in this illustration the supports for holding the reflectors have been removed to simplify the view.
Figure 9E:
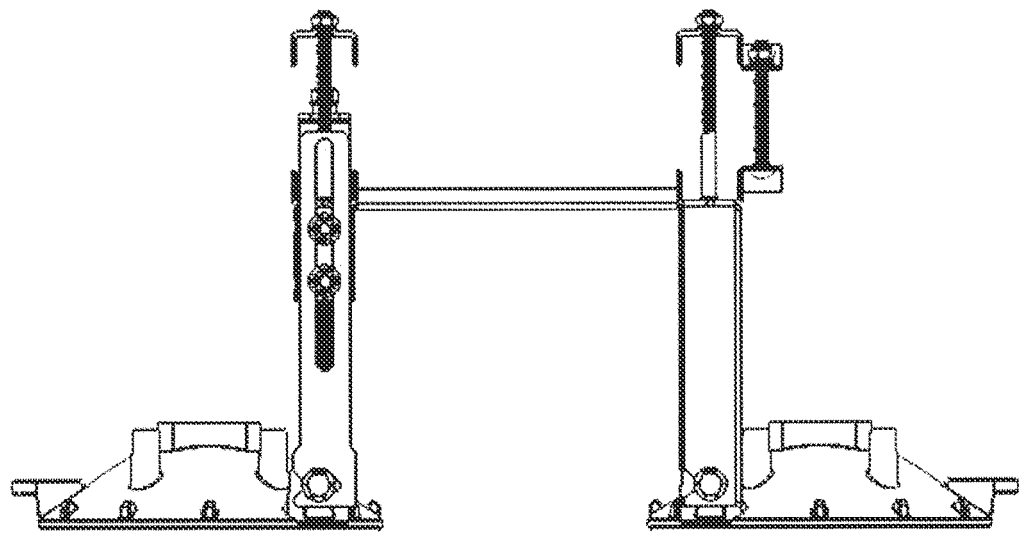
FIGS. 9C, 9D, and 9E illustrate front, back and side views, respectively, of the frame and pole mount of FIG. 9A.
Figure 9D:
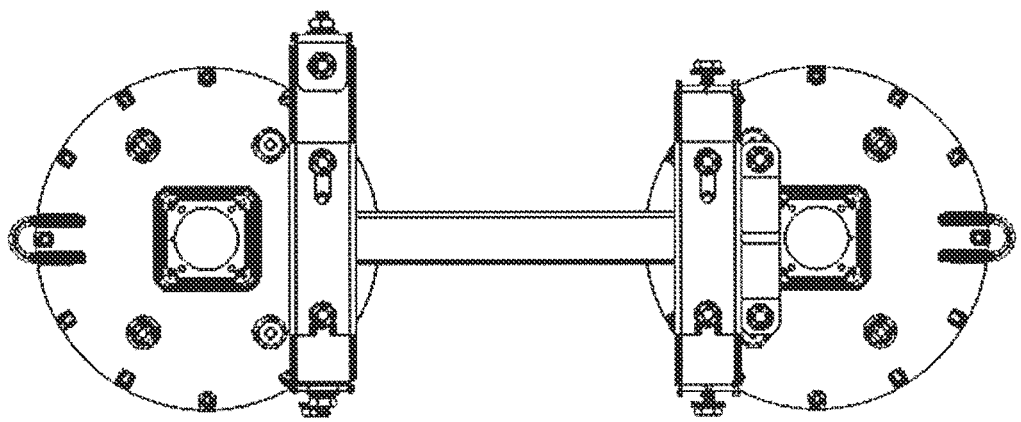
Figure 9C:
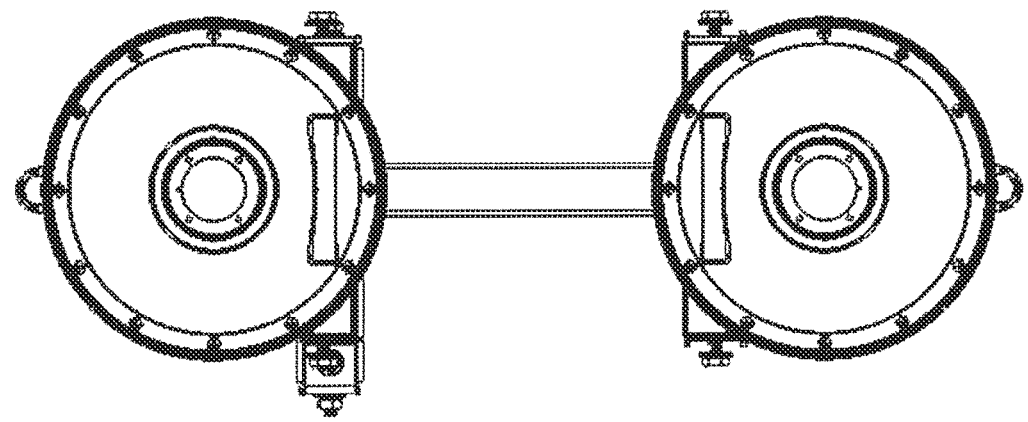
Figure 9F:
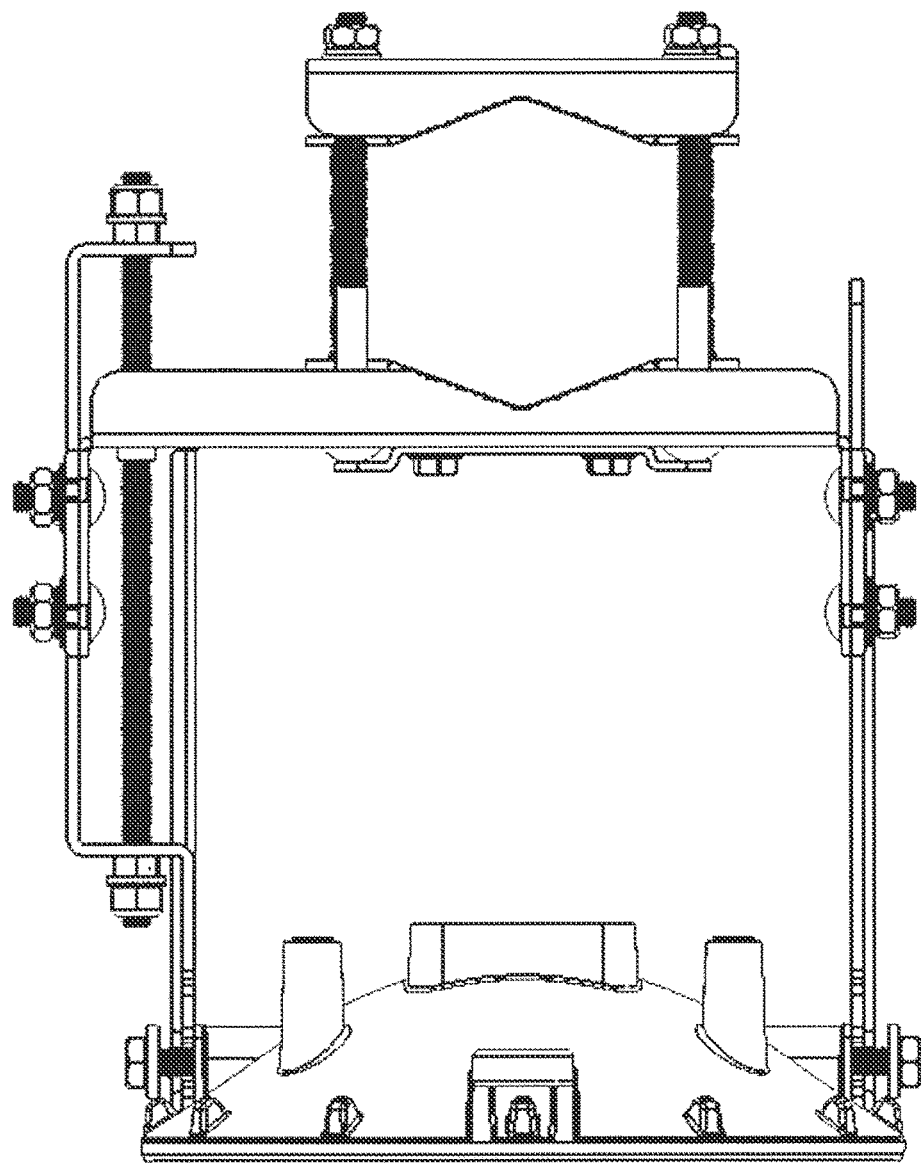
FIG. 9F shows a top view of the frame and pole mount of FIG. 9A.

FIG. 8A is an exploded view of the pole mount and frame for a radio device shown in FIG. 7A.

FIGS. 8B-9F illustrate another variation of a pole mount and bracket. This variation includes a quick connect coupling into which the frame may drop into the pole mount, so that the pole mount may be attached to the pole, then then the rest of the antenna, connected to the frame, may be dropped into the slots in four of the arms of the pole mount. In FIG. 8B, the lateral arms of the pole mount each include a slot at the distal end (furthest from the pole). As shown in FIGS. 9A-9F, these slots may be used to hold the rest of the antenna to the pole mount, and thus to a pole. These slots are vertical (facing up) so that they are not difficult to match with the detents (e.g., projections, screws, etc.) on the frame of the antenna. Once the antenna is mounted in the slots, screws or other retainers may be tightened down to lock the antenna to the pole mount. In some variations the slots also include a catch to prevent the screw/retainer from pulling out. As mentioned above, the mounting clamps may be pre-loaded and installed on a pole. The clamps may be rough-attached or locked down, and tightened once positioning has been confirmed.

In FIG. 9G, a sliding-clamp configuration allows the mounting hardware (including quick connects) to be pre-assembled prior to installation. The drop-in cradle mount design allows the installer to attach mounting hardware to the pole without having to support the weight of the device during installation.

Any of these devices may include adjustment controls that may be locked, and may aid in adjusting the antenna relative to a target (e.g., a second, or remote, antenna).

As mentioned above, any of the devices described herein may be configured to operate at a range of frequencies for both transmitting and receiving. For example, the devices may be configured to transmit in a first range of frequencies using the first parabolic reflector and to receive in the same, or a different, range of frequencies using the second parabolic reflector. Examples of ranges of frequencies that may be used may include between about 4 GHz and about 8 GHz (e.g., around 5 GHz, centered on 5.2 GHz, such as mid-band 5 GHz frequencies between about 5470-5950 MHz, and/or high-band 5 GHz frequencies between about 5725-6200 MHz, etc.), between about 22 and 26 GHz (e.g., around 24 GHz, between about 24.05 GHz and 24.25 GHz), 11 GHz (e.g., centered at or near 11 GHz), 13 GHz (centered at or near 13 GHz), etc.

System Operation

In use, the radios described herein may transmit and receive simultaneously in the same frequency channel(s). Thus, the transmitter and the receivers may be isolated from each other to prevent cross-talk and/or interference between the transmitter and receiver. The choke boundary between the antennas may further isolate the transmitting and receiving portions of the radio.

Figure 11A:
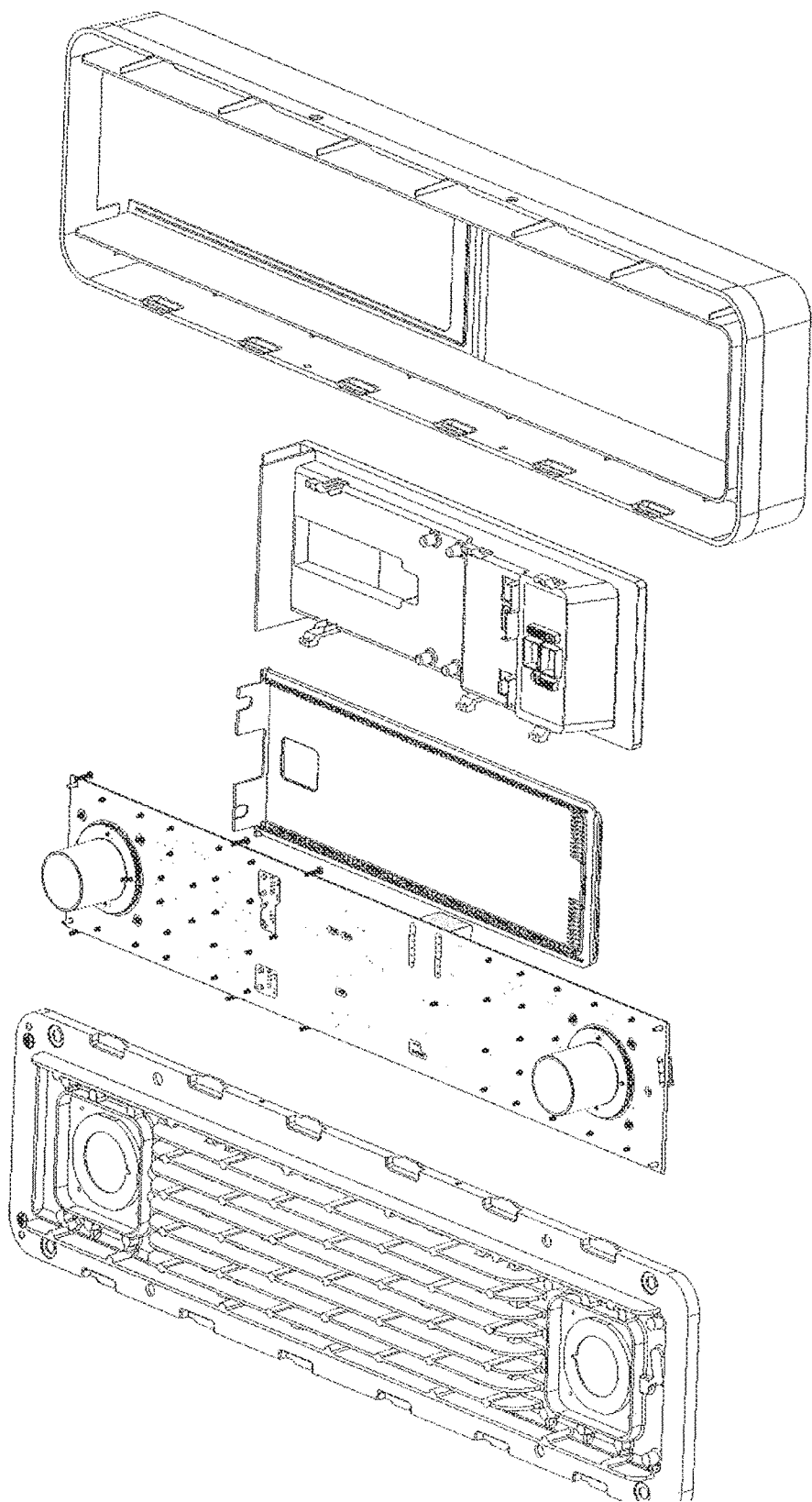
FIG. 11A shows a front perspective view of an exploded view of the housing of one variation of a radio device as described herein, including radio circuitry housed within as well as the antenna waveguides that may connect to the feeds for each antenna.
Figure 11B:
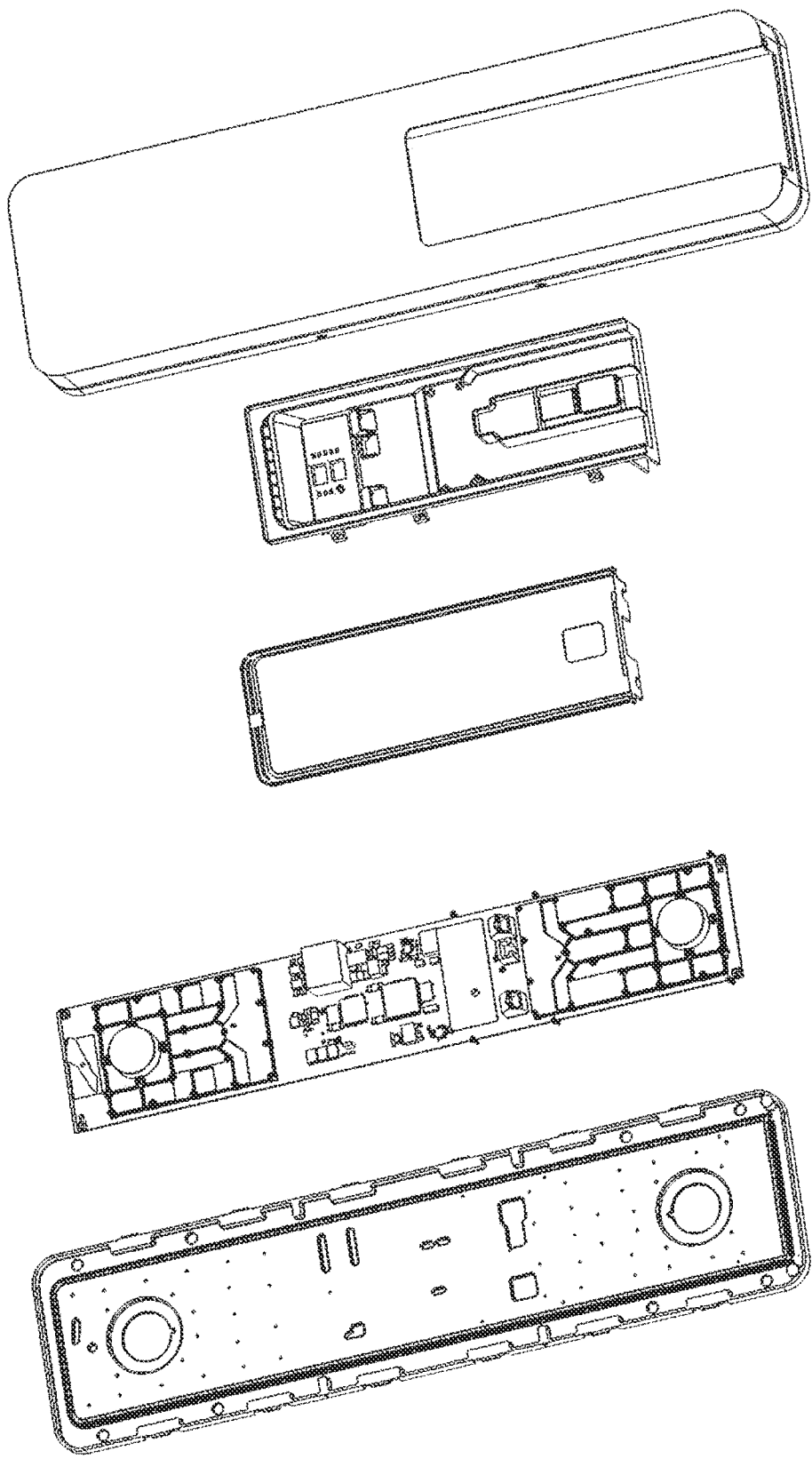
FIG. 11B shows an exploded view of the back of the housing shown in FIG. 11A.

At the PCB level, one or more transmitters may be coupled to a single transmitting antenna feed; as illustrated in FIGS. 11A-11B, both the transmitter and the receiver may be present on the same PCB, which may save costs but risks RF interference between the two. In the variations described herein the transmitters and receivers are physically separated on different regions of the PCB and may be shielded. Beyond the RF shielding, the reflectors may also be configured to reduce or eliminate RF cross-talk (e.g., coupling) between the transmitter and receiver.

During operation, the radio system can be configured for half-duplex operation and full-duplex operation. In some variations, the lower antenna reflectors are used for transmitting (TX) purposes, whereas the upper antenna reflectors are used for receiving (RX) purposes. When the system is configured to operate in the half-duplex mode, the TX and RX frequencies can be either the same or different to suit local interference. Note that the half-duplex mode allows communication in one direction at a time, alternating between transmission and reception. As a result, the half-duplex operation provides more frequency planning options at the cost of higher latency and throughput.

In some variations, high speed and lower latency may be obtained with the radios configured as a full-duplex system using Frequency Division Duplexing (FDD). The data streams generated by the radios are simultaneously transferred across the wireless link. The transmitter and receiver are running concurrently in time. Because of the trade-off between bandwidth resources and propagation conditions, this approach is typically reserved for links in areas where installations are in clear line-of-sight conditions and free of reflected energy such as that generated by heavy rain or intermediate objects. Installations that are subject to Fresnel reflections or highly scattered environments may experience some level of degradation at great ranges.

Links that are installed in environments that are highly reflective or subject to considerable scattering due to heavy rain or foliage loss may be better suited to half-duplex configurations (or simulated full duplex). In this case the frequency and bandwidth resources are shared on a Time Division Duplexing (TDD) basis, and the system can accept higher levels of propagation distortion. The trade-offs may include reduced throughput and slightly higher latency. Other half-duplex/simulated full duplex techniques include HDD and other techniques as known to those of skill in the art.

As mentioned above, in some variations the system may allow switching between duplexing types. For example, the system may be configured to switch between FDD and TDD. In some variations, the system switches between FDD and TDD based on the one or more performance parameters of the device/system. As mentioned above, communication between nodes may vary based on environmental conditions. In open space, you may have few obstacles that can cause multiple paths b/w the transmitter and receiver. In such cases, when you have a clear space, then FDD mode signaling may be used. Transmission and receiving may be performed at the same time, and even on the same channel using the devices described herein. However, if objects are introduced in the space (and particular energy reflectors, such as water, etc.) that cause reflection of signal power, the signals may degrade, and it may be better to transmit between nodes using TDD. Thus, by monitoring the signal parameters to detect the transmission quality, a system that can support multiple duplex modalities, such as the systems described above, may be configured to dynamically switch between modalities based on signal quality, allowing the optimal duplexing to be matched to the conditions and operation of the devices. In one example, the system or device may monitor (e.g., using the FPGA) a parameter of signal transmission. If the packet error rate increases (bit error rate, etc.) at the receiver above a predetermined threshold then the system may be configured to automatically switch to a higher-fidelity, though slower, duplexing mode (e.g., TDD). The transmission rate may be returned to a faster mode (e.g., FDD) either based on periodic re-testing at the faster duplexing mode, or based on other parameters passing a threshold (e.g., decrease in error rate, etc.).

The ability to switch duplexing modes (e.g., between FDD and TDD) is made possible in the systems described herein in part by having a separate receiver antenna and transmitter antenna. This allows use of FDD on the same channel without requiring specific and costly filtering using pre-tuned filters.

In some variations, the radio system is configured with the ability to manage time and bandwidth resources, similar to other systems utilizing different modulation schemes that are scaled according to the noise, interference, and quality of the propagation channel. The radio system also automatically scales its modulation based on channel quality but has the ability to be reconfigured from a time/bandwidth perspective to allow for the best possible performance. In many regards the suitability of the duplexing scheme needs to be taken into account based on the ultimate goals of the user. Just as channel conditions have an effect on the modulation scheme selection, there are effects on duplexing modes to consider as well.

When deploying the radio systems for establishing wireless communication links, various configurations can be used. For example, the first configuration is for point-to-point backhaul, where two radios (one configured as master and one configured as slave) are used to establish a point-to-point link.

When mounting the radios onto poles, the user should configure the paired radios. The installation may include connecting Ethernet cables to the data and configuration ports, configuring the settings of the radio using a configuration interface, disconnecting the cables to move the radios to mounting sites, reconnecting at the mounting sites, mounting the radios, and establishing and optimizing the RF link.

An auxiliary port can be coupled to a listening device, such as a headphone, to enable alignment of the antennas by listening to an audio tone. More specifically, while aligning the pair of antennas, one can listen to the audio tone via the listening device coupled to auxiliary port 1206; the higher the pitch, the stronger the signal strength, and thus the better the alignment.

Figure 10B:
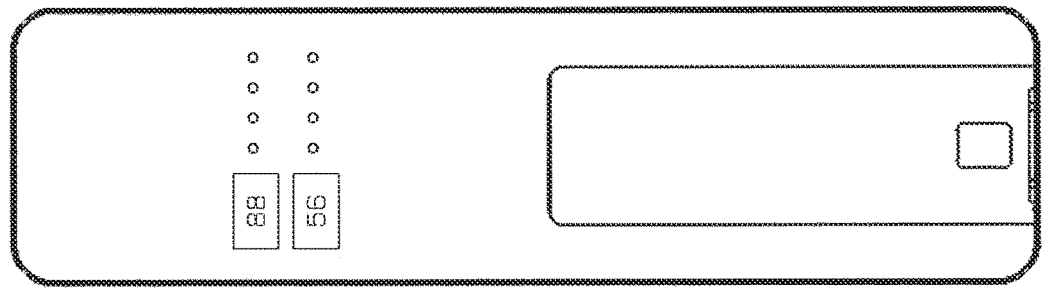
FIGS. 10A and 10B show side perceptive and front views, respectively, of a housing forming part of a radio apparatus as described herein, illustrating one variation of a RAD.
Figure 10A:
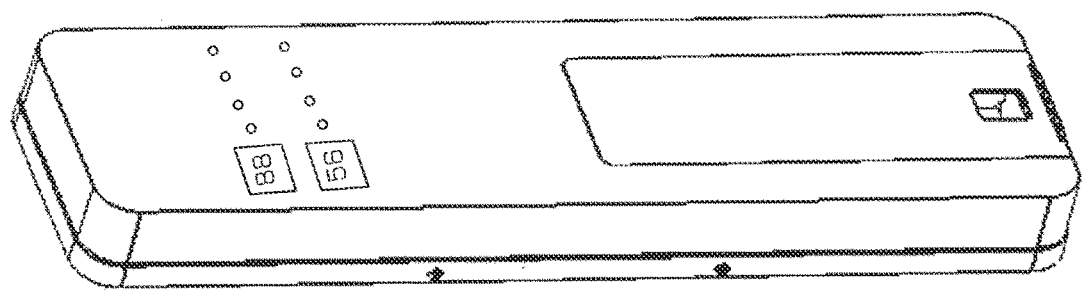

Although in some variations 'iterative' adjustment of each antenna in a link (e.g., a local and remote antenna) was performed to optimize alignment, described herein are radio alignment displays that simplify this process. In some variations the antenna includes a radio alignment display (RAD) that provides information on the received and/or transmitted signals for both the local antenna and the remote antenna(s) that it is being aligned with. For example a RAD device may include a display on the outside of the antenna, e.g. on the housing, as illustrated in FIGS. 10A and 10B, showing one or more indicators of the signal strength received by both the local and remote antennas. This information may be shared between the devices via robust channel (e.g., command/control channel) that operates even with a poor connection/alignment.

Thus a user may iteratively adjust the position (e.g., azimuth and elevation) of local antenna, until an optimal link (e.g., with received signal levels within 1 dB of each other) is achieved. Note that adjusting the AZ and elevation of a radio can be achieved by adjusting the corresponding AZ and elevation adjustment controls (e.g., bolts), as discussed above.

Thus, a user can align the radio based on displayed (e.g., digitally displayed) values. For example, LED displays may display the power level of the received signal at both the local and remote antennas. In one embodiment, values on LED display are displayed in negative dBm. For example, a number 88 represents a received signal level of −88 dBm. Hence, lower values indicate a stronger received signal level. While aligning the paired radios, the user can observe LED displays to monitor the received signal strength at both local and remote antennas. The RAD enabled device therefore does not require a pair of installers, with one adjusting the AZ and elevation of a radio at one end of the link, while the other installer reports the received signal level at the other end of the link; instead a single installer may be present at one link.

Telemetry information (transmitted over the robust control channel) may be displayed at both ends of the link, remote and local, and used to adjust the device(s). For example, a RAD device may include a first indicator or set of indicators showing the properties of transmission/reception of the first (local) radio device, and a second indicator or set of indicators (near or adjacent to the first) displaying the transmission/reception at the second (remote) radio device. Any appropriate information may be displayed, including status such as data port/link activity, data port speed, management port link activity, management port link speed, GPS synchronization, link status, modulation mode (0.25× to 4×, 6×, 8×, overload), calibrated signal strength, etc.

In addition to hardware, the radio system may further includes a configuration interface, which is an operating system capable of powerful wireless and routing features, built upon a simple and intuitive user interface foundation. In one embodiment, a user can access the configuration interface for easy configuration and management via a web browser. Note that the configuration interface can be accessed in two different ways. More specifically, one can use the direct coupling to the configuration port to achieve out-of-band management. In addition, in-band management is available via the local data port or the data port at the other end of the link.

In some variations, before accessing the communication interface, the user can launch the web browser, and type http://192.168.1.20 in the address field and press enter (PC) or return (Mac). In one embodiment, a login window appears, prompting the user for a username and password. After a standard login process, the configuration interface will appear, allowing the user to customize radio settings as needed.

Any of the variations described herein may be configured to continuously monitor for interference and to provide immediate (or near immediate) frequency switching. Thus, any of these devices may be configured for continuous dynamic frequency selection (DFS). Dynamic Frequency Selection (DFS) may be applied in wireless networks with several adjacent non-centrally controlled access-points. The access-points may automatically select a frequency channel with low interference level. DFS is supported by the novel IEEE 802.11h wireless local area network standard and is also mandated in the 5470-5725 MHz U-NII band for radar avoidance. However, because the systems described herein may separately transmit and receive (using separate transmit/receive radio antennas), one receiver or receiver chain may be dedicated to monitoring the band, and may allow the system to react nearly instantaneously accordingly. Thus, even when the device is operating in full duplex, transmitting signals continuously and receiving signal continuously, any of the system/devices described herein may be operated to provide DFS. These systems can respond to signal in the 5GH band, providing a robust DFS response.

In general, any of the apparatuses (systems/devices) herein may include a detector that is configured to concurrently monitor the channel that the apparatus is transmitting in, e.g., during transmission. Although the detector may include a receiver, the detector is typically independent of the primary receiver used for communication by the apparatus. The detector may be configured to monitor the channel that the apparatus is transmitting on to "listen" for interference that would degrade the operation of the apparatus. For example, the radio device may be configured for full duplex operation, and the detector may be configured to listens for specific types of interference, including reflections and/or nearby emitters such as radar emitters.

Reflection may occur, for example, when the apparatus is aimed at a station, but an obstruction (e.g., vehicle, tree, etc.) is positioned in front of the apparatus. For example, ice buildup on the radome of the apparatus may result in reflections. Reflected signals will correlate (though with delay) to signals transmitted by the apparatus. If the apparatus (using the detector) hears signals highly correlated with previously or concurrently transmitted signals, the apparatus may raise a flag to alert that there is a reflection in front of the apparatus. Such interference may make some forms of duplex communication (e.g., FDD) less reliable. Thus, in the event that a reflection (e.g., above a particular strength) is detected, the apparatus may indicate that operation in this communication mode (e.g., FDD) is unreliable and/or may automatically shift to another duplex mode, or into a non-duplex mode. This may be particularly important when the received signal (received by the detector) is so strong that it interferes with transmission from other end of the link (e.g., the other station that the apparatus is communicating with). In such cases, if the reflected power is too high then the apparatus may operate only at the lowest (more reliable) speeds or not at all. For example, the apparatus may switch from an FDD duplex mode to TDD to maintain the link when there is excessive reflection.

Thus, if the isolation between the transmitter and receiver is compromised, so that power from the adjacent channel is spilling over to the other adjacent channel (e.g., by reflection from ice, objects, etc.) then the apparatus may alert and/or switch operating modes in response. Operation of the transmission and primary receiving channels when the isolation is compromised may not be feasible in such situations. Thus, a detector that is independent of the primary receiver chain may be used to monitor the band of the transmitter, and determine if there is interference in the transmission band.

If the detector detects a signal corresponding to interference (including reflections), the detector may act, either by triggering an alert/alarm, and/or by switching the operating mode (e.g., duplex mode) or by stopping transmission until the issue is resolved.

In the case of reflections, the detector may generally be connected to the transmitter both so that the detector knows what band the transmitter is transmitting in, and also to know what is being transmitted (or identifying information about what is being transmitted) which may allow the detector to determine (e.g., by correlation) if a single received by the detector is a reflection. In the event a reflection is detected, in some variations the detector may be configured to determine the range of the source of reflection, e.g., estimating the distance from the material reflecting the signal by determining the latency, which may give an indication of ranging; indicating how far the reflective material it is from the antenna. This information may be provided to a user to help resolve the reflection.

In some variations the detector is configured as a spectrum analyzer. However, the detector does not have to be a spectrum analyzer. In general, the detector detects interference in the band that the apparatus is transmitting in. The detector may determine if a detected signal is encoded in the same manner as the transmitted signal, and therefore identified as a reflected signal. The reflected signal's power (e.g., power correlating to the transmitted signal) may be compared to help diagnose the reflection.

As mentioned, information from the detector (e.g., indicating a reflected signal of significant power) may be used by the apparatus (e.g., the detector) to switch operation of the apparatus between modes, such as between duplexing modes like FDD and TDD. The apparatus may generally be configured to maintain the link between the apparatus and a remote location; switching between duplex modes automatically may help maintain the link.

When a signal is detected by the detector, a reflection may be identified by comparing the timing reference/frequency reference of the received signal to signals transmitted by the same device. In addition to identifying interference from reflected signals, the detector may also be configured to identify radar signals in the transmitting band, allowing the apparatus to perform dynamic frequency selection (DFS) when radar signals are detected. Because monitoring is performed continuously, even during transmission, the apparatus may be configured as a continuous DFS receiver, allowing observation on the same frequency band that the apparatus is transmitting on, at the same time, while still (concurrently) receiving on the primary receiver (maintaining the link with a remote station). In general the monitoring detector receives only a fraction of the energy from the apparatus; the majority of the energy is used by the transmitter and primary receiver (Rx antenna). The detector may include some form of receiver operating in the transmission frequency band continuously. Thus, in general, the receiver for data communication (primary receiver) may be different from the detector, and may be on a separate antenna.

In general, a detector may be configured to identify a radar signal by known characteristics of radar signals. Radar signals may be identified by family; for example, radar signals are protected signals having a pre-defined duration of pulses, separation of pulses and characteristic lengths/sequences.

When the apparatus is configured to detect radar signals, the apparatus may also be configured to perform DFS by automatically vacating the current transmission channel if a radar signal is detected. Similarly, the detector may also look for reflections by interpreting (e.g. cross-correlating) the received signals to see if they are reflections of transmitted signals. Thus, the detector may be conjured to operate in both modes, detecting radar for DFS operation, and also determining potential interference from reflections as well. The apparatus may have the monitoring capability to ensure that if a putative radar signal were detected, the system can switch immediately to transmit on another channel because it monitored the transmission channel for a prescribed length of time; the new channel could also be monitored for a prescribed amount of time before transmitting.

In one example, an apparatus includes a receiving antenna dish that gets a split signal; some of the signal goes to the receiver that is used for communication with remote end of the link, and some goes to the auxiliary/monitoring receiver (detector). The detector may include a relatively simple receiver, e.g., if only looking for radar signals. In some variations the detector receives signals in the same band as the transmitter and decodes and/or compares the data received to transmitted information. Thus, in some variations the detector may include additional circuitry to allow detection of reflected signals. For example, the detector may include circuitry configured to allow the detector to compare either the data received by the detector to previously (or concurrently) transmitted data or it may compare characteristics (e.g., information/frequency spectrum) of received data/signals to previously/concurrently transmitted data/signals.

Transmitted signals are generally not continuous, but may include characteristic "gaps" which may be used to help identify a signal received by the detector as a reflection. For example, the portion of time a transmitter is busy may depend on the data being transmitted; the apparatus typically transmits both data and internal control traffic for a link There are numerous period where the transmitter is not active, resulting in gaps in transmission (transmission silence). If the transmission transmits data that is reflected, the nearly periodic pattern of the gaps for the data and/or control information (as well as the transmitted signal from the other end of the link) may be detected by the detector and may be used to diagnose the link (e.g., including looking for reflection). Thus, even when the ends of the link are communicating in the same channel the detector may distinguish reflected signal from data transmitted by the station at the end of the link.

In some variations the radio circuitry in the apparatus includes two receivers; one of these receivers may be configured as a primary (data) receiver and the other may be configured as or coupled to the detector. Thus, an apparatus may include two receiver chains, one for monitoring, and one for communication of data with a remote station.

As mentioned, the detector may be configured so that it includes an internal threshold for reflection; reflections below the threshold (e.g., a limit of concern), such as 78 db of isolation, may be ignored; reflections above 78 db may trigger a flag/alarm and/or may modify the behavior of the apparatus, e.g., switching transmission mode (duplex transmission). For example, if a link operates in FDD to exchange data by communication from the other end of the link, when reflections above a threshold are detected (e.g., if the signal from the other end of the link is approximately 30 db stronger or more than the reflected signals), the apparatus may not be able to measure the reflection, or separate it from the actual transmitted data from the other end of the link Reflections that cause a problem generally have to be relatively close to the apparatus, because attenuation of the reflected signal from obstacle typically falls off as a 4th order (power attenuation) relative to the distance from the receiver, and therefore falls off quickly.

Figure 12:
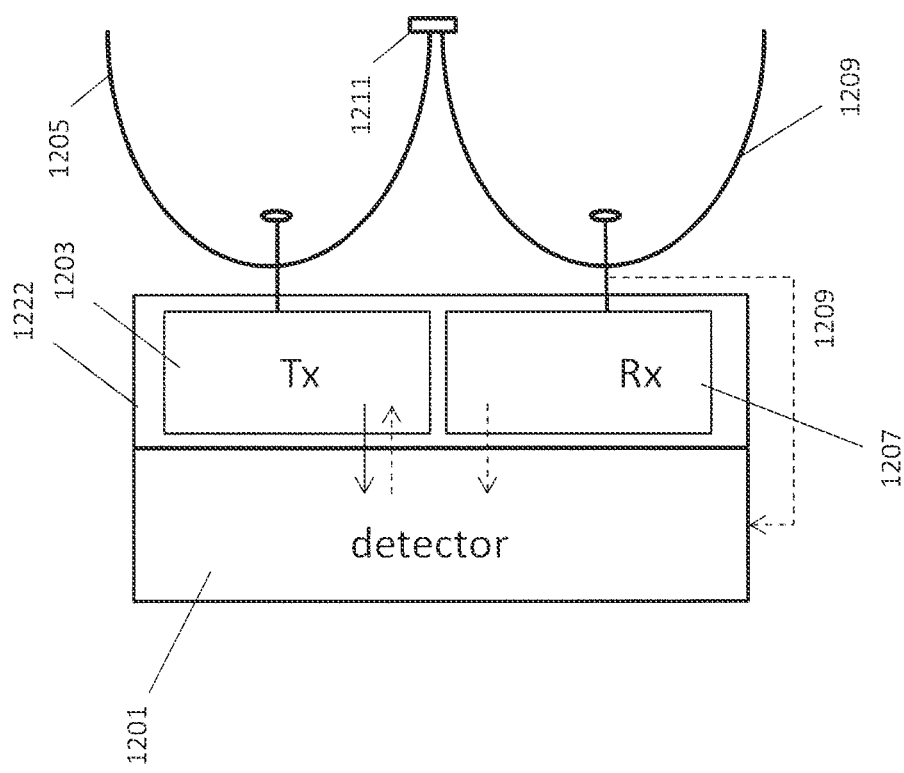
FIG. 12 is a schematic of one variation of a radio device for transmission of broadband wireless signals that includes a detector that continuously monitors a transmitted frequency channel to avoid interference.

FIG. 12 schematically illustrates one variation of radio device for transmission of broadband wireless signals that continuously monitors a transmitted frequency channel to avoid interference (e.g., a radio device for transmission of broadband wireless signals that automatically switches between duplexing schemes and/or a radio device for transmission of broadband wireless signals that performs continuous dynamic frequency selection). In FIG. 12, the apparatus includes a parabolic transmitting reflector 1205, and a parabolic receiving reflector 1209, as well as a radio circuitry 1222 that is configured to transmit radio-frequency signals in a frequency channel (e.g., between about 4 and about 8 GHz) from the parabolic transmitting reflector and to receive radio-frequency signals (e.g., between about 4 and about 8 GHz) from the parabolic receiving reflector. The transmitting reflector 1205 is connected to the transmitter 1203 of the radio circuitry, and the receiving reflector 1209 is connected to the receiver 1207. In some variations the radio circuitry comprises a pair of transmitters and a pair of receivers, and the transmitters are coupled to the parabolic transmitting reflector and the receivers are coupled to the parabolic receiving reflector; the detector may incorporate one of the two receivers. The apparatus also includes a detector 1201 configured to operate concurrently with transmission by the radio circuitry. In FIG. 12 the detector is coupled 1209 to the parabolic receiving reflector. The detector may be configured to continuously monitor the same frequency channel as transmitted signals to detect radar signals, thus it may communication with the radio circuitry 1222 and/or specifically the transmitter 1203. A choke boundary 1211 is also shown between the transmitter reflector 1205 and the receiver reflector 1209 in FIG. 12.

Other variations of the radio devices described herein may include parabolic reflectors in which one of the reflectors impinges on the other reflectors, and/or in which the reflectors for transmission and receiving are different sizes. In general, any of the apparatuses (e.g., devices, systems) described herein may include both a first and second parabolic dish as part of the antennas. The first dish may be configured as a receiving antenna, while the second dish may be a transmitting antenna, or the second dish may be a receiving antenna and the first dish may be a receiving antenna. The first and second dishes may be configured so that they may both transmit and receive. In some variations, the first dish antenna may be switched from receiving to transmitting or vice-versa, and/or the second dish antenna may be switched from transmitting to receiving; switching may be manual or automatic. For example, it may be beneficial to switch from transmitting to receiving if one of the two dishes is blocked, or if transmission/receiving from one of the parabolic dishes is blocked or otherwise experiences interference or dysfunction; the apparatus may be adapted to monitor and/or sense transmission and/or reception from each of the parabolic reflectors individually.

Figure 13B:
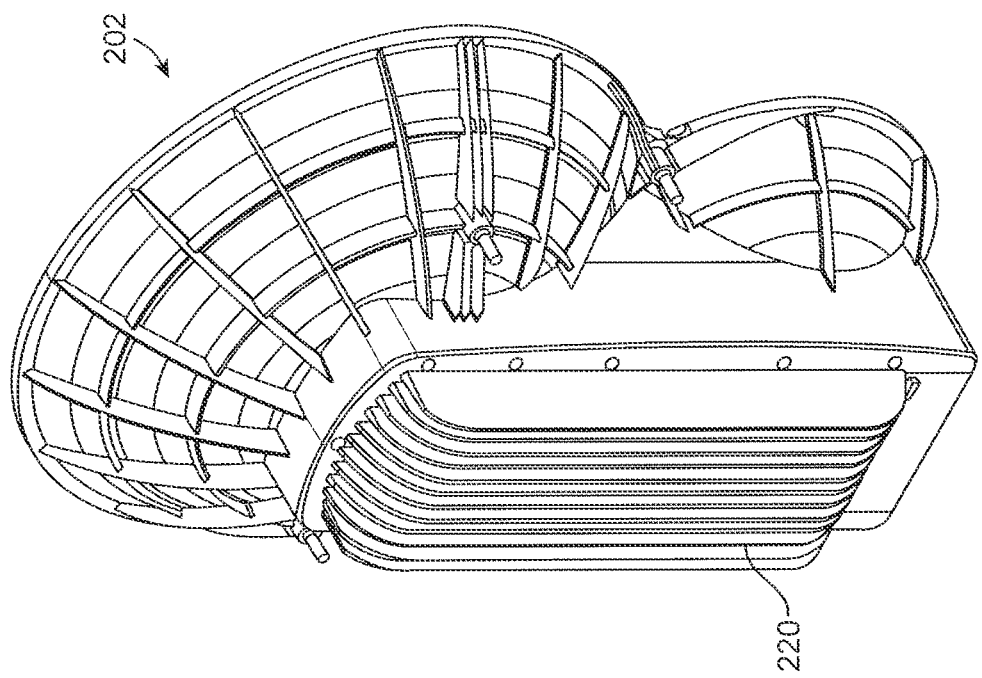
FIG. 13B presents an exemplary view of a radio showing the backside of a radio device.
Figure 13A:
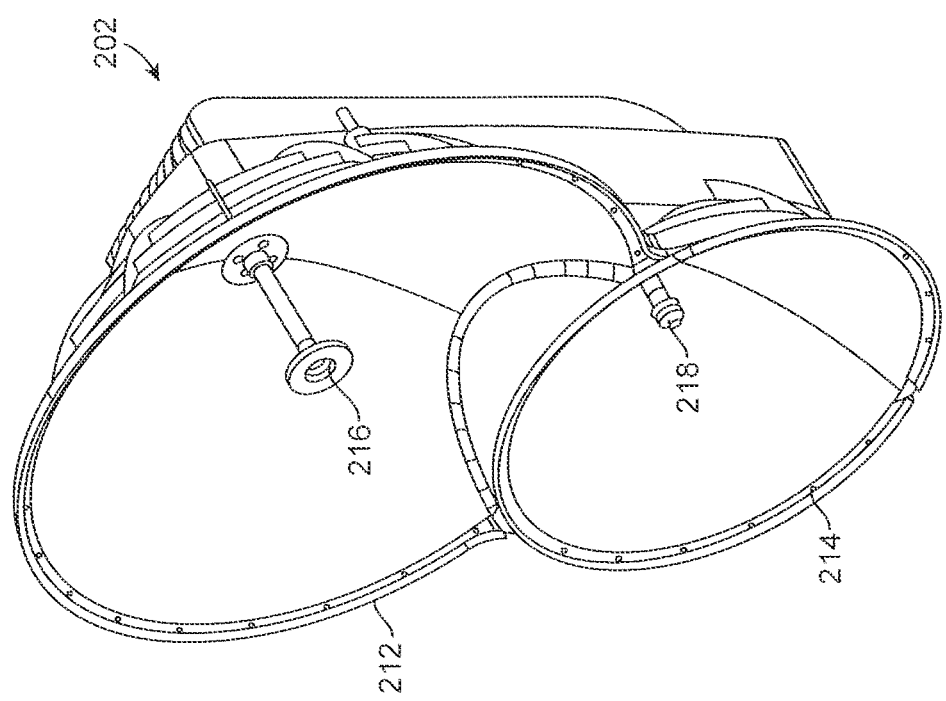
FIG. 13A presents an exemplary view of a radio showing the front side of a radio device.

FIG. 13A shows a radio device in a front view; in this example, the transmitting antenna dish (parabolic reflector) 214 impinges on the receiving antenna dish (parabolic reflector) 212. In FIG. 13A, one can see that the front side of radio 200 includes two circular shaped reflectors, an upper reflector 212 and a lower reflector 214; and two feed antennas, an upper feed antenna 216 and a lower feed antenna 218. In one embodiment, upper feed antenna 216 is coupled to the receiver of the radio, whereas lower feed antenna 218 is coupled to the transmitter of the radio. The reflecting surfaces of the reflectors are carefully designed to ensure long-range reachability. In one embodiment, reflectors 212 and 214 are parabolic reflectors. We will describe the reflectors in more detail later.

FIG. 13B presents an exemplary view of a radio showing the backside of the radio, in accordance with an embodiment of the present invention. From FIG. 13B, one can see that the backside of radio 200 includes a substantially rectangular enclosure 220, which houses a PCB. This rectangular enclosure includes ribs or struts extending vertically/horizontally; these struts/ribs may provide added stiffness to the housing. Note that the rest of the radio components, including the CPU, the FPGA, the transmitters, the receivers, etc., can all be mounted to the single PCB.

Figure 13D:
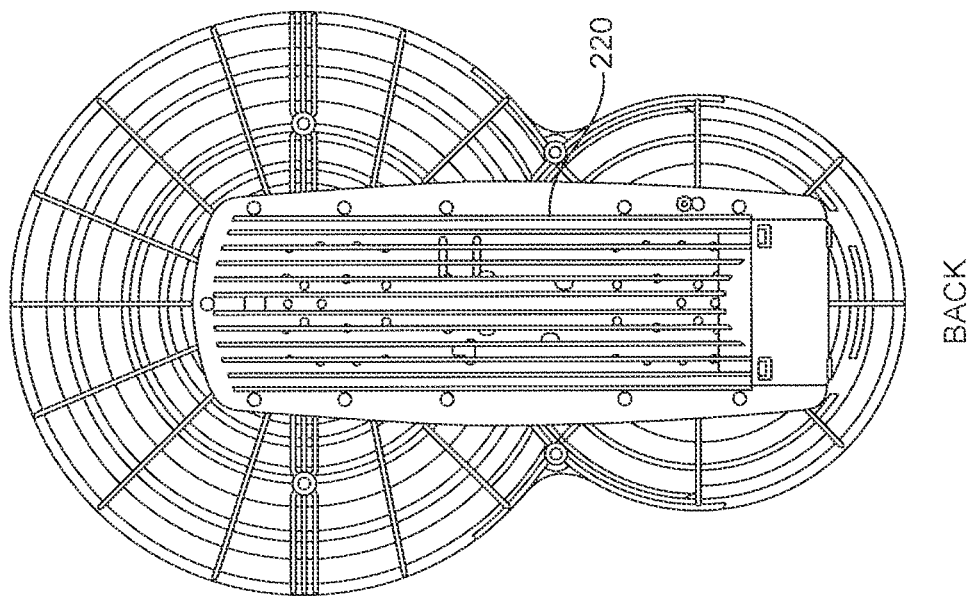
FIGS. 13C and 13D show front side perspective view and the back side perspective views, respectively, of a radio device.
Figure 13C:
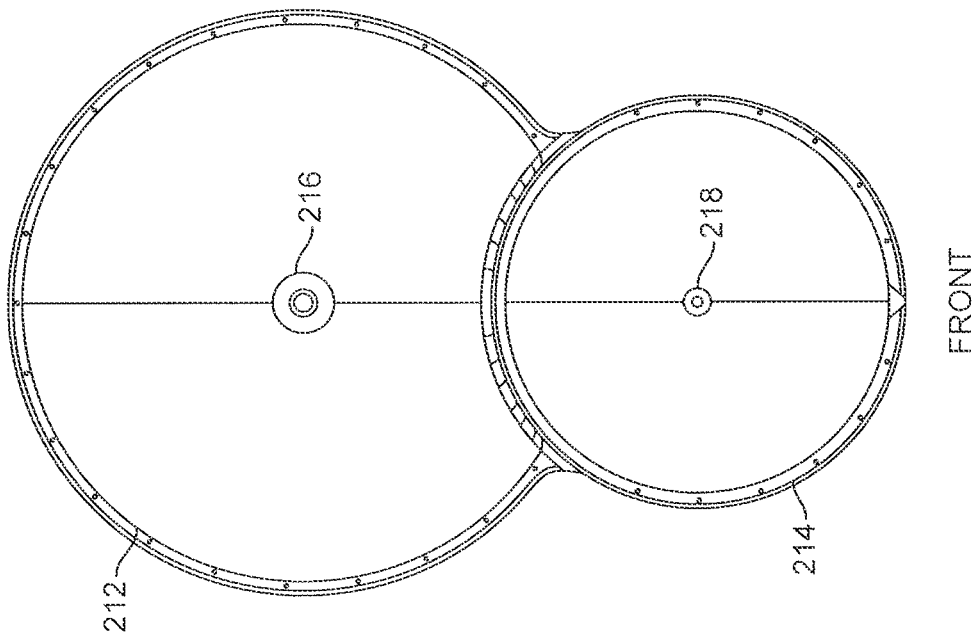

FIGS. 13C and 13D show front view and the back views, respectively of the radio of FIG. 13A. From FIGS. 13C and 13D, the two reflectors together are shaped like an upside-down 8, with upper reflector 212 being a partial circle and having a larger radius than lower reflector 214, which is a full circle. In addition, one can see that rectangular enclosure 220 is attached to the backside of the two reflectors. Note that the proximity of the reflectors to the PCB housed in enclosure 220 not only ensures a compact radio system, but also eliminates the need for an external cable to connect the reflector to other radio components, thus obviating the need for tuning the transmitter antennas.

Figure 13E:
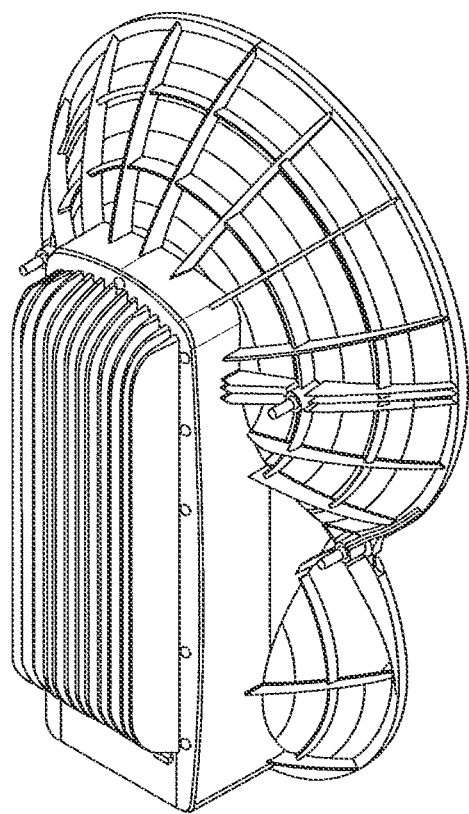
FIGS. 13E and 13F show exemplary views of a radio with the radome cover on, showing the front and backside of the radio device, respectively.
Figure 13F:
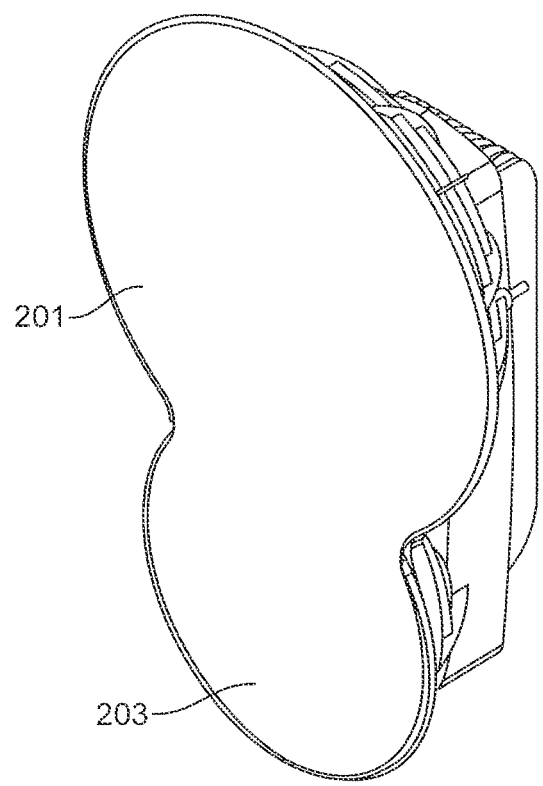
Figure 13G:
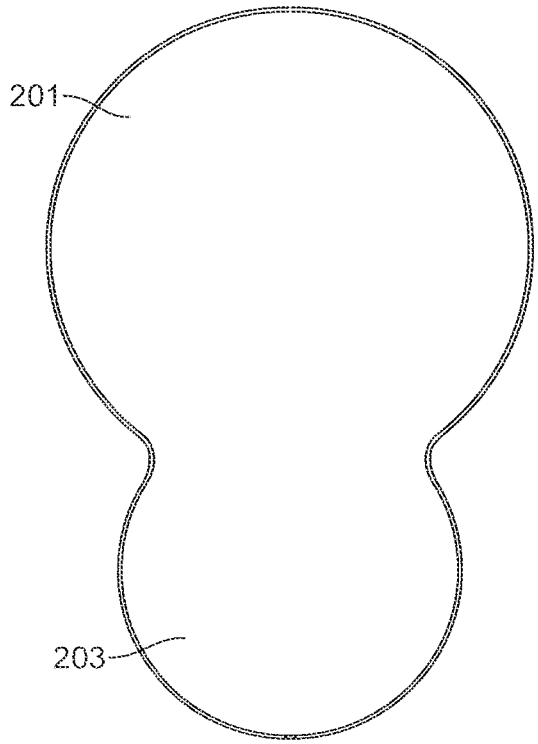
Figure 13H:
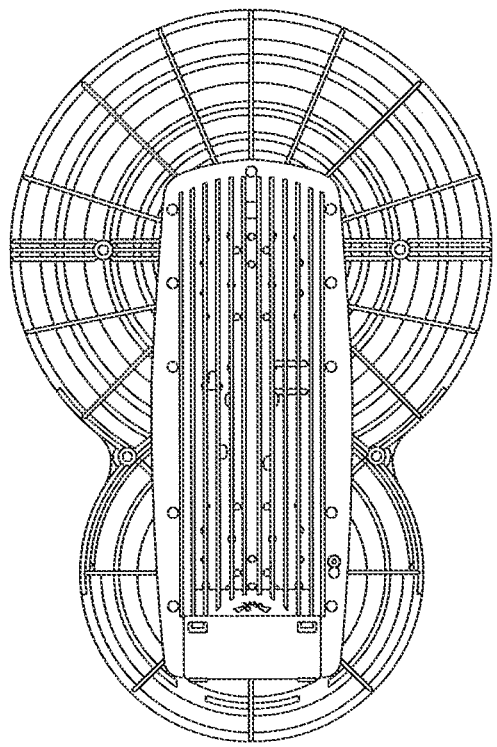

FIGS. 13E and 13F show views of the radio with the radome cover on, showing the side perspective front and back views of the radio, respectively. FIGS. 13G and 13H show front view and back views, respectively, of the radio of FIGS. 13A-13B with the radome cover on.

Figure 14A:
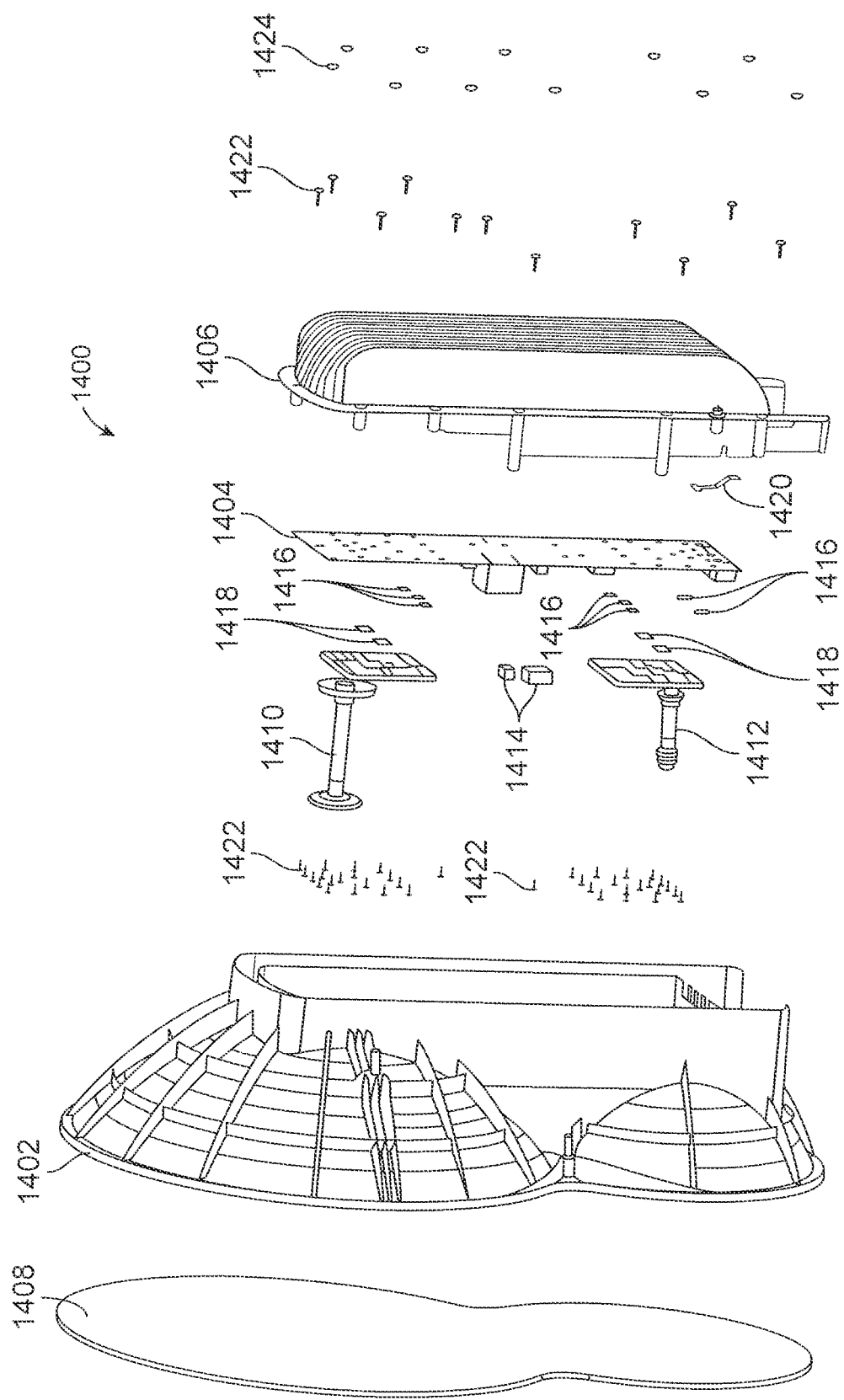
FIG. 14A presents a diagram illustrating an exemplary exploded view of the radio assembly of FIGS. 13A-H.

FIG. 14A illustrates an exemplary exploded view of the radio assembly, in accordance with an embodiment of the present invention. In FIG. 14A, radio 1400 includes a number of major components as well as a number of auxiliary or connecting components. More specifically, the major components include a reflecting housing 1402, a PCB 1404, and a backside cover 1406. Reflecting housing 1402 includes a front portion that houses and supports the reflectors for the antenna and a back portion that together with backside cover 1406 provides a housing space for PCB 1404. PCB 1404 includes most radio components, such as the CPU, the FPGA, the transmitter, and the receiver. Backside cover 1406 covers the backside of the radio. More specifically, backside cover 1406 includes a hollowed space that snugly fits PCB 1404. In addition, the fins on backside cover 1406 improve dissipation of heat generated by the radio.

The auxiliary components include a radome cover 1408 for protecting the antenna from weather damage; an upper feed-shield subassembly 1410 for shielding a feed antenna to the upper reflector; a lower feed-shield subassembly 1412 for shielding a feed antenna to the lower reflector; heat sinks 1414 for dissipating heat from components on PCB 1404; thermal pads 1416; microwave absorbers 1418; a strap 1420 for an RJ-45 connector; a number of screws 1422 for coupling together reflecting housing 1402, PCB 1404, and backside cover 1406; and a number of screw covers 1424.

FIGS. 14B1 and 14B2 show front and cross-sectional view of an assembled radio device. The length unit used in the drawings is millimeters. The upper drawing (FIG. 14B2) shows the cross section of the radio device and the bottom drawing (FIG. 14B1) shows the front view of the assembled radio and the cutting plane (along line FF). FIG. 14C presents a diagram illustrating where to apply 1409 the sealant for the radome, in accordance with an embodiment of the present invention. As described in greater detail below, this rim or ridge surrounding the reflectors (both transmit and receive reflectors) may also act as an isolation barrier in addition to acting as a channel for the sealant. In FIG. 14C, along the rims of the front surface of the reflecting housing, a narrow region is marked with hatched lines; the sealant needs to stay within the hatched region before and after the radome is seated and should not intrude into un-hatched regions. In another words, only a thin layer of sealant material should be applied before the radome is installed to prevent the sealant material from overflowing to the un-hatched region.

FIGS. 15A-15E show detailed mechanical drawings of the reflecting housing, in accordance with an embodiment of the present invention. More specifically, FIGS. 15A-15E provides exemplary dimensions of the reflecting housing. In the example shown in FIGS. 15A-15E, all lengths are expressed in millimeters. For example, the vertical length of the radio system, or the sum of diameters of the upper and lower reflectors, is around 650 mm Note that such a compact size makes installation of the radio much easier than many of the conventional radio systems. Note that the radios are installed outdoors, and thus a weatherproof material is needed for making the reflecting housing. In one embodiment, a hard plastic material, such as polycarbonate (PC), is used for making the reflecting housing. To form the reflectors, a metal layer can be deposited on the front concave surface of the reflecting housing. In one embodiment, a layer of aluminum (Al) is deposited using a physical vapor deposition (PVD) technique. In a further embodiment, before the PVD of the Al layer, the reflecting area is polished. For example, a diamond polishing process that meets the SPI (Society of the Plastic Industry) A-1 standard can be performed before the deposition of the metal layer.

Figure 16B:
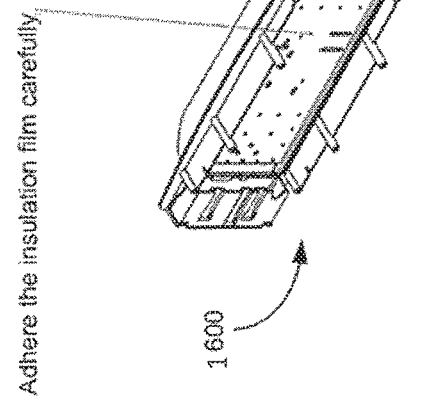
FIG. 16B is a diagram illustrating an exemplary view of an assembled backside cover subassembly.
Figure 16A:
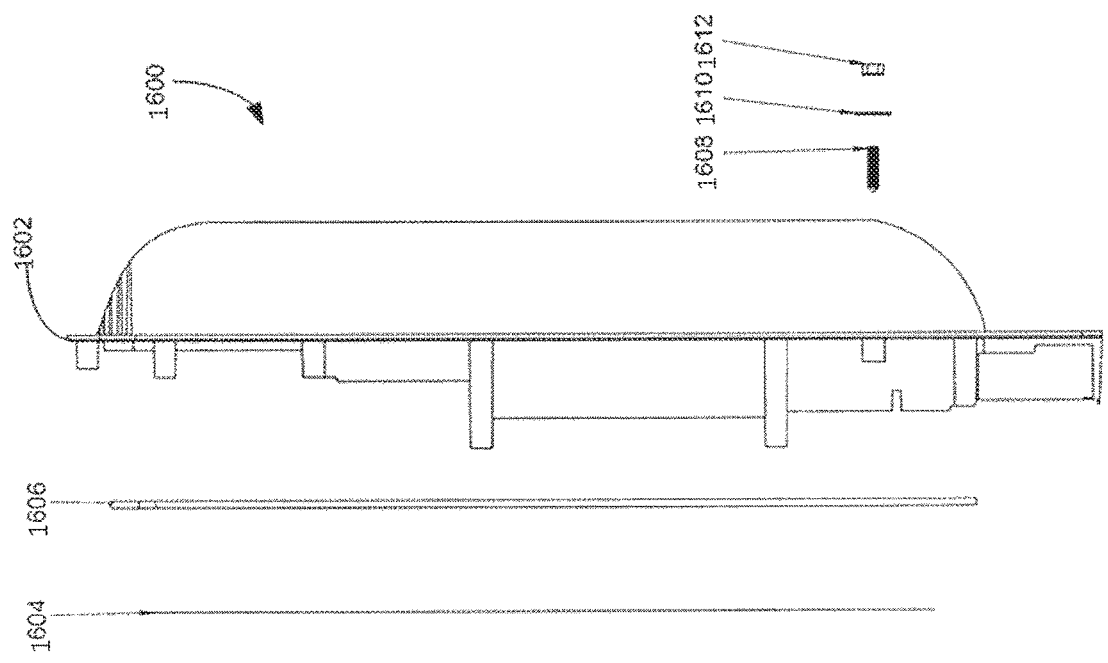
FIG. 16A is a diagram illustrating an exemplary exploded view of a backside cover subassembly.

FIG. 16A presents a diagram illustrating an exemplary exploded view of the backside cover subassembly, in accordance with an embodiment of the present invention. In FIG. 16A, a backside cover subassembly 1600 includes a rear lid 1602, an insulation film 1604, an o-ring seal 1606, a setscrew 1608, a washer 1610, and a nut 1612. More specifically, rear lid 1602 covers the backside of the radio system. In one embodiment, a material that is similar to the one used for the reflecting housing can be used to make rear lid 1602. For example, rear lid 1602 can also be fabricated using PC. Insulation film 1604 and o-ring seal 1606 provide electrical insulation as well as waterproofing capability, thus preventing damages caused by weather or other factors to the radio components. Various insulation materials can be used as insulation film 1604. In one embodiment, insulation film 1604 includes a Kapton® (registered trademark of DuPont of Wilmington, Delaware) film. FIG. 16B presents a diagram illustrating an exemplary view of the assembled backside cover subassembly, in accordance with an embodiment of the present invention. In FIG. 16B, the insulation film and the o-ring have been applied to the inside of the rear lid. Note that the insulation film should be adhered carefully on the inside of the rear lid and no bubbles should be formed.

FIGS. 16C1 and 16C2 show front view and cross-sectional views, respectively, of the rear lid, in accordance with an embodiment of the present invention. More specifically, the top drawing shows the front view of the rear lid, the middle drawing shows a cross-sectional view of the rear lid across the cutting plane AA, and the bottom drawing shows a partial-sectional view of the rear lid across the cutting plane CC. From the sectional views, one can see more details, including the shape and dimensions of the heat dissipation fins on the backside of the rear lid.

FIGS. 16D1-16D3 illustrate the backside of the rear lid in more detail. The top drawing (FIG. 16D1) shows the entire backside from an angle. FIG. 16D2 shows a portion of the backside viewed from the top. FIG. 16D3 shows a partial-sectional view of the rear lid across a cutting plane BB.

Figure 17A:
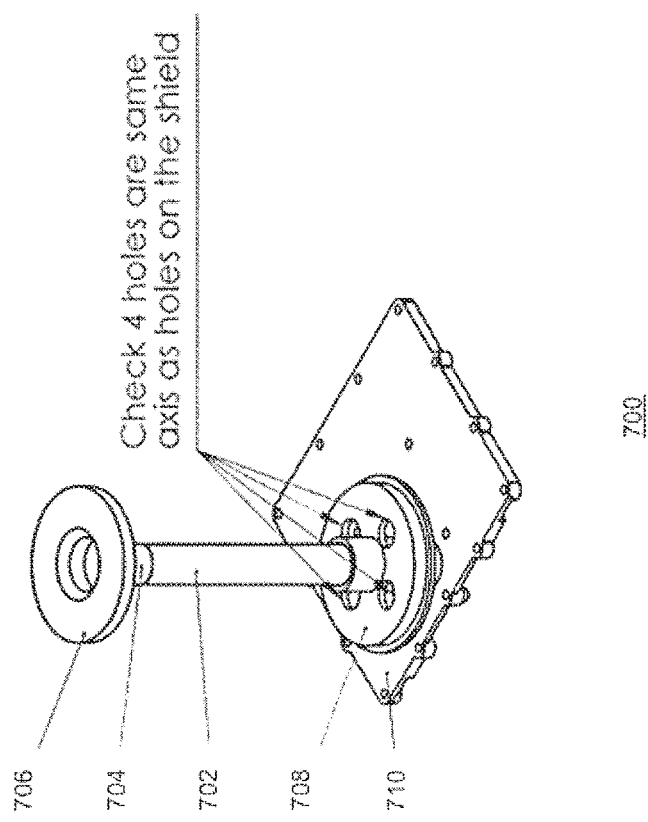
FIG. 17A presents a diagram illustrating an exemplary view of the upper feed-shield subassembly, in accordance with an embodiment of the present invention.

FIG. 17A presents a diagram illustrating an exemplary view of the upper feed-shield subassembly, in accordance with an embodiment of the present invention. In FIG. 17A, upper feed-shield subassembly 700 includes a waveguide tube 702, a spacer 704, a sub-reflector 706, a flange 708, and an RF shield 710. Waveguide tube 702 houses the waveguide of the feed antenna to the upper reflector of the radio antenna. Spacer 704 separates the waveguide and sub-reflector 706; sub-reflector 706 reflects the RF waves to the upper reflector. Flange 708 and the holes on it enable upper feed-shield subassembly 700 to be physically secured to other underlying structures.

FIGS. 17B1-17B5 show mechanical drawing views for the upper feed-shield subassembly. FIG. 17B1 shows the front view of the upper feed-shield subassembly. FIG. 17B2 shows a cross-sectional view of the upper feed-shield subassembly along a vertical cutting plane AA and a horizontal cutting plane CC. The lower left (FIG. 17B4) drawing shows the bottom view of the upper feed-shield subassembly, illustrating in detail the bottom of RF shield 710. Note that the ridges on RF shield 710 provide space for components on the underlying FPGA board. FIG. 17B5 is a detailed drawing of a section where glue is applied to attach the sub-reflector to the spacer and the waveguide tube.

Figure 18A:
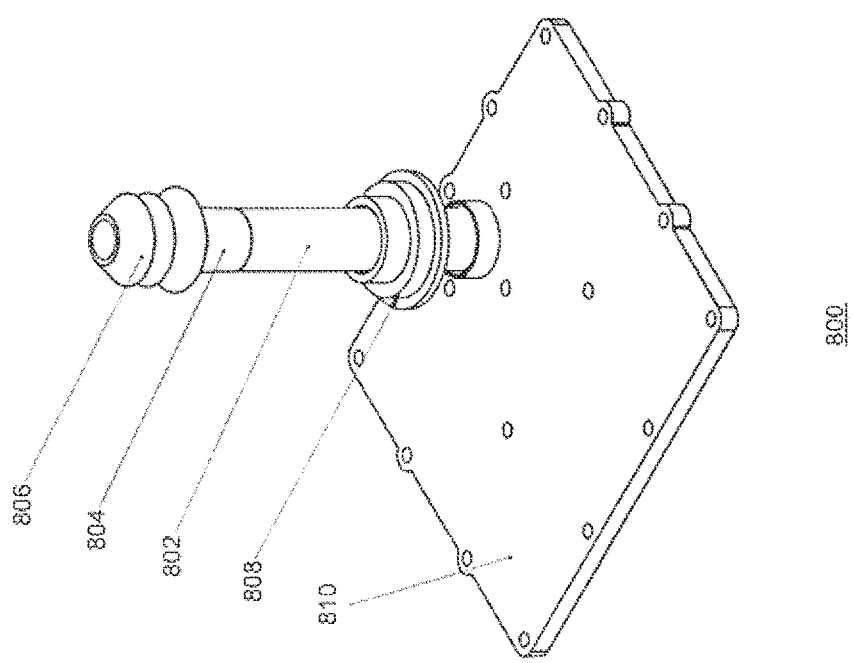
FIG. 18A is a diagram illustrating an exemplary view of the lower feed-shield subassembly, in accordance with an embodiment of the present invention.

FIG. 18A presents a diagram illustrating an exemplary view of the lower feed-shield subassembly, in accordance with an embodiment of the present invention. In FIG. 18A, lower feed-shield subassembly 800 includes a waveguide tube 802, a spacer 804, a sub-reflector 806, a flange 808, and an RF shield 810. Waveguide tube 802 houses the waveguide of the feed antenna to the lower reflector of the radio antenna. Spacer 804 separates the waveguide and sub-reflector 806; sub-reflector 806 reflects the RF waves to the lower reflector. Flange 808 and the holes on it enable lower feed-shield subassembly 800 to be physically secured to other underlying structures.

FIGS. 18B1-18B5 show detailed mechanical drawing views for the lower feed-shield subassembly, in accordance with an embodiment of the present invention. FIG. 18B1 shows the front view of the lower feed-shield subassembly. FIG. 18B2 shows a cross-sectional view of the lower feed-shield subassembly along a vertical cutting plane AA and a horizontal cutting plane BB (FIG. 18B3). The lower left drawing (FIG. 18B4) shows the bottom view of the lower feed-shield subassembly, illustrating in detail the bottom of RF shield 810. Note that the ridges on RF shield 810 provide space for components on the underlying FPGA board. FIG. 18B5 is a detailed drawing of a section where glue is applied to attach the sub-reflector to the spacer and the waveguide tube.

Recall the previously shown FIGS. 2C and 2D, where the radio is mounted on a pole via a mounting unit. The mounting unit not only secures the radio to the pole, but also enables easy and accurate alignment of the antenna reflectors, which is important to ensure the best performance of the link. In general, the mounting unit includes a pole-mounting bracket and a radio-mounting bracket. The pole-mounting bracket is mounted to a pole, which can be located on a rooftop or any other elevated location in order to ensure a clear line of sight between paired radios. Moreover, the mounting location should have a clear view of the sky to ensure proper GPS operation. For safety, the mounting point should be at least one meter below the highest point on the structure, or if on a tower, at least three meters below the top of the tower. The radio-mounting bracket is mounted to the backside of the radio, and is coupled to the pole-mounting bracket.

Figure 19A:
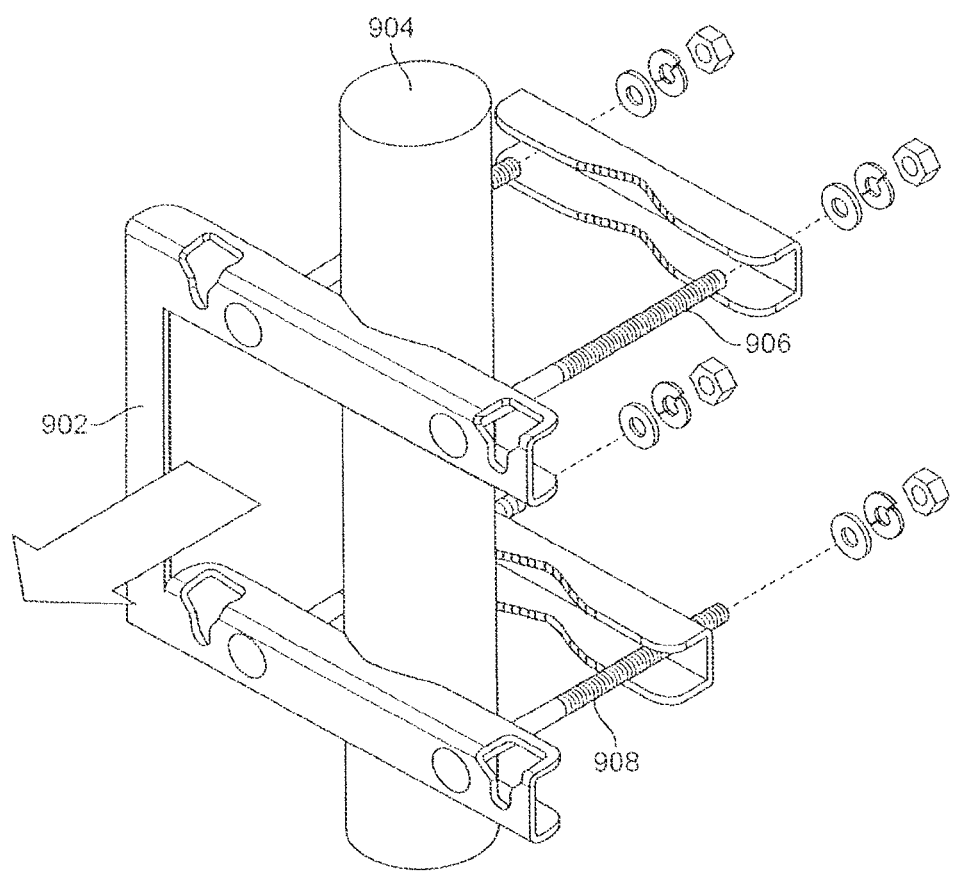
FIG. 19A is an assembly view of a pole-mounting bracket mounted on a pole, in accordance with an embodiment of the present invention.

FIG. 19A presents the assembly view of the pole-mounting bracket mounted on a pole, in accordance with an embodiment of the present invention. In FIG. 19A, pole mounting bracket 902 is mounted onto a pole 904 using a number of bolts, such as bolts 906 and 908. Pole-mounting bracket 902 can be configured to fit poles of various sizes. In one embodiment, pole-mounting bracket 902 accommodates poles with diameters between 2 and 4 inches. The arrow in the figure indicates the direction in which the radio antenna faces, that is the direction to the other radio. Note that while aligning the antenna, a user may adjust the position of the antenna by adjusting the position (including elevation and direction) of pole-mounting bracket 902 on pole 904.

Figure 19B:
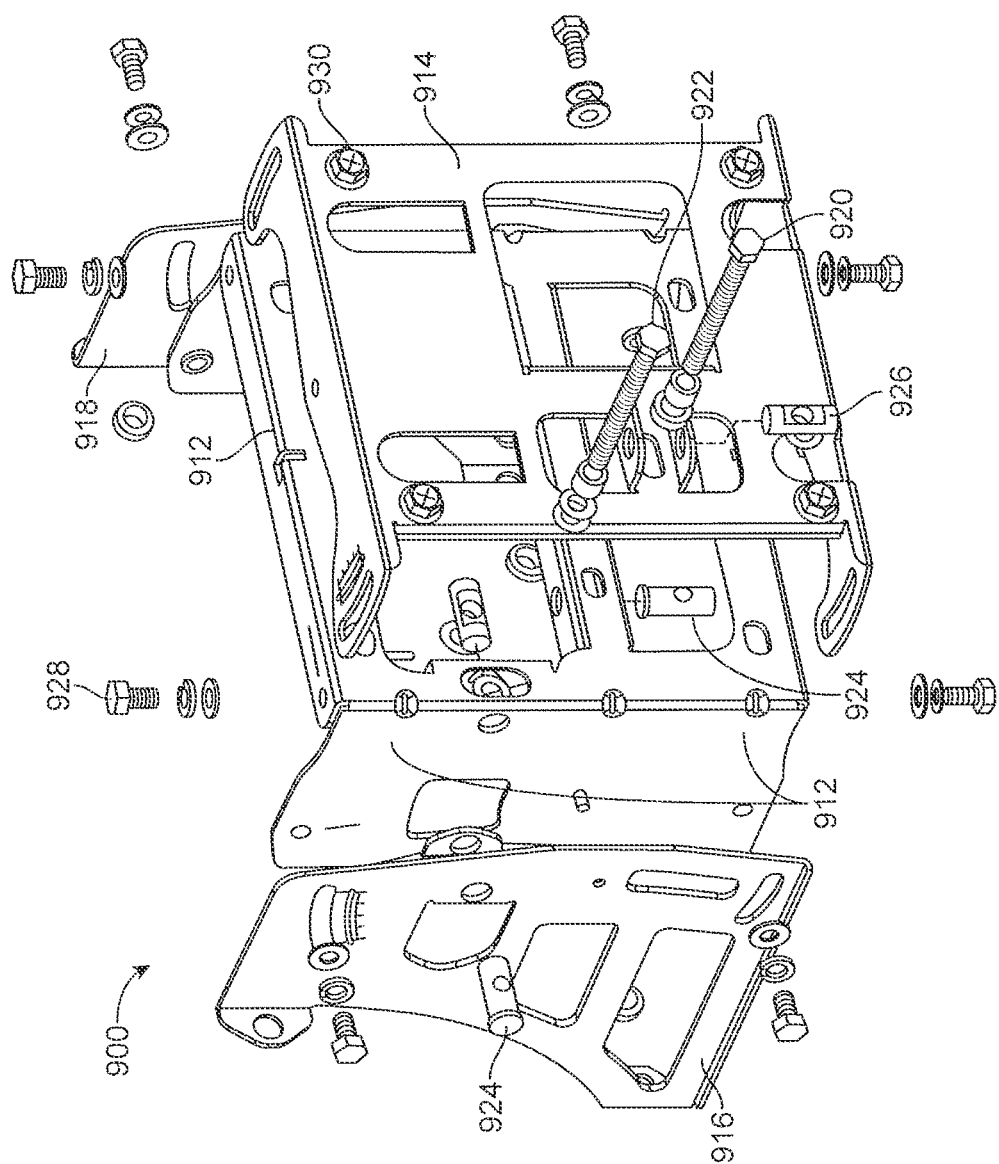
FIG. 19B is an assembly view of a radio-mounting bracket subassembly, in accordance with an embodiment of the present invention.

FIG. 19B presents the assembly view of the radio-mounting bracket subassembly, in accordance with an embodiment of the present invention. In FIG. 19B, radio-mounting bracket subassembly 900 includes a number of brackets and a number of connecting components (such as screws and pins). More specifically, radio-mounting bracket subassembly 900 includes a pivot bracket 912, an azimuth (AZ)-adjustment bracket 914, a left elevation-adjustment bracket 916, and a right elevation-adjustment bracket 918. Pivot bracket 912 provides pivot points for all other adjustment brackets. AZ-adjustment bracket 914 enables the fine-tuning of the azimuth of the antenna. More specifically, a user can adjust the azimuth of the antenna by adjusting the position of an AZ-adjustment bolt 920 coupled to AZ-adjustment bracket 914. Similarly, elevation-adjustment brackets 916 and 918 enable the fine-tuning of the elevation of the antenna. A user can adjust the elevation of the antenna by adjusting the position of an elevation-adjustment bolt 922. In one embodiment, the azimuth and the elevation of the antenna can be adjusted within a range of ±10°. A number of adjustment pins, such as adjustment pins 924 and 926, fit to the adjustment bolts, also assist the fine-tuning of the antenna orientation. Radio-mounting bracket subassembly 900 also includes a number of lock bolts, such as lock bolt 928. In one embodiment, radio-mounting bracket subassembly 900 includes 8 lock bolts. These lock bolts are loosened before and during the alignment process. After the radio has been sufficiently aligned with the radio on the other side, these lock bolts are tightened to lock the alignment. In addition, radio-mounting bracket subassembly 900 includes four flange screws, such as screw 930. These flange screws are used to couple radio-mounting bracket subassembly 900 to pole mounting bracket 902.

FIGS. 19C1-19C4 show detailed mechanical drawing views of a radio-mounting bracket. The upper left drawing (FIG. 19C1) shows the back view (viewed from the side of the radio) of the radio-mounting bracket, the lower left drawing (FIG. 19C3) shows the front view of a radio-mounting bracket, FIG. 19C2 shows the side view of the radio-mounting bracket, and FIG. 19C4 shows a detailed drawing of an adjustment bolt assembly. Note that the assemblies for the AZ-adjustment bolt and the elevation-adjustment bolt are similar. In FIG. 19C4, an adjustment bolt assembly 950 includes an adjustment bolt 952, a disk spring 954, an adjustment pin 956 with a through hole, a flat washer 958, and slotted spring pin 960.

FIG. 19D1-19D3 shows a radio-mounting bracket mounted to a radio in different views. FIG. 19D1 shows a back view. The arrows in FIG. 19D1 point to the lock bolts. FIG. 19D2 is an angled view. The zoomed-in image of FIG. 19D3 shows that a 6 mm gap is needed between the head of flange screw 930 and AZ-adjustment bracket 914.

Figure 19E:
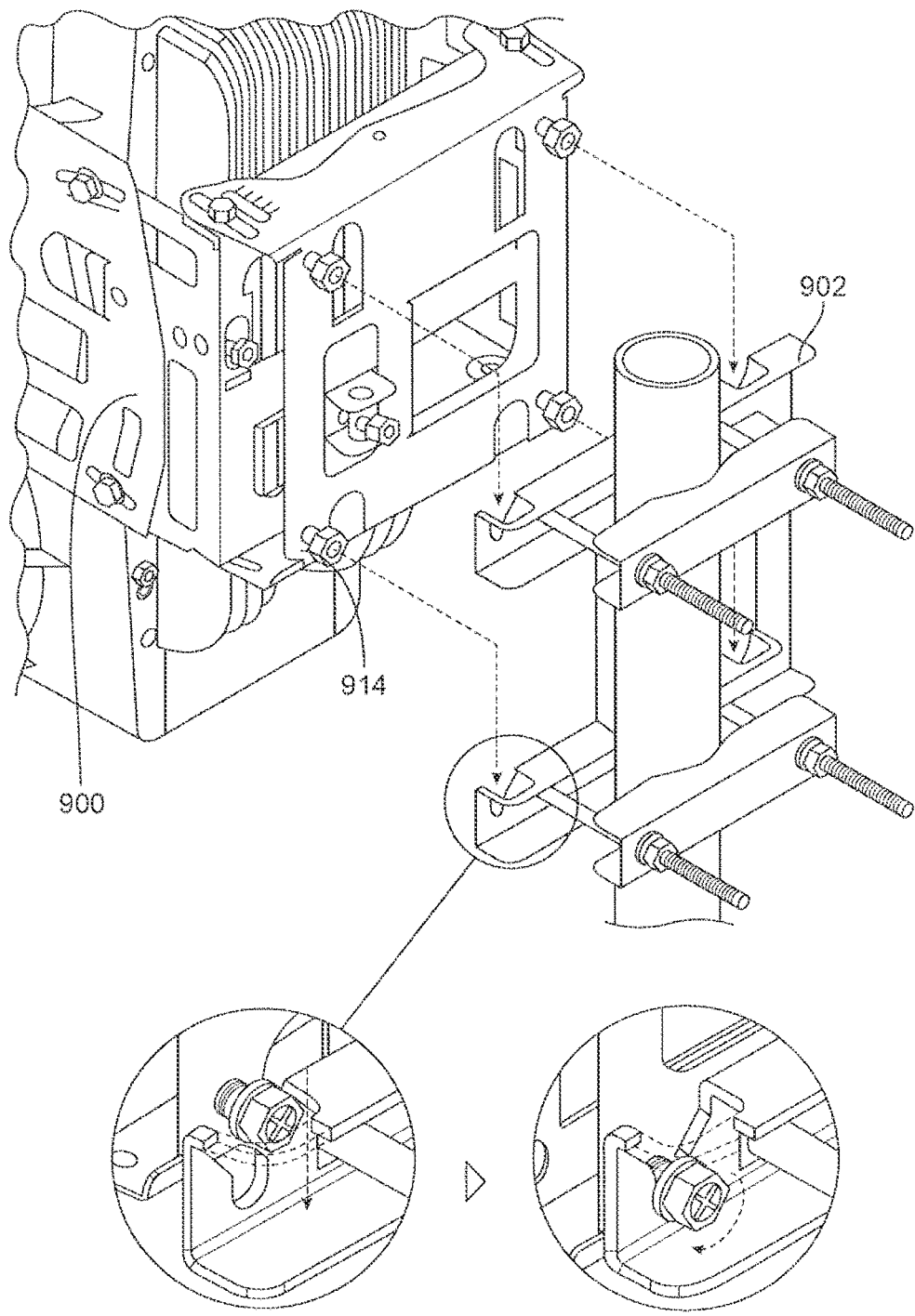
FIG. 19E is a diagram illustrating the coupling between the radio-mounting bracket and the pole-mounting bracket, in accordance with an embodiment of the present invention.

FIG. 19E presents a diagram illustrating the coupling between the radio-mounting bracket and the pole-mounting bracket, in accordance with an embodiment of the present invention. From FIG. 19E, one can see that the radio-mounting bracket subassembly 900 can be attached to pole mounting bracket 902 by seating the flange screws on AZ-adjustment bracket 914 to corresponding notches on pole mounting bracket 902. Note that the flange screws can be later tightened to ensure that the radio-mounting bracket subassembly 900, and thus the radio, is securely attached to pole mounting bracket 902.

In general, the radios described herein include two (or more) antenna reflectors that are locked into alignment so that they both aim in parallel; both the transmitter and the receiver are aligned in parallel. This may allow for the dual reflectors (one transmitter and one receiver) to be "seen" as a single device by the paired partner during point-to-point transmission. To keep the two reflectors aligned in parallel, it may be desirable to have them be rigidly formed and/or connected to each other, as illustrated in FIGS. 13A-19E. Because the two beams (transmit and receive) are parallel they do not typically interfere with each other during transmission and receiving. The rigidity of the housing may also help the system resist misalignment of the reflectors (and possible interference between the transmitter and receiver during operation) under conditions of strain/stress, as due to weather conditions (wind, rain, etc.). In addition to the material stiffness of the housing, the addition of mechanical support elements (e.g., ribs) may also add to the stiffness. The radome may also enhance the stiffness by both covering the reflector and by providing additional support.

The housing may be formed of a single piece. In some variations the housing is formed as a monocoque structure, in which the load is supported by the "skin" of the antenna. Molding (e.g., injection molding) may be used in this design. Similarly a unitary body design may also be used to provide enhanced structural support. A design such as the monocoque design illustrated above may also allow for an extremely low overall weight, in part because of the reduced amount of materials need to achieve the overall stiffness/support. The reflector is a thin-wall reflector that may be supported by ribs.

As illustrated above, a single PCB is used. The size of the PCB may be minimized, though on the PCB the transmitters may be isolated from the receivers, as discussed.

In use, radios that include adjacent (and even somewhat overlapping, as illustrated above) reflectors as described herein may transmit and receive simultaneously in the same frequency channel(s). Thus, the transmitter and the receivers may be isolated from each other to prevent cross-talk and/or interference between the transmitter and receiver.

At the PCB level, one or more transmitters may be coupled to a single transmitting antenna feed; as illustrated above in FIGS. 17A-18B5, both the transmitter and the receiver may be present on the same PCB, which may save costs but risks RF interference between the two. In the variations described herein the transmitters and receivers are all physically separated on different regions of the PCB and are shielded with shielding appropriate for the frequencies transmitted. For example, in FIGS. 17A and 18A, the RF shield elements 710, 810 are appropriate for use with 24 GHz signals, and are formed from die-cast Al. The labyrinthine shape of these shields isolates each of the transmitters (2) in the transmitters and isolates the feed from the rest of the circuitry. Interior walls help with isolation between the radio circuit elements (e.g., radio synthesizer, local oscillator, down- and up-converter parts, etc.). In the example shown in FIGS. 17A-18B5 the radio has two transmitters and two receivers, which operate using orthogonal polarization to enable concurrent RF waveforms traveling in the same direction, so that the transmitters share a single reflector and feed, and the receivers share a single receiver and feed. To avoid any contamination between these separate signals, both transmitters and receivers are also isolated from each other, as illustrated, reflected in the symmetric pattern of the RF shields.

Figure 32A:
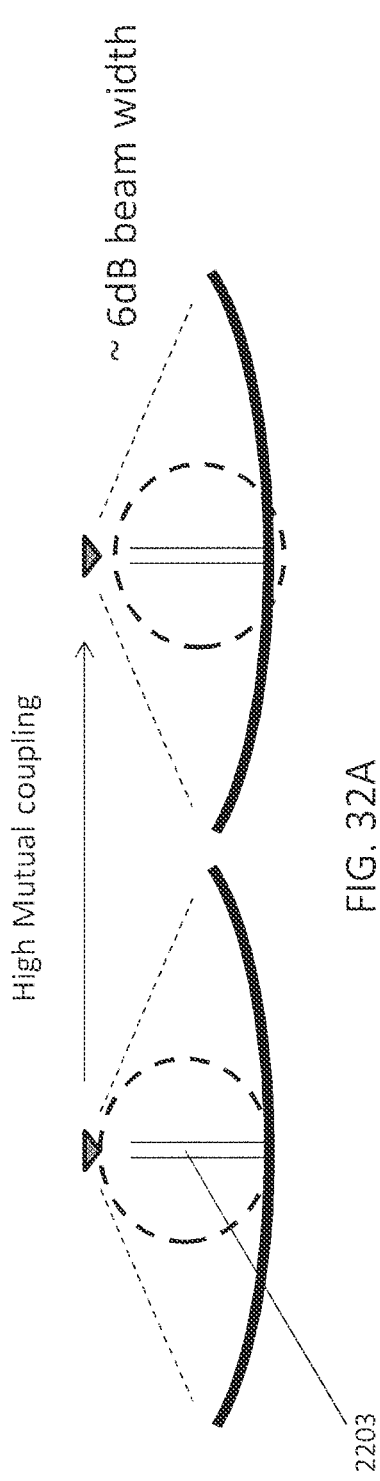
FIGS. 32A and 32B show a comparison between two adjacent typical parabolic reflectors (FIG. 32A) having relatively high mutual coupling, and two adjacent "deep dish" parabolic reflectors (FIG. 32B) having a low mutual coupling as described herein.
Figure 32B:
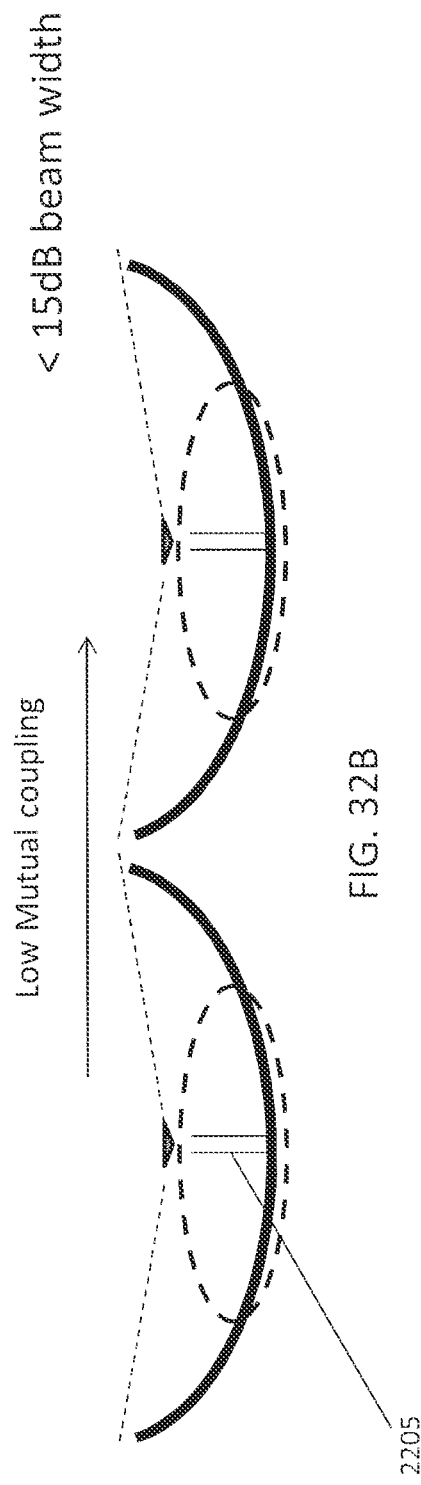

Beyond the RF shielding, the reflectors may also be configured to reduce or eliminate RF cross-talk (e.g., coupling) between the transmitter and receiver. FIGS. 32A and 32B illustrate one technique for reducing the mutual coupling between immediately adjacent reflectors.

As mentioned above, the adjacent reflectors are typically held in rigid alignment so that they are aimed in parallel, as shown. FIG. 32A illustrates a typical pair of parabolic reflectors, positioned side-by-side, that exhibit a high degree of mutual coupling between the transmitter on one side and the receiver on the other. The antenna feeds 2203 extend above the curvature (edge) of each reflector. In contrast, in FIG. 33B, a pair of adjacent parabolic reflectors are shown that have a low mutual conductance coupling. In this example, the primary feed 2205 is shadowed from the adjacent reflector. In addition, the feed used has been configured to have a very low edge illumination so that diffraction is minimized. In some variations the reflectors are configured so that there is low mutual coupling between the two reflectors in part because the ratio of focal length, $f_l$, to diameter, d, ($f_l/d$) may be less than approximately 0.25 for the reflectors (e.g., the transmission reflector or both the transmission and receiving reflectors).

In some variations the relative sizes of the reflectors may also help isolate the two antennas. For example, as shown above, the transmitting antenna reflector may be smaller than the receiver antenna reflector. This may allow a higher receive gain while staying within regulated limits for transmission. In some variations, the transmit antenna does not align maximally with the reflector, so that the effective power limitation plus the side lobe energy is less than maximal. Thus, in some variations, the antenna reflector is larger than it needs to be because of the losses from the side lobe energy.

In some variations an isolation boundary may be included between the transmitter reflector (antenna) and the receiver reflector (antenna). For example, an isolation boundary (choke) may be a ridged boundary between the two reflectors. An isolation boundary between the reflectors may be referred to as an isolation choke boundary (or isolation choke boundary layer). As discussed above, an isolation choke boundary is typically an anti-diffraction layer which may smooth or avoid sharp edges that may otherwise interfere or create interference. By minimizing the diffraction (e.g., avoiding sharp edges where the energy will "bend"), and also by under-illuminating the transmitter, the transmitter may reduce energy at the rim of the reflector(s), so that the power available to spill over is small.

In some variations the isolation choke boundary includes "rings" around the rim of the parabolic reflector edge. For example, see FIG. 33A. Annular rings at the boundary (shown as "corrugations") may enhance the isolation of the transmitter antenna with respect to the receiver. A corrugated (ridged) surface may help reduce diffracted fields from reaching the second reflector feed. The ridges may be chosen to be approximately a quarter wavelength at the center frequency of operation.

Figure 33A:
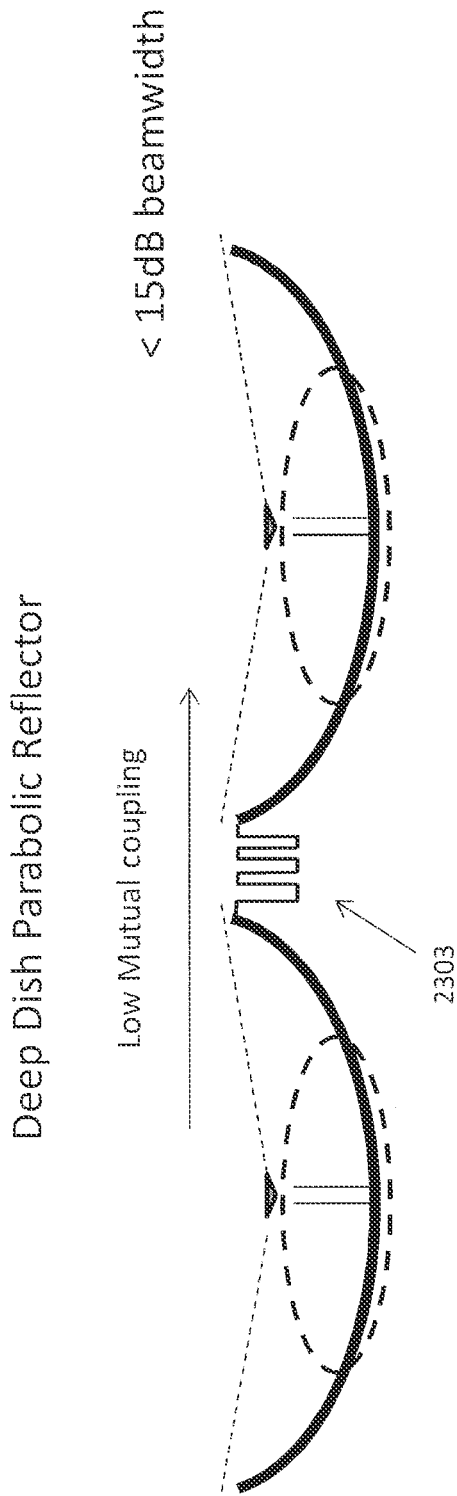
FIG. 33A shows another variation of a pair of parabolic reflectors (similar to those shown in FIG. 32B), having a corrugated isolation choke boundary layer that reduces or prevents diffracted fields from reaching the reflector feed of the adjacent reflector.
Figure 33B:
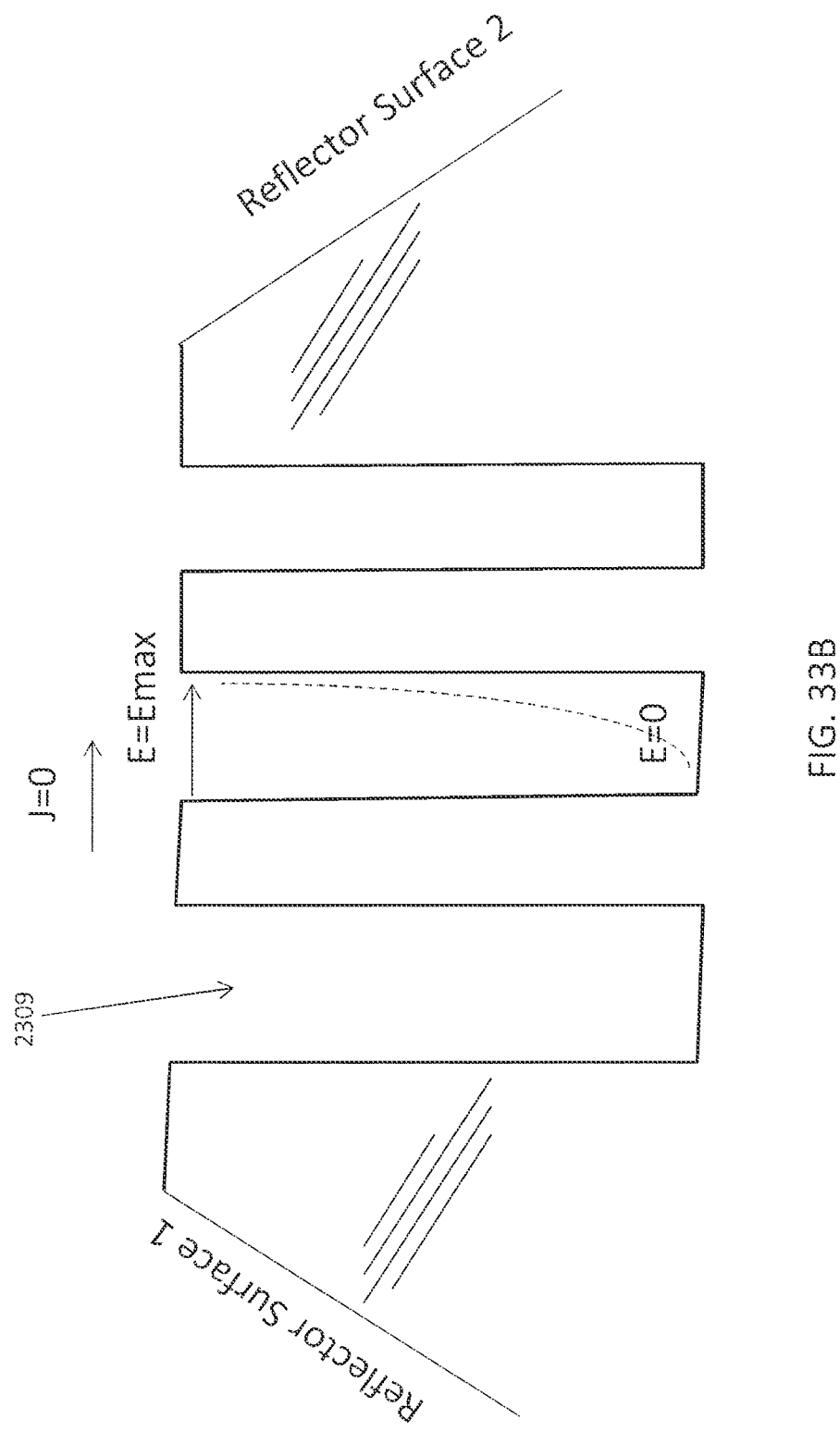
FIG. 33B shows an enlarged view of the boundary region, illustrating the quarter wavelength corrugations in the surface.
Figure 33C:
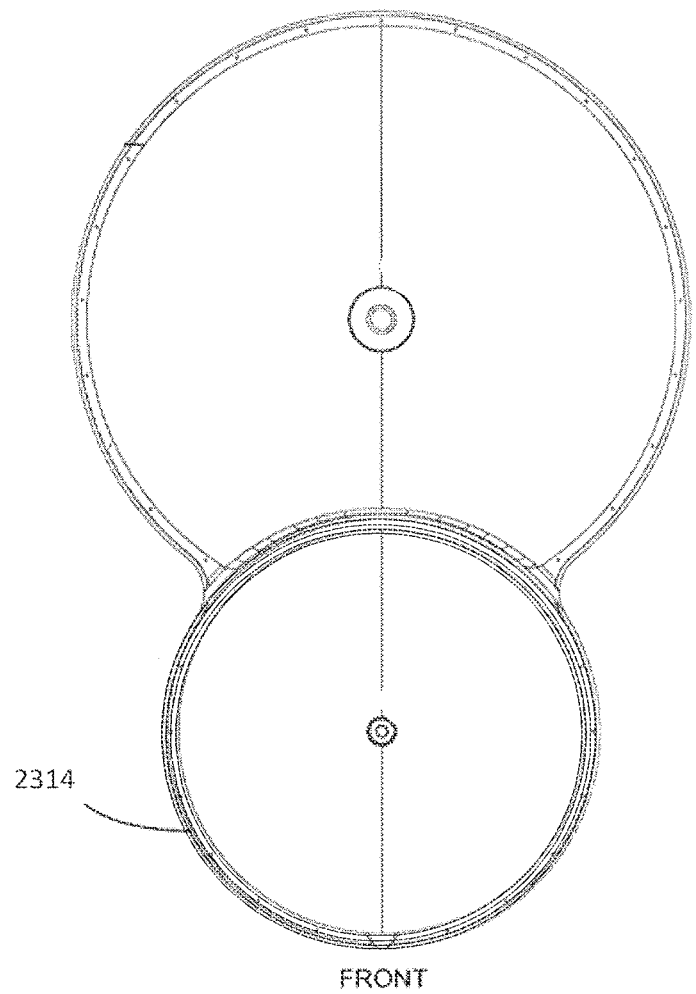
FIG. 33C shows a front view of a transmitter reflector having corrugations (rings) forming the isolation boundary between the transmitter and receiver.

FIG. 33B illustrates an enlarged view of the quarter wavelength corrugated surface 2303 shown in FIG. 33A. This boundary provides electromagnetic boundary conditions that do not allow current to travel from one antenna to the other. Thus, with no direct primary feed to primary feed patch and diffraction dramatically reduced by the feed pattern taper and corrugations, the antenna pair may have a very high isolation (e.g., low mutual coupling) between the transmitter antenna and the receiver antenna. FIG. 33C illustrates a front view of an antenna pair forming a radio device having a corrugated/ridged isolation boundary around the lower (transmitter) reflector 2314.

In this example, the transmitter reflector antenna is dominant in the sense that it emits a large amount of energy (high gain). The transmitter antenna is under-illuminated, and the splash guide is positioned deep in the housing, which may help with side-lobe suppression.

Further, in some variations, including the variation shown in FIG. 33C, the transmitter reflector/antenna is embedded within (e.g., overlaps with) the reflector for the receiver. Embedding the transmit reflector into the receive reflector may impact the efficiency of the receive antenna, however it may also help provide an isolation boundary between the receiver and transmitter antennas that reduces the coupled energy between these antenna.

The 24 GHz license-free operating frequency of the radio system makes it a preferred choice for deployment of point-to-point wireless links, such as a wireless backhaul, because there is no need to obtain an FCC (Federal Communications Commission) license. The unique design of the high-gain reflector antenna provides long reachability (up to 13 Km in range) of the radio system. Moreover, the radio system can operate in both Frequency Division Duplex (FDD) and Hybrid Division Duplex (HDD) modes, thus providing the radio system with unparalleled speed and spectral efficiency, with data throughput above 1.4 Gbps. Note that HDD provides the best of both worlds, combining the latency performance of FDD with the spectral efficiency of Time Division Duplex (TDD).

Figure 20A:
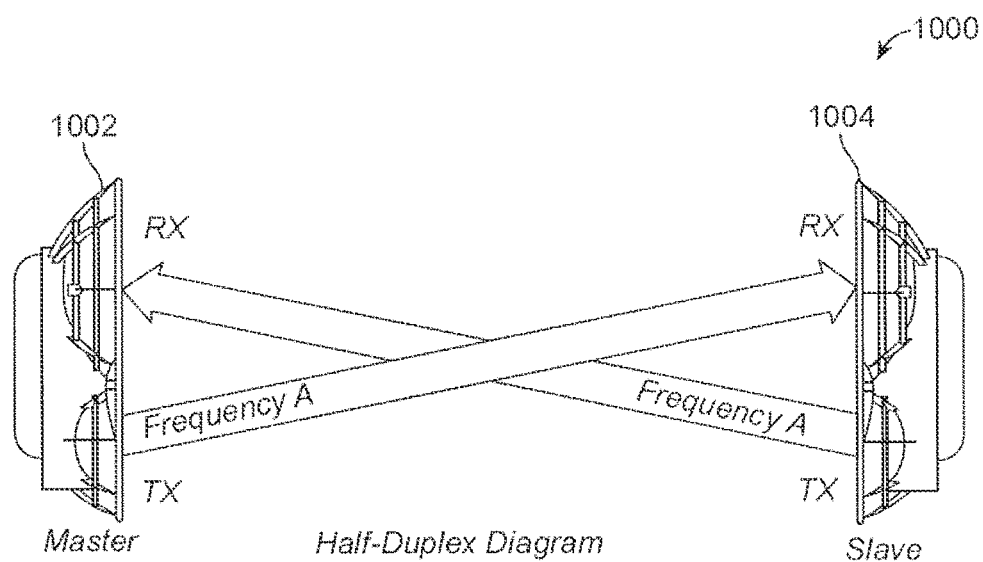
FIG. 20A is a diagram illustrating a radio system operating in half-duplex mode.

During operation, the radio system can be configured for half-duplex operation (which is the default setting) and full-duplex operation. FIG. 20A presents a diagram illustrating the radio system operating in half-duplex mode, in accordance with an embodiment of the present invention. In FIG. 20A, radio system 1000 includes two radios, a master radio 1002 and a slave radio 1004. Note that master and slave radios can be similar radios with different configurations. In the example shown in FIG. 20A, the lower antenna reflectors are used for transmitting (TX) purposes, whereas the upper antenna reflectors are used for receiving (RX) purposes. When the system is configured to operate in the half-duplex mode, the TX and RX frequencies can be either the same or different to suit local interference. Note that the half-duplex mode allows communication in one direction at a time, alternating between transmission and reception. As a result, the half-duplex operation provides more frequency planning options at the cost of higher latency and throughput.

Figure 20B:
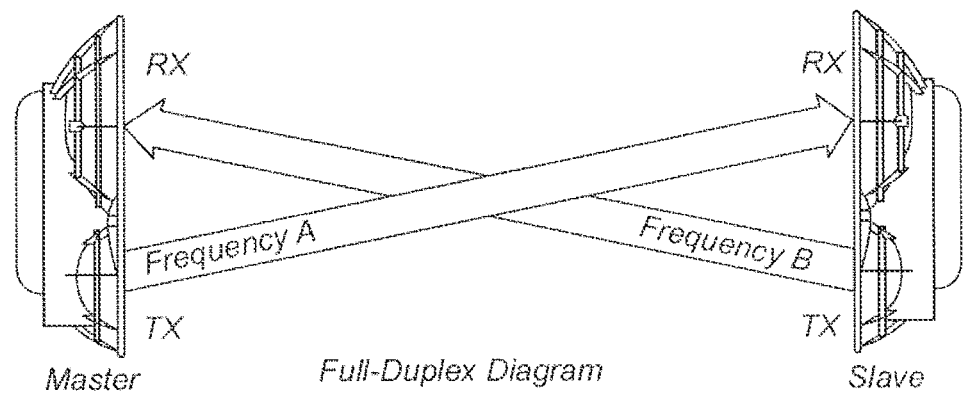
FIG. 20B is a diagram illustrating a radio system operating in full-duplex mode.

FIG. 20B presents a diagram illustrating the radio system operating in full-duplex mode, in accordance with an embodiment of the present invention. When operating in the full-duplex mode, the TX and RX frequencies should be different, thus allowing communication in both directions simultaneously. The full-duplex operation may provide higher throughput and lower latency.

In some variations, high speed and lower latency may be obtained with the radios configured as a full-duplex system using Frequency Division Duplexing (FDD). The data streams generated by the radios are simultaneously transferred across the wireless link. The transmitter and receiver are running concurrently in time. Because of the trade-off between bandwidth resources and propagation conditions, this approach is typically reserved for links in areas where installations are in clear line-of-sight conditions and free of reflected energy such as that generated by heavy rain or intermediate objects. Installations that are subject to Fresnel reflections or highly scattered environments may experience some level of degradation at great ranges.

Links that are installed in environments that are highly reflective or subject to considerable scattering due to heavy rain or foliage loss may be better suited to half-duplex configurations (or simulated full duplex). In this case the frequency and bandwidth resources are shared on a Time Division Duplexing (TDD) basis, and the system can accept higher levels of propagation distortion. The trade-offs may include reduced throughput and slightly higher latency. Other half-duplex/simulated full duplex techniques include HDD and other techniques as known to those of skill in the art.

As mentioned above, in some variations the system may allow switching between duplexing types. For example, the system may be configured to switch between FDD and TDD. In some variations, the system switches between FDD and TDD based on the one or more performance parameters of the device/system. As mentioned above, communication between nodes may vary based on environmental conditions. In open space, you may have few obstacles that can cause multiple paths b/w the transmitter and receiver. In such cases, when you have a clear space, then FDD mode signaling may be used. Transmission and receiving may be performed at the same time, and even on the same channel using the devices described herein. However, if objects are introduced in the space (and particular energy reflectors, such as water, etc.) that cause reflection of signal power, the signals may degrade, and it may be better to transmit between nodes using TDD. Thus, by monitoring the signal parameters to detect the transmission quality, a system that can support multiple duplex modalities, such as the systems described above, may be configured to dynamically switch between modalities based on signal quality, allowing the optimal duplexing to be matched to the conditions and operation of the devices. In one example, the system or device may monitor (e.g., using the FPGA) a parameter of signal transmission. If the packet error rate increases (bit error rate, etc.) at the receiver above a predetermined threshold then the system may be configured to automatically switch to a higher-fidelity, though slower, duplexing mode (e.g., TDD). The transmission rate may be returned to a faster mode (e.g., FDD) either based on periodic re-testing at the faster duplexing mode, or based on other parameters passing a threshold (e.g., decrease in error rate, etc.).

The ability to switch duplexing modes (e.g., between FDD and TDD) is made possible in the systems described herein in part by having a separate receiver antenna and transmitter antenna. This allows use of FDD on the same channel without requiring specific and costly filtering using pre-tuned filters.

In some variations, the radio system is configured with the ability to manage time and bandwidth resources, similar to other systems utilizing different modulation schemes that are scaled according to the noise, interference, and quality of the propagation channel. The radio system also automatically scales its modulation based on channel quality but has the ability to be reconfigured from a time/bandwidth perspective to allow for the best possible performance. In many regards the suitability of the duplexing scheme needs to be taken into account based on the ultimate goals of the user. Just as channel conditions have an effect on the modulation scheme selection, there are effects on duplexing modes to consider as well.

When deploying the radio systems for establishing wireless communication links, various configurations can be used. For example, the first configuration is for point-to-point backhaul, where two radios (one configured as master and one configured as slave) are used to establish a point-to-point link as shown in FIGS. 20A and 20B. Note that although the figure show schematic "arrows" between the antenna pairs that cross (e.g., between TX and RX antenna reflectors on the link pairs), this is to illustrate the link between the node pairs and is not directionally accurate; the transmission and receiving reflectors are oriented in parallel.

Figure 21A:
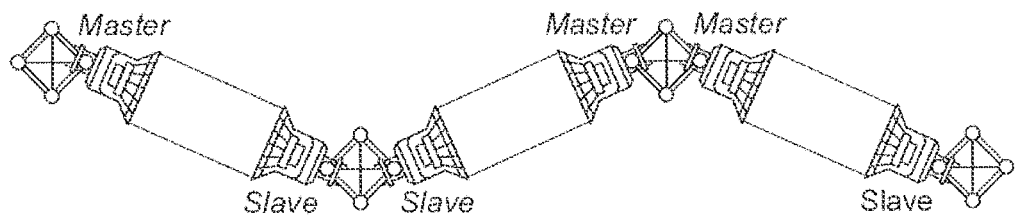
FIG. 21A is a diagram illustrating a radio system in a daisy chain configuration.
Figure 21B:
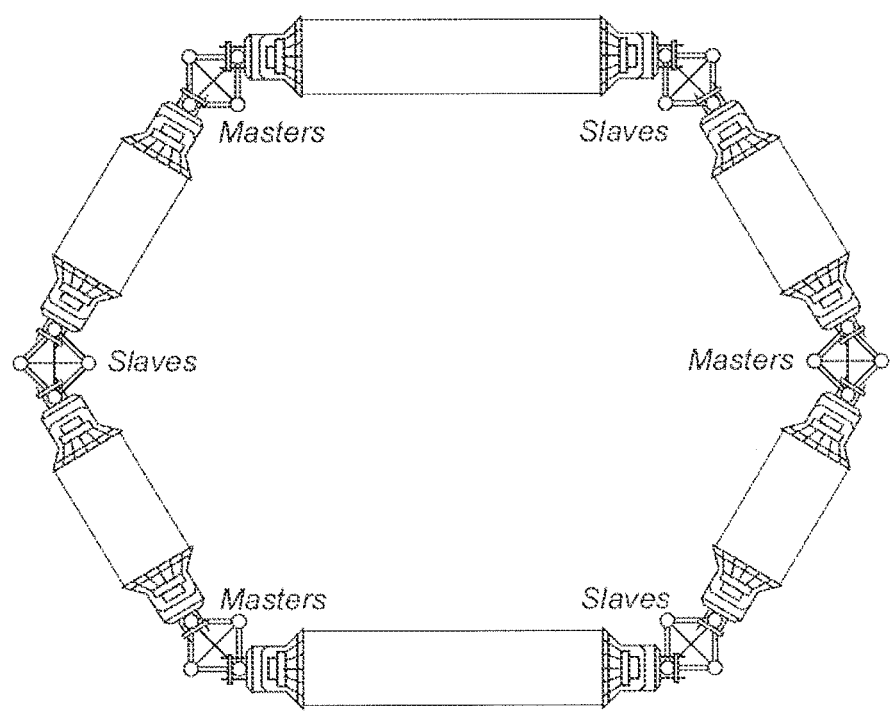
FIG. 21B presents a diagram illustrating a radio system in a ring configuration

FIG. 21A presents a diagram illustrating a radio system in a daisy chain configuration, in accordance with an embodiment of the present invention. As shown in FIG. 21A, in a daisy chain configuration, multiple radios are used to extend the distance of a link, like a relay from point to point to point. Note that the radios in the same node need to have the same master/slave configuration. FIG. 21B presents a diagram illustrating a radio system in a ring configuration, in accordance with an embodiment of the present invention. As shown in FIG. 21B, in a ring configuration, multiple radios are used to form redundant paths. When configured as a ring, if one link goes down, the other links have an alternative route available. For each link, one radio is configured as master and the other one is configured as slave. Due to the narrow bandwidth of the radios, co-location interference is not a concern in most cases. It is possible to co-locate multiple radios if they are pointed in different directions. If the radios are back-to-back, it is even possible to use the same frequency. It is recommended to use different frequencies for adjacent radios. Note that co-located radios should have the same master/slave configuration.

Before mounting the radios onto poles, the user should configure the paired radios. The radio configurations include, but are not limited to: operating mode (master or slave) of the radio, duplex mode (full-duplex or half-duplex of the link), TX and RX frequencies, and data modulation schemes. Detailed descriptions of the configuration settings are included in the following section.

Figure 22A:
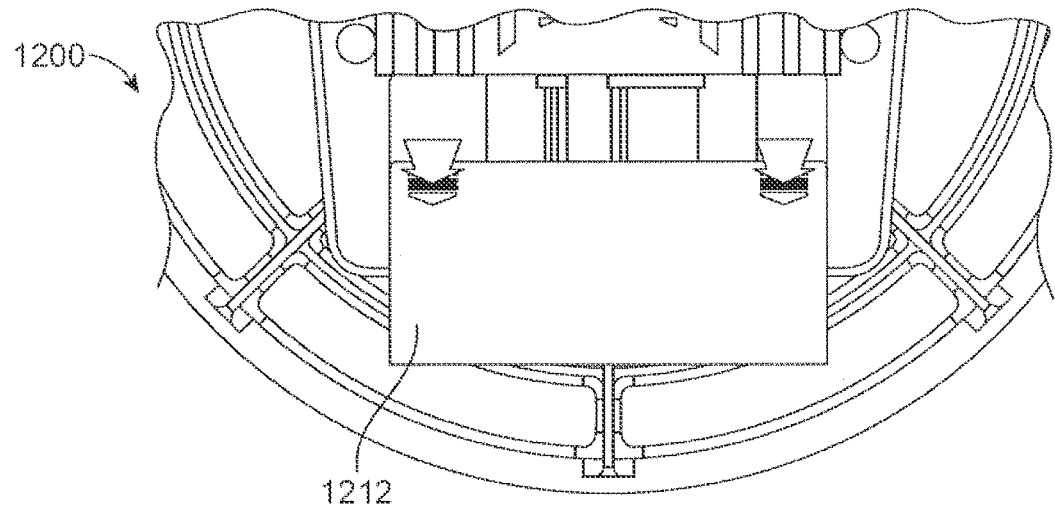
FIG. 22A presents a diagram illustrating the port cover being slid off the backside of the radio to expose various ports.

The installation steps include connecting Ethernet cables to the data and configuration ports, configuring the settings of the radio using a configuration interface, disconnecting the cables to move the radios to mounting sites, reconnecting at the mounting sites, mounting the radios, and establishing and optimizing the RF link FIG. 22A presents a diagram illustrating the port cover being slid off the backside of the radio to expose various ports, in accordance with an embodiment of the present invention. In FIG. 22A, one can slide off a port cover 1212 from the backside of the radio by pressing down on the indicator arrows.

Figure 22B:
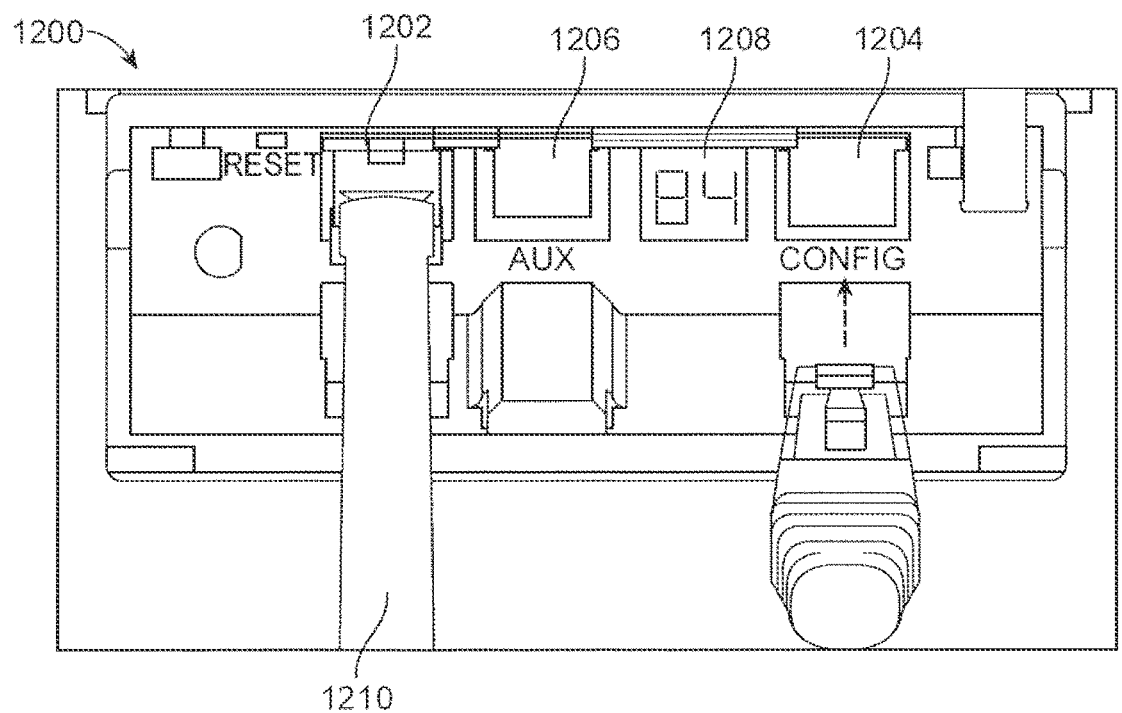
FIG. 22B presents a diagram illustrating the ports on the backside of a radio.

FIG. 22B presents a diagram illustrating the ports on the backside of a radio, in accordance with an embodiment of the present invention. In FIG. 22B, radio 1200 includes a data port 1202, a configuration port 1204, an auxiliary port 1206, and an LED display 1208. Data port 1202 not only enables upload/download of link data, but also provides power to the radio via power-over-Ethernet (PoE). During operation, an Ethernet cable, such as cable 1210, can be used to couple data port 1202 with a PoE adapter, which in turn couples to a power source. Configuration port 1204 enables communication between a user computer and the CPU of the radio, thus enabling the user to configure the settings that govern the operations of the radio. In one embodiment, an Ethernet cable can be used to couple configuration port 1204 with a computer.

Auxiliary port 1206 includes an RJ-12 connector. In one embodiment, auxiliary port 1206 can be coupled to a listening device, such as a headphone, to enable alignment of the antennas by listening to an audio tone. More specifically, while aligning the pair of antennas, one can listen to the audio tone via the listening device coupled to auxiliary port 1206; the higher the pitch, the stronger the signal strength, and thus the better the alignment. To ensure the best tuning result, it is recommended that the user iteratively adjusts the AZ and elevation of the pair of radios one by one, starting with the slave radio, until a symmetric link (with received signal levels within 1 dB of each other) is achieved. This ensures the best possible data rate between the paired radios. Note that adjusting the AZ and elevation of a radio can be achieved by adjusting the corresponding AZ and elevation bolts, as discussed in the previous section.

In addition to using the audio tone, the user can also align the paired radios based on digital values displayed by LED display 1208. More specifically, LED display 1208 displays the power level of the received signal. In one embodiment, values on LED display 1208 are displayed in negative dBm. For example, a number 61 represents a received signal level of −61 dBm. Hence, lower values indicate a stronger received signal level. While aligning the paired radios, the user can observe LED display 1208 to monitor the received signal strength. For best alignment results, a pair of installers should be used with one adjusting the AZ and elevation of a radio at one end of the link, while the other installer reports the received signal level at the other end of the link.

FIG. 22C presents a diagram illustrating the fine-tuning of the wireless link, in accordance with an embodiment of the present invention. The upper drawing shows that one installer at the end of the slave radio sweeps the AZ-adjustment bolt and then sweeps the elevation-adjustment bolt (as indicated by the arrows in the drawing) until the other installer sees the strongest received signal level displayed on the LED display of the master radio. The lower drawing shows that the installer at the end of the master radio sweeps the AZ-adjustment bolt and then sweeps the elevation-adjustment bolt (as indicated by the arrows in the drawing) until the other installer sees the strongest received signal level displayed on the LED display of the slave radio. During alignment, the installers alternate adjustments between the paired radios until a symmetric link is achieved. Subsequently, the installers can lock the alignment on both radios by tightening all eight lock bolts on the alignment bracket. The installers should observe the LED display on each radio to ensure that the value remains constant. If the LED value changes during the locking process, the installers can loosen the lock bolts, finalize the alignment of each radio again, and retighten the lock bolts.

The radio configurations include, but are not limited to: operating mode (master or slave) of the radio, duplex mode (full-duplex or half-duplex of the link), TX and RX frequencies, and data modulation schemes. Detailed descriptions of the configuration settings are included in the following section.

Modes of Operation

Any of the radio devices described herein may be operated in one or more (e.g., and may dynamically or manually be adjusted between) different operating modes, which may include any appropriate duplexing mode (e.g., time-division duplexing, frequency-division duplexing, etc.). In addition, the operating mode of any appropriate duplexing configuration may selectively use different diversities (SISO, SIMO, MISO, MIMO). In particular, the apparatuses described herein may be configured to operate using spatially multiplexed multiple-input, multiple-output (MIMO). If a MIMO link is to be used, the apparatuses described herein may be configured to increase the signal-to-impairments ratio of a MIMO communication link.

In a wireless digital communication system using MIMO, deteriorating RF channel causes increased error rate that overcomes any adaptive modulation and coding mechanism even at the QPSK modulation and the lowest coding selection. Described below are apparatus configurations and methods that may extend the range of a wireless link by combining multiple transmitters in sending data and the multiple receivers in receiving and decoding date, without disturbing MIMO processing of the waveforms. This may prevent undesirable unintended beamforming associated with emissions of identical or highly correlated signals by distinct antennas. In combination with the wireless digital apparatuses and methods described above, this increase signal-to impairment ratio for a MIMO link may be particularly effective.

In general, effective signal-to-impairments ratio at the receiving node of a communication link may be increased by using multiple available paths formed by all the available Tx and Rx pairs to transport the same original data, without changing the basic MIMO implementation such as modulation and allocation of subcarriers that carry reference signals.

When a MIMO communication link operates near the design limits imposed by modulation, coding, noise figure of the receiver, impairments in the communication channel, and transmit power, further tradeoff between data rate and communication range is obtained by such means as repetition coding and resorting to simpler coding (BPSK is the lowest sensible choice); the apparatuses and methods described herein do not preclude application of these methods. Depending on other factors, use of a single transmitter and increasing its transmit power is sometimes possible, but in general, due to factors such as cost of amplifiers, power draw and heat dissipation, is not desirable or practical. Considering operation of an outdoor wireless link, where the dominant method of obtaining two paths is via orthogonal polarizations, reduction of the number active transmitters to one requires implementation of exceptional processing at the receiver.

Methods of increasing signal-to-impairments ratio in a MIMO system may apply to the simplest modulations such as QPSK and BPSK. For example, data to be transmitted by M separate transmitter chains in a MIMO connection may be coded using a different binary sequence by each chain. The main requirement may be to de-correlate the waveforms emitted by the individual antennas and thus virtually eliminate unintended beam-forming. In general, for each transmitter, there may be two binary scrambling sequences: one for the "I" and another for "Q" components of the data phasors. Thus, 2 M such sequences can to be defined. They may be formed by replication of shorter segments, but altogether they may be of a length corresponding to the number of modulated subcarriers.

For example, in a MIMO systems with two transmit chains and two receive chains in each communicating node, with 1024 FFT, and 800 data-modulated subcarriers, four 800-bit scrambling sequences may be used (two for each channel), selected for very low cross-correlation. In case of BPSK-modulated data, two sequences may suffice. In the context of the radio systems described above, a wireless radio system may be configured having a dedicated Tx reflector with two (or more) Txs connected to it, and a dedicated Rx reflector fed by two (or more) Rxs.

Any appropriate computational methods can be used. For example, data to be transmitted can be mapped to the magnitude of the "I" and "Q" components of the subcarrier phasor first, followed by "+1" or "−1" multiplication. In another example, an XOR operation between the "I" component of data bit and the corresponding bit from the scrambling sequence, and similarly for the "Q" component may be applied and followed by the mapping of data to the subcarriers.

As an example, in which the first computational method is used, each transmitter performs multiplication (say the customary multiplication by one if the scrambling bit is "0" and by minus one if the scrambling bit is "1") of the "I" or "Q" component of the phasor. The result can then be used for generating the time-domain digital waveform, using an IFFT or first FFT followed by IFFT as is done with SC-FDMA. The resulting waveforms emitted by each antenna will be virtually de-correlated. The receiver may use the reference signals for channel estimation and channel matrix computation, separating the data received on each channel. The components of the phasors (in each data subcarrier) are then multiplied by "+1" or "−1" according to the scrambling sequences (that are known to the receiver), followed by addition (or averaging or some more elaborate algorithm not subject of this invention) so that an estimate of the received phasor is obtained with better signal-to-impairments ratio, before with further processing, such as error correction, is performed.

Any of the apparatuses described herein may be configured to improve signal to impairment ratio of a spatially multiplexed multiple-input, multiple-output (MIMO) link between a transmitter and a receiver.

For example, a method of improving a MIMO link in a device having a transmitter and a receiver that communicates with another device (e.g., point-to-point) having a transmitter and a receiver, as illustrated above, may include: communicating in a robust control channel between the transmitter and the receiver; operating the transmitter in a first transmission mode, wherein the first transmission mode comprises a spatially multiplexed MIMO mode wherein a first signal is divided into a plurality of sub-signals, each sub-signal encoding different portions of the first signal, and wherein the sub-signals are concurrently transmitted in a second channel from different transmission antennas; determining a signal impairment ratio of the transmitted sub-signals; switching from the first transmission mode to a second transmission mode based on the signal impairment ratio, wherein the second transmission mode comprises a de-correlated duplication mode wherein one or more duplicates of a second signal are each modified to be de-correlated relative to the second signal and relative to each other, and wherein the second signal and the one or more de-correlated duplicates are concurrently transmitted in the second channel from different transmission antennas. The method may also include comprising transmitting an indicator of an operating mode in the control channel.

In general, switching may include: de-correlating the one or more duplicates of the second signal and the second signal by applying a mathematical operation using scrambling sequences to each of the one or more duplicates of the second signal so that the second signal and the one or more scrambling sequences are all de-correlated with each other.

Any appropriate mathematical operator may be applied. For example, applying a mathematical operator may comprise multiplying "+1" for "0" scrambling bits and by "−1" for "1" scrambling bits. Applying a mathematical operator may perform an XOR between each duplicate and scrambling sequence.

Switching may include concurrently transmitting the one or more de-correlated duplicates using an ODFM protocol from the different transmission antennas. In general, the method may include switching an operating mode of the receiver based on a transmission mode of the transmitter.

Any of these methods may include switching from a spatially multiplexed MIMO receiving mode to a de-correlated duplication mode when the transmitter is operating in the second transmission mode.

Configuration Interface

In addition to hardware, the radio system may further includes a configuration interface, which is an operating system capable of powerful wireless and routing features, built upon a simple and intuitive user interface foundation. In one embodiment, a user can access the configuration interface for easy configuration and management via a web browser. Note that the configuration interface can be accessed in two different ways. More specifically, one can use the direct coupling to the configuration port to achieve out-of-band management. In addition, in-band management is available via the local data port or the data port at the other end of the link.

In some variations, before accessing the communication interface, the user needs to make sure that the host machine is connected to the LAN that is connected to the configuration port on the radio being configured. The user may also need to configure the Ethernet adapter on the host system with a static IP address, such as one on the 192.168.1.x subnet (for example, 192.168.1.100). Subsequently, the user can launch the web browser, and type http://192.168.1.20 in the address field and press enter (PC) or return (Mac). In one embodiment, a login window appears, prompting the user for a username and password. After a standard login process, the configuration interface will appear, allowing the user to customize radio settings as needed.

Figure 23:
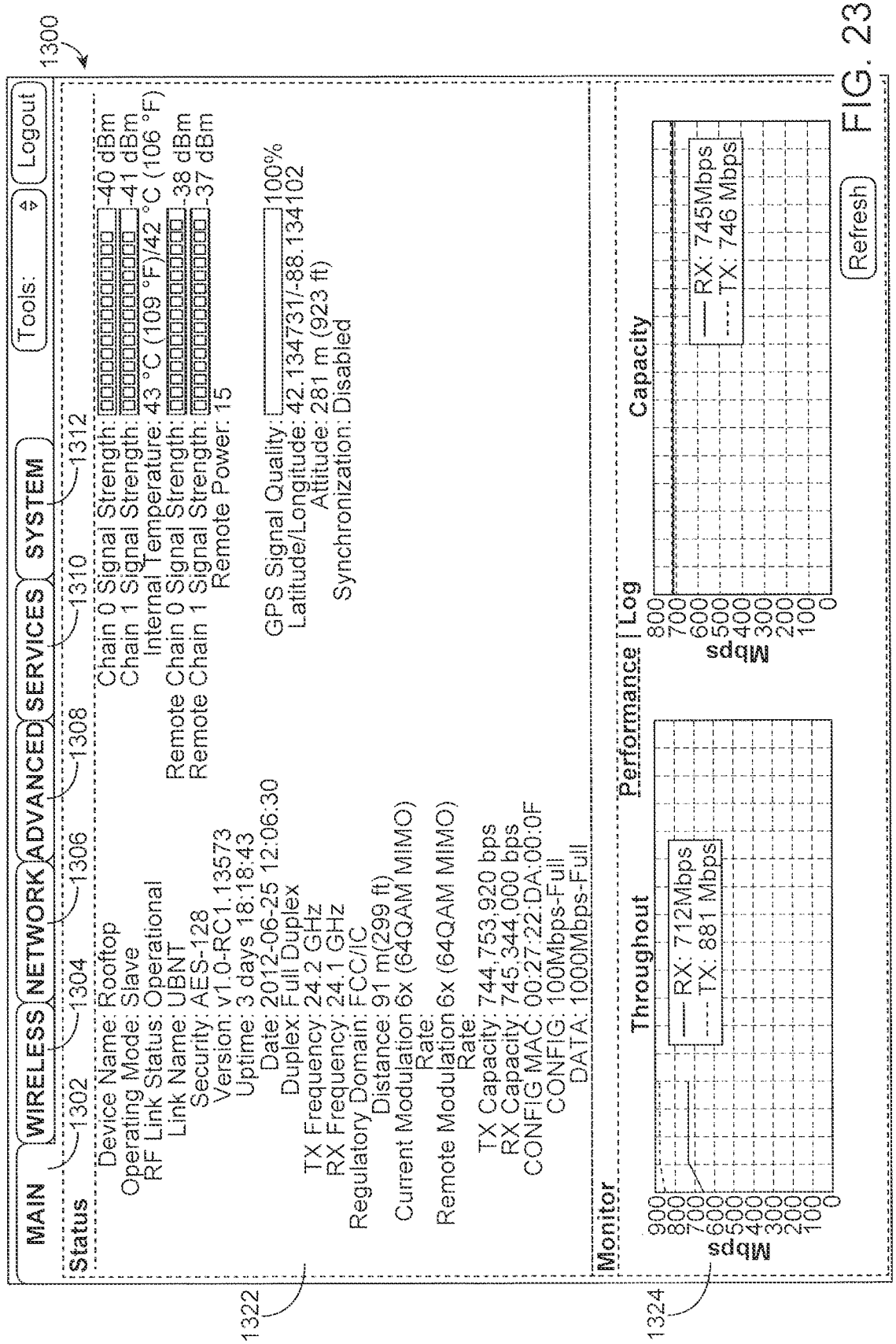
FIG. 23 presents a diagram illustrating an exemplary view of a configuration interface.

FIG. 23 presents a diagram illustrating an exemplary view of the configuration interface, in accordance with an embodiment of the present invention. In FIG. 23, configuration interface 1300 includes six main tabs, each of which provides a web-based management page to configure a specific aspect of the radio. More specifically, configuration interface 1300 includes a main tab 1302, a wireless tab 1304, a network tab 1306, an advanced tab 1308, a services tab 1310, and a system tab 1312.

In some variations, the main tab 1302 displays device status, statistics, and network monitoring links. Wireless tab 1304 configures basic wireless settings, including the wireless mode, link name, frequency, output power, speed, RX Gain, and wireless security. Network tab 1306 configures the management network settings, Internet Protocol (IP) settings, management VLAN, and automatic IP aliasing. Advanced tab 1308 provides more precise wireless interface controls, including advanced wireless settings and advanced Ethernet settings. Services tab 1310 configures system management services: ping watchdog, Simple Network Management Protocol (SNMP), servers (web, SSH, Telnet), Network Time Protocol (NTP) client, dynamic Domain Name System (DDNS) client, system log, and device discovery. System tab 1312 controls system maintenance routines, administrator account management, location management, device customization, firmware update, and configuration backup. The user may also change the language of the web management interface under system tab 1312.

As shown in FIG. 23, when main tab 1302 is active, configuration interface 1300 presents two display areas, an area 1322 for displaying various status information, and an area 1324 for displaying outputs of monitoring tools.

In the example shown in FIG. 23, area 1322 displays a summary of link status information, current values of the basic configuration settings, and network settings and information. Items displayed in area 1322 include, but are not limited to: device name, operating mode, RF link status, link name, security, version, uptime, date, duplex, TX frequency, RX frequency, regulatory domain, distance, current modulation rate, remote modulation rate, TX capacity, RX capacity, CONFIG MAC, CONFIG, data, chain 0/1 signal strength, internal temperature, remote chain 0/1 signal strength, remote power, GPS signal quality, latitude/longitude, altitude, and synchronization.

Device name displays the customizable name or identifier of the device. The device name (also known as the host name) is displayed in registration screens and discovery tools. Operating mode displays the mode of the radio: slave, master, or reset. RF link status displays the status of the radio: RF off, syncing, beaconing, registering, enabling, listening, or operational. Link name displays the customizable name or identifier of the link Security displays the encryption scheme, where AES-128 is enabled at all times.

Version displays the software version of the radio configuration interface. Uptime is the total time the device has been running since the latest reboot (when the device was powered up) or software upgrade. This time is displayed in days, hours, minutes, and seconds. Date displays the current system date and time in YEAR-MONTH-DAY HOURS:MINUTES:SECONDS format. The system date and time are retrieved from the Internet using NTP (Network Time Protocol). The NTP client is enabled by default on the Services tab. The radio does not have an internal clock, and the date and time may be inaccurate if the NTP client is disabled or the device is not connected to the Internet.

Duplex displays full-duplex or half-duplex. As discussed in the previous section, full-duplex mode allows communication in both directions simultaneously, and half-duplex mode allows communication in one direction at a time, alternating between transmission and reception.

TX frequency displays the current transmit frequency. The radio uses the radio frequency specified to transmit data. RX frequency displays the current receive frequency. The radio uses the radio frequency specified to receive data. Regulatory domain displays the regulatory domain (FCC/IC, ETSI, or Other), as determined by country selection. Distance displays the distance between the paired radios.

Current modulation rate displays the modulation rate, for example: 6× (64QAM MIMO), 4× (16QAM MIMO), 2× (QPSK MIMO), 1× (QPSK SISO), and ¼× (QPSK SISO). Note that if Automatic Rate Adaptation is enabled on the wireless tab, then current modulation rate displays the current speed in use and depends on the maximum modulation rate specified on the wireless tab and current link conditions. Remote modulation rate displays the modulation rate of the remote radio: 6× (64QAM MIMO), 4× (16QAM MIMO), 2× (QPSK MIMO), 1× (QPSK SISO), and ¼× (QPSK SISO).

TX capacity displays the potential TX throughput, how much the radio can send, after accounting for the modulation and error rates. RX capacity displays the potential RX throughput, how much the radio can receive, after accounting for the modulation and error rates.

CONFIG MAC displays the MAC address of the configuration port. CONFIG displays the speed and duplex of the configuration port. Data displays the speed and duplex of the data port. Chain 0/1 signal strength displays the absolute power level (in dBm) of the received signal for each chain. Changing the RX Gain on the wireless tab does not affect the signal strength values displayed on the main tab. However, if "overload" is displayed to indicate overload condition, decrease the RX Gain.

Internal temperature displays the temperatures inside the radio for monitoring. Remote chain 0/1 signal strength displays the absolute power level (in dBm) of the received signal for each chain of the remote radio. Remote power displays the maximum average transmit output power (in dBm) of the remote radio. GPS signal quality displays GPS signal quality as a percentage value on a scale of 0-100%. Latitude and longitude are displayed based on GPS tracking, reporting the device's current latitude and longitude. In some variations, clicking the link opens the reported latitude and longitude in a browser, for example, using Google Maps™ (registered trademark of Google Inc. of Menlo Park, California). Altitude is displayed based on GPS tracking, reporting the device's current altitude relative to sea level. Synchronization displays whether the radio uses GPS to synchronize the timing of its transmissions. In some variation, the option of synchronization using GPS may be disabled. In some variation, the radio can be configured without a GPS receiver or other GPS tracking electronics.

Area 1324 displays outputs of two monitoring tools that are accessible via the links on the main tab, performance and log. The default is performance, which is displayed when the main tab is opened, as shown in FIG. 23. In FIG. 23, area 1324 displays two charts, the throughput chart and the capacity chart. The throughput chart displays the current data traffic on the data port in both graphical and numerical form. The capacity chart displays the potential data traffic on the data port in both graphical and numerical form. For both charts the chart scale and throughput dimension (Bps, Kbps, Mbps) change dynamically depending on the mean throughput value, and the statistics are updated automatically. If there is a delay in the automatic update, one can click the refresh button to manually update the statistics. When the log link is selected and logging is enabled, area 1324 displays all registered system events. By default, logging is not enabled.

Figure 24:
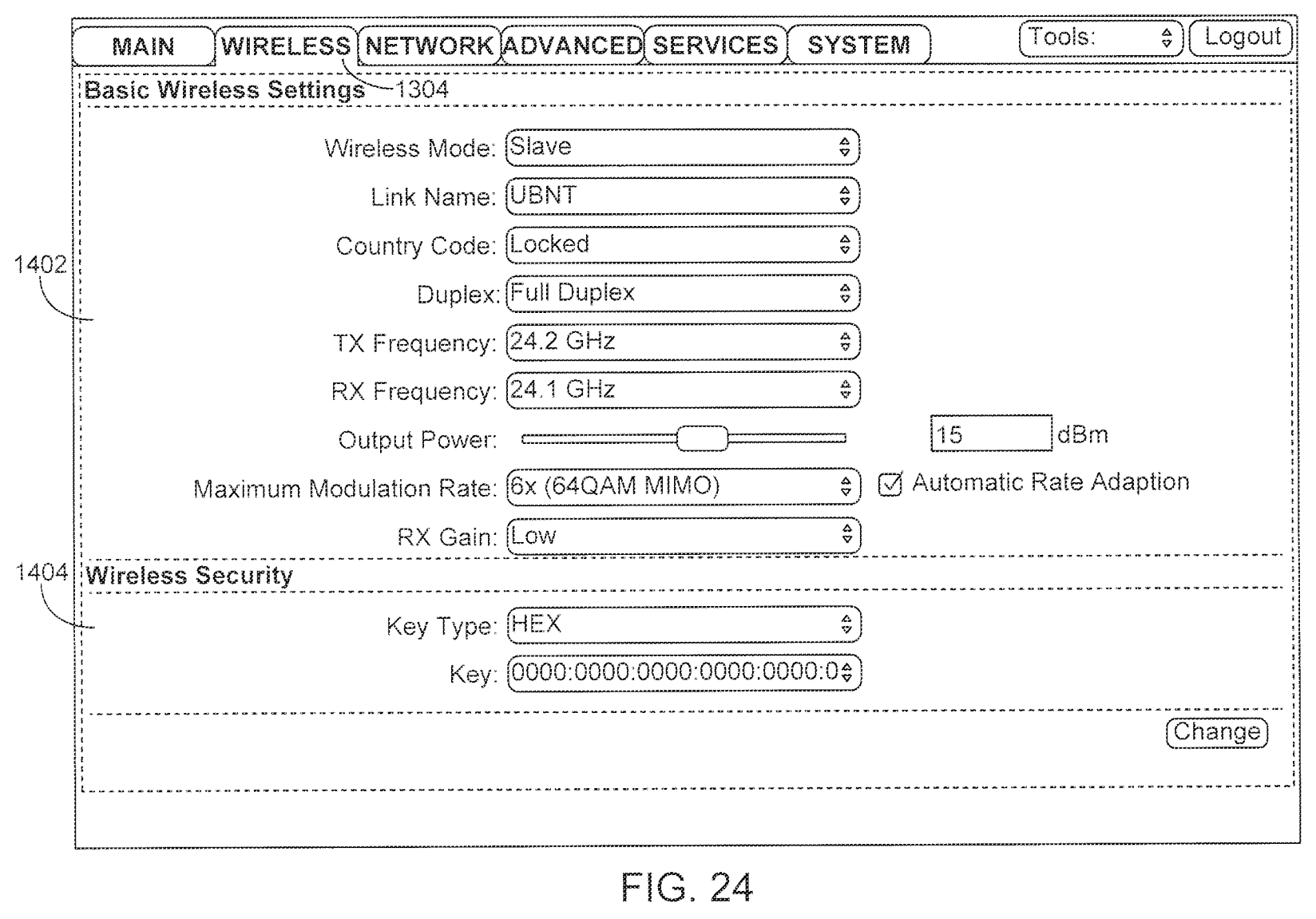

FIG. 24 presents a diagram illustrating an exemplary view of the configuration interface, in accordance with an embodiment of the present invention. As shown in FIG. 24, when wireless tab 1304 is active, two display areas are presented to the user, including an area 1402 for displaying basic wireless settings and an area 1404 for displaying wireless security settings. The change button allows the user to save or test the changes. When a user clicks on the change button, a new message appears (not shown in FIG. 24), providing the user with three options. The user can immediately save the changes by clicking on an apply button. To test the changes, the user can click a test button. To keep the changes, click the apply button. If the user does not click apply within 180 seconds (the countdown is displayed), the radio times out and resumes its earlier configuration. To cancel the changes, the user can click the discard button.

In some variations, the basic wireless settings include, but are not limited to: wireless mode, link name, country code, duplex mode, frequencies, output power, speed, and gain. The wireless mode can be set as master or slave. By default, the wireless mode is set as slave. For paired radios, one needs to be configured as master because each point-to-point link must have one master. Link name is the name for the point-to-point link A user can enter a selected name in the field of the link name.

Because each country has its own power level and frequency regulations, to ensure that the radio operates under the necessary regulatory compliance rules, the user may select the country where the radio will be used. The frequency settings and output power limits will be tuned according to the regulations of the selected country. In some variations, the U.S. product versions are locked to the U.S. country code, as illustrated in FIG. 24, to ensure compliance with government regulations.

In this example, the duplex field includes two selections: half-duplex or full-duplex. The TX frequency field allows the user to select a transmit frequency. Note that the TX frequency on the master should be used as the RX frequency on the slave, and vice versa. The RX frequency field allows a user to select a receive frequency. The output power field defines the maximum average transmit output power (in dBm) of the radio. A user can use the slider or manually enter the output power value. The transmit power level maximum is limited according to the country regulations. The maximum modulation rate field displays either the maximum modulation rate or the modulation rate. Note that higher modulations support greater throughput but generally require stronger RF signals and higher signal-to-noise ratio (SNR). In some variations, by default, automatic rate adaptation is enabled, as shown in FIG. 24, and the maximum modulation rate is displayed. This allows the radio to automatically adjust the modulation rate to changing RF signal conditions. Under certain conditions, a user may prefer to lock the maximum modulation rate to a lower setting to improve link performance. When automatic rate adaptation is disabled, the modulation rate is displayed, and the user can lock the modulation rate to a selected setting. In some variations, there are five possible modulation choices: 6× (64QAM MIMO), 4× (16QAM MIMO), 2× (QPSK MIMO), 1× (QPSK SISO), and ¼× (QPSK SISO). The RX Gain field allows the user to select the appropriate gain for the RX antenna: high (default) or low. One can select RX Gain as low if the link is very short or being tested to prevent the signal from being distorted.

In FIG. 24, area 1404 displays wireless security settings, where 128-bit, AES (Advanced Encryption Standard) encryption is used at all times. The security settings include a key type field, which specifies the character format (HEX or ASCII), and a key field, which specifies the format of the MAC address.

Note that the same wireless settings should be applied to the radio at the other end of the point-to-point link with the exception of the wireless mode (one needs to be configured as master and the other as slave), and the TX and RX frequencies (the TX frequency on the master should be used as the RX frequency on the slave, and vice versa).

Figure 25:
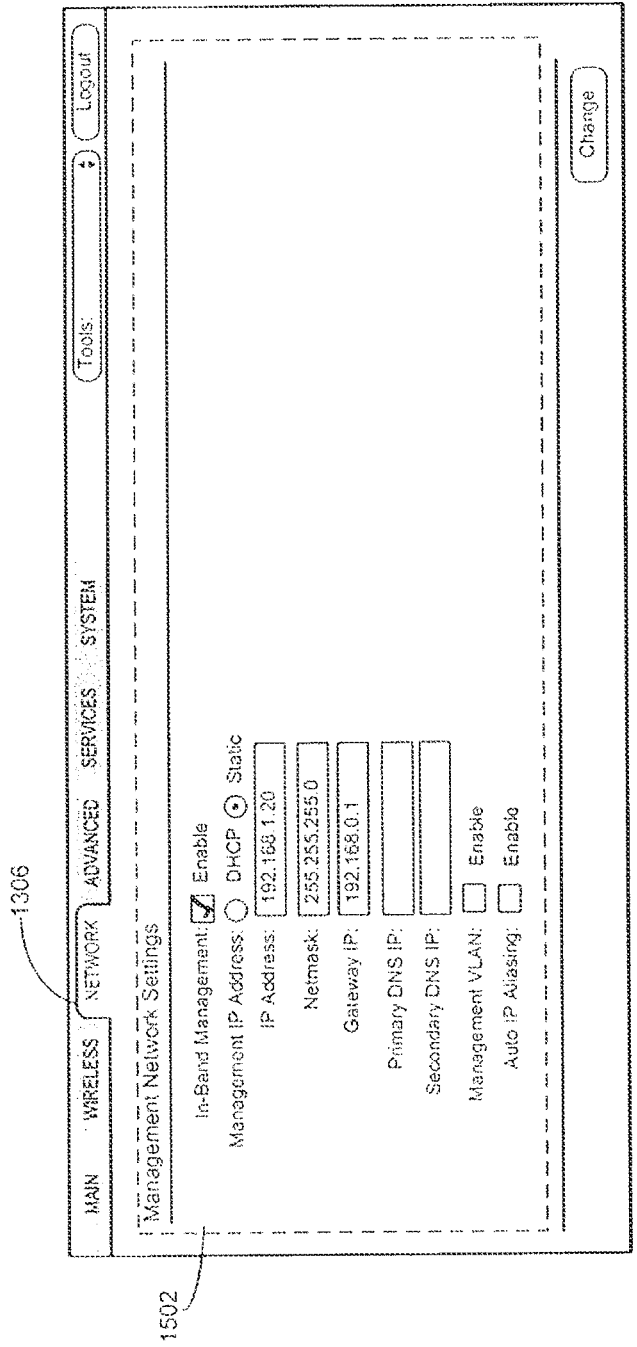
FIG. 25 is a diagram illustrating an exemplary view of a configuration interface.

FIG. 25 presents a diagram illustrating an exemplary view of the configuration interface, in accordance with an embodiment of the present invention. As shown in FIG. 25, when network tab 1306 is active, a display area 1502 is presented to the user, which allows the user to configure settings for the management network. The change button allows a user to save or test the changes.

The in-band management field allows a user to enable or disable in-band management, which is available via the data port of the local radio or the data port of the remote radio. In-band management is enabled by default, as shown in FIG. 25. Out-of-band management is available via the configuration port, which is enabled by default. The configuration port and the in-band management share the default IP address of 192.168.1.20.

The management IP address field includes two choices: DHCP or static. When DHCP is selected, the local DHCP server assigns a dynamic IP address, gateway IP address, and DNS address to the radio. It is recommended to choose the static option, where a static IP address is assigned to the radio, as shown in FIG. 25.

When a static IP address is selected, area 1502 displays the following fields: IP address, netmask, gateway IP, primary DNS IP, secondary DNS IP, management VLAN, and auto IP aliasing. The IP address field specifies the IP address of the radio. This IP will be used for device management purposes. When the netmask is expanded into its binary form, the netmask field provides a mapping to define which portions of the IP address range are used for the network devices and which portions are used for host devices. The netmask defines the address space of the radio's network segment. For example, in FIG. 25, the netmask field displays 255.255.255.0 (or "/24"), which is commonly used on many Class C IP networks.

The gateway IP is the IP address of the host router, which provides the point of connection to the Internet. This can be a DSL modem, cable modem, or WISP gateway router. The radio directs data packets to the gateway if the destination host is not within the local network. The primary DNS IP specifies the IP address of the primary DNS (Domain Name System) server. The secondary DNS IP specifies the IP address of the secondary DNS server. Note that this entry is optional and used only if the primary DNS server is not responding.

The management VLAN field allows the user to enable the management VLAN, which results in the system automatically creating a management Virtual Local Area Network (VLAN). In some variations, when management VLAN is enabled, a VLAN ID filed appears (not shown in the figure) to allow the user to enter a unique VLAN ID from 2 to 4094. When the auto IP aliasing option is enabled, the system automatically generates an IP address for the corresponding WLAN/LAN interface. The generated IP address is a unique Class B IP address from the 169.254.X.Y range (netmask 255.255.0.0), which is intended for use within the same network segment only. The auto IP always starts with 169.254.X.Y, with X and Y being the last two octets from the MAC address of the radio. For example, if the MAC address is 00:15:6D:A3:04:FB, then the generated unique auto IP will be 169.254.4.251. The hexadecimal value, FB, converts to the decimal value, 251. This auto IP aliasing setting can be useful because the user can still access and manage devices even if the user loses, misconfigures, or forgets their IP addresses. Because an auto IP address is based on the last two octets of the MAC address, the user can determine the IP address of a device if he knows its MAC address.

Figure 26:
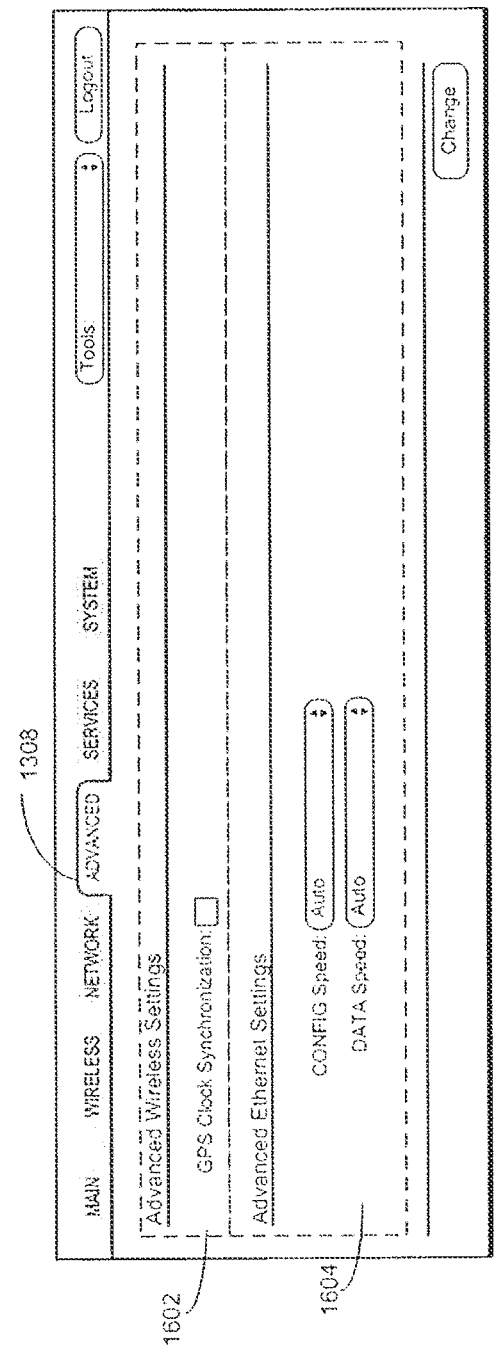
FIG. 26 presents a diagram illustrating an exemplary view of a configuration interface.

FIG. 26 presents a diagram illustrating an exemplary view of the configuration interface, in accordance with an embodiment of the present invention. As shown in FIG. 26, when advanced tab 1308 is active, display areas 1602 and 1604 are presented to the user, which allow the user to configure advanced wireless and Ethernet settings, respectively. Display area 1602 includes a GPS clock synchronization field, which allows the user to enable or disable the use of GPS to synchronize the timing of its transmissions. By default, option is disabled, as shown in FIG. 26. Display area 1604 includes a CONFIG speed field and a data speed field. The CONFIG speed field allows the user to set the speed of the configuration port. By default, this option is auto, as shown in FIG. 26, where the radio automatically negotiates transmission parameters, such as speed and duplex, with its counterpart. A user can also manually specify the maximum transmission link speed and duplex mode by selecting one of the following options: 100 Mbps-full, 100 Mbps-half, 10 Mbps-full, or 10 Mbps-half. The data speed field allows the user to set the data speed. By default, this option is auto, as shown in FIG. 26. When negotiating the transmission parameters, the networked devices first share their capabilities and then choose the fastest transmission mode they both support. The change button allows a user to save or test the changes.

Figure 27:
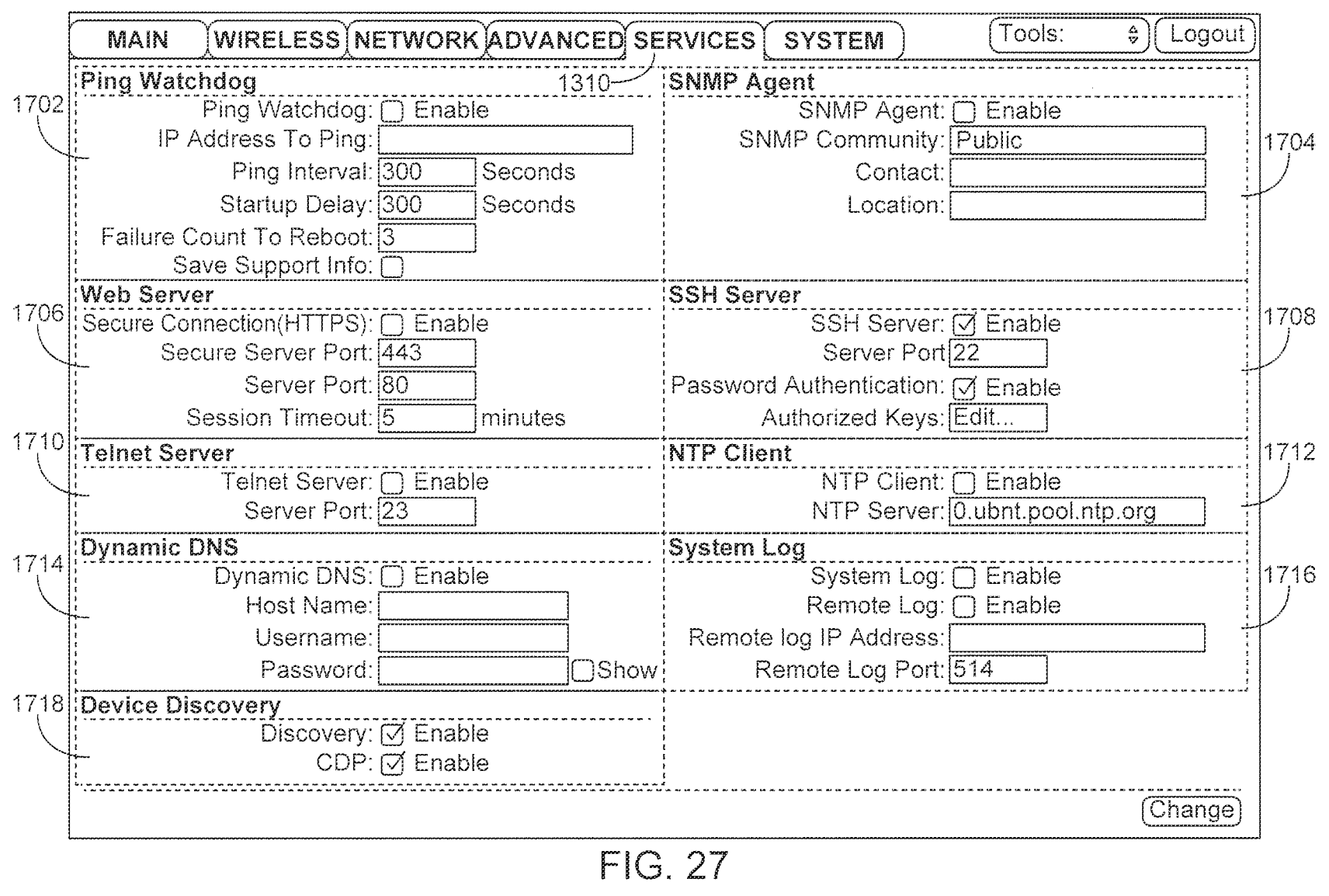

FIG. 27 presents a diagram illustrating an exemplary view of the configuration interface, in accordance with an embodiment of the present invention. As shown in FIG. 27, when services tab 1310 is active, a number of display areas are presented to the user to allow the user to configure system management services, including but not limited to: ping watchdog, SNMP agent, web server, SSH server, Telnet server, NTP client, dynamic DNS, system log, and device discovery. The change button allows the user to save or test the changes.

In some variations, ping watchdog sets the radio to continuously ping a user-defined IP address (it can be the Internet gateway, for example). If it is unable to ping under the user-defined constraints, then the radio will automatically reboot. This option creates a kind of "fail-proof" mechanism. Ping watchdog is dedicated to continuous monitoring of the specific connection to the remote host using the ping tool. The ping tool works by sending ICMP echo request packets to the target host and listening for ICMP echo response replies. If the defined number of replies is not received, the tool reboots the radio. As shown in FIG. 27, a user can enable the ping watchdog option to activate the fields in display area 1702, which include an IP address to ping field, a ping interval field, a startup delay field, a failure count to reboot field, and a save support info option.

The IP address to ping field specifies the IP address of the target to be monitored by the ping watchdog. The ping interval field specifies the time interval (in seconds) between the ICMP echo requests that are sent by the Ping watchdog. The default value is 300 seconds. The startup delay field specifies the initial time delay (in seconds) until the first ICMP echo requests are sent by the ping watchdog. The default value is 300 seconds. The startup delay value should be at least 60 seconds because the network interface and wireless connection initialization takes a considerable amount of time if the radio is rebooted. The failure count to reboot field specifies a number of ICMP echo response replies. If the specified number of ICMP echo response packets is not received continuously, the ping watchdog will reboot the radio. The default value is 3. The save support info option generates a support information file when enabled.

Simple Network Monitor Protocol (SNMP) is an application layer protocol that facilitates the exchange of management information between network devices. Network administrators use SNMP to monitor network-attached devices for issues that warrant attention. The radio includes an SNMP agent, which does the following: provide an interface for device monitoring using SNMP, communicate with SNMP management applications for network provisioning, allow network administrators to monitor network performance and troubleshoot network problems.

In some variations, as shown in FIG. 27, a user can enable the SNMP agent, and the fields in display area 1704, which include SNMP community, contact, and location, are activated. The SNMP community field specifies the SNMP community string. It is required to authenticate access to Management Information Base (MIB) objects and functions as an embedded password. The radio also supports a read-only community string; authorized management stations have read access to all the objects in the MIB except the community strings, but do not have write access. The radio supports SNMP v1. The default SNMP community is public. The contact field specifies the contact that should be notified in case of emergency. The location field specifies the physical location of the radio.

As shown in FIG. 27, configuration options of the web server are displayed in display area 1706, including an option to enable secure connection (HTTPS), a secure server port field (active only when HTTPS is enabled), a server port field, and a session timeout field. When the secure connection is enabled, the web server uses the secure HTTPS mode. When secure HTTPS mode is used, the secure server port field specifies the TCP/IP port of the web server. If the HTTP mode is used, the server port field specifies the TCP/IP port of the web server, as shown in FIG. 27. The session timeout field specifies the maximum timeout before the session expires. Once a session expires, the user needs to log in again using the username and password.

A number of SSH server parameters can be set in display area 1708. The SSH server option enables SSH access to the radio. When SSH is enabled, the server port field specifies the TCP/IP port of the SSH server. When the password authentication option is enabled, the user needs to be authenticated using administrator credentials to gain SSH access to the radio; otherwise, an authorized key is required. A user can click edit in the authorized keys field to import a public key file for SSH access to the radio instead of using an admin password.

The Telnet server parameter can be set in display area 1710. When the Telnet server option is enabled, the system activates Telnet access to the radio, and the server port field specifies the TCP/IP port of the Telnet server.

Network Time Protocol (NTP) is a protocol for synchronizing the clocks of computer systems over packet-switched, variable-latency data networks. One can use it to set the system time on the radio. If the log option is enabled, then the system time is reported next to every log entry that registers a system event. The NTP client parameter can be set in display area 1712. When the NTP client option is enabled, the radio obtains the system time from a time server on the Internet. The NTP server field specifies the IP address or domain name of the NTP server.

Domain Name System (DNS) translates domain names to IP addresses; each DNS server on the Internet holds these mappings in its respective DNS database. Dynamic Domain Name System (DDNS) is a network service that notifies the DNS server in real time of any changes in the radio's IP settings. Even if the radio's IP address changes, one can still access the radio through its domain name. The dynamic DNS parameters can be set in display area 1714. When the dynamic DNS option is enabled, the radio allows communication with the DDNS server. To do so, the user needs to enter the host name of the DDNS server in the host name field, the user name of the DDNS account in the username field, and the password of the DDNS account in the password field. When the box next to the show option is checked, the password characters are shown.

The system log parameters can be set in display area 1716. Enabling the system log option enables the registration routine of system log (syslog) messages. By default it is disabled. When enabled, the remote log option enables the syslog remote sending function. As a result, system log messages are sent to a remote server, which is specified in the remote log IP address and remote log port fields. The remote log IP address field specifies the host IP address that receives the syslog messages. One should properly configure the remote host to receive syslog protocol messages. The remote log port field specifies the TCP/IP port that receives syslog messages. 514 is the default port for the commonly used system message logging utilities, as shown in FIG. 27.

Every logged message contains at least a system time and host name. Usually a specific service name that generates the system event is also specified within the message. Messages from different services have different contexts and different levels of detail. Usually error, warning, or informational system service messages are reported; however, more detailed debug level messages can also be reported. The more detailed the system messages reported, the greater the volume of log messages generated.

The device discovery parameters can be set in display area 1718. More specifically, a user can enable the discovery option in order for the radio to be discovered by other devices through the discovery tool. A user can also enable the Cisco Discovery Protocol (CDP) option, so the radio can send out CDP packets to share its information.

Figure 28:
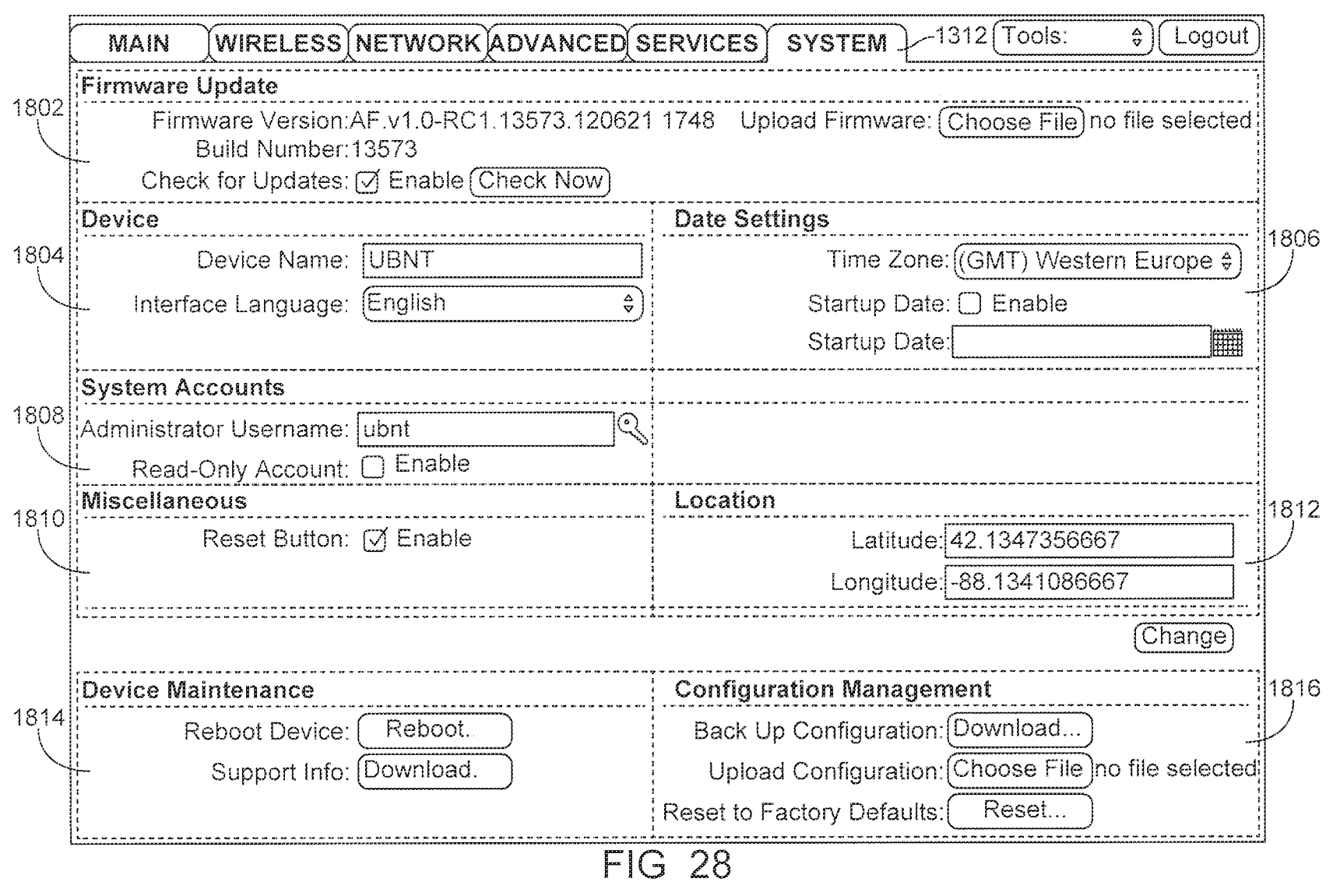

FIG. 28 presents a diagram illustrating an exemplary view of the configuration interface, in accordance with an embodiment of the present invention. As shown in FIG. 28, when system tab 1312 is active, a number of display areas are presented to the user to provide the user with a number of administrative options. More specifically, this page enables the administrator to reboot the radio, reset it to factory defaults, upload new firmware, back up or update the configuration, and configure the administrator account. The change button allows the user to save and test the changes.

The firmware maintenance is managed by the various fields in firmware update display area 1802. The firmware version field displays the current firmware version. The build number field displays the build number of the firmware version. The check for updates option is enabled by default to allow the firmware to automatically check for updates. To manually check for an update, the user can click the check now button. One can click the upload firmware button to update the radio with new firmware. The radio firmware update is compatible with all configuration settings. The system configuration is preserved while the radio is updated with a new firmware version. However, it is recommended that the user backs up the current system configuration before updating the firmware. Updating the firmware is a three-step procedure. First, click the choose file button to locate the new firmware file. In a subsequently appearing window (not shown in FIG. 28), select the file and click open. Second, click the upload button to upload the new firmware to the radio. Third, once the uploaded firmware version is displayed, click the update button to confirm. If the firmware update is in process, the user can close the firmware update window, but this does not cancel the firmware update. The firmware update routine can take three to seven minutes. The radio cannot be accessed until the firmware update routine is completed.

Device display area 1804 displays the device name and the interface language. The device name (host name) is the system-wide device identifier. The SNMP agent reports it to authorized management stations. The device name will be used in popular router operating systems, registration screens, and discovery tools. The interface language field allows a user to select the language displayed in the web management interface. English is the default language.

Data settings display area 1806 displays time zone and startup date. The time zone field specifies the time zone in relation to Greenwich Mean Time (GMT). A user can enable the startup date option to change the radio's startup date. The startup date field specifies the radio's startup date. The user can click the calendar icon or manually enter the date in the following format: MM/DD/YYYY. For example, for Apr. 5, 2012, enter 04/05/2012 in the startup date field.

System accounts display area 1808 allows the user to change the administrator password to protect the device from unauthorized changes. It is recommended that the user changes the default administrator password when initially configuring the device. Note that the read-only account check box enables the read-only account, which can only view the main tab.

Miscellaneous display area 1810 includes a reset button option. Enabling the reset button allows the use of the radio's physical reset button. To prevent an accidental reset to default settings, uncheck the box.

Location display area 1812 includes a latitude field and a longitude field. After the on-board GPS determines the location of the radio, its latitude and longitude are displayed in the respective fields. If the GPS does not have a fix on its location, then "searching for satellites" will be displayed.

Device maintenance display area 1814 enables management of the radio's maintenance routines: reboot and support information reports. When the reboot button is clicked, the configuration interface initiates a full reboot cycle of the radio. Reboot is the same as the hardware reboot, which is similar to the power-off and power-on cycle. The system configuration stays the same after the reboot cycle completes. Any changes that have not been applied are lost. When the support info download button is clicked, the configuration interface generates a support information file that support engineers can use when providing customer support. This file only needs to be generated at the engineers' request.

Configuration management display area 1816 allows a user to manage the radio's configuration routines and provides the option to reset the radio to factory default settings. The radio configuration is stored in a plain text file with a ".cfg" extension. A user can back up, restore, or update the system configuration file. More specifically, a user can back up the configuration file by clicking the download button to download the current system configuration file. To upload a configuration file, one can click the choose file button to locate the new configuration file. On a subsequently appearing screen (not shown in FIG. 28), the user can select the file and click open. It is recommended that one should back up the current system configuration before uploading the new configuration. Once the new file is open, the user can click the upload button to upload the new configuration file to the radio. After the radio is rebooted, the settings of the new configuration are displayed in the wireless, network, advanced, services, and system tabs of the configuration interface. The reset button in the reset to factory defaults field resets the radio to the factory default settings. This option will reboot the radio, and all factory default settings will be restored.

Figure 29:
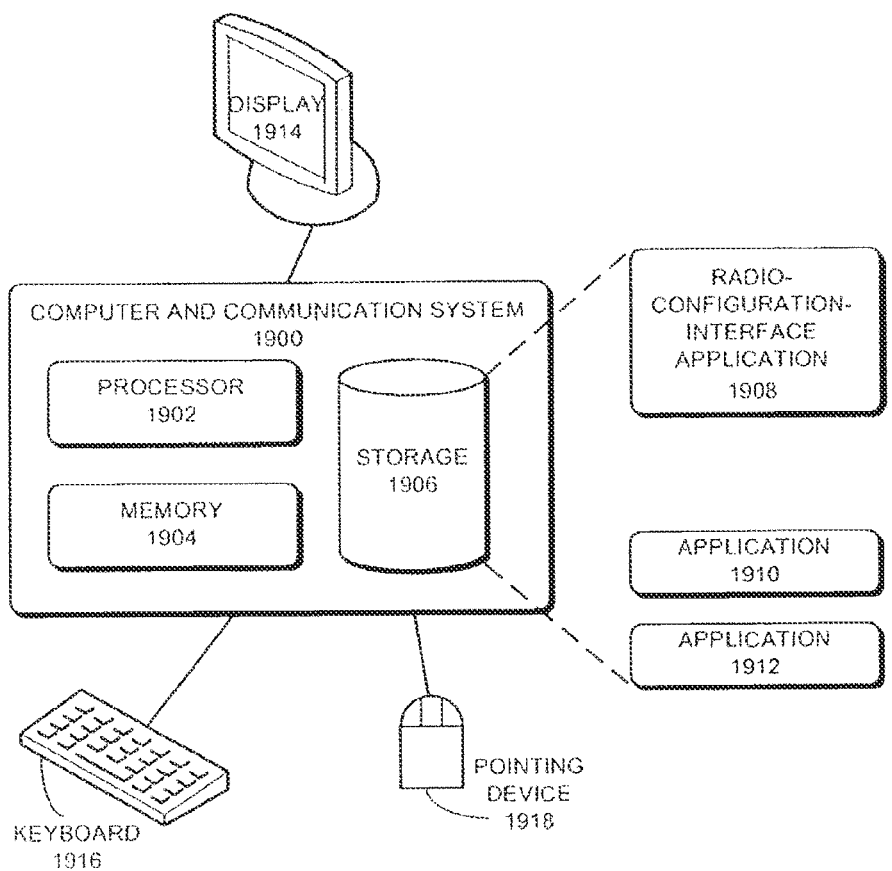
FIG. 29 illustrates an exemplary computer system for implementing a radio-configuration interface of devices

FIG. 29 illustrates an exemplary computer system for implementing the radio-configuration interface of devices, in accordance with one embodiment of the present invention. In one embodiment, a computer and communication system 1900 includes a processor 1902, a memory 1904, and a storage device 1906. Storage device 1906 stores a radio-configuration-interface application 1908, as well as other applications, such as applications 1910 and 1912. During operation, radio-configuration-interface application 1908 is loaded from storage device 1906 into memory 1904 and then executed by processor 1902. While executing the program, processor 1902 performs the aforementioned functions. Computer and communication system 1900 is coupled to an optional display 1914, keyboard 1916, and pointing device 1918. The display, keyboard, and pointing device can facilitate the use of the radio-configuration interface.

FIG. 30 presents a diagram illustrating one variation of the receive sensitivity specifications of the radio for various modulation schemes, in accordance with an embodiment of the present invention. As one can see from FIG. 30, in this example, the higher rate modulations support greater throughput but generally require stronger RF signals (with lower receive sensitivity).

FIG. 31 presents a diagram illustrating one variation of the general specifications of the radio, in accordance with an embodiment of the present invention.

The data structures and code described in this detailed description may be stored on a computer-readable storage medium, which may be any device or medium that can store code and/or data for use by a computer system. In some variations, the computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

This application should be read in the most general possible form. This includes, without limitation, the following: References to specific techniques include alternative and more general techniques, especially when discussing aspects of the invention, or how the invention might be made or used. References to "preferred" techniques generally mean that the inventor contemplates using those techniques, and thinks they are best for the intended application. This does not exclude other techniques for the invention, and does not mean that those techniques are necessarily essential or would be preferred in all circumstances. References to contemplated causes and effects for some implementations do not preclude other causes or effects that might occur in other implementations. References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Polarization-Preserving Microwave RF Filters

As mentioned above, polarization-preserving microwave RF filters are also described and illustrated herein. A radio device, including any of the radio devices described herein, may include a polarization-preserving microwave RF filter. As used herein, a "filter", and the like, generally refers to signal manipulation techniques, whether analog, digital, or otherwise, in which signals modulated onto distinct carrier frequencies can be separated, with the effect that those signals can be individually processed. By way of example only, in systems in which frequencies both in the approximately 2.4 GHz range and the approximately 5 GHz range are concurrently used, it might occur that a single band-pass, high-pass, or low-pass filter for the approximately 2.4 GHz range is sufficient to distinguish the approximately 2.4 GHz range from the approximately 5 GHz range, but that such a single band-pass, high-pass, or low-pass filter has drawbacks in distinguishing each particular channel within the approximately 2.4 GHz range or has drawbacks in distinguishing each particular channel within the approximately 5 GHz range. In such cases, a 1st set of signal filters might be used to distinguish those channels collectively within the approximately 2.4 GHz range from those channels collectively within the approximately 5 GHz range. A 2nd set of signal filters might be used to separately distinguish individual channels within the approximately 2.4 GHz range, while a 3rd set of signal filters might be used to separately distinguish individual channels within the approximately 5 GHz range.

Figure 34:
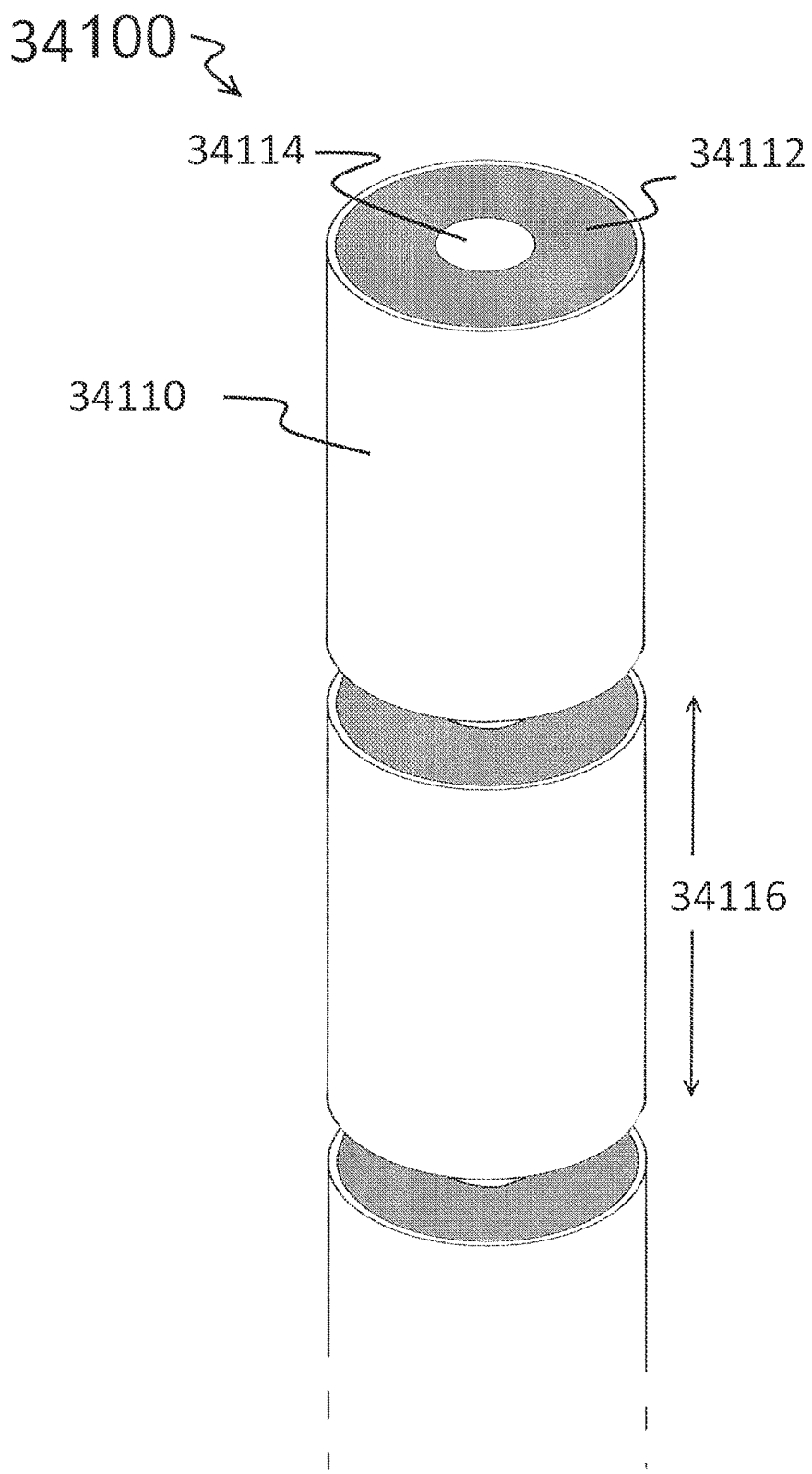
FIG. 34 shows certain structures and techniques which may be employed to effectuate some embodiments of a filter according to the current disclosure.

FIG. 34 illustrates certain structures and techniques which may be employed to effectuate some embodiments of a filter according to the current disclosure. In FIG. 34, a body 34110 is comprised of material that may be suitable for use as a waveguide in an RF System. For example and without limitation, circular waveguide may be employed to create the body 34110. Although the inventor contemplates the use of circular waveguide, this is not limiting because other shaped waveguide such as rectangular and oval may be employed to effectuate some embodiments.

The body 34110 is hollow and has an inner diameter determined by the RF frequency that would be used in the system. In order for the electromagnetic waves to travel with low loss, the body's inner diameter must be large enough for the lowest-order waveguide mode, the TE11 mode, to propagate. In circular waveguide, the cutoff wavelength for this mode is approximately 1.706×D (diameter) so the minimum waveguide diameter is approximately 0.59λ. For example and without limitation some embodiments may use a circular waveguide with a diameter approximately 65% of the wavelength of a predetermined radio frequency (0.65λ), above the cutoff frequency. One having skill in the art will appreciate that the next mode, TM01, needs a minimum diameter of 0.76λ, to propagate. While the inventor contemplates operating wavelengths in the 40 cm to 3 mm range, this disclosure should not be read as limiting operation to these frequencies.

The entrance to the body 34110 may be closed by a plate 34112. In certain embodiments this plate may be made of copper or plated copper depending on predetermined design criteria. Other embodiments may have an integrated closed end operable as a plate, obviating the need for a separate part. The integrated closed end may be coated with a material different from the body 34110. In the plate 34112 is an iris 34114 for receiving RF energy. Certain embodiments will have a plate 34112 with an iris 34114 on each end forming a resonant cavity. Conventionally a cavity resonator is a hollow conductor blocked at both ends and along which an electromagnetic wave can be supported. It can be viewed as a waveguide short-circuited at both ends. The cavity's interior surfaces reflect a wave of a specific frequency. When a wave that is resonant with the cavity enters, it bounces back and forth within the cavity, with low loss. As more wave energy enters the cavity, it combines with and reinforces the standing wave, increasing its intensity. Here, the irises 34114 at each end of the body 34110 transfer energy into and out of the body 34110. The amount of energy is dependent on the overall diameter of the iris 34114. For example and without limitation, the smaller the iris 34114 the less energy may be radiated out of the cavity.

In operation the structure of FIG. 34 may act as a cavity filter for a predetermined frequency. Conventionally, every cavity has numerous resonant frequencies that correspond to electromagnetic field modes satisfying necessary boundary conditions on the walls of the cavity. Because of these boundary conditions that must be satisfied at resonance (i.e. tangential electric fields must be zero at cavity walls), it follows that cavity length must be an integer multiple of half-wavelength at resonance. Accordingly, the inventor contemplates using a body with a length 34116 of approximately $(n\lambda)/2$, where n is an integer.

The quality factor (or Q) of a filter is a function of the energy in the cavity. In FIG. 34 it may be decomposed into three parts, power loss in the walls, power loss in the dielectric (generally air), and power loss through the irises 34114. Therefore control of the size of the iris 34114 substantially controls the Q factor of the cavity and its filtering capability. Placing multiple bodies 34110, each having end plates 34112 and irises 34114, improves the filtering by providing more filter poles.

One having skill in the art will recognize from this disclosure that placing multiple bodies as described herein effectuates a filter operable for microwave communications systems. The filer may be tuned by varying the size of the body 34110, the size of the irises 34114 and the length of the body 34116. Multiple segments provide for higher order filtering, thus allowing more complex filtering operations. Moreover, one having skill in the art will recognize that circular waveguide provides for more modes of transmission, including different polarizations than rectangular or oval waveguide. Accordingly, the techniques and structures described herein allow for dual and circular polarized filtering.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Figure 35:
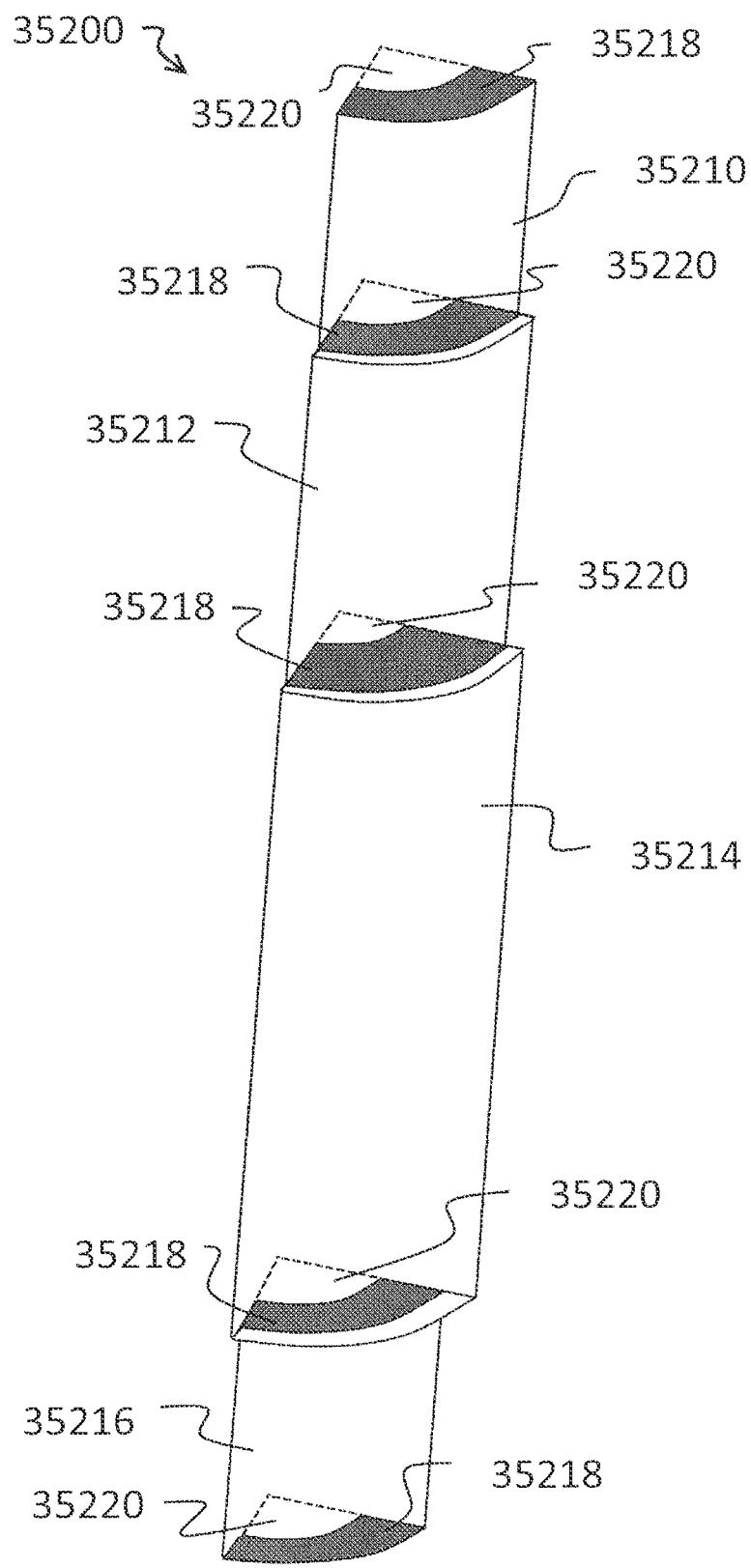
FIG. 35 shows a partial cutaway view of an embodiment of a multi-segmented filter.

FIG. 35 shows a partial cutaway view of an embodiment of a multi-segmented filter. FIG. 35 represents a quarter section view showing a plate 35218 with an iris 35220 exposed to view. In FIG. 35, hollow body sections 35210-35216 are aligned serially. The body sections may be of different lengths and diameters. For example and without limitation sections 35210 and 35216 may be approximately a half wavelength for the desired operating frequency whereas section 35212 is nearly a full wavelength and section 35214 two wavelengths.

Each segment is separated by a metal plate 35218 made from highly conductive material such as copper or other conductively plated material. The plates each have an iris 35220 positioned substantially in the center of the plate. Collectively the structure envisioned by FIG. 35 operates as a multi-pole filter, with each body section having its own Q factor determined by the diameter of the irises 35220. Note, that these iris diameters may be different for each plate 35218, thus providing for different energy transfer between the sections 35210 to 35216 and a different Q factor for each section. Multi-pole filters are well known in the art and a skilled artisan will appreciate the effect of using the techniques and structures here to effect filtering.

FIG. 35 shows polarization-preserving circular waveguide portion created from the hollow body sections 35210-35216. Conventional waveguide is often rectangular and thus limited to a particular polarization. FIG. 35 shows a waveguide polarization-preserving filter because of the rotational symmetry of the cross section of the interior of the sections 35201-35216 and the circular irises 35220. However, this disclosure should not be limited to circular waveguide filters because other interior dimensions will act to preserve polarization of a waveform, for example, and without limitation, components with two-plane identical ridges, such as quadruple-ridged waveguides.

Any of the data structures and code described in this detailed description may be stored on a (non-transient) computer-readable storage medium, which may be any device or medium that can store code and/or data for use by a computer system. In some variations, the computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

This application should be read in the most general possible form. This includes, without limitation, the following: References to specific techniques include alternative and more general techniques, especially when discussing aspects of the invention, or how the invention might be made or used. References to "preferred" techniques generally mean that the inventor contemplates using those techniques, and thinks they are best for the intended application. This does not exclude other techniques for the invention, and does not mean that those techniques are necessarily essential or would be preferred in all circumstances. References to contemplated causes and effects for some implementations do not preclude other causes or effects that might occur in other implementations. References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described above to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This application should be read with the following terms and phrases in their most general form. The general meaning of each of these terms or phrases is illustrative, not in any way limiting. The terms "antenna", "antenna system" and the like, generally refer to any device that is a transducer designed to transmit or receive electromagnetic radiation. In other words, antennas convert electromagnetic radiation into electrical currents and vice versa. Often an antenna is an arrangement of conductor(s) that generate a radiating electromagnetic field in response to an applied alternating voltage and the associated alternating electric current, or can be placed in an electromagnetic field so that the field will induce an alternating current in the antenna and a voltage between its terminals.

The term "gain" generally means a dimensionless quality of an antenna characterized by the ratio of the power received by the antenna from a source along its beam axis to the power received by a hypothetical isotropic antenna. The term "waveguide" generally means a structure that guides waves, such as electromagnetic waves. Conventionally there are different types of waveguides for each type of wave. For example and without limitation a hollow conductive metal pipe may be used to carry high frequency radio waves, particularly microwaves. Waveguides may differ in their geometry and physical makeup because different waveguides are used to guide different frequencies: an optical fiber guiding light (high frequency) will not guide microwaves (which have a much lower frequency).

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising", when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately", even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A device for transmission of wireless signals that switches between duplexing schemes, the device comprising:
   radio circuitry configured to utilize a plurality of duplexing schemes to transmit a radio-frequency signal in a frequency channel from a transmitting reflector and to receive a radio-frequency signal from a receiving reflector, wherein the radio circuitry comprises a transmitter and a receiver, further wherein the transmitter is coupled to the transmitting reflector and the receiver is coupled to the receiving reflector; and
   a detector coupled to either the transmitting reflector or the receiving reflector, wherein the detector is configured to monitor the same frequency channel as the radio-frequency signal transmitted by the radio circuitry to detect a reflection of the transmitted radio-frequency signal,
   wherein the device is configured to trigger switching of duplexing schemes for the device when the reflection is detected,
   wherein the detector comprises a correlator configured to correlate a received signal with the transmitted radio-frequency signal to detect the reflection of the transmitted radio-frequency signal.

2. The device of claim 1, wherein the reflection is detected when the correlator indicates that the received signal is highly correlated with the transmitted radio-frequency signal.

3. The device of claim 1, wherein at least one of the transmitting reflector and the receiving reflector includes a parabolic reflector.

4. The device of claim 1, further configured to switch duplexing schemes for the device upon triggering.

5. The device of claim 1, further wherein the device is configured to present an alert to a user to manually switch duplexing schemes for the device upon triggering.

6. The device of claim 1, wherein the device is configured to trigger switching from frequency-division duplexing (FDD) to time-division duplexing (TDD) when the reflection is detected.

7. The device of claim 1, wherein the device is configured to trigger switching from frequency-division duplexing (FDD) to time-division duplexing (TDD) when a power of a detected reflection is greater than a threshold power level.

8. The device of claim 1, wherein the device is configured to trigger for switching from frequency-division duplexing (FDD) to time-division duplexing (TDD) when a power of the detected reflection is greater than a threshold power level and return to FDD if the power of the detected reflection is below the threshold power level or if the detector does not detect a reflected signal.

9. The device of claim 1, wherein the detector is coupled to the receiving reflector.

10. The device of claim 1, wherein the radio circuitry comprises a pair of transmitters and a pair of receivers, wherein the transmitters are coupled to the transmitting reflector and the receivers are coupled to the receiving reflector.

11. The device of claim 1, wherein the detector comprises a detector receiver coupled to the receiving reflector.

12. The device of claim 1, wherein the detector is configured as a spectrum analyzer.

13. A device for transmission of wireless signals that performs continuous dynamic frequency selection (DFS), the device comprising:
- radio circuitry configured to transmit radio-frequency signals in a frequency channel from a transmitting reflector and to receive radio-frequency signals from a receiving reflector, wherein the radio circuitry comprises a plurality of transmitters and a plurality of receivers, further wherein the plurality of transmitters are coupled to the transmitting reflector and the plurality of receivers are coupled to the receiving reflector; and
- a detector configured to operate concurrently with transmission by the radio circuitry, the detector coupled to either the transmitting reflector or the receiving reflector,
- wherein the device is configured to switch the frequency channel that the radio circuitry transmits on when a radar signal is detected,
- wherein the detector comprises a correlator configured to correlate a received signal with a known radar signal to detect the radar signal.

14. The device of claim 13, wherein the radar signal is detected when the correlator indicates that the received signal is highly correlated with the known radar signal.

15. The device of claim 13, wherein at least one of the transmitting reflector and the receiving reflector includes a parabolic reflector.

16. The device of claim 13, wherein the detector is coupled to the receiving reflector.

17. The device of claim 13, wherein the radio circuitry comprises a pair of transmitters and a pair of receivers, wherein the transmitters are coupled to the transmitting reflector and the receivers are coupled to the receiving reflector.

18. The device of claim 13, wherein the detector comprises a detector receiver coupled to the receiving reflector.

19. The device of claim 13, wherein the detector is configured as a spectrum analyzer.

20. A device for transmission of wireless signals that continuously monitors a transmitted frequency channel to avoid interference, the device comprising:
- radio circuitry configured to transmit a radio-frequency signal in a frequency channel from a parabolic transmitting reflector and to receive a radio-frequency signal from a parabolic receiving reflector, further wherein the radio circuitry comprises a transmitter and a receiver, wherein the transmitter is coupled to the parabolic transmitting reflector and the receiver is coupled to the parabolic receiving reflector; and
- a detector configured to operate concurrently with transmission by the radio circuitry, the detector coupled to either the parabolic transmitting reflector or the parabolic receiving reflector, wherein the detector is configured to continuously monitor the same frequency channel as the radio-frequency signal transmitted by the radio circuitry to detect interference including a reflection of the transmitted radio-frequency signal and a radar signal,
- wherein the device is configured to switch duplexing schemes for the device when the reflection is detected and to switch the frequency channel that the radio circuitry transmits on when a radar signal is detected,
- wherein the detector comprises a correlator configured to correlate a signal received by the detector with the radio-frequency signal transmitted by the radio circuitry to detect the reflection of the transmitted radio-frequency signal.

\* \* \* \* \*